(12) United States Patent
Hozumi et al.

(10) Patent No.: US 7,729,058 B2
(45) Date of Patent: Jun. 1, 2010

(54) ZOOM LENS SYSTEM AND ELECTRONIC IMAGE PICKUP APPARATUS USING THE SAME

(75) Inventors: Kouki Hozumi, Hachioji (JP); Takahiro Amanai, Sagamihara (JP); Toru Miyajima, Hachioji (JP); Masahito Watanabe, Hachioji (JP); Masashi Hankawa, Hachioji (JP); Kazuya Nishimura, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 712 days.

(21) Appl. No.: 11/604,032

(22) Filed: Nov. 21, 2006

(65) Prior Publication Data

US 2007/0121217 A1    May 31, 2007

(30) Foreign Application Priority Data

| Nov. 25, 2005 | (JP) | ............................. 2005-340261 |
| Feb. 21, 2006 | (JP) | ............................. 2006-043406 |
| Jun. 1, 2006  | (JP) | ............................. 2006-153336 |

(51) Int. Cl.
*G02B 15/14* (2006.01)

(52) U.S. Cl. .................. 359/680; 359/682; 359/683; 359/684; 359/685; 359/689; 359/716; 359/740; 359/753; 359/784; 359/761; 359/770; 359/781

(58) Field of Classification Search ................. 359/680, 359/682–685, 689, 716, 740, 753, 784, 761, 359/770, 781

See application file for complete search history.

(56) References Cited

U.S. PATENT DOCUMENTS

| 6,191,896 | B1  | 2/2001 | Itoh |
| 6,233,099 | B1  | 5/2001 | Itoh |
| 6,351,337 | B1  | 2/2002 | Tanaka |
| 6,611,386 | B2  | 8/2003 | Tanaka |
| 2001/0022694 | A1 | 9/2001 | Tanaka |
| 2003/0169508 | A1* | 9/2003 | Ori ........................... 359/680 |

FOREIGN PATENT DOCUMENTS

| JP | 2000-284177 | 10/2000 |
| JP | 2001-242378 | 9/2001 |

* cited by examiner

*Primary Examiner*—Evelyn A. Lester
(74) *Attorney, Agent, or Firm*—Kenyon & Kenyon LLP

(57) ABSTRACT

A zoom lens system includes, in order from an object side, a first lens unit having a negative refractive power, a second lens unit having a positive refractive power, and a third lens unit having a positive refractive power. During zooming from a wide-angle end to a telephoto end, a space between the first lens unit and the second lens unit narrows, at least the second lens unit moves only toward the object side, and the third lens unit is constituted of one positive lens.

48 Claims, 53 Drawing Sheets

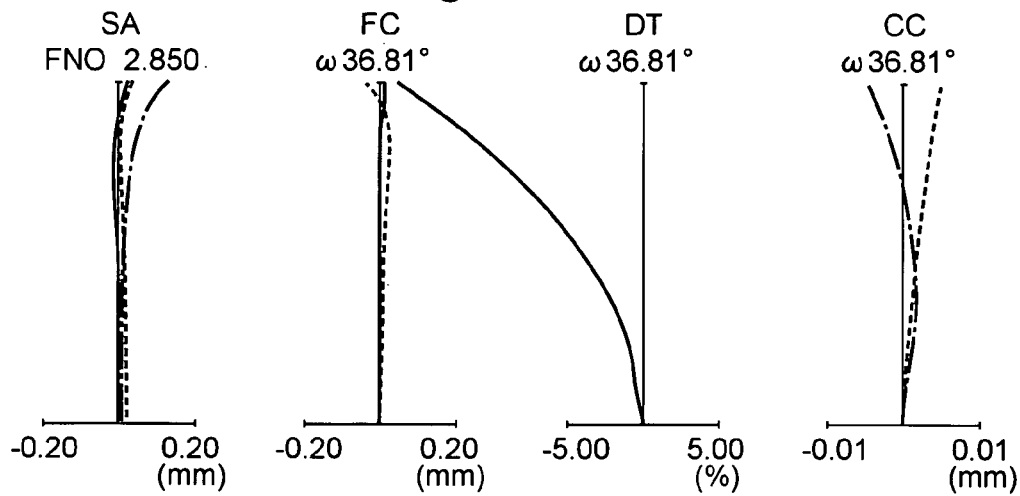
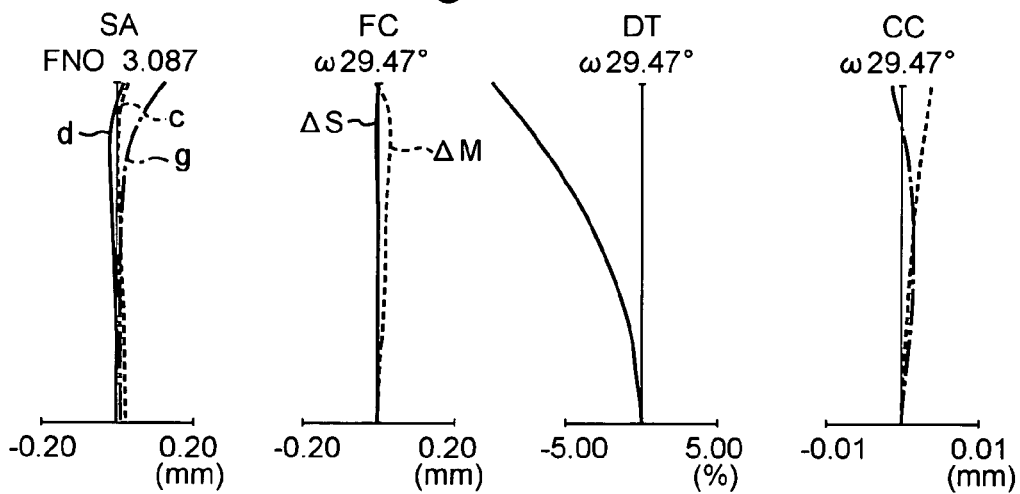
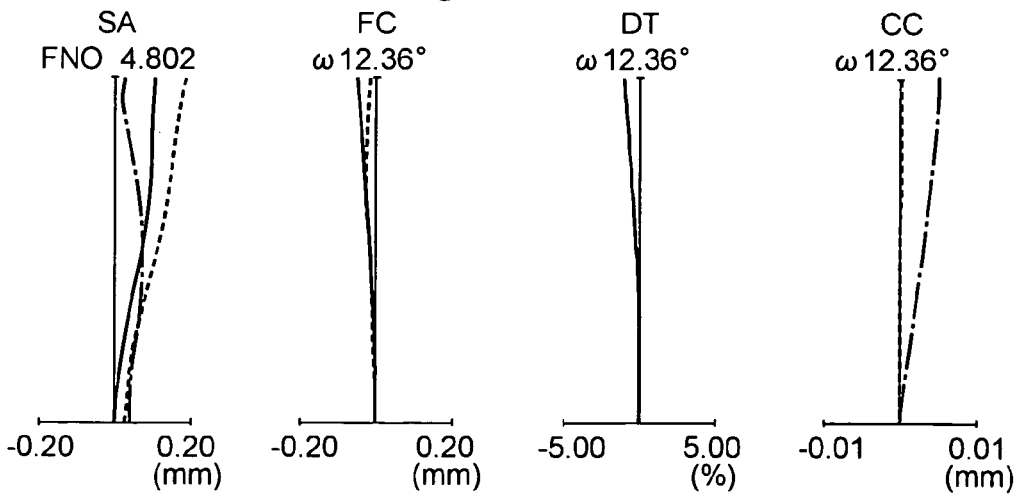

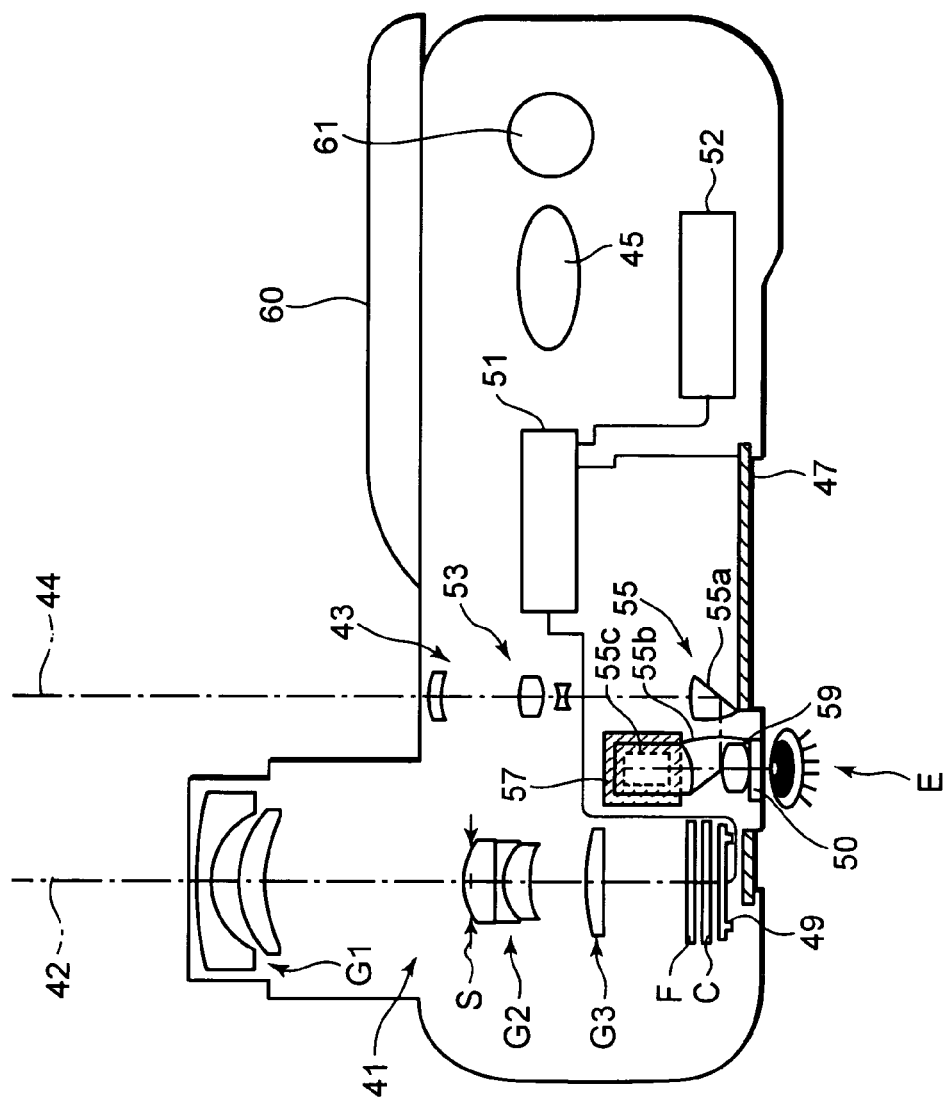

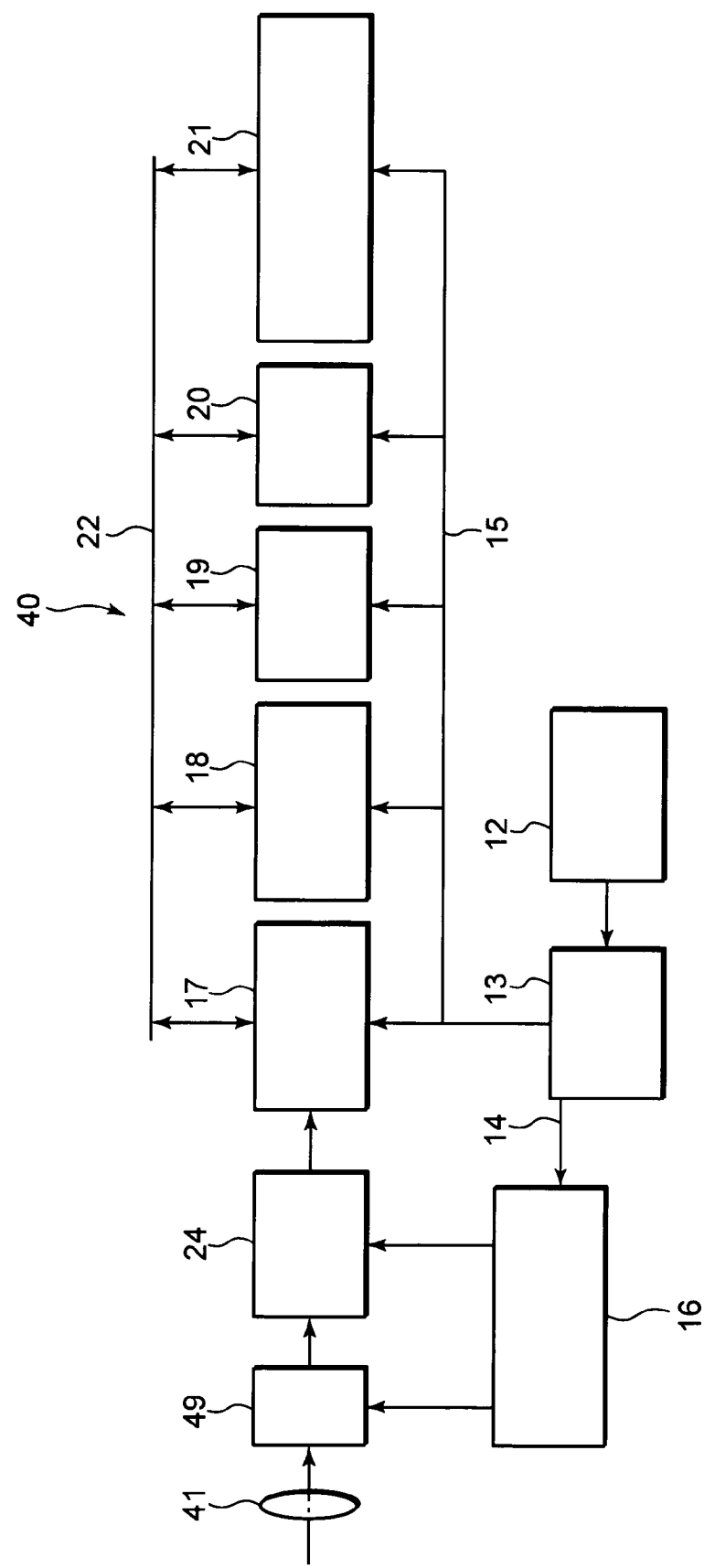

ZOOM LENS SYSTEM AND ELECTRONIC IMAGE PICKUP APPARATUS USING THE SAME

CROSS REFERENCE TO RELATED APPLICATIONS

This application claims benefit under 35 U.S.C. sec. 119 of Japanese patent applications of No. 2005-340261 filed on Nov. 25, 2005, No. 2006-043406 filed on Feb. 21, 2006 and No. 2006-153336 filed on Jun. 1, 2006, the contents of which are incorporated herein by reference.

BACKGROUND OF THE INVENTION

1. Field of the Invention

The present invention relates to a zoom lens system and an electronic image pickup apparatus using the same.

2. Description of the Related Art

In recent years, miniaturization of digital still cameras and mounting of image pickup functions on cellular phones have been advanced. In consequence, it is demanded to further miniaturize and thin image pickup lenses. As these image pickup lenses, there are demanded zoom lens systems having a zoom ratio above 2.5.

As methods for realizing the thin zoom lens systems, there are known a method of bending the optical axis in the vertical direction by disposing a reflecting member in the zoom lens system, and also a method of moving a part of lens units constituting the zoom lens system to the outside of the optical path when the image pickup apparatus is in non-use state.

However, the method of bending the optical axis by use of the reflecting member requires a space for bending rays and a space for moving the lens unit in order to secure the zoom ratio. Since these spaces are not eliminated even when the image pickup apparatus such as a camera is not used, this method is disadvantageous to decrease of the volume of the image pickup apparatus when unused. Furthermore, when the optical axis is bent, layout in the image pickup apparatus is limited.

On the other hand, in the method of moving a part of the lens units to the outside when unused, a mechanism for moving the lens units is required. Therefore, eccentricity of the lens units from the optical axis tends to occur and it is difficult to suppress the adverse influence of the eccentricity. In addition, since driving means for moving the lens units is required, it is difficult to suppress the volume of the apparatus when unused. This method is also disadvantageous in view of costs.

As another method for realizing the thin zoom lens system, a method of using a collapsible type structure in the lens barrel of the zoom lens system. As refractive power layouts of the zoom lens systems for which usual collapsible type lens barrels are intended to use, there are known a two-unit zoom lens system having a refractive power layout of a negative-positive type from an object side; a 3-unit zoom lens system of a negative-positive-negative type; and a 3-unit zoom lens system of a negative-positive-positive type.

Among them, the zoom lens system of the negative-positive type is advantageous in reducing total thickness of the lens frames which directly hold lenses since the number of the lens units is small. However, in order to decrease the total length while securing the zoom ratio, the first lens unit needs to be reciprocated in the optical axis direction and the second lens unit needs to be moved in a region which includes the equal magnification position of the second lens unit during zooming. In this case, when the second lens unit is moved to perform focusing, a movement direction of the second lens unit during focusing from infinity to a short distance is reversed in a magnification state before and after the equal magnification position of the second lens unit. Further, when the zoom lens system is focused on infinity while the second lens unit is in the equal magnification position, focusing to the short distance cannot be performed by the movement of the second lens unit. That is, the second lens unit cannot be used as a focusing lens unit. In consequence, the first lens unit or the whole zoom lens system needs to be moved for focusing, and the total length of the lens barrel including the focusing mechanism increases. Therefore, in this case, this type is disadvantageous in thinning the zoom lens system and securing the zoom ratio.

On the other hand, the zoom lens system of the negative-positive-negative type and the zoom lens system of the negative-positive-positive type are advantageous in that the increase of the total length can be suppressed by performing focusing by the third lens unit.

The 3-unit zoom lens system having a refractive power layout of the negative-positive-negative in order from the object side is advantageous to miniaturization, because it is possible to reduce the diameter of the front lens. However, since the above described type of power layout includes a negative refractive power immediately before the paraxial image surface, this type is disadvantageous in decreasing the F-number to constitute a bright zoom lens system. The incidence angle of an off-axial light flux for the maximum image height on the image surface easily increases, and the type is easily influenced by shading in a case where a CCD image sensor is used.

Moreover, although the layout is advantageous to miniaturization, the type is easily influenced by manufacturing errors, because the image is enlarged by the negative lens unit on the image side. Therefore, it is difficult to obtain a stable optical performance.

On the other hand, the 3-unit zoom lens system having a refractive power layout of negative-positive-positive in order from the object side is advantageous in that the stable optical performance can easily be obtained, focusing can be performed by the third lens unit, change of the total length of the zoom lens system during focusing is suppressed and the total length is reduced. This lens system is also preferable in respect of the performance and simplification of a mechanism.

As a zoom lens system of the negative-positive-positive type, there is known a zoom lens system in which the third lens unit moves to a position closer to the image side in the telephoto end than in the wide-angle end or hardly moves. However, in such a form of movement of the lens unit, since the third lens unit is positioned close to the image surface in the telephoto end, the height of an off-axial ray increases in the third lens unit, and the diameter of each lens easily increases. In the case where the third lens unit moves for focusing operation, when the third lens unit is positioned close to the image surface, the focusing sensitivity (the movement amount of the image surface position at a time when the focusing lens moves as much as a unit movement amount) easily decreases. Therefore, the third lens unit necessarily has a strong positive power, and it is difficult to suppress the axial thickness of the third lens unit.

As examples of the zoom lens system in which the third lens unit moves toward the object side during the zooming toward the telephoto end, there are known zoom lens systems described in Japanese Patent Application Laid-Open Nos. 2000-284177 and 2001-242378, third and fourth embodiments of Japanese Patent No. 3,513,369 and a second embodiment of Japanese Patent No. 3,606,548. The Japanese Patent Application Laid-Open Nos. 2000-284177 and 2001-242378 and Japanese Patent No. 3,513,369 disclose examples in which the second and third lens units move toward the object side during the zooming toward the telephoto end. Furthermore, Japanese Patent Application Laid-Open Nos. 2000-284177 and 2001-242378 and Japanese Patent No. 3,606,548 disclose examples in which the second and third lens units integrally move during zooming, and only the third lens unit moves during focusing.

SUMMARY OF THE INVENTION

A zoom lens system according to the present invention comprises, in order from an object side: a first lens unit having a negative refractive power; a second lens unit having a positive refractive power; and a third lens unit having a positive refractive power, wherein during zooming from a wide-angle end to a telephoto end, a space between the first lens unit and the second lens unit narrows.

In the first aspect of the present invention, the zoom lens system is a 3-unit zoom lens system, wherein during the zooming from the wide-angle end to the telephoto end, at least the second and third lens units move only toward the object side.

In one preferable example according to the first aspect, the second lens unit comprises a cemented lens component which comprises, in order from the object side, a positive lens element, a negative lens element and a positive lens element, and the three lens elements are cemented on an optical axis.

The third lens unit comprises one positive lens element, and the total number of the lens elements in the third lens unit is one.

In another preferable example according to the first aspect, the first lens unit comprises, in order from the object side, a negative lens element and a positive lens element, and the total number in the lens elements of the first lens unit is two.

The second lens unit comprises a positive lens element and a negative lens element, and the total number of the lens elements in the second lens unit is three.

The third lens unit comprises a positive lens element, the total number of the lens elements in the third lens unit is one, and the zoom lens system satisfies the following condition (1A):

$$1.0 < Cjmax/f_t < 2.0 \quad (1A),$$

wherein Cjmax is a maximum value of a distance from an incidence surface of the first lens unit to the image surface of the zoom lens system in a zooming region, and $f_t$ is a focal length of the zoom lens system in the telephoto end.

In still another preferable example according to the first aspect, the first lens unit comprises, in order from the object side, a negative lens element and a positive lens element, and the total number of the lens elements in the first lens unit is two.

The second lens unit comprises a positive lens element and a negative lens element, and the total number of the lens elements in the second lens unit is three.

The third lens unit comprises a positive lens element, the total number of the lens elements in the third lens unit is one, and the zoom lens system satisfies the following conditions (4A) and (5A):

$$1.2 < |\Delta 2g/f_w| < 2.0 \quad (4A); \text{ and}$$

$$0.4 < \Sigma d2g/f_w < 0.74 \quad (5A),$$

wherein $\Delta 2g$ is a movement amount of the second lens unit during the zooming from the wide-angle end to the telephoto end, $\Sigma d2g$ is a thickness of the second lens unit along the optical axis and $f_w$ is a focal length of the zoom lens system in the wide-angle end.

In the second aspect of the present invention, the space between the second lens unit and the third lens unit changes during zooming or during focusing operation.

During the zooming from the wide-angle end to the telephoto end, at least the second lens unit moves only toward the object side so that a space between the first lens unit and the second lens unit narrows.

The first lens unit comprises, in order from the object side, a negative lens element and a positive lens element, and the total number of the lens elements in the first lens unit is two.

The second lens unit comprises three lens elements in total.

The third lens unit comprises a positive lens element, and the total number of the lens elements in the third lens unit is one.

The total number of the lens elements in the zoom lens system is six.

In one preferable example according to the second aspect, during the zooming from the wide-angle end to the telephoto end, the third lens unit also moves only toward the object side.

The zoom lens system satisfies the following condition (1B):

$$0.45 < \Sigma d1G/f_w < 0.65 \quad (1B),$$

wherein $\Sigma d1G$ is a thickness of the first lens unit along the optical axis, and $f_w$ is a focal length of the zoom lens system in the wide-angle end.

In another preferable example according to the second aspect, the space between the second lens unit and the third lens unit changes during zooming.

During the zooming from the wide-angle end to the telephoto end, the third lens unit moves so as to be positioned closer to the object side in the telephoto end than in the wide-angle end.

The zoom lens system satisfies the following conditions (2B) and (3B):

$$0.04 < D_2(w)/f_3 < 0.23 \quad (2B); \text{ and}$$

$$0.04 < D_2(t)/f_3 < 0.23 \quad (3B),$$

wherein $D_2(w)$ is an air space between the second lens unit and the third lens unit along the optical axis in the wide-angle end, $D_2(t)$ is an air space between the second lens unit and the third lens unit along the optical axis in the telephoto end, and $f_3$ is a focal length of the third lens unit.

In still another preferable example according to the second aspect, during the zooming from the wide-angle end to the telephoto end, the third lens unit moves so as to be positioned closer to the object side in the telephoto end than in the wide-angle end.

The zoom lens system satisfies the following condition (4B):

$$0.04 < D_2/f_3 < 0.18 \quad (4B),$$

wherein $D_2$ is an air space between the second lens unit and the third lens unit along the optical axis in an arbitrary state between the wide-angle end and the telephoto end, and $f_3$ is a focal length of the third lens unit.

In the third aspect of the present invention, during the zooming from the wide-angle end to the telephoto end, at least the second and third lens units move only toward the object side.

The first lens unit comprises, in order from the object side, a negative lens element and a positive lens element, and the total number of the lens elements in the first lens unit is two.

The third lens unit comprises a positive lens element, and the total number of the lens elements in the third lens unit is one.

In one preferable example according to the third aspect, each lens surface of the zoom lens system brought into contact with air on the optical axis, excluding a lens surface closest to the object side, has a center of paraxial curvature on the image side of the vertex of the lens surface.

In another example according to the third aspect, the lens surface of the first lens unit closest to the image side is a concave surface which faces the image side, the lens surface of the second lens unit closest to the object side is a convex surface which faces the object side, the lens surface of the second lens unit closest to the image side is a concave surface which faces the image side, and the lens surface of the third lens unit closest to the object side is a convex surface which faces the object side.

The zoom lens system satisfies the following conditions (1C) and (2C):

$$1.0 < RG1I/RG2O < 6.0 \quad (1C); \text{ and}$$

$$0.5 < RG2I/RG3O < 3.0 \quad (2C),$$

wherein RG1I is a paraxial radius of curvature of the lens surface of the first lens unit closest to the image side, RG2O is a paraxial radius of curvature of the lens surface of the second lens unit closest to the object side, RG2I is a paraxial radius of curvature of the second lens unit closest to the image side, and RG3O is a paraxial radius of curvature of the lens surface of the third lens unit closest to the object side.

It is to be noted that the above described zoom lens system can be used as image pickup lens of an image pickup apparatus. In this case, it is preferable that the image pickup apparatus comprises the zoom lens system according to the present invention; and an image sensor which is disposed on the image side of the zoom lens system and which converts an image formed by the zoom lens system into an electric signal.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A shows a state in a wide-angle end, FIG. 1B shows an intermediate state, and FIG. 1C shows a state in a telephoto end;

FIG. 2A shows a state in a wide-angle end, FIG. 2B shows an intermediate state, and FIG. 2C shows a state in a telephoto end;

FIG. 3A shows a state in a wide-angle end, FIG. 3B shows an intermediate state, and FIG. 3C shows a state in a telephoto end;

FIG. 4A shows a state in a wide-angle end, FIG. 4B shows an intermediate state, and FIG. 4C shows a state in a telephoto end;

FIG. 5A shows a state in a wide-angle end, FIG. 5B shows an intermediate state, and FIG. 5C shows a state in a telephoto end;

FIG. 6A shows a state in a wide-angle end, FIG. 6B shows an intermediate state, and FIG. 6C shows a state in a telephoto end;

FIG. 7A shows a state in a wide-angle end, FIG. 7B shows an intermediate state, and FIG. 7C shows a state in a telephoto end;

FIG. 8A shows a state in a wide-angle end, FIG. 8B shows an intermediate state, and FIG. 8C shows a state in a telephoto end;

FIG. 17A shows a state in a wide-angle end, FIG. 17B shows an intermediate state, and FIG. 17C shows a state in a telephoto end;

FIG. 18A shows a state in a wide-angle end, FIG. 18B shows an intermediate state, and FIG. 18C shows a state in a telephoto end;

FIG. 19A shows a state in a wide-angle end, FIG. 19B shows an intermediate state, and FIG. 19C shows a state in a telephoto end;

FIG. 20A shows a state in a wide-angle end, FIG. 20B shows an intermediate state, and FIG. 20C shows a state in a telephoto end;

FIG. 21A shows a state in a wide-angle end, FIG. 21B shows an intermediate state, and FIG. 21C shows a state in a telephoto end;

FIG. 22A shows a state in a wide-angle end, FIG. 22B shows an intermediate state, and FIG. 22C shows a state in a telephoto end;

FIG. 23A shows a state in a wide-angle end, FIG. 23B shows an intermediate state, and FIG. 23C shows a state in a telephoto end;

FIG. 38A shows a state in a wide-angle end, FIG. 38B shows an intermediate state, and FIG. 38C shows a state in a telephoto end;

FIG. 39A shows a state in a wide-angle end, FIG. 39B shows an intermediate state, and FIG. 39C shows a state in a telephoto end;

FIG. 40A shows a state in a wide-angle end, FIG. 40B shows an intermediate state, and FIG. 40C shows a state in a telephoto end;

FIG. 41A shows a state in a wide-angle end, FIG. 41B shows an intermediate state, and FIG. 41C shows a state in a telephoto end;

FIG. 42A shows a state in a wide-angle end, FIG. 42B shows an intermediate state, and FIG. 42C shows a state in a telephoto end;

FIG. 43A shows a state in a wide-angle end, FIG. 43B shows an intermediate state, and FIG. 43C shows a state in a telephoto end;

FIG. 44A shows a state in a wide-angle end, FIG. 44B shows an intermediate state, and FIG. 44C shows a state in a telephoto end;

FIG. 45A shows a state in a wide-angle end, FIG. 45B shows an intermediate state, and FIG. 45C shows a state in a telephoto end;

FIG. 50A is an aberration diagram of the twentieth embodiment in the wide-angle end when focused on the infinite object, FIG. 50B is an aberration diagram in the intermediate state, and FIG. 50C is an aberration diagram in the telephoto end;

FIG. 58 is a schematic sectional view showing an inner constitution of the digital camera showing in FIG. 56; and FIG. 59 is a block diagram of a main inner circuit of the digital camera shown in FIG. 56.

DETAILED DESCRIPTION OF THE PREFERRED EMBODIMENTS

Figure 1A:
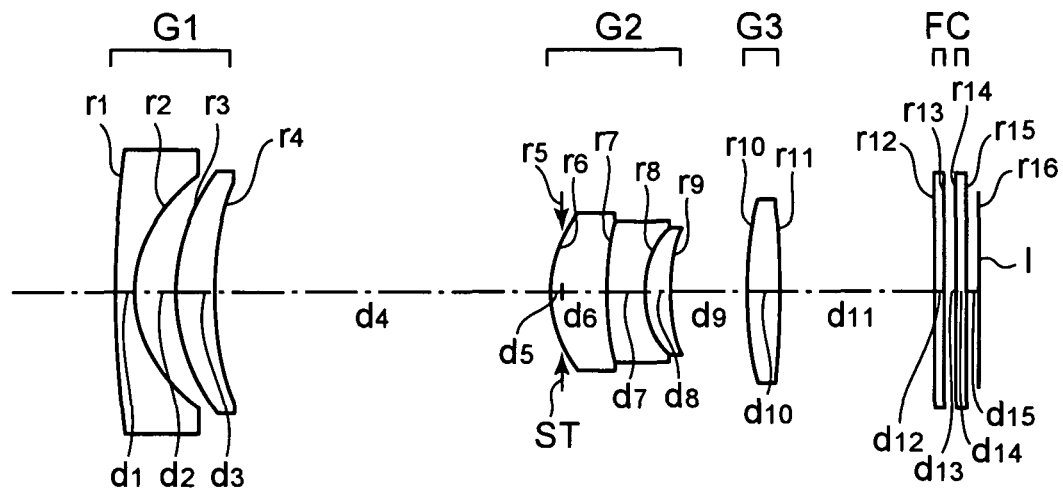
FIGS. 1A to 1C are sectional views of the first embodiment of the present invention when focused on an infinite object.

First, the first aspect of the present invention will be described.

As described above, the zoom lens system according to the first aspect of the present invention is a 3-unit zoom lens system comprising, in order from an object side, a first lens unit having a negative refractive power, a second lens unit having a positive refractive power and a third lens unit having a positive refractive power.

During the zooming from a wide-angle end to a telephoto end, a space between the first lens unit and the second lens unit narrows, and at least the second and third lens units move only toward the object side.

Moreover, in one preferable example, the second lens unit comprises a cemented lens component which comprises, in order from the object side, a positive lens element, a negative lens element and a positive lens element, and the three lens elements are cemented on an optical axis.

The third lens unit comprises one positive lens element, and the total number of the lens elements in the third lens unit is one.

According to such a constitution, as compared with the case where the third lens unit is fixed or moves toward an image side during zooming, the ray height in the third lens unit can be lowered. Therefore, the diameter of the third lens unit can be reduced. Especially, since the third lens unit is constituted of one positive lens element, the constitution of the third lens unit is simplified, and this constitution is advantageous to miniaturization of the zoom lens system in a collapsed state. It is to be noted that it is further preferable that the third lens unit is constituted of a single plastic lens to decrease the weight of the unit.

Moreover, the second lens unit is constituted of one cemented lens component including at least three lens elements of a positive lens element, a negative lens element and a positive lens element in order from the object side, which are cemented on the optical axis.

According to such a constitution, generation of aberrations in the second lens unit is easily suppressed.

Especially, the constitution of the second lens unit is advantageous in that air spaces are omitted from the second lens unit, the second lens unit itself is miniaturized and a space for moving the third lens unit is secured.

Moreover, to thin the zoom lens system in the collapsed state, it is effective to thin not only the lens units but also the lens frames for holding the lens units. When the second lens unit is constituted of one cemented lens component, the whole cemented lens component can be held by holding at least a part of one of the lens elements of the second lens unit. Therefore, the thickness of the lens frame can be reduced. This is advantageous in thinning the zoom lens system in the collapsed state.

It is preferable that focusing is performed by moving only the third lens unit.

In the zoom lens system according to the first aspect of the present invention, the third lens unit is positioned closer to the object side when the zoom lens system is brought closer to the telephoto end. In this case, the focusing sensitivity of the third lens unit increases, and the power of the third lens unit may be weakened. Therefore, the thickness of the third lens unit can be reduced, and this constitution is advantageous in thinning the zoom lens system in the collapsed state.

Moreover, in the case where the third lens unit is used as a focusing lens unit, since the third lens unit is constituted of one lens element and weight thereof is suppressed, the driving system for the third lens unit can be simplified, and this contributes to miniaturization of the lens barrel of the zoom lens system.

The focusing sensitivity of the third lens unit depends on magnification of the third lens unit. Therefore, it is preferable to satisfy the following condition so that the focusing sensitivity of the third lens unit in the telephoto end appropriately increases:

$$0.5 < 1 - \beta_{3T}^2 < 1.0 \tag{BA},$$

wherein $\beta_{3T}$ is a lateral magnification of the third lens unit in the telephoto end.

In the case where the value of the condition (BA) exceeds the upper limit of 1.0, the lateral magnification of the third lens unit increases in a minus direction and the distance from the third lens unit to the image forming surface increases. This will adversely affect miniaturization of the zoom lens system. When the value of the condition (BA) is below the lower limit of 0.5, since the movement amount of the third lens unit increases and the space for focusing operation increases, the effect of miniaturization of the zoom lens system in the used state decreases.

Moreover, in the above zoom lens system, it is preferable that the first lens unit includes, in order from the object side, a negative lens element and a positive lens element, and includes two lenses in total. According to such a constitution, while the principal point of the first lens unit is positioned closer to the object side to miniaturize the zoom lens system in the used state, the aberration such as chromatic aberration is easily corrected with a good balance. This constitution is also effective for maintaining the optical performance and for thinning the lens barrel in the collapsed state.

In another preferable example according to the first aspect, the first lens unit comprises, in order from the object side, a negative lens element and a positive lens element, and the total number of the lens elements in the first lens unit is two.

The second lens unit comprises a positive lens element and a negative lens element, and the total number of the lens elements in the second lens unit is three.

The third lens unit comprises a positive lens element, the total number of the lens elements in the third lens unit is one, and the zoom lens system satisfies the following condition (1A):

$$1.0 < Cj\max/f_t < 2.0 \qquad (1A),$$

wherein Cjmax is a maximum value of distance from an incidence surface of the first lens unit to an image surface of the zoom lens system in the zooming region, and $f_t$ is a focal length of the zoom lens system in the telephoto end.

When the first lens unit is constituted as described above, miniaturization and the securing of the aberration performance of the zoom lens system are easily balanced.

When the second lens unit is constituted as described above, thinning and the optical performance of the zoom lens system are easily balanced. The constitution is also advantageous in securing the space for moving the third lens unit.

Moreover, the condition (1A) defines the maximum value of the total length (the distance from the incidence surface of the first lens unit to the image surface) of the zoom lens system with respect to the focal length of the zoom lens system in the telephoto end. When the condition is satisfied, the thinning of the lens barrel and the correction of aberration are satisfactorily balanced.

If the value of the condition (1A) is below the lower limit of 1.0, the power of each lens unit strengthens, and it is difficult to correct, with a good balance, aberrations such as an off-axial aberration generated in the first lens unit in the wide-angle end and an axial aberration generated in the second lens unit. Alternatively, aberrations are largely influenced by the manufacturing error, and adjustment during assembling is difficult.

If the value of the condition (1A) exceeds the upper limit of 2.0, the total length of the zoom lens system increases, and the total length of the lens barrel therefore increases. Therefore, the number of steps of the collapsible lens barrel needs to be increased to thin the lens barrel in the collapsed state, and the lens barrel mechanism becomes complicated and the diameter of the lens barrel becomes large. Alternatively, the desired zoom ratio is not easily obtained.

Moreover, it is preferable that the zoom lens system according to the present invention satisfies the following condition (2A):

$$4.0 < Cj(w)/f_w < 6.0 \qquad (2A),$$

wherein $Cj(w)$ is a distance from the incidence surface of the first lens unit to the image surface in the wide-angle end, and $f_w$ is a focal length of the zoom lens system in the wide-angle end.

The condition (2A) defines the total length of the zoom lens system in the wide-angle end with respect to the focal length of the zoom lens system in the wide-angle end. When the condition is satisfied, miniaturization of the zoom lens system and the securing of the zoom ratio may be realized. When the value of the condition (2A) is not below the lower limit of 4.0, increase of the total length of the zoom lens system in the telephoto end is easily suppressed. Alternatively, the desired zoom ratio is easily obtained. When the value of the condition (2A) is not above the upper limit of 6.0, increase of the ray height in the first lens unit is suppressed, and the diameter of the front lens can be prevented from being increased. Alternatively, the total length of the zoom lens system is prevented from being increased, and an increase of the number of the steps of the collapsible lens barrel is easily suppressed.

Furthermore, it is preferable that the zoom lens system according to the present invention satisfies the following condition (3A):

$$-0.005 < (D_2(t) - D_2(w))/f_w < 0.5 \qquad (3A),$$

wherein $D_2(w)$ is an air space between the second lens unit and the third lens unit along the optical axis in the wide-angle end, $D_2(t)$ is an air space between the second lens unit and the third lens unit along the optical axis in the telephoto end, and $f_w$ is a focal length of the zoom lens system in the wide-angle end.

This condition (3A) defines the ratio of the difference of the air space between the second lens unit and the third lens unit to the focal length of the zoom lens system in the wide-angle end. The condition is a condition for easily correcting the image position consistently with miniaturization. When the value of the condition (3A) is not below the lower limit of –0.005, it is easy to secure the space necessary for adjustment of the position of the third lens unit in a case where adjustment of the positional deviation of the image surface is performed by positional adjustment of the third lens unit. In addition, when focusing is performed by the third lens unit, it is easy to secure the space necessary for focusing in the telephoto end. When the value of the condition (3A) is not above the upper limit of 0.5, the ray height of the first lens unit in the wide-angle end can be inhibited from being increased, and an increase of the diameter of the front lens is easily suppressed. Alternatively, in the telephoto end, the off-axial ray height in the third lens unit, which is a rearmost lens unit, can be inhibited from being increased. These are advantageous for reducing the diameter of the third lens unit.

Moreover, in a case where a shaft is disposed on the lens frame for holding the second lens unit in order to hold the lens frame for holding the third lens unit, the length of the shaft increases in accordance with the movement amount of the third lens unit. Therefore, when the condition (3A) is satisfied, the zoom lens system can easily be thinned in the collapsed state.

Furthermore, it is preferable that the second lens unit is composed of one cemented lens component constituted of, in order from the object side, a positive lens element, a negative lens element and a positive lens element. Such a constitution is more advantageous to miniaturization of the second lens unit itself and the securing of the space for movement of the third lens unit.

Alternatively, it is preferable that the second lens unit includes, in order from the object side, a positive single lens element and a cemented lens component constituted by cementing a positive lens element and a negative lens element. According to such a constitution, the principal point of the second lens unit is positioned closer to the object side, and this is advantageous to miniaturization of the front lens and the securing of the zoom ratio.

In still another preferable example according to the first aspect, the first lens unit comprises, in order from the object side, a negative lens element and a positive lens element, and the total number of the lens elements in the first lens unit is two.

The second lens unit comprises a positive lens element and a negative lens element, and the total number of the lens elements in the second lens unit is three.

The third lens unit comprises a positive lens element, the total number of the lens elements in the third lens unit is one, and the zoom lens system satisfies the following conditions (4A) and (5A):

$$1.2<|\Delta 2g/f_w|<2.0 \qquad (4A); \text{ and}$$

$$0.4<\Sigma d2g/f_w<0.74 \qquad (5A),$$

wherein $\Delta 2g$ is a movement amount of the second lens unit during the zooming. from the wide-angle end to the telephoto end, $\Sigma d2g$ is a thickness of the second lens unit along the optical axis and $f_w$ is a focal length of the zoom lens system in the wide-angle end.

When the number of the lens elements of each lens unit is specified as described above, miniaturization and the securing of the image forming performance, the zoom ratio and the like can be achieved with a good balance.

The condition (4A) defines a ratio between the movement amount of the second lens unit and the focal length of the zoom lens system in the wide-angle end during zooming, and is a condition for balancing the securing of an appropriate zoom ratio, miniaturization, adjustment of the exit pupil position and the like.

If the value of the condition (4A) is below the lower limit of 1.2, it is difficult to obtain a desired zoom ratio. If the value of the condition exceeds the upper limit of 2.0, it is difficult to decrease the total length of the zoom lens system in the telephoto end. The fluctuation of the position of the exit pupil easily increases, and it is difficult to secure a satisfactory shading property over the whole zoom region.

The condition (5A) defines a ratio between the thickness of the second lens unit along the optical axis and the focal length of the zoom lens system in the wide-angle end, and is a condition for balancing miniaturization and the influence of the assembling error.

If the value of the condition (5A) is below the lower limit of 0.4, the system is easily influenced by eccentricity during assembling and a processing tolerance, and it is difficult to secure a stable quality level. If the value of the condition exceeds the upper limit of 0.74, the thickness of the second lens unit increases. Therefore, the constitution is disadvantageous to the thinning of the lens barrel in the collapsed state.

Moreover, it is preferable to satisfy the above condition (3A):

$$-0.005<(D_2(t)-D_2(w))/f_w<0.5 \qquad (3A),$$

Since the function of the condition (3A) has been described above, description thereof is omitted.

Furthermore, it is preferable that the second lens unit includes one cemented lens component constituted of, in order from the object side, a positive lens element, a negative lens element and a positive lens element.

Since the function of this constitution has been described above, description thereof is omitted.

Alternatively, it is preferable that the second lens unit includes, in order from the object side, a positive single lens element, and a cemented lens component constituted by cementing a positive lens element and a negative lens element.

Since the function of this constitution has been described above, description thereof is omitted.

Moreover, it is preferable that the zoom lens system according to the present invention satisfies the following condition (6A), $$1.3<Cj(t)/f_t<1.8 \qquad (6A),$$

wherein $C_j(t)$ is a distance from an incidence surface of the first lens unit to the image surface of the zoom lens system in the telephoto end, and $f_t$ is a focal length of the zoom lens system in the telephoto end.

This condition (6A) defines a ratio between the total length of the zoom lens system in the telephoto end and the focal length in the telephoto end, and is a condition for reducing the total length to thereby further simplify the constitution of the lens barrel.

When the value of the condition (6A) is not below the lower limit of 1.3, an increase of the total length in the wide-angle end is easily suppressed. Alternatively, the desired zoom ratio is easily obtained. When the value of the condition (6A) is not above the upper limit of 1.8, the increase of the total length of the lens barrel is easily suppressed. This is advantageous to miniaturization.

Moreover, in the zoom lens system according to the present invention, it is preferable that the third lens unit moves for focusing, and satisfies the following condition (7A):

$$3.0<f_3/f_w<10 \qquad (7A),$$

wherein $f_3$ is a focal length of the third lens unit, and $f_w$ is a focal length of the zoom lens system in the wide-angle end.

This condition (7A) defines a ratio between the focal length of the third lens unit and the focal length of the zoom lens system in the wide-angle end. When this third lens unit is used as the focusing lens unit, as compared with another focusing method, the burden on the driving mechanism can be reduced. Especially when the third lens unit has a high focusing sensitivity in the telephoto end, the refractive power of the third lens unit can appropriately be weakened so as to satisfy the condition (7A), and the constitution is more advantageous to miniaturization.

When the value of the condition (7A) is not below the lower limit of 3.0, the ray height in the first lens unit in the wide-angle end is easily suppressed, and the diameter of the front lens or the diameter of the first lens unit is easily reduced. Alternatively, the increase of the thickness of the third lens unit is suppressed, and the constitution is advantageous to the thinning of the lens barrel. When the value of the condition (7A) is not above the upper limit of 10, the movement amount of the third lens unit during focusing is suppressed, and this is advantageous to thinning.

Moreover, it is preferable to satisfy the following condition (AA):

$$2.5 \leq f_t/f_w<5.5 \qquad (AA),$$

wherein $f_t$ is a focal length of the zoom lens system in the telephoto end, and $f_w$ is a focal length of the zoom lens system in the wide-angle end.

This condition (AA) defines the zoom ratio of the zoom lens system. When the zoom lens system according to the present invention is constituted as a 3-unit zoom lens system having an appropriate zoom ratio of 2.5 or more, the size of the zoom lens system and the optical performance are easily balanced.

When the value of the condition (AA) is not below the lower limit of 2.5, the zoom ratio sufficient for general use is obtained. When the value of the condition is not above the upper limit of 5.5, the constitution serves for reduction of the number of lens elements for correcting aberrations, or the like, and this is advantageous for cost reduction.

Moreover, it is preferable that the zoom lens system includes an aperture stop which is disposed immediately before the second lens unit and which moves integrally with the second lens unit during zooming.

According to such a constitution, enlargement of the diameter of the first lens unit is prevented. Moreover, the off-axial chief ray emitted from the third lens unit is easily brought close to a parallel state with respect to the optical axis. Since the second lens unit is not disposed on the object side of the aperture stop and the lens elements of the second lens unit are arranged on the image side of the aperture stop, it is possible to inhibit deterioration of the aberration due to relative eccentricities among the lens elements of the second lens unit. Since the moving mechanism can be shared by the aperture stop with the second lens unit, the moving mechanism can easily be simplified.

It is to be noted that the zoom lens system according to the present invention can be used as an image pickup lens of an image pickup apparatus. In this case, it is preferable that the image pickup apparatus comprises any of the above zoom lens systems; and an image sensor which is disposed on the image side of the zoom lens system and which converts an image formed by the zoom lens system into an electric signal.

The zoom lens system according to the present invention is advantageous to miniaturization and the securing of a wide angle of field in the wide-angle end, and is easily constituted to be substantially telecentric. Therefore, since the incidence angle of the ray on the image pickup surface decreases and the influence of color shading can be reduced, the system is preferably used in the image pickup apparatus including the image sensor.

It is to be noted that the above described constitution(s) and/or condition(s) may be simultaneously satisfied in any combination.

In addition, the above conditions may be modified as follows.

In the condition (1A), to achieve a more satisfactory balance between the thinning of the lens barrel and the correction of aberration, it is more preferable to set the lower limit value to 1.3, further preferably 1.5. It is more preferable to set the upper limit value to 1.95, further preferably 1.9.

In the condition (2A), to achieve a more satisfactory consistency between miniaturization and the securing of the zoom ratio, it is more preferable to set the lower limit value to 4.3, further preferably 4.5. It is more preferable to set the upper limit value to 5.6, further preferably 5.7.

In the condition (3A), to achieve a more satisfactory consistency between the ease of the correction of the image position and miniaturization, it is. more preferable to set the lower limit value to −0.04, further preferably −0.03. It is more preferable to set the upper limit value to 0.47, further preferably 0.46.

In the condition (4A), to achieve a more satisfactory balance between the securing of the zoom ratio and the adjustment of the exit pupil position or the like, it is more preferable to set the lower limit value to 1.3, further preferably 1.35. It is more preferable to set the upper limit value to 1.9, further preferably 1.8.

In the condition (5A), to achieve a more satisfactory balance between miniaturization and the influence of the assembling error, it is more preferable to set the lower limit value to 0.45, further preferably 0.5.

In the condition (6A), to achieve a more satisfactory balance of the total length, it is more preferable to set the lower limit value to 1.4, further preferably 1.5. It is more preferable to set the upper limit value to 1.76.

In the condition (7A), to balance the decrease of the diameter of the third lens unit and the decrease of the total length, it is more preferable to set the lower limit value to 3.5, further preferably 4.0. It is more preferable to set the upper limit value to 9.0.

In the condition (AA), to achieve a more satisfactory balance between miniaturization and the securing of the zoom ratio, it is more preferable to set the lower limit value to 2.6, further preferably 2.7. It is more preferable to set the upper limit value to 4.5, further preferably 3.5.

In the condition (BA), to more satisfactorily balance the securing of the focusing sensitivity and miniaturization, it is more preferable to set the lower limit value to 0.5, further preferably 0.7. It is more preferable to set the upper limit value to 0.97.

Next, there will be described embodiments of the zoom lens system according to the first aspect.

FIGS. 1A to 8C are sectional views of the first to eighth embodiments of the present invention when focused on an infinite object. Among these drawings, FIGS. 1A, 2A, 3A . . . show sections in the wide-angle ends, FIGS. 1B, 2B, 3B . . . show sections in the intermediate states, and FIGS. 1C, 2C, 3C . . . show sections in the telephoto ends, respectively. In the drawings, the first lens unit is denoted with G1, the aperture stop is denoted with ST, the second lens unit is denoted with G2 and the third lens unit is denoted with G3. A low pass filter coated with an IR cut coating or the like are represented as a plane parallel plate F. The cover glass of the electronic image sensor (a CCD image sensor or a CMOS image sensor) is represented as a plane parallel plate C. The image surface is denoted with I. When an image formed by the zoom lens system is received by the electronic image sensor, the light receiving surface of the image sensor is disposed on the image surface I. It is to be noted that a multilayer thin film for restricting a wavelength region may be disposed on the surface of the cover glass C. The cover glass C may be provided with a low pass filter function. In each drawing, the dash-dotted line extended through the lens units and the plane parallel plates is an optical axis.

Figure 1B:
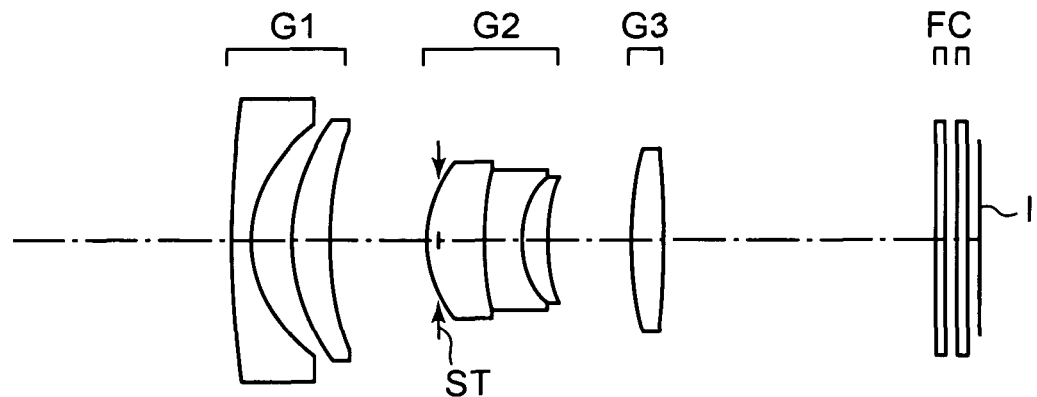
Figure 1C:
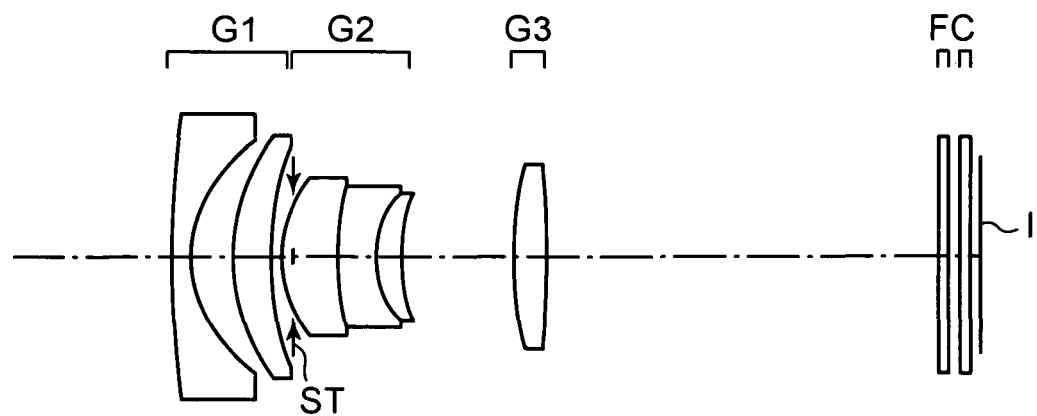

As shown in FIGS. 1A to 1C, the first embodiment comprises, in order from the object side, a first lens unit G1 having a negative refractive power, an aperture stop ST, a second lens unit G2 having a positive refractive power and a third lens unit G3 having a negative refractive power. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while enlarging the space between the third lens unit G3 and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one double-convex positive lens. The aperture stop ST is positioned on the image side of the vertex of the surface of the cemented triplet of the second lens unit G2 closest to the object side.

Aspherical surfaces are used on four surfaces including the image-side surface of the negative meniscus lens in the first lens unit G1; the surfaces of the cemented triplet in the second lens unit G2 closest to the object side and the image side; and the object-side surface of the double-convex positive lens in the third lens unit G3.

Figure 2A:
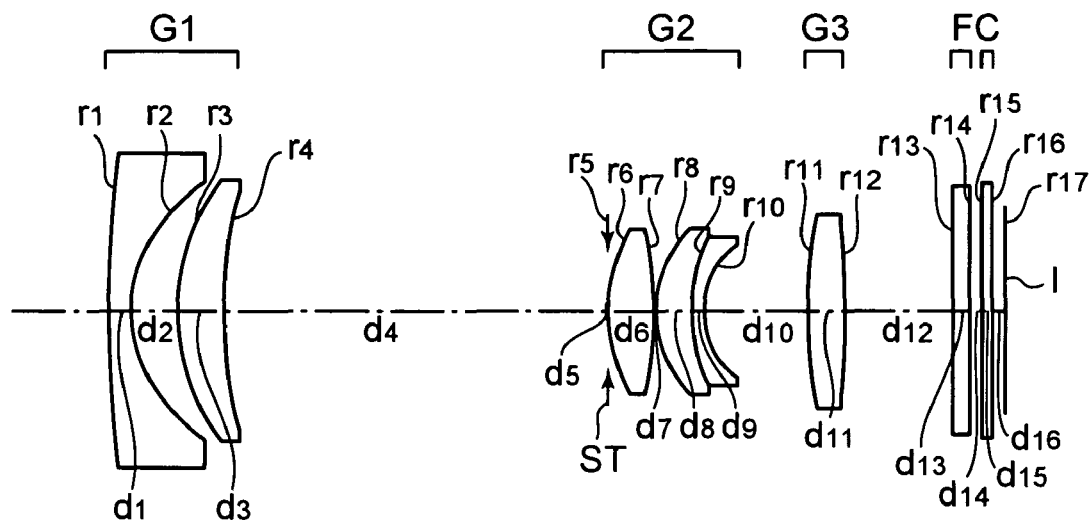
FIGS. 2A to 2C are sectional views of the second embodiment of the present invention when focused on an infinite object.
Figure 2B:
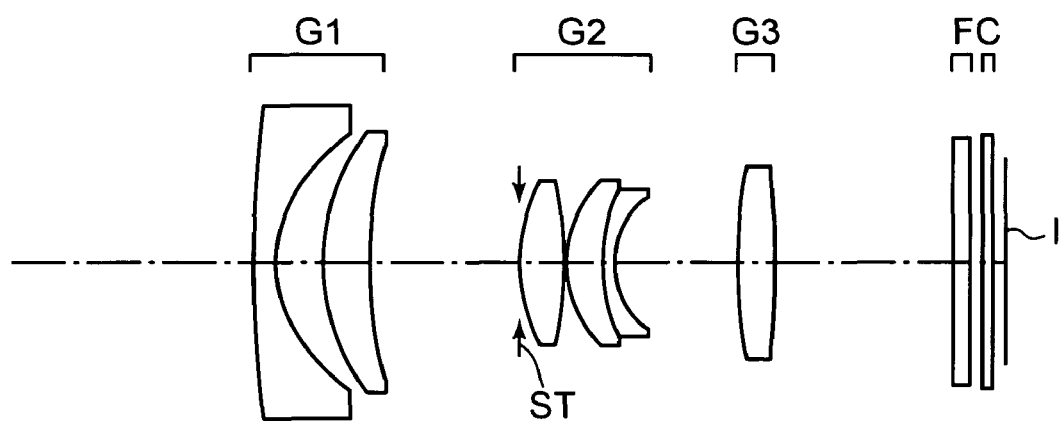
Figure 2C:
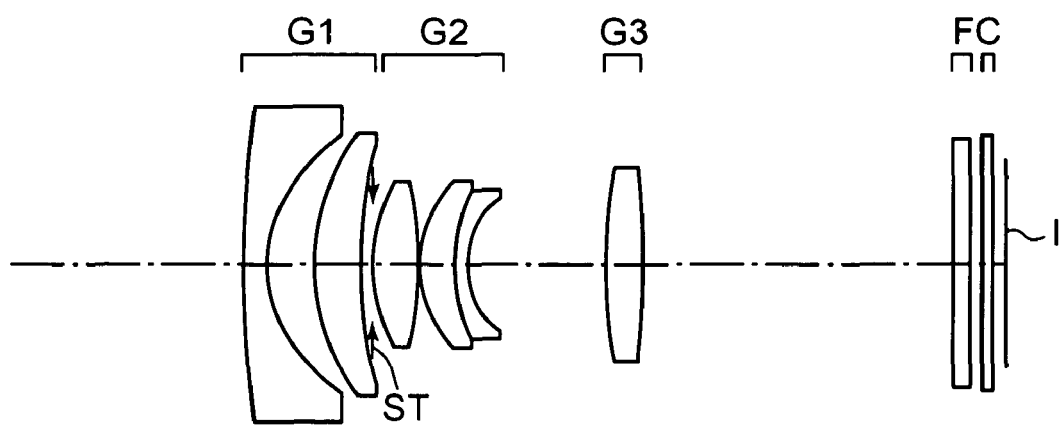

As shown in FIGS. 2A to 2C, the second embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned in the telephoto end slightly closer to the object side than in the intermediate state and closer to the image side than in the wide-angle end. The aperture stop ST and the second lens unit G2 integrally monotonously move toward the object side while reducing the space between the second lens unit G2 and the first lens unit G1. The third lens unit G3 moves toward the object side while enlarging the space between the third lens unit G3 and the second lens unit G2.

The first lens unit G1 is constituted of, in order from the object side, a negative meniscus lens whose convex surface faces the object side and a positive meniscus lens whose convex surface faces the object side. The second lens unit G2 is constituted of, in order from the object side, a double-convex positive lens, and a cemented doublet including a positive meniscus lens whose convex surface faces the object side and a negative meniscus lens whose convex surface faces the object side. The third lens unit G3 is constituted of one double-convex positive lens. The aperture stop ST is disposed in the same position as that of the vertex of the object-side surface of the double-convex positive lens in the second lens unit G2.

Aspherical surfaces are used on three surfaces including the image-side surface of the negative meniscus lens in the first lens unit G1; and opposite surfaces of the double-convex positive lens in the second lens unit G2.

Figure 3A:
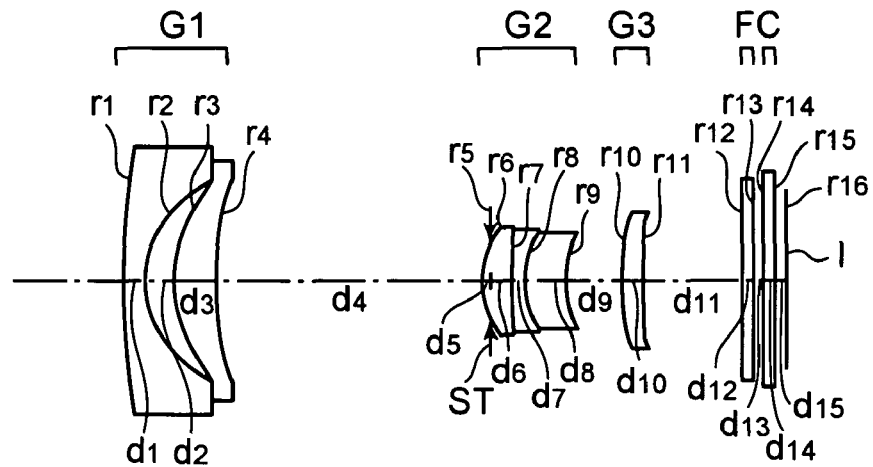
FIGS. 3A to 3C are sectional views of the third embodiment of the present invention when focused on an infinite object.
Figure 3B:
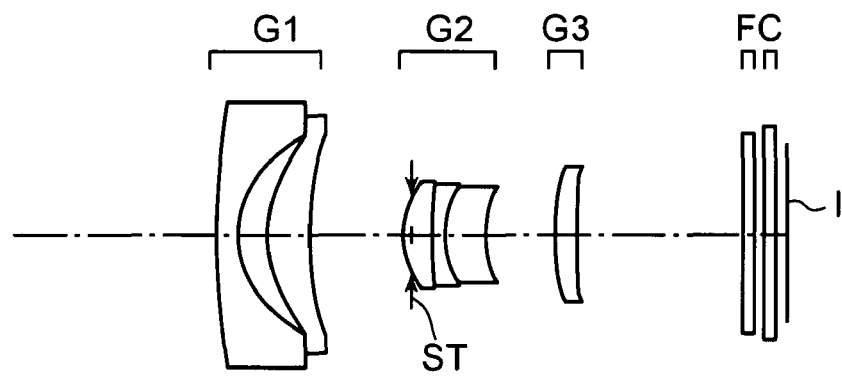
Figure 3C:
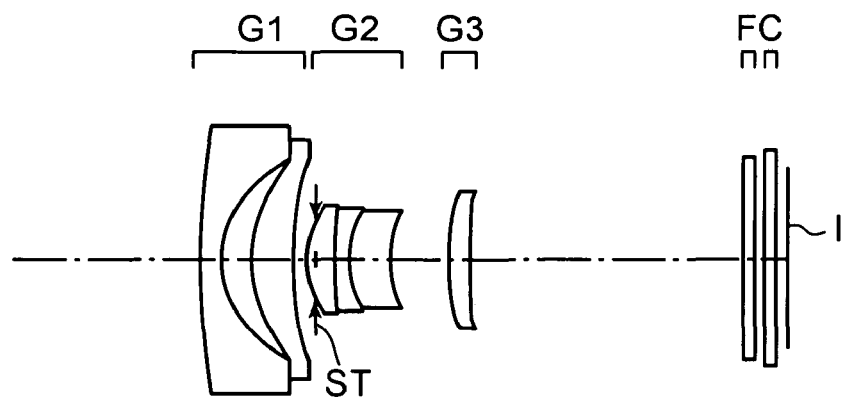

As shown in FIGS. 3A to 3C, the third embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned in the telephoto end slightly closer to the object side than in the intermediate state and closer to the image side than in the wide-angle end. The aperture stop ST and the second lens unit G2 integrally monotonously move toward the object side while reducing the space between the second lens unit G2 and the first lens unit G1. The third lens unit G3 moves toward the object side while once enlarging the space between the third lens unit G3 and the second lens unit G2 and then reducing the space.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one double-convex positive lens. The aperture stop ST is positioned on the image side of the vertex of the surface of the cemented triplet in the second lens unit G2 closest to the object side.

Aspherical surfaces are used on six surfaces including the image-side surface of the negative meniscus lens in the first lens unit G1; the object-side surface of the positive meniscus lens in the first lens unit G1; the surfaces of the cemented triplet in the second lens unit G2 closest to the object side and the image side; and opposite surfaces of the double-convex positive lens in the third lens unit G3.

Figure 4A:
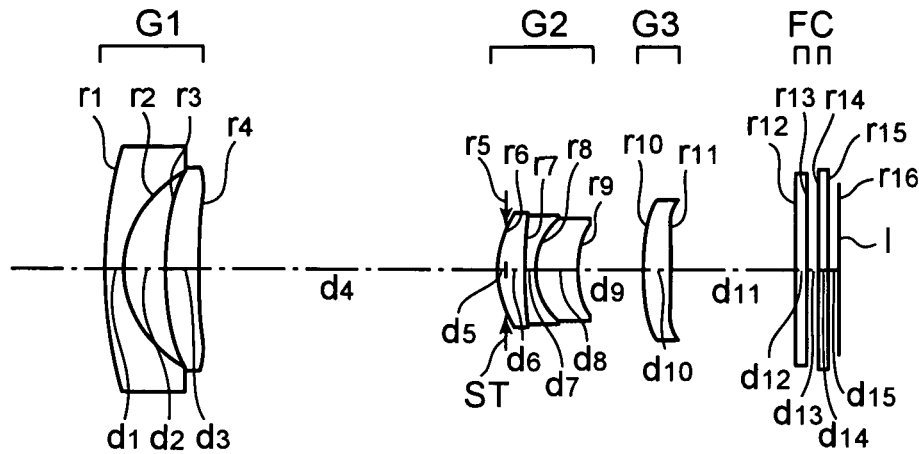
FIGS. 4A to 4C are sectional views of the fourth embodiment of the present invention when focused on an infinite object.
Figure 4B:
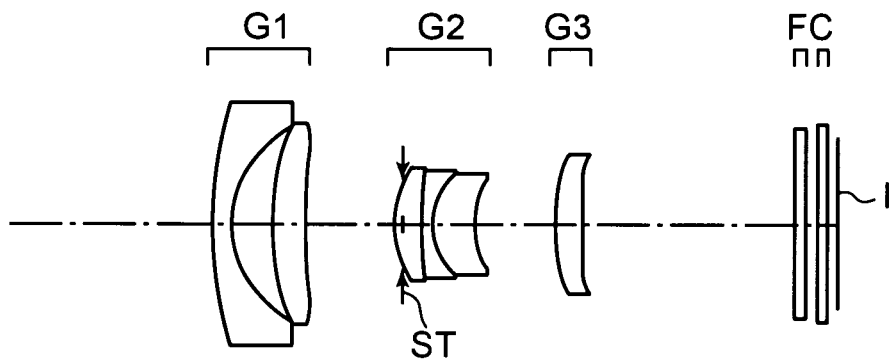
Figure 4C:
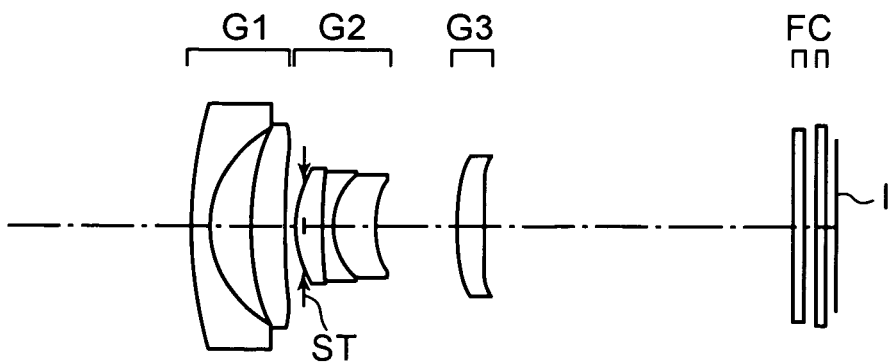

As shown in FIGS. 4A to 4C, the fourth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned in the telephoto end closer to the object side than in the intermediate state and closer to the image side than in the wide-angle end. The aperture stop ST and the second lens unit G2 integrally monotonously move toward the object side while reducing the space between the second lens unit G2 and the first lens unit G1. The third lens unit G3 moves toward the object side while once enlarging the space between the third lens unit G3 and the second lens unit G2 and then reducing the space.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet in the second lens unit G2 closest to the object side.

Aspherical surfaces are used on six surfaces including opposite surfaces of the positive meniscus lens in the first lens unit G1; the surfaces of the cemented triplet in the second lens unit G2 closest to the object side and the image side; and opposite surfaces of the positive meniscus lens in the third lens unit G3.

Figure 5A:
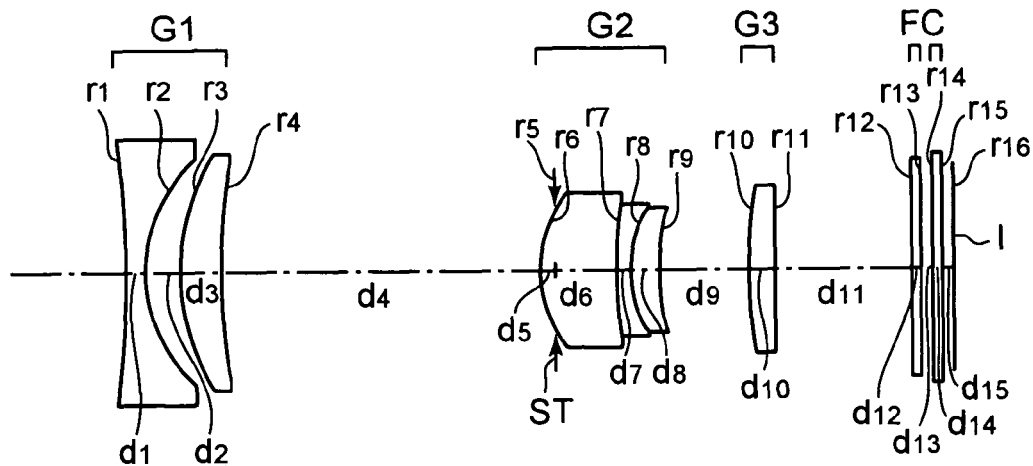
FIGS. 5A to 5C are sectional views of the fifth embodiment of the present invention when focused on an infinite object.
Figure 5B:
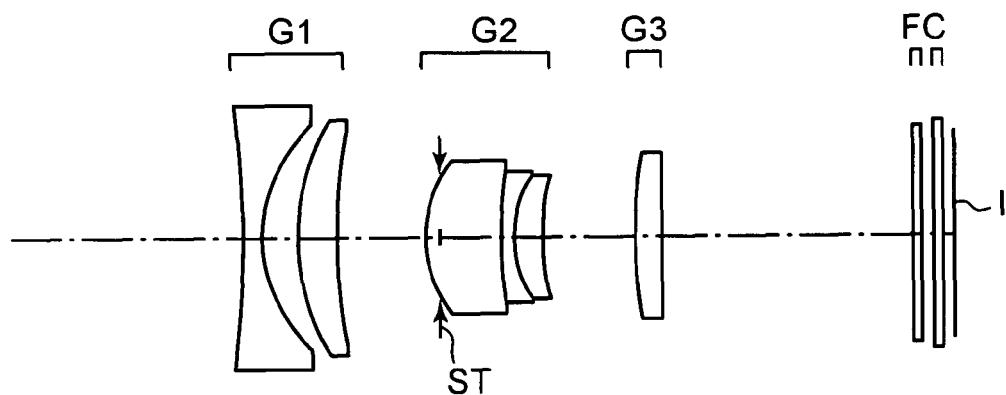
Figure 5C:
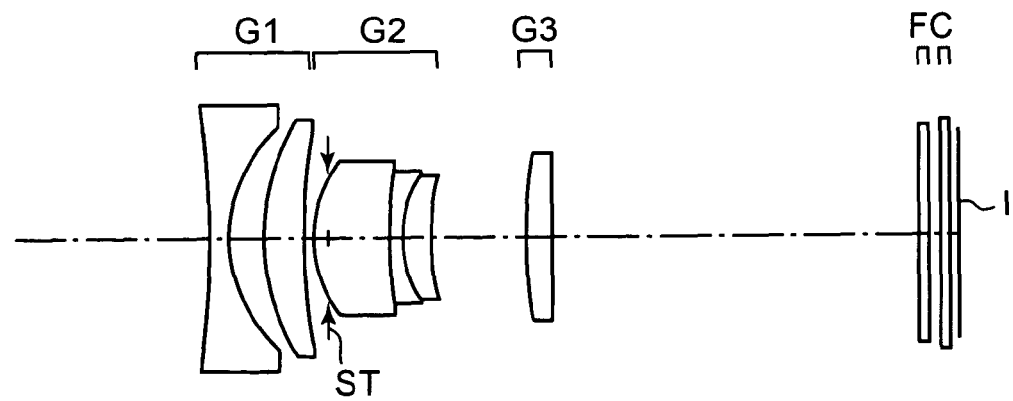

As shown in FIGS. 5A to 5C, the fifth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit and the first lens unit G1. The third lens unit G3 moves toward the object side while enlarging the space between the third lens G3 unit and the second lens unit G2.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet in the second lens unit G2 closest to the object side.

Aspherical surfaces are used on four surfaces including the image-side surface of the double-concave negative lens in the first lens unit G1; the surfaces of the cemented triplet in the second lens unit G2 closest to the object side and the image side; and the object-side surface of the positive meniscus lens in the third lens unit G3.

Figure 6A:
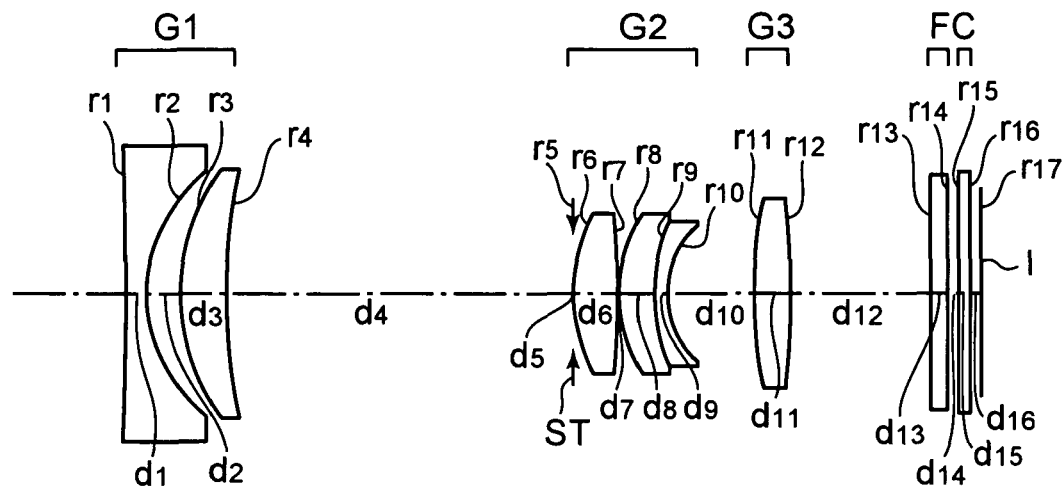
FIGS. 6A to 6C are sectional views of the sixth embodiment of the present invention when focused on an infinite object.
Figure 6B:
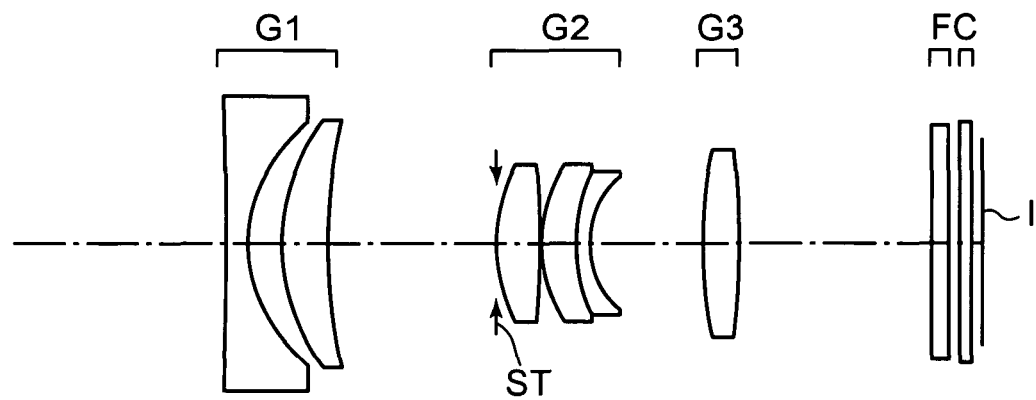
Figure 6C:
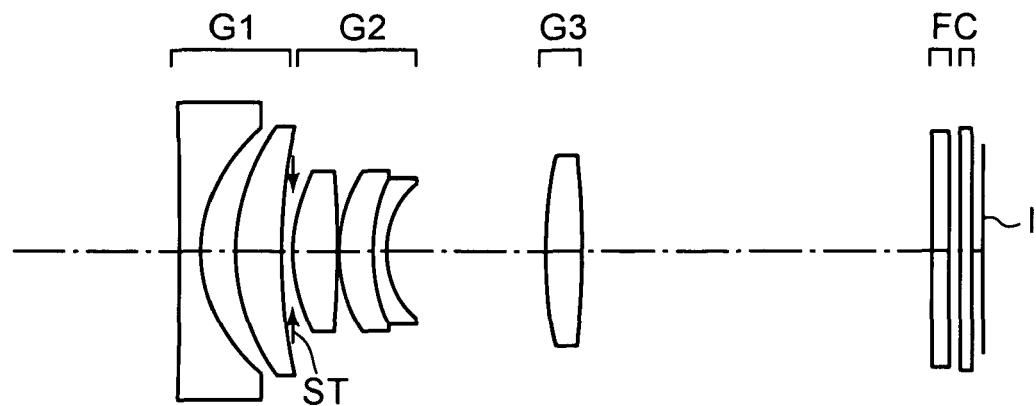

As shown in FIGS. 6A to 6C, the sixth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while enlarging the space between the third lens unit G3 and the second lens unit G2.

The first lens unit G1 is constituted of, in order from the object side, a double-concave negative lens and a positive meniscus lens whose convex surface faces the object side. The second lens unit G2 is constituted of, in order from the object side, a double-convex positive lens, and a cemented doublet including a positive meniscus lens whose convex surface faces the object side and a negative meniscus lens whose convex surface faces the object side. The third lens unit G3 is constituted of one double-convex positive lens. The aperture stop ST is disposed in the same position as that of the vertex of the object-side surface of the double-convex lens in the second lens unit G2.

Aspherical surfaces are used on four surfaces including the image-side surface of the double-concave negative lens in the first lens unit G1; opposite surfaces of the double-convex positive lens in the second lens unit G2; and the image-side surface of the double-convex positive lens in the third lens unit G3.

Figure 7A:
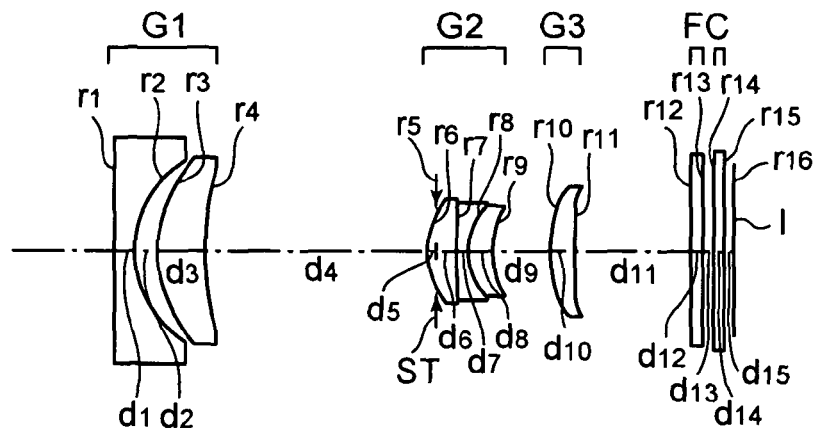
FIGS. 7A to 7C are sectional views of the seventh embodiment of the present invention when focused on an infinite object.
Figure 7B:
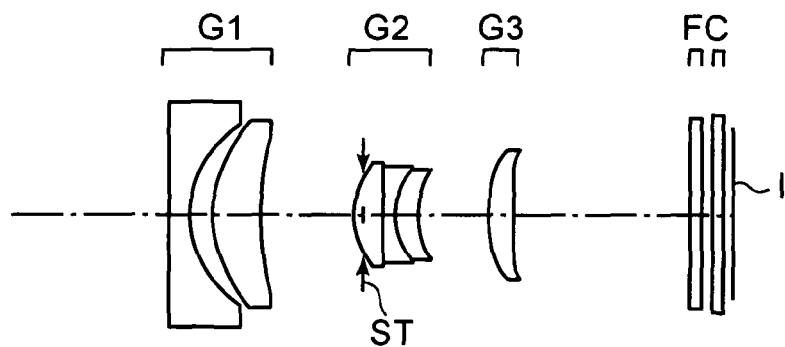
Figure 7C:
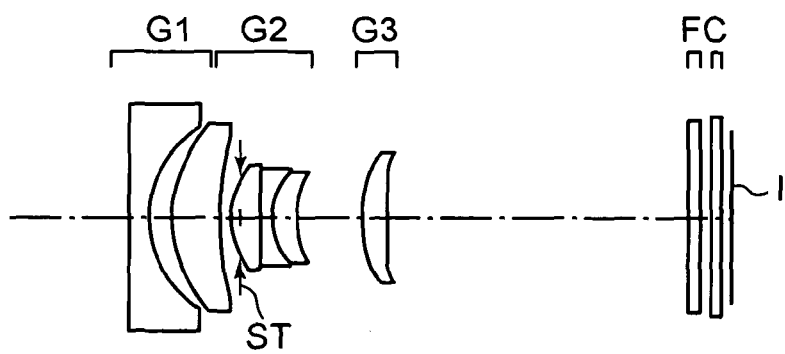

As shown in FIGS. 7A to 7C, the seventh embodiment comprises, in order from an object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while once enlarging the space between the third lens unit G3 and the second lens unit G2 and then reducing the space.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a double-convex positive lens, a double-concave negative lens and a positive meniscus lens whose convex surface faces the object side. The third lens unit G3 is constituted of one positive meniscus lens whose convex surface faces the object side. The aperture stop ST is disposed in the same position as that of the vertex of the object-side surface of the double-convex positive lens in the second lens unit G2.

Aspherical surfaces are used on five surfaces including the image-side surface of the negative meniscus lens in the first lens unit G1; the surfaces of the cemented triplet in the second lens unit G2 closest to the object side and the image side; and opposite surfaces of the positive meniscus lens in the third lens unit G3.

Figure 8A:
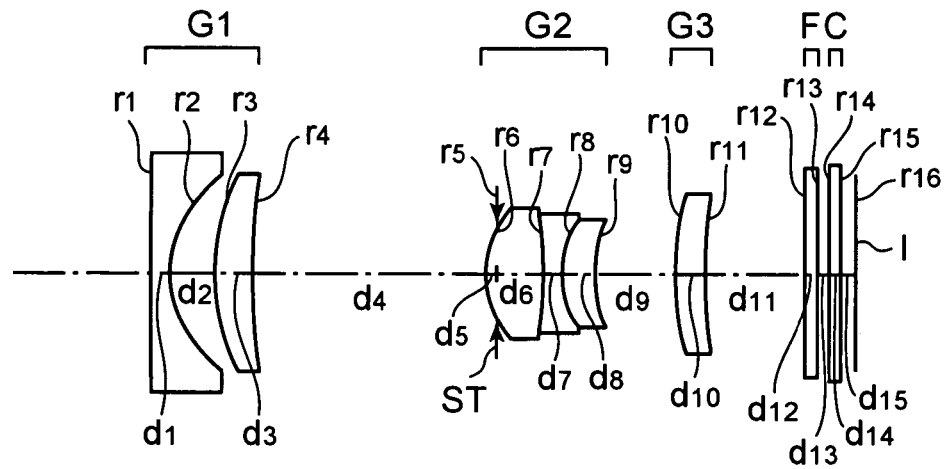
FIGS. 8A to 8C are sectional views of the eighth embodiment of the present invention when focused on an infinite object.
Figure 8B:
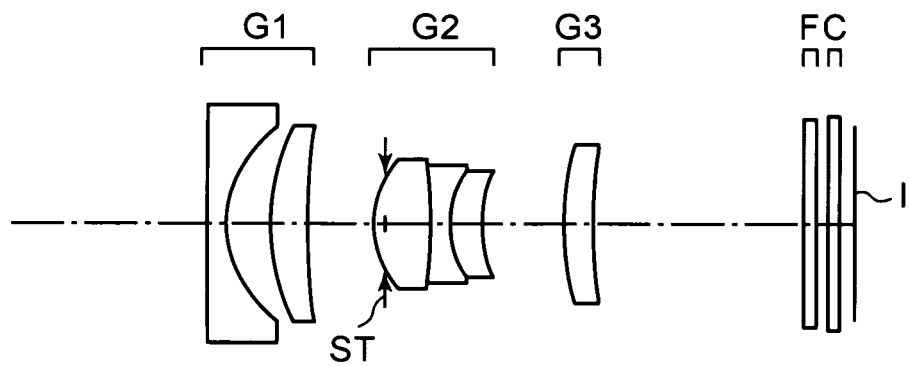
Figure 8C:
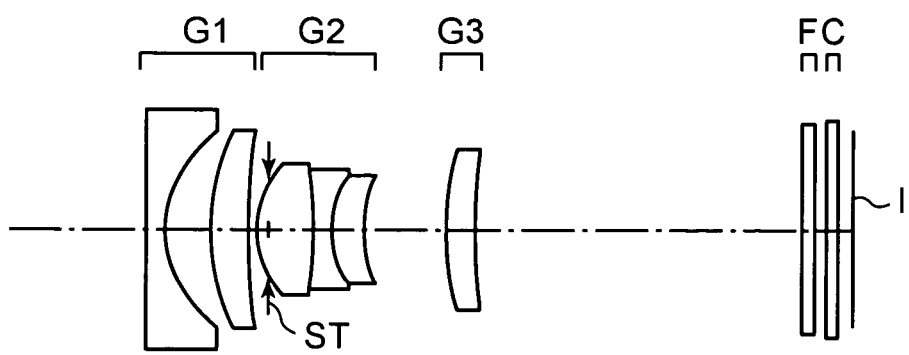
Figure 9A:
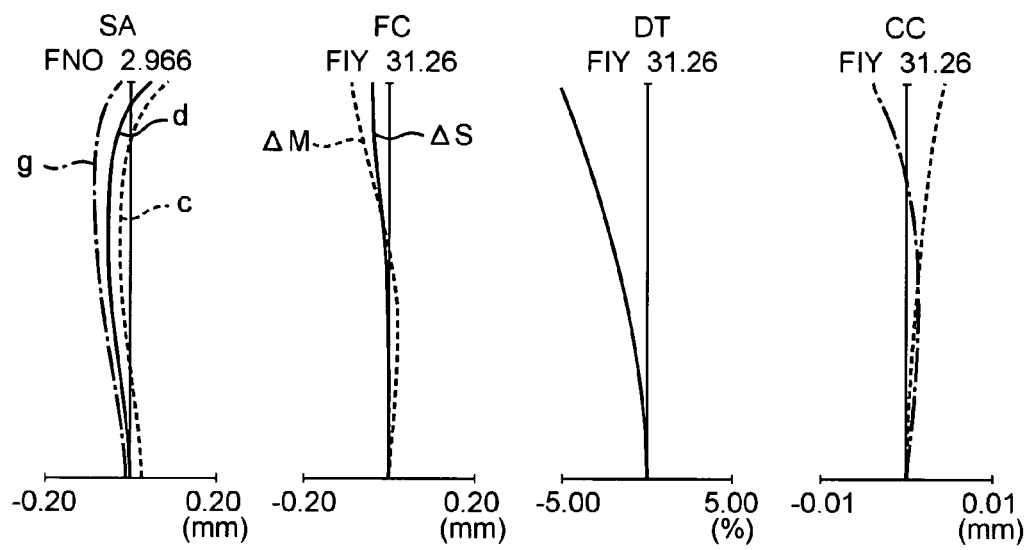
FIG. 9A is an aberration diagram of the first embodiment in the wide-angle end when focused on the infinite object.
Figure 9B:
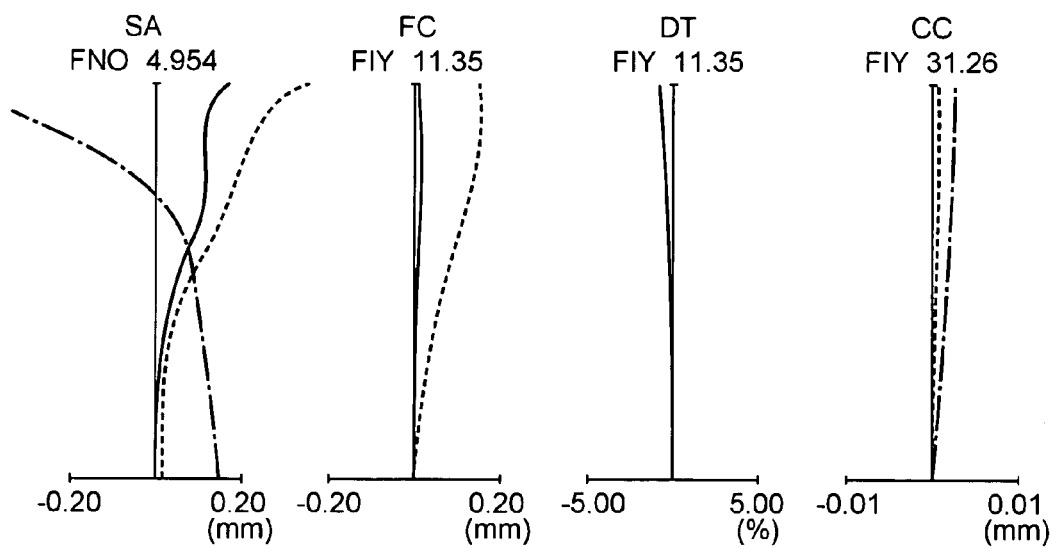
FIG. 9B is an aberration diagram of the first embodiment in the telephoto end when focused on the infinite object.
Figure 10A:
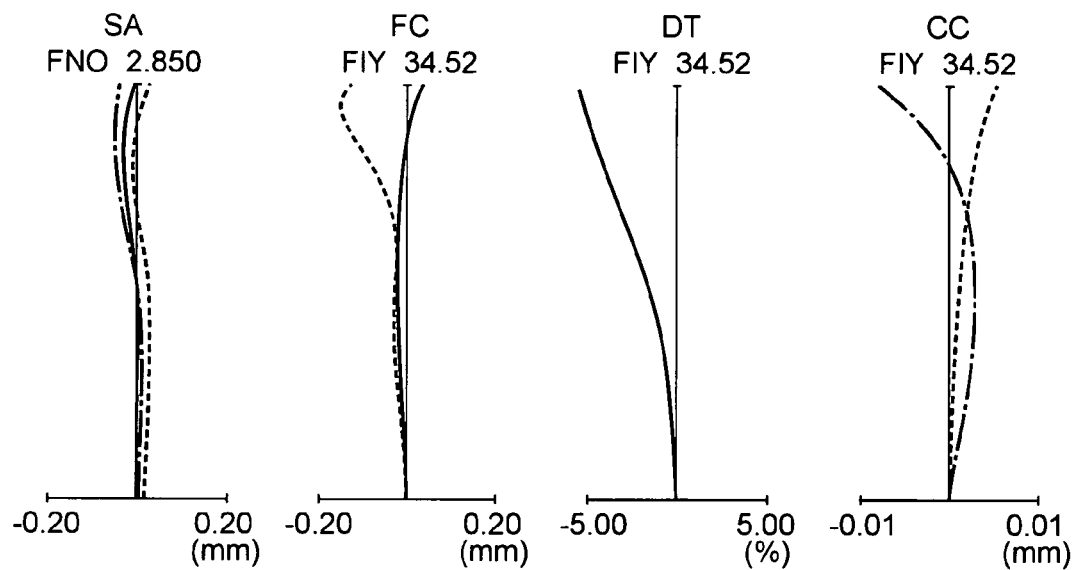
FIG. 10A is an aberration diagram of the second embodiment in the wide-angle end when focused on the infinite object.
Figure 10B:
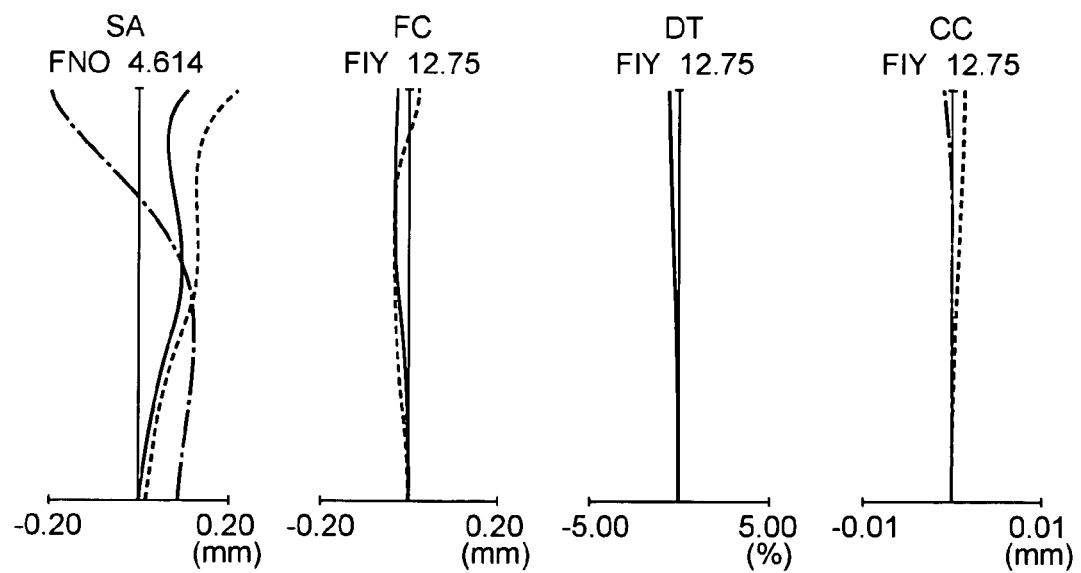
FIG. 10B is an aberration diagram in the telephoto end.
Figure 11A:
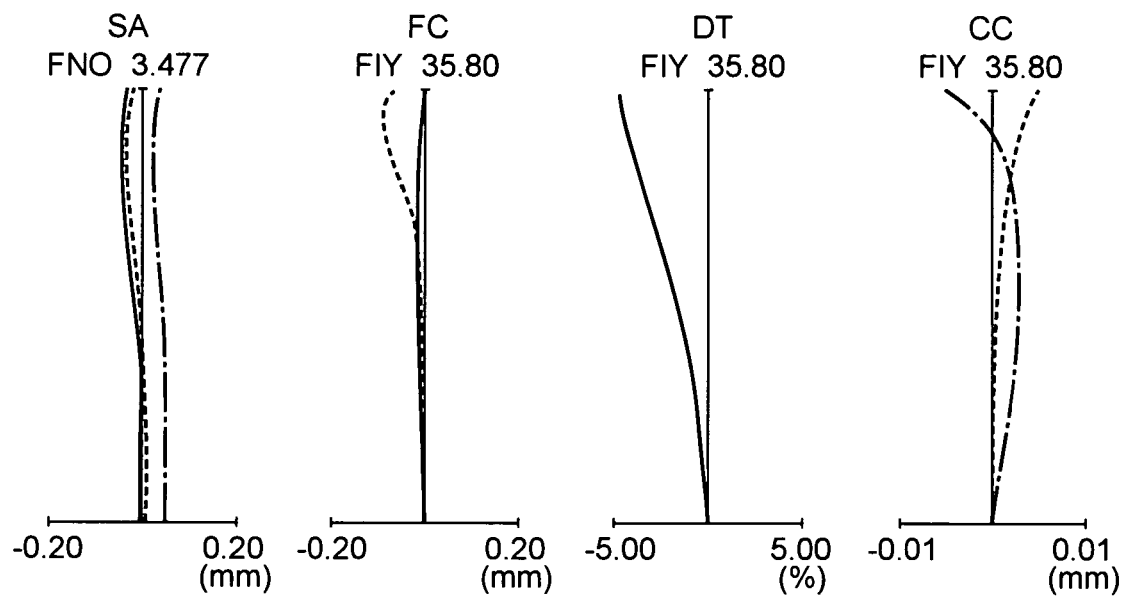
FIG. 11A is an aberration diagram of the third embodiment in the wide-angle end when focused on the infinite object.
Figure 11B:
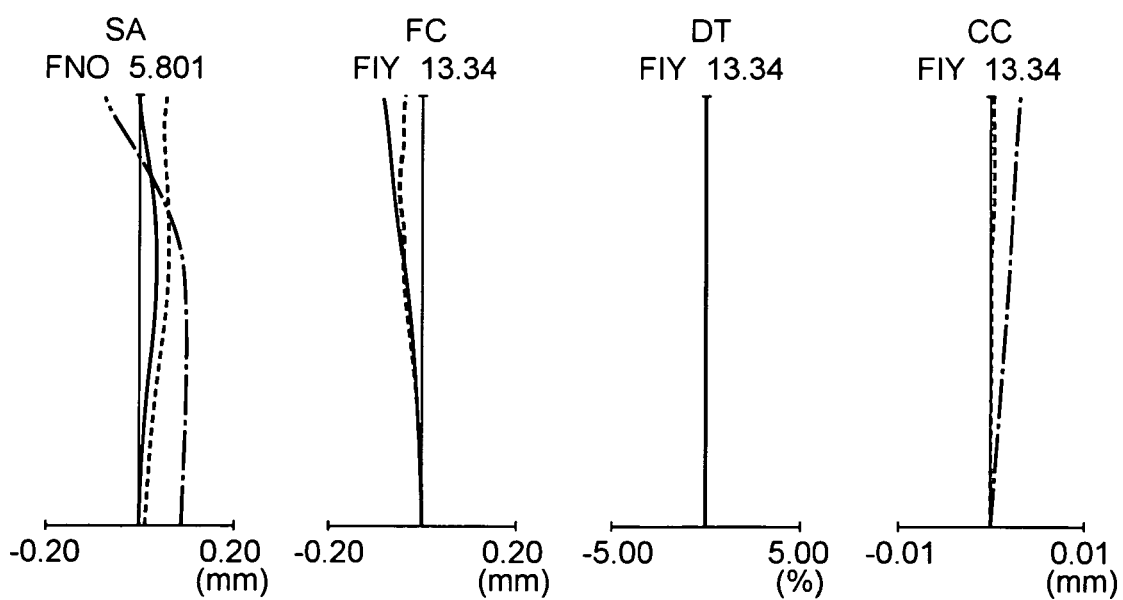
FIG. 11B is an aberration diagram in the telephoto end.
Figure 12A:
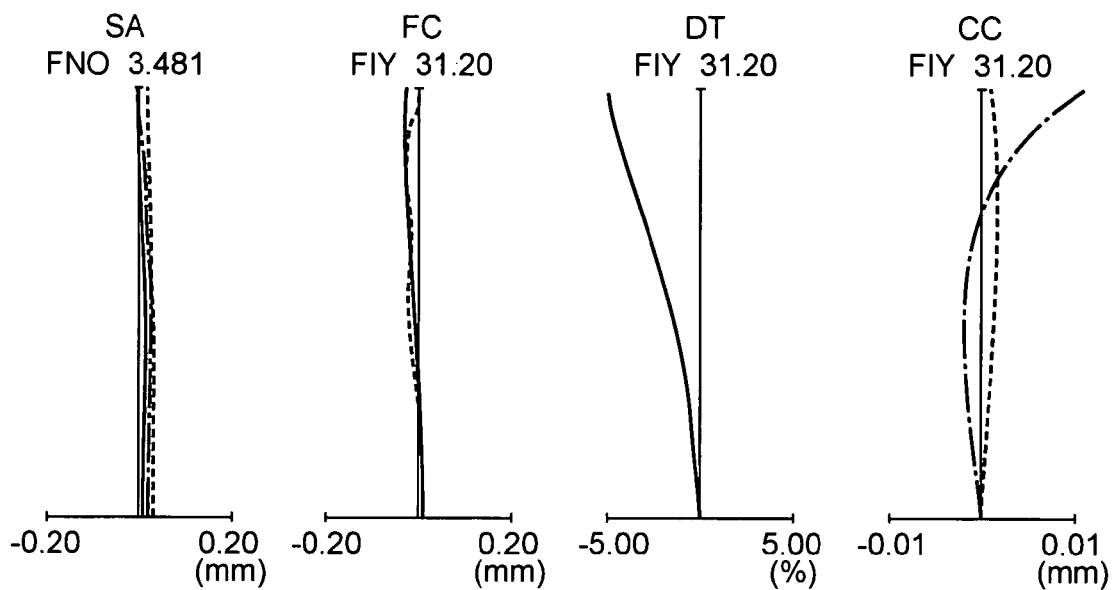
FIG. 12A is an aberration diagram of the fourth embodiment in the wide-angle end when focused on the infinite object.
Figure 12B:
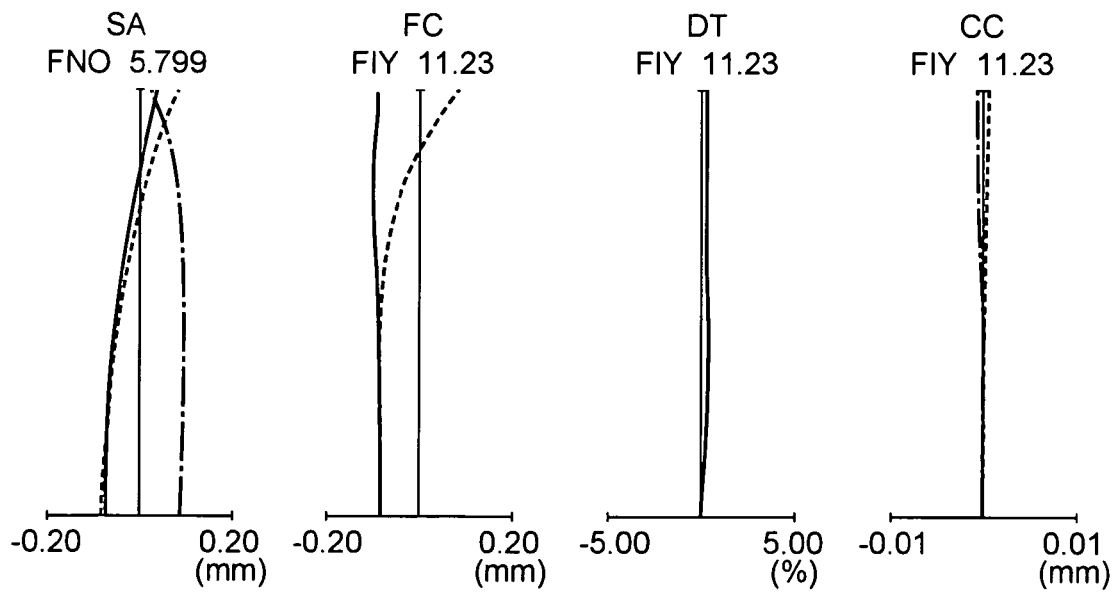
FIG. 12B is an aberration diagram in the telephoto end.
Figure 13A:
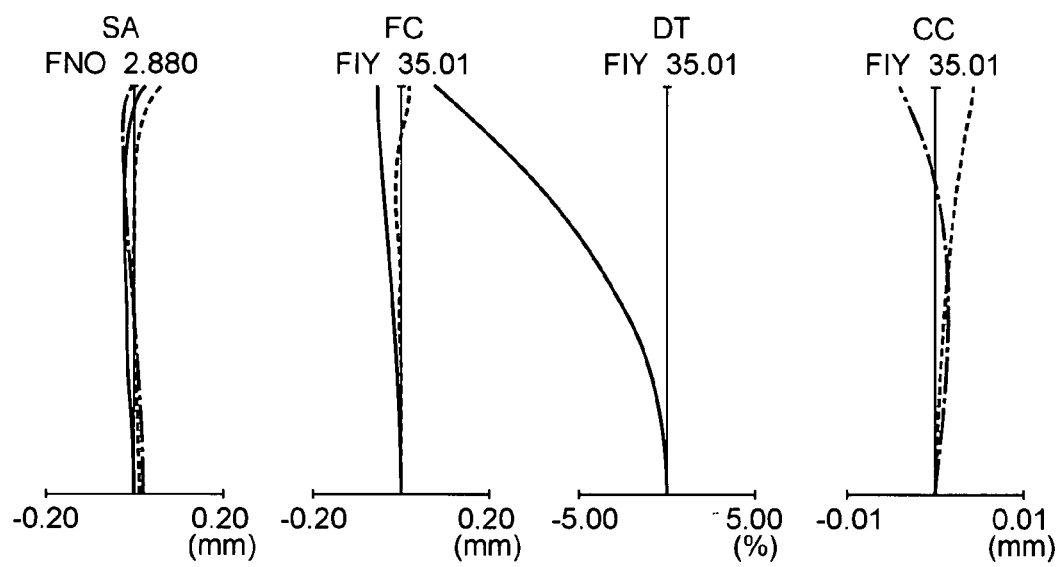
FIG. 13A is an aberration diagram of the fifth embodiment in the wide-angle end when focused on the infinite object.
Figure 13B:
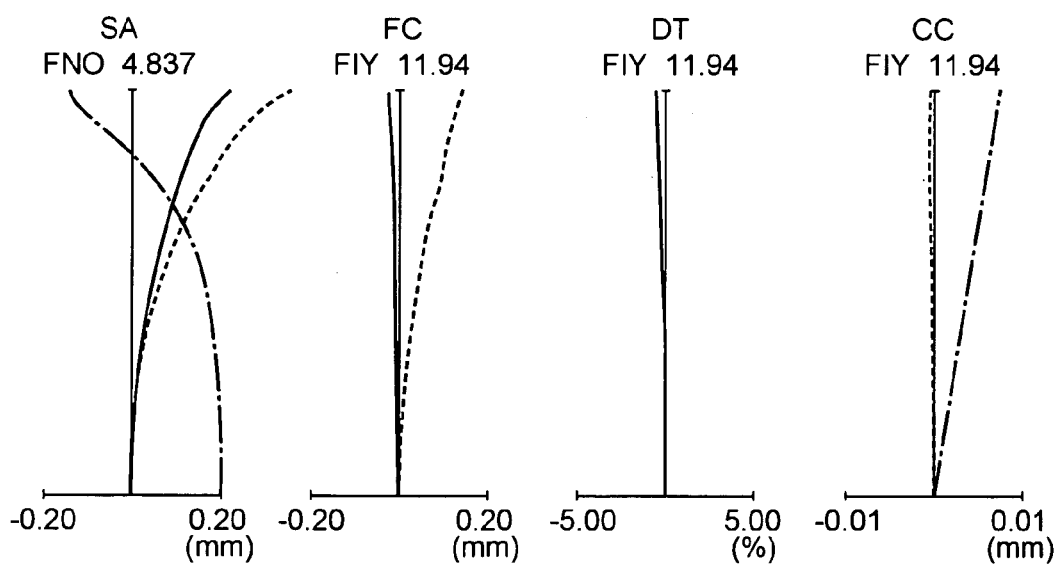
FIG. 13B is an aberration diagram in the telephoto end.
Figure 14A:
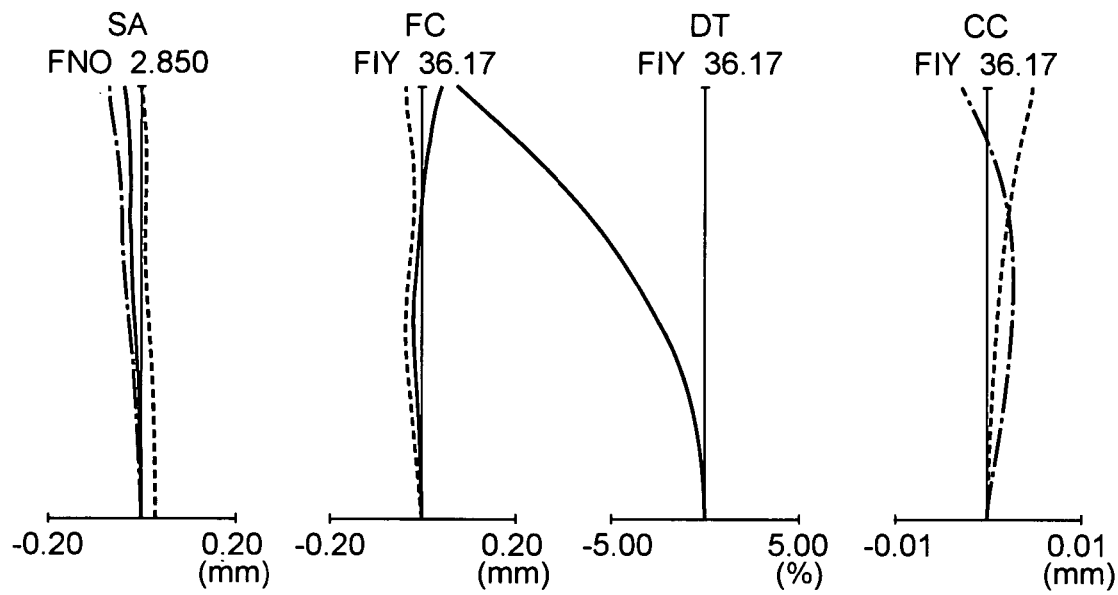
FIG. 14A is an aberration diagram of the sixth embodiment in the wide-angle end when focused on the infinite object.
Figure 14B:
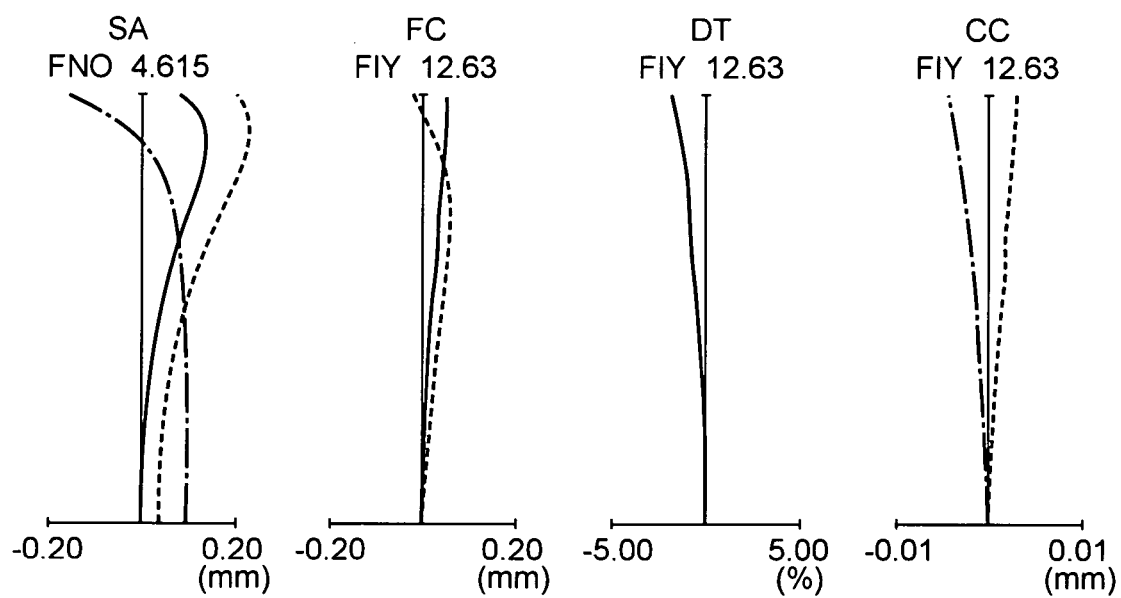
FIG. 14B is an aberration diagram in the telephoto end.
Figure 15A:
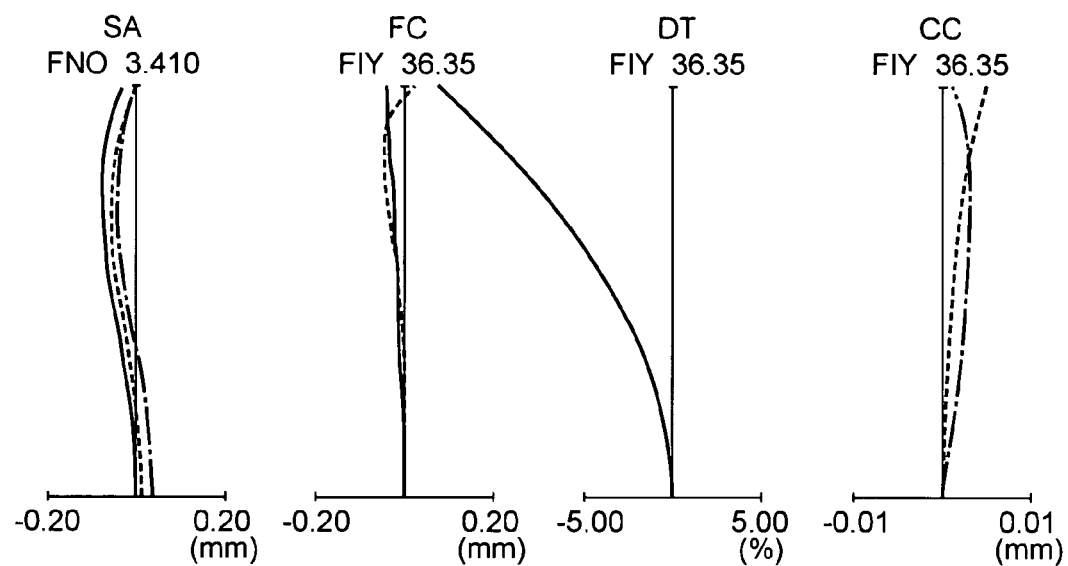
FIG. 15A is an aberration diagram of the seventh embodiment in the wide-angle end when focused on the infinite object.
Figure 15B:
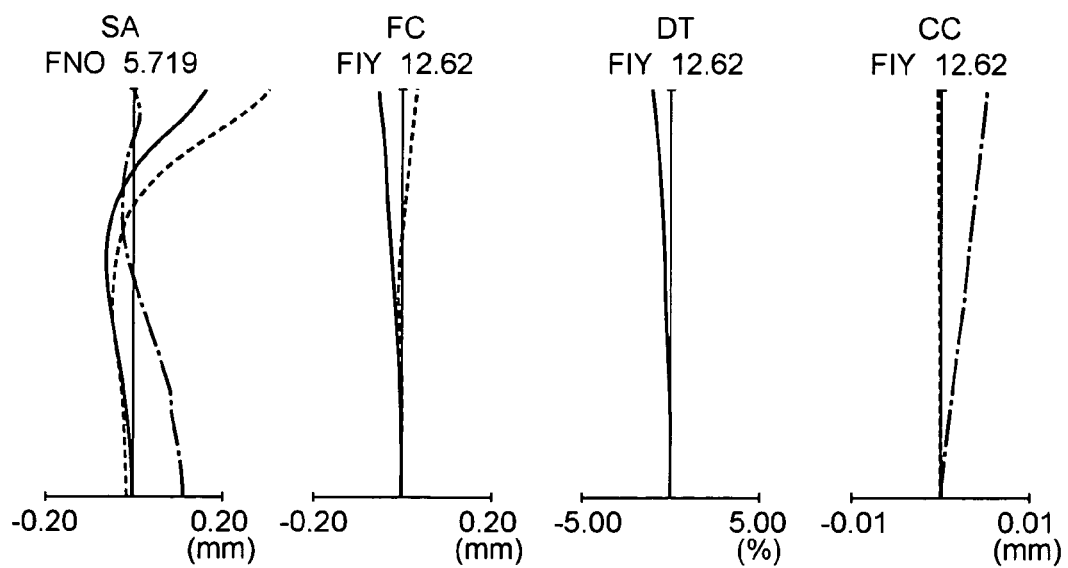
FIG. 15B is an aberration diagram in the telephoto end.
Figure 16A:
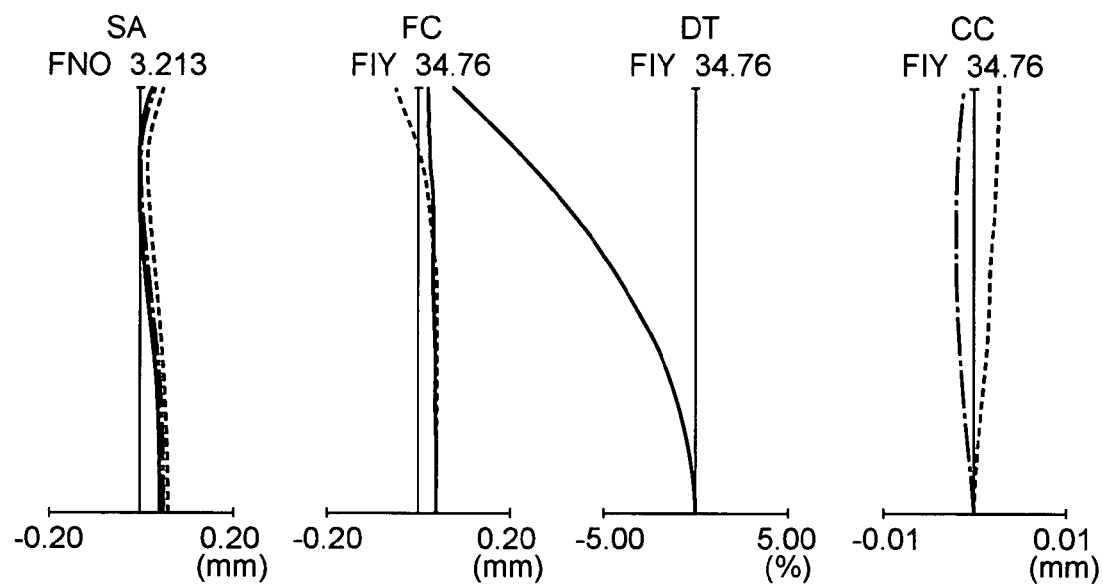
FIG. 16A is an aberration diagram of the eighth embodiment in the wide-angle end when focused on the infinite object.
Figure 16B:
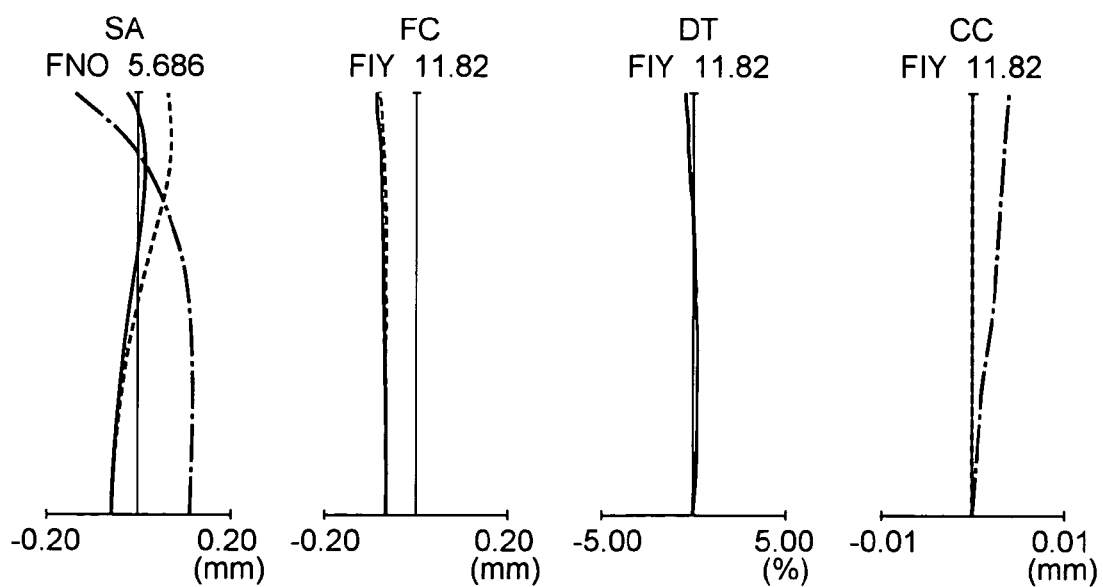
FIG. 16B is an aberration diagram in the telephoto end.

As shown in FIGS. 8A to 8C, the eighth embodiment is constituted of, in order from an object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned slightly closer to the image side in the telephoto end than in the wide-angle end. The aperture stop ST and the second lens unit G2 integrally monotonously move toward the object side while reducing the space between the second lens G2 unit and the first lens unit G1. The third lens unit G3 moves toward the object side while reducing the space between the third lens unit G3 and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including a double-convex positive lens, a double-concave negative lens and a positive meniscus lens whose convex surface faces the object side. The third lens unit G3 is constituted of one positive meniscus lens whose convex surface faces the object side. The aperture stop ST is disposed in the same position as that of the vertex of the object-side surface of the double-convex positive lens in the second lens unit G2.

Aspherical surfaces are used on five surfaces including the image-side surface of the positive meniscus lens in the first lens unit G1; the surfaces of the cemented triplet in the second lens unit G2 closest to the object side and the image side; and opposite surfaces of the positive meniscus lens in the third lens unit G3.

There will be described hereinafter numerical data of the above embodiments. In addition to the above-described symbols, f is a focal length of the zoom lens system, $F_{NO}$ is an F-number, $2\omega$ is an angle of field, WE is the wide-angle end, ST is the intermediate state, TE is the telephoto end, $r_1$, $r_2$ ... are paraxial radii of curvature of the lens surfaces, $d_1$, $d_2$ ... are spaces between the lens surfaces, $n_{d1}$, $n_{d2}$ ... are refractive indices of the lenses for the wavelength of d-line, and $V_{d1}$, $V_{d2}$ ... are Abbe numbers of the lenses. After the data of the paraxial radius of curvature, (AS) indicates that the surface is an aspherical surface, (ST) indicates that the surface is an aperture stop and (I) indicates that the surface is an image surface. It is to be noted that the shape of an aspherical surface is represented by the following equation in the coordinate system in which the intersection of the aspherical surface and the optical axis is set as an origin, the optical axis is set as an x-axis whose positive direction is coincide with the light traveling direction, and an arbitrary axis which passes the origin and is perpendicular to the x-axis is set as a y-axis:

$$x=(y^2/r)/[1+\{1-(K+1)(y/r)^2\}^{1/2}]+A_4 \cdot y^4+A_6 \cdot y^6+A_8 \cdot y^8+A_{10} \cdot y^{10},$$

wherein r is a paraxial radius of curvature, K is a conic constant, and $A_4$, $A_6$, $A_8$ and $A_{10}$ are 4-th, 6-th, 8-th, and 10-th order aspherical surface coefficients.

First embodiment

| | | |
|---|---|---|
| r1 = 50.852 | d1 = 0.90 | nd1 = 1.80610 | Vd1 = 40.92 |
| r2 = 5.799(AS) | d2 = 1.89 | | |
| r3 = 9.201 | d3 = 1.76 | nd2 = 2.00069 | Vd2 = 25.46 |
| r4 = 16.258 | d4 = variable | | |
| r5 = ∞ (ST) | d5 = −0.60 | | |
| r6 = 5.636(AS) | d6 = 2.63 | nd3 = 1.74320 | Vd3 = 49.34 |
| r7 = 11.974 | d7 = 1.71 | nd4 = 1.80518 | Vd4 = 25.42 |
| r8 = 4.090 | d8 = 1.25 | nd5 = 1.58313 | Vd5 = 59.38 |
| r9 = 13.539(AS) | d9 = variable | | |
| r10 = 18.182(AS) | d10 = 1.50 | nd6 = 1.52542 | Vd6 = 55.78 |
| r11 = −61.937 | d11 = variable | | |
| r12 = ∞ | d12 = 0.50 | nd7 = 1.51633 | Vd7 = 64.14 |
| r13 = ∞ | d13 = 0.50 | | |
| r14 = ∞ | d14 = 0.50 | nd8 = 1.51633 | Vd8 = 64.14 |
| r15 = ∞ | d15 = 0.47 | | |
| r16 = ∞ (I) | | | |

Aspherical Surface Coefficient

TABLE 1

| | 2nd surface | 6th surface | 9th surface | 10th surface |
|---|---|---|---|---|
| K | −1.118 | −0.831 | 0.000 | 0.000 |
| $A_4$ | $4.40772 \times 10^{-4}$ | $5.53954 \times 10^{-4}$ | $1.86701 \times 10^{-3}$ | $-7.43754 \times 10^{-5}$ |
| $A_6$ | $-1.79165 \times 10^{-7}$ | $-6.08508 \times 10^{-7}$ | $9.48986 \times 10^{-5}$ | $7.82756 \times 10^{-6}$ |
| $A_8$ | $6.84992 \times 10^{-8}$ | $1.25836 \times 10^{-6}$ | $-1.36654 \times 10^{-7}$ | 0 |
| $A_{10}$ | $-4.27115 \times 10^{-10}$ | $-3.07335 \times 10^{-8}$ | $1.56679 \times 10^{-6}$ | 0 |

Zoom Data (∞)

TABLE 2

| | WE | ST | TE |
|---|---|---|---|
| f (mm) | 7.90 | 15.23 | 22.84 |
| FNO | 2.97 | 3.93 | 4.95 |
| 2ω(°) | 62.52 | 33.69 | 22.70 |
| d4 | 16.00 | 4.96 | 1.00 |
| d9 | 3.47 | 3.89 | 5.15 |
| d11 | 7.21 | 12.48 | 17.95 |

Second embodiment

| | | | |
|---|---|---|---|
| r1 = 60.375 | d1 = 0.90 | $n_{d1}$ = 1.80610 | $V_{d1}$ = 40.92 |
| r2 = 5.749(AS) | d2 = 2.08 | | |
| r3 = 9.939 | d3 = 2.00 | $n_{d2}$ = 2.00069 | $V_{d2}$ = 25.46 |
| r4 = 19.633 | d4 = variable | | |
| r5 = ∞ (ST) | d5 = 0.00 | | |
| r6 = 6.733(AS) | d6 = 2.00 | $n_{d3}$ = 1.58913 | $V_{d3}$ = 61.28 |
| r7 = −20.821(AS) | d7 = 0.10 | | |
| r8 = 5.168 | d8 = 1.70 | $n_{d4}$ = 1.49700 | $V_{d4}$ = 81.54 |
| r9 = 7.903 | d9 = 0.50 | $n_{d5}$ = 2.00069 | $V_{d5}$ = 25.46 |
| r10 = 3.793 | d10 = variable | | |
| r11 = 21.078 | d11 = 1.70 | $n_{d6}$ = 1.52542 | $V_{d6}$ = 55.78 |
| r12 = −42.921 | d12 = variable | | |
| r13 = ∞ | d13 = 0.86 | $n_{d7}$ = 1.54771 | $V_{d7}$ = 62.84 |
| r14 = ∞ | d14 = 0.50 | | |
| r15 = ∞ | d15 = 0.50 | $n_{d8}$ = 1.51633 | $V_{d8}$ = 64.14 |
| r16 = ∞ | d16 = 0.50 | | |
| r17 = ∞ (I) | | | |

Aspherical Surface Coefficient

TABLE 3

| | 2nd surface | 6th surface | 7th surface |
|---|---|---|---|
| K | −0.352 | −0.663 | −0.563 |
| $A_4$ | $-1.27821 \times 10^{-4}$ | $-2.82950 \times 10^{-4}$ | $-3.61449 \times 10^{-5}$ |
| $A_6$ | $3.81118 \times 10^{-7}$ | $-1.04899 \times 10^{-6}$ | $-1.05788 \times 10^{-5}$ |
| $A_8$ | $-1.53718 \times 10^{-7}$ | $-1.26909 \times 10^{-6}$ | $-5.36698 \times 10^{-7}$ |
| $A_{10}$ | $-3.01038 \times 10^{-10}$ | 0 | 0 |

Zoom Data (∞)

TABLE 4

| | WE | ST | TE |
|---|---|---|---|
| f (mm) | 7.00 | 11.86 | 20.20 |
| $F_{NO}$ | 2.85 | 3.51 | 4.61 |
| 2ω(°) | 69.04 | 42.45 | 25.50 |
| $d_4$ | 16.80 | 6.71 | 0.50 |
| $d_9$ | 4.51 | 5.26 | 6.05 |
| $d_{11}$ | 4.54 | 7.56 | 13.36 |

Third embodiment

| | | | |
|---|---|---|---|
| r1 = 31.493 | d1 = 1.00 | $n_{d1}$ = 1.80610 | $V_{d1}$ = 40.92 |
| r2 = 4.015(AS) | d2 = 1.36 | | |
| r3 = 6.467(AS) | d3 = 1.80 | $n_{d2}$ = 1.84666 | $V_{d2}$ = 23.78 |
| r4 = 13.950 | d4 = variable | | |
| r5 = ∞ (ST) | d5 = −0.45 | | |
| r6 = 3.743(AS) | d6 = 1.30 | $n_{d3}$ = 1.74320 | $V_{d3}$ = 49.34 |
| r7 = 20.976 | d7 = 0.50 | $n_{d4}$ = 1.71736 | $V_{d4}$ = 29.52 |
| r8 = 3.002 | d8 = 2.03 | $n_{d5}$ = 1.51633 | $V_{d5}$ = 64.14 |
| r9 = 9.297(AS) | d9 = variable | | |
| r10 = 19.045(AS) | d10 = 1.00 | $n_{d6}$ = 1.52511 | $V_{d6}$ = 56.23 |
| r11 = −241.584(AS) | d11 = variable | | |
| r12 = ∞ | d12 = 0.50 | $n_{d7}$ = 1.51633 | $V_{d7}$ = 64.14 |
| r13 = ∞ | d13 = 0.50 | | |
| r14 = ∞ | d14 = 0.50 | $n_{d8}$ = 1.51633 | $V_{d8}$ = 64.14 |
| r15 = ∞ | d15 = 0.42 | | |
| r16 = ∞ (I) | | | |

Aspherical Surface Coefficient

TABLE 5-1

| | 2nd surface | 3rd surface | 6th surface | 9th surface |
|---|---|---|---|---|
| K | −0.788 | 0.000 | −1.016 | 0.000 |
| $A_4$ | $5.88309 \times 10^{-4}$ | $2.80805 \times 10^{-10}$ | $2.19556 \times 10^{-3}$ | $6.49949 \times 10^{-3}$ |
| $A_6$ | $1.25094 \times 10^{-5}$ | $7.99547 \times 10^{-7}$ | $9.52058 \times 10^{-5}$ | $6.51196 \times 10^{-4}$ |
| $A_8$ | $-6.84764 \times 10^{-8}$ | $-3.58622 \times 10^{-12}$ | $2.20537 \times 10^{-6}$ | $8.19880 \times 10^{-5}$ |
| $A_{10}$ | $1.92475 \times 10^{-9}$ | 0 | $-7.19757 \times 10^{-8}$ | $1.62716 \times 10^{-5}$ |

TABLE 5-2

| | 10th surface | 11th surface |
|---|---|---|
| K | 0.000 | 0.000 |
| $A_4$ | $-8.16440 \times 10^{-11}$ | $7.72945 \times 10^{-7}$ |
| $A_6$ | $4.00208 \times 10^{-5}$ | $5.03191 \times 10^{-5}$ |
| $A_8$ | $1.51332 \times 10^{-5}$ | $-1.14557 \times 10^{-5}$ |
| $A_{10}$ | $2.94028 \times 10^{-6}$ | $4.64487 \times 10^{-6}$ |

Zoom Data (∞)

TABLE 6

|  | WE | ST | TE |
|---|---|---|---|
| f (mm) | 5.53 | 10.00 | 16.04 |
| $F_{NO}$ | 3.48 | 4.49 | 5.80 |
| 2ω(°) | 71.60 | 42.04 | 26.68 |
| $d_4$ | 12.20 | 4.63 | 0.95 |
| $d_9$ | 2.50 | 3.01 | 2.50 |
| $d_{11}$ | 4.47 | 7.38 | 12.10 |

Fourth embodiment

| $r_1 = 19.064$ | $d_1 = 0.80$ | $n_{d1} = 1.77250$ | $V_{d1} = 49.60$ |
|---|---|---|---|
| $r_2 = 5.104$ | $d_2 = 1.87$ | | |
| $r_3 = 10.613(AS)$ | $d_3 = 1.50$ | $n_{d2} = 1.82114$ | $V_{d2} = 24.06$ |
| $r_4 = 17.740(AS)$ | $d_4$ = variable | | |
| $r_5 = \infty$ (ST) | $d_5 = -0.50$ | | |
| $r_6 = 4.218(AS)$ | $d_6 = 1.25$ | $n_{d3} = 1.80610$ | $V_{d3} = 40.92$ |
| $r_7 = 16.475$ | $d_7 = 0.50$ | $n_{d4} = 1.72825$ | $V_{d4} = 28.46$ |
| $r_8 = 3.000$ | $d_8 = 1.98$ | $n_{d5} = 1.58313$ | $V_{d5} = 59.38$ |
| $r_9 = 6.705(AS)$ | $d_9$ = variable | | |
| $r_{10} = 15.406(AS)$ | $d_{10} = 1.20$ | $n_{d6} = 1.52511$ | $V_{d6} = 56.22$ |
| $r_{11} = 679.942(AS)$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (I) | | | |

Aspherical Surface Coefficient

TABLE 7-1

|  | 3rd surface | 4th surface | 6th surface | 9th surface |
|---|---|---|---|---|
| K | −13.399 | 4.762 | −1.661 | −1.556 |
| $A_4$ | $1.00692 \times 10^{-3}$ | $-9.39622 \times 10^{-4}$ | $2.81854 \times 10^{-3}$ | $5.79158 \times 10^{-3}$ |
| $A_6$ | $-5.17345 \times 10^{-5}$ | $1.08563 \times 10^{-5}$ | $3.99977 \times 10^{-5}$ | $5.27276 \times 10^{-4}$ |
| $A_8$ | $2.70682 \times 10^{-6}$ | $-5.52833 \times 10^{-7}$ | $1.43030 \times 10^{-6}$ | $2.64149 \times 10^{-7}$ |
| $A_{10}$ | $-8.69858 \times 10^{-8}$ | $-3.72262 \times 10^{-8}$ | $1.39779 \times 10^{-7}$ | $1.62265 \times 10^{-5}$ |

TABLE 7-2

|  | 10th surface | 11th surface |
|---|---|---|
| K | −14.699 | 0.000 |
| $A_4$ | $1.27364 \times 10^{-3}$ | $6.13478 \times 10^{-4}$ |
| $A_6$ | $1.39733 \times 10^{-4}$ | $1.52095 \times 10^{-4}$ |
| $A_8$ | $2.54309 \times 10^{-5}$ | $7.94767 \times 10^{-6}$ |
| $A_{10}$ | $-7.92228 \times 10^{-7}$ | $1.36613 \times 10^{-6}$ |

Zoom Data (∞)

TABLE 8

|  | WE | ST | TE |
|---|---|---|---|
| f (mm) | 6.61 | 12.75 | 19.11 |
| $F_{NO}$ | 3.48 | 4.64 | 5.80 |
| 2ω(°) | 62.40 | 33.44 | 22.45 |
| $d_4$ | 13.97 | 4.45 | 0.90 |
| $d_9$ | 2.98 | 3.71 | 3.63 |
| $d_{11}$ | 5.54 | 9.39 | 13.94 |

Fifth embodiment

| $r_1 = -55.947$ | $d_1 = 0.90$ | $n_{d1} = 1.80610$ | $V_{d1} = 40.92$ |
|---|---|---|---|
| $r_2 = 6.646(AS)$ | $d_2 = 1.62$ | | |
| $r_3 = 11.161$ | $d_3 = 1.82$ | $n_{d2} = 2.00069$ | $V_{d2} = 25.46$ |
| $r_4 = 30.512$ | $d_4$ = variable | | |
| $r_5 = \infty$ (ST) | $d_5 = -0.67$ | | |
| $r_6 = 5.808(AS)$ | $d_6 = 3.51$ | $n_{d3} = 1.74320$ | $V_{d3} = 49.34$ |
| $r_7 = 16.319$ | $d_7 = 0.60$ | $n_{d4} = 1.84666$ | $V_{d4} = 23.78$ |
| $r_8 = 5.200$ | $d_8 = 1.36$ | $n_{d5} = 1.58313$ | $V_{d5} = 59.38$ |
| $r_9 = 26.430(AS)$ | $d_9$ = variable | | |
| $r_{10} = 24.745(AS)$ | $d_{10} = 1.24$ | $n_{d6} = 1.52542$ | $V_{d6} = 55.78$ |
| $r_{11} = 7929.558$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.45$ | | |
| $r_{16} = \infty$ (I) | | | |

Aspherical Surface Coefficient

TABLE 9

|  | 2nd surface | 6th surface | 9th surface | 10th surface |
|---|---|---|---|---|
| K | −3.702 | −2.011 | 0.000 | 0.000 |
| $A_4$ | $1.29210 \times 10^{-3}$ | $1.29270 \times 10^{-3}$ | $1.94125 \times 10^{-3}$ | $-1.01517 \times 10^{-4}$ |
| $A_6$ | $-2.94031 \times 10^{-5}$ | $-8.81428 \times 10^{-6}$ | $3.03189 \times 10^{-5}$ | $5.70765 \times 10^{-6}$ |
| $A_8$ | $6.63852 \times 10^{-7}$ | $1.57107 \times 10^{-6}$ | $1.16357 \times 10^{-5}$ | 0 |
| $A_{10}$ | $-7.48401 \times 10^{-9}$ | $-3.88466 \times 10^{-8}$ | $1.55401 \times 10^{-7}$ | 0 |

Zoom Data (∞)

TABLE 10

|  | WE | ST | TE |
|---|---|---|---|
| f (mm) | 7.51 | 14.60 | 21.63 |
| $F_{NO}$ | 2.88 | 3.86 | 4.84 |
| 2ω(°) | 70.01 | 35.27 | 23.89 |
| $d_4$ | 15.42 | 4.74 | 1.07 |
| $d_9$ | 4.10 | 4.19 | 4.41 |
| $d_{11}$ | 6.29 | 11.60 | 16.79 |

Sixth embodiment

| $r_1 = -253.431$ | $d_1 = 1.00$ | $n_{d1} = 1.80610$ | $V_{d1} = 40.92$ |
|---|---|---|---|
| $r_2 = 6.524(AS)$ | $d_2 = 1.57$ | | |
| $r_3 = 9.882$ | $d_3 = 2.00$ | $n_{d2} = 1.84666$ | $V_{d2} = 23.78$ |
| $r_4 = 24.764$ | $d_4$ = variable | | |
| $r_5 = \infty$ (ST) | $d_5 = 0.00$ | | |
| $r_6 = 7.186(AS)$ | $d_6 = 2.00$ | $n_{d3} = 1.69350$ | $V_{d3} = 53.20$ |
| $r_7 = -62.824(AS)$ | $d_7 = 0.10$ | | |
| $r_8 = 7.116$ | $d_8 = 1.50$ | $n_{d4} = 1.88300$ | $V_{d4} = 40.76$ |
| $r_9 = 7.772$ | $d_9 = 0.60$ | $n_{d5} = 1.92286$ | $V_{d5} = 18.90$ |
| $r_{10} = 4.109$ | $d_{10}$ = variable | | |
| $r_{11} = 19.941$ | $d_{11} = 1.70$ | $n_{d6} = 1.58913$ | $V_{d6} = 61.14$ |
| $r_{12} = -37.021(AS)$ | $d_{12}$ = variable | | |
| $r_{13} = \infty$ | $d_{13} = 0.86$ | $n_{d7} = 1.54771$ | $V_{d7} = 62.84$ |
| $r_{14} = \infty$ | $d_{14} = 0.50$ | | |
| $r_{15} = \infty$ | $d_{15} = 0.50$ | $n_{d8} = 1.51633$ | $V_{d8} = 64.14$ |
| $r_{16} = \infty$ | $d_{16} = 0.50$ | | |
| $r_{17} = \infty$ (I) | | | |

Aspherical Surface Coefficient

TABLE 11

|  | 2nd surface | 6th surface | 7th surface | 12th surface |
|---|---|---|---|---|
| K | −0.403 | −0.552 | −117.722 | −7.421 |
| $A_4$ | $-5.30123 \times 10^{-5}$ | $-1.95147 \times 10^{-4}$ | $-1.76410 \times 10^{-4}$ | $5.77763 \times 10^{-6}$ |
| $A_6$ | $1.55843 \times 10^{-6}$ | $-8.83262 \times 10^{-6}$ | $-7.63343 \times 10^{-6}$ | $-2.75734 \times 10^{-6}$ |
| $A_8$ | $-8.23618 \times 10^{-8}$ | $-4.39594 \times 10^{-7}$ | $-4.35389 \times 10^{-7}$ | 0 |
| $A_{10}$ | $3.83367 \times 10^{-10}$ | 0 | 0 | 0 |

Zoom Data (∞)

TABLE 12

|  | WE | ST | TE |
|---|---|---|---|
| f (mm) | 7.18 | 11.15 | 20.67 |
| $F_{NO}$ | 2.85 | 3.40 | 4.62 |
| 2ω(°) | 72.33 | 46.25 | 25.25 |
| $d_4$ | 15.64 | 7.63 | 0.50 |
| $d_9$ | 3.90 | 5.02 | 7.17 |
| $d_{11}$ | 6.17 | 8.63 | 15.59 |

| Seventh embodiment | | | |
|---|---|---|---|
| $r_1 = 157.020$ | $d_1 = 1.00$ | $n_{d1} = 1.80610$ | $V_{d1} = 40.92$ |
| $r_2 = 4.547(AS)$ | $d_2 = 1.05$ | | |
| $r_3 = 6.272$ | $d_3 = 2.20$ | $n_{d2} = 1.80810$ | $V_{d2} = 22.76$ |
| $r_4 = 13.255$ | $d_4$ = variable | | |
| $r_5 = \infty$ (ST) | $d_5 = -0.45$ | | |
| $r_6 = 3.721(AS)$ | $d_6 = 1.40$ | $n_{d3} = 1.74320$ | $V_{d3} = 49.34$ |
| $r_7 = -7358.609$ | $d_7 = 0.50$ | $n_{d4} = 1.68893$ | $V_{d4} = 31.07$ |
| $r_8 = 3.002$ | $d_8 = 1.19$ | $n_{d5} = 1.51633$ | $V_{d5} = 64.14$ |
| $r_9 = 6.657(AS)$ | $d_9$ = variable | | |
| $r_{10} = 11.922(AS)$ | $d_{10} = 1.10$ | $n_{d6} = 1.52511$ | $V_{d6} = 56.23$ |
| $r_{11} = 30423.657(AS)$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.49$ | | |
| $r_{16} = \infty$ (I) | | | |

Aspherical Surface Coefficient

TABLE 13-1

|  | 2nd surface | 6th surface | 9th surface | 10th surface |
|---|---|---|---|---|
| K | −0.273 | −0.978 | 0.000 | 0.000 |
| $A_4$ | $-4.57253 \times 10^{-5}$ | $2.62235 \times 10^{-3}$ | $7.42985 \times 10^{-3}$ | $5.04258 \times 10^{-4}$ |
| $A_6$ | $-8.76429 \times 10^{-6}$ | $5.71552 \times 10^{-5}$ | $6.75400 \times 10^{-4}$ | $2.09830 \times 10^{-4}$ |
| $A_8$ | $2.14403 \times 10^{-8}$ | $1.38662 \times 10^{-5}$ | $1.92625 \times 10^{-4}$ | $1.45376 \times 10^{-5}$ |
| $A_{10}$ | $-2.20356 \times 10^{-8}$ | $-7.25720 \times 10^{-8}$ | $1.93182 \times 10^{-5}$ | $2.75747 \times 10^{-6}$ |

TABLE 13-2

|  | 11th surface |
|---|---|
| K | 0.000 |
| $A_4$ | $4.21538 \times 10^{-4}$ |
| $A_6$ | $1.53746 \times 10^{-4}$ |
| $A_8$ | $4.60241 \times 10^{-6}$ |
| $A_{10}$ | $4.35430 \times 10^{-6}$ |

Zoom Data (∞)

TABLE 14

|  | WE | ST | TE |
|---|---|---|---|
| f (mm) | 5.96 | 9.94 | 17.14 |
| $F_{NO}$ | 3.41 | 4.28 | 5.79 |
| 2ω(°) | 72.71 | 43.42 | 25.23 |
| $d_4$ | 10.66 | 4.78 | 0.95 |
| $d_9$ | 2.66 | 3.12 | 3.06 |
| $d_{11}$ | 5.40 | 8.27 | 13.96 |

| Eighth embodiment | | | |
|---|---|---|---|
| $r_1 = 212.622$ | $d_1 = 0.80$ | $n_{d1} = 1.69350$ | $V_{d1} = 53.21$ |
| $r_2 = 5.061$ | $d_2 = 1.84$ | | |
| $r_3 = 9.120$ | $d_3 = 1.50$ | $n_{d2} = 1.84666$ | $V_{d2} = 23.78$ |
| $r_4 = 14.258(AS)$ | $d_4$ = variable | | |
| $r_5 = \infty$ (ST) | $d_5 = -0.50$ | | |
| $r_6 = 4.470(AS)$ | $d_6 = 2.32$ | $n_{d3} = 1.74320$ | $V_{d3} = 49.34$ |
| $r_7 = -22.186$ | $d_7 = 0.80$ | $n_{d4} = 1.71736$ | $V_{d4} = 29.52$ |
| $r_8 = 4.101$ | $d_8 = 1.37$ | $n_{d5} = 1.51633$ | $V_{d5} = 64.14$ |
| $r_9 = 14.762(AS)$ | $d_9$ = variable | | |
| $r_{10} = 10.675(AS)$ | $d_{10} = 1.21$ | $n_{d6} = 1.58393$ | $V_{d6} = 30.21$ |
| $r_{11} = 16.123(AS)$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.60$ | | |
| $r_{16} = \infty$ (I) | | | |

TABLE 15-1

|  | 4th surface | 6th surface | 9th surface | 10th surface |
|---|---|---|---|---|
| K | 0.000 | −0.964 | 0.000 | 0.000 |
| $A_4$ | $-2.93212 \times 10^{-4}$ | $1.16351 \times 10^{-3}$ | $4.34772 \times 10^{-3}$ | $-1.12133 \times 10^{-3}$ |
| $A_6$ | $-8.62541 \times 10^{-6}$ | $4.17698 \times 10^{-5}$ | $3.69556 \times 10^{-4}$ | $5.83908 \times 10^{-5}$ |
| $A_8$ | $-2.81496 \times 10^{-7}$ | $6.21747 \times 10^{-7}$ | $4.92494 \times 10^{-5}$ | 0 |
| $A_{10}$ | 0 | 0 | 0 | 0 |

Aspherical Surface Coefficient

TABLE 15-2

|  | 11th surface |
|---|---|
| K | 0.000 |
| $A_4$ | $-9.59381 \times 10^{-4}$ |
| $A_6$ | $2.73144 \times 10^{-5}$ |
| $A_8$ | 0 |
| $A_{10}$ | 0 |

Zoom Data (∞)

TABLE 16

|  | WE | ST | TE |
|---|---|---|---|
| f (mm) | 6.31 | 12.16 | 18.24 |
| $F_{NO}$ | 3.21 | 4.42 | 5.69 |
| 2ω(°) | 69.52 | 35.50 | 23.64 |
| $d_4$ | 10.22 | 3.36 | 0.90 |
| $d_9$ | 3.29 | 3.27 | 3.25 |
| $d_{11}$ | 4.06 | 8.62 | 13.42 |

FIGS. 9A to 16C show aberration diagrams of the first to eighth embodiments when focused on an infinite object. In these aberration diagrams, FIGS. 9A, 10A, 11A . . . show aberrations in the wide-angle end, and FIGS. 9B, 10B, 11B . . . show aberrations in the telephoto end. In the drawings, SA is spherical aberration, FC is astigmatism, DT is distortion and CC is chromatic aberration of magnification. In the drawings, "FIY" is the maximum image height.

Next, there will be described the parameter values concerning the conditions (1A) to (7A), (AA) and (BA) of each of the above embodiments.

TABLE 17

| Embodiment | 1 | 2 | 3 | 4 | 5 | 6 | 7 | 8 |
|---|---|---|---|---|---|---|---|---|
| (1A) | 1.74 | 1.94 | 1.85 | 1.73 | 1.76 | 1.87 | 1.67 | 1.59 |
| (2A) | 5.02 | 5.60 | 5.36 | 4.99 | 5.08 | 5.37 | 4.82 | 4.59 |
| (3A) | 0.21 | 0.22 | 0.00 | 0.10 | 0.04 | 0.45 | 0.07 | −0.01 |
| (4A) | 1.57 | 1.48 | 1.38 | 1.37 | 1.44 | 1.77 | 1.50 | 1.48 |
| (5A) | 0.71 | 0.61 | 0.69 | 0.56 | 0.73 | 0.59 | 0.52 | 0.71 |
| (6A) | 1.62 | 1.65 | 1.62 | 1.52 | 1.60 | 1.75 | 1.63 | 1.59 |
| (7A) | 3.41 | 3.88 | 6.09 | 4.54 | 6.29 | 3.10 | 3.80 | 7.92 |
| (AA) | 2.89 | 2.88 | 2.90 | 2.89 | 2.88 | 2.88 | 2.88 | 2.89 |
| (BA) | 0.94 | 0.83 | 0.66 | 0.79 | 0.65 | 0.97 | 0.92 | 0.56 |

The zoom lens system described in each embodiment is a 3-unit zoom lens system capable of securing an appropriate zoom ratio without bending the optical axis or moving a part of lens units externally from the optical axis, and is advantageous to miniaturization and the securing of optical performance.

Next, the second aspect of the present invention will be described.

As described above, the zoom lens system according to the present invention comprises, in order from an object side, a first lens unit having a negative refractive power, a second lens unit having a positive refractive power and a third lens unit having a positive refractive power.

During zooming from a wide-angle end to a telephoto end, a space between the first lens unit and the second lens unit narrows.

In the second aspect, a space between the second lens unit and the third lens unit changes during zooming or focusing.

During the zooming from the wide-angle end to the telephoto end, at least the second lens unit moves only toward the object side so that the space between the first lens unit and the second lens unit narrows.

The first lens unit comprises, in order from the object side, a negative lens element and a positive lens element, and the total number of the lens elements in the first lens unit is two.

The second lens unit comprises three lens elements in total.

The third lens unit comprises a positive lens element, and the total number of the lens elements in the third lens unit is one.

The total number of the lens elements of the zoom lens system is six.

In one preferable example according to the second aspect, during the zooming from the wide-angle end to the telephoto end, the third lens unit also moves only toward the object side.

The zoom lens system satisfies the following condition (1B):

$$0.45 < \Sigma d1G/f_w < 0.65 \quad (1B),$$

wherein $\Sigma d1G$ is a thickness of the first lens unit along an optical axis, and fw is a focal length of the zoom lens system in the wide-angle end.

In another preferable example according to the second aspect, the space between the second lens unit and the third lens unit changes during zooming.

During the zooming from the wide-angle end to the telephoto end, the third lens unit moves so as to be positioned closer to the object side in the telephoto end than in the wide-angle end.

The zoom lens system satisfies the following conditions (2B) and (3B):

$$0.04 < D_2(w)/f_3 < 0.23 \quad (2B); \text{ and}$$

$$0.04 < D_2(t)/f_3 < 0.23 \quad (3B),$$

wherein $D_2(w)$ is an air space between the second lens unit and the third lens unit along the optical axis in the wide-angle end, $D_2(t)$ is an air space between the second lens unit and the third lens unit along the optical axis in the telephoto end, and $f_3$ is a focal length of the third lens unit.

In still another preferable example according to the second aspect, during the zooming from the wide-angle end to the telephoto end, the third lens unit moves so as to be positioned closer to the object side in the telephoto end than in the wide-angle end.

The zoom lens system satisfies the following condition (4B):

$$0.04 < D_2/f_3 < 0.18 \quad (4B),$$

wherein $D_2$ is an air space between the second lens unit and the third lens unit along the optical axis in a state between the wide-angle end and the telephoto end, and $f_3$ is a focal length of the third lens unit.

The above constitution of the zoom lens system serves to shorten the length of each lens unit and to easily secure a sufficient space for moving the lens unit for zooming without enlarging the total length of the zoom lens system. Therefore, the burden on each lens unit in power layout can be reduced, and thinning is easily achieved consistently with the performance.

That is, since the third lens unit moves toward the object side during the zooming to the telephoto end, the ray height in the third lens unit is reduced as compared with the case where the third lens unit is fixed or moves toward the image side during the zooming. Therefore, the diameter of the third lens unit can be reduced. Since the third lens unit is moved, deterioration of the performance due to the zooming can be inhibited.

To achieve miniaturization consistently with the optical performance, the third lens unit is constituted of one positive lens element. In consequence, the space for movement of the lens unit for zooming can be secured, and the constitution further contributes to thinning.

Moreover, since the space between the third lens unit and the second lens unit is variable during zooming or focusing operation, the aberration fluctuation during zooming can be suppressed. Alternatively, the number of movable lenses for focusing can be reduced.

Furthermore, since the first lens unit is constituted of two lens elements including the negative lens element and the positive lens element, the length of the first lens unit can be shortened while maintaining the performance. In consequence, the lens frame can be thinned, and the space for moving the lens unit for zooming can be broadened.

In addition, since the second lens unit, which has a main magnification change function, is constituted of three lens elements, the length of the second lens unit can be shortened while maintaining the performance. If the second lens unit is constituted of two lens elements, the space between the lens elements tends to be large for correcting the off-axial aberration. Therefore, it is difficult to thin the second lens unit, the constitution of and after the third lens unit needs to be complicated, and the whole zoom lens system enlarges.

It is to be noted that even when a collapsible structure or the like is used in the lens barrel of the zoom lens system, the above constitution is advantageous because the length of each lens unit can be shortened.

Moreover, the above constitution is also advantageous to a case where focusing operation is performed by the movement of the third lens unit. That is, in the above zoom lens system, since the third lens unit is positioned closer to the object side in the telephoto end than in the wide-angle end, the focusing sensitivity in the telephoto end can be increased in a case where focusing operation is performed by the movement of the third lens unit. In consequence, the power of the third lens unit can be weakened to reduce the thickness of the third lens unit. This is advantageous to the thinning of the lens barrel in the collapsed state.

Furthermore, since the third lens unit has a small diameter and is constituted of one lens element, the weight of the lens element can be reduced, and the driving system for the third lens unit can be simplified. The constitution contributes to miniaturization of the lens barrel.

It is to be noted that it is further preferable that plastic is used in the lens element of the third lens unit to reduce the weight.

Moreover, the constitution in which the third lens unit moves only toward the object side during the zooming from the wide-angle end to the telephoto end is advantageous to miniaturization of the third lens unit.

Furthermore, to balance thinning and aberration, the condition (1B) is satisfied.

The condition (1B) defines the thickness of the first lens unit along the optical axis. If the value of the condition (1B) is above the upper limit of 0.65, the thickness of the zoom lens in the collapsed state increases. If the value of the condition is below the lower limit of 0.45, it is difficult to correct field curvature.

In the above zoom lens system, it is preferable that the air space between the second lens unit and the third lens unit along the optical axis and the focal length of the third lens unit satisfy the conditions (2B) and (3B).

In a case where the second lens unit is constituted of three lens elements and the third lens unit is constituted of one lens element, when the conditions (2B) and (3B) are satisfied, the power of the third lens unit can be weakened. Or it is easy to reduce the diameter of the third lens unit. If the values of the conditions (2B) and (3B) are below the lower limits of 0.04 and 0.04, respectively, especially in the telephoto end, it is difficult to correct the off-axial aberration, and it is necessary to strengthen the power of the third lens unit or complicate the constitution. If the values of the conditions (2B) and (3B) are above the upper limits of 0.23 and 0.23, respectively, (especially in the wide-angle end) the total length of the zoom lens system unfavorably increases.

Even when the collapsible lens barrel structure or the like is used, the above constitution is advantageous because the length of each lens unit can be shortened.

It is to be noted that even when the third lens unit is provided with a focusing function, it is preferable to satisfy the conditions (2B) and (3B). Below the lower limits of these conditions, there is not any extra space for forward and backward movements of the lens unit during focusing, and the performance to photograph an object in a short distance deteriorates. Above the upper limit, the focusing sensitivity lowers, the driving system for focusing enlarges, or power consumption increases.

In a case where the above zoom lens system is constituted so that the space between the second lens unit and the third lens unit changes during zooming, this variable space has a floating function. This is advantageous in reducing the aberration fluctuation during zooming.

Moreover, it is advantageous in correcting aberration while reducing the total length of the zoom lens system that the zoom lens system is constituted so as to satisfy the conditions (2B) and (3B) with respect to the variable space.

It is to be noted that, when, for example, the third lens unit is used as a movable lens unit for focusing, it is advantageous to miniaturization that the zoom lens system is constituted so as to satisfy the conditions (2B), (3B).

It is preferable that the above zoom lens system satisfies the condition (4B) in a state between the wide-angle end and the telephoto end.

In a case where the second lens unit is constituted of three lens elements and the third lens unit is constituted of one lens element, when the condition (4B) is satisfied, the power of the third lens unit can be weakened. Alternatively, it is easy to reduce the diameter. If the value of the condition (4B) is below the lower limit of 0.04, it is difficult to correct the off-axial aberration, and it is necessary to strengthen the power of the third lens unit or complicate the constitution. Above the upper limit of 0.18, the total length of the zoom lens system unfavorably increases.

The above constitution is also advantageous when the collapsible lens barrel structure or the like is used since the length of each lens unit can be shortened.

It is to be noted that even when the third lens unit is provided with a focusing function, it is preferable to satisfy the condition (4B). Below the lower limit of the condition, there is not any extra space for the forward and backward movements of the lens unit during focusing, and the capability to photograph the subject in the short distance deteriorates. Above the upper limit, the focusing sensitivity decreases, the driving system for focusing enlarges, or the power consumption increases.

It is preferable that the above zoom lens system satisfies the following condition (5B) concerning the change amount of the space between the second lens unit and the third lens unit:

$$-0.005 < (D_2(t) - D_2(w))/f_w < 0.5 \tag{5B},$$

wherein $D_2(w)$ is an air space between the second lens unit and the third lens unit along the optical axis in the wide-angle end, $D_2(t)$ is an air space between the second lens unit and the third lens unit along the optical axis in the telephoto end, and $f_w$ is a focal length of the zoom lens system in the wide-angle end.

If the value of the condition (5B) is above the upper limit of 0.5, the ray height in the first lens unit increases in the wide-angle end, the diameter of the front lens increases, or the diameter of the rearmost lens increases. This is disadvantageous to miniaturization. In addition, since the air space between the second lens unit and the third lens unit along the optical axis increases in the telephoto end, when a shaft is disposed on the lens frame for holding the second lens unit to hold the lens frame for holding the third lens unit, the length of the shaft increases as much as the movement amount of the third lens unit. This is disadvantageous in thinning the lens barrel structure. Especially, in a case where a collapsible lens barrel structure or the like is used, the above mentioned structure restricts the thinning of the lens barrel in the collapsed state. If the value of the condition (5B) is below the lower limit of −0.005, it is difficult to secure the tolerance with respect to the fluctuation of the image surface position during manufacturing or the space necessary for focusing.

To achieve the thinning of the lens barrel, it is preferable that the second lens unit is constituted of one cemented lens component including three lens elements.

That is, to achieve the thinning of the lens barrel, in addition to the thinning of the lens unit, it is necessary to reduce the thickness of the lens frame for holding the lens unit as much as possible. When the second lens unit is constituted of only the cemented lens component, the second lens unit may be held by holding only one portion of the cemented lens component. This serves to reduce the thickness of the lens frame. In addition, since the space for movement of the lens unit for zooming can be secured, the constitution is advantageous to thinning. Especially, when the collapsible lens barrel structure or the like is used, the effect increases.

It is preferable that the above zoom lens system satisfies the following condition (6B) which defines the radius of curvature of the lens surface in the first lens unit closest to the image side:

$$-0.41 < f_w/RDY(R)_{L2} < 0.41 \tag{6B},$$

wherein $RDY(R)_{L2}$ is a paraxial radius of curvature of the lens surface in the first lens unit closest to the image side.

When this condition is satisfied, the shape of the image-side surface of the first lens unit comes close to a plane, and the thinning of the first lens unit can be achieved. The power of the incidence surface of the positive lens element in the first lens unit decreases, and generation of aberration is reduced.

In the above zoom lens system, when the collapsible structure is used as the lens barrel, it is preferable that the space between the lens units is set to be smaller than that in the wide-angle end, when the lens barrel is collapsed.

The above zoom lens system is advantageous in maintaining the optical performance while reducing the thickness of each lens unit. Therefore, effect of reducing the size of the zoom lens system in the collapsed state is easily obtained.

In the above zoom lens system, when only the third lens unit is moved during focusing, there are the following advantages.

That is, as described above, the third lens unit is easily miniaturized since it is constituted of one lens element. In addition, the form of movement of the third lens unit is advantageous especially in maintaining the focusing sensitivity. Therefore, when the third lens unit is used as a focusing unit, the burden on the driving system can be reduced.

If the first lens unit is used for focusing, it is necessary to consider the space for moving the first lens unit for focusing on an object at a short distance. This constitution is disadvantageous to the thinning of the lens frame. When the second lens unit is used for focusing, the fluctuation of aberration increases, the moving direction for focusing in the wide-angle end is different from that in the telephoto end, or there is sometimes a focal length region of the zoom lens system in which a remarkable space to move the second lens unit for focusing is required. Therefore, it is advantageous that the third lens unit is used as the focusing lens unit.

In the above zoom lens system, during zooming, the space between the second lens unit and the third lens unit may change.

When the space between the second lens unit and the third lens unit is slightly varied, a floating effect is produced. This constitution is advantageous in suppressing the aberration fluctuation during zooming.

Moreover, when the first lens unit moves toward the image side and then moved toward the object side during the zooming from the wide-angle end to the telephoto end, the first lens unit can be provided with a main image position adjusting function. In a case where this constitution is combined with a constitution to vary the space between the second lens unit and the third lens unit during zooming, when movement amounts are mutually adjusted, the aberration fluctuation during zooming can be reduced.

It is preferable that the zoom lens system satisfies the following condition (7B):

$$1.40 < D_1(w)/f_w < 2.80 \tag{7B},$$

wherein $D_1(w)$ is an air space between the first lens unit and the second lens unit along the optical axis in the wide-angle end, and $f_w$ is a focal length of the zoom lens system in the wide-angle end.

This condition specifies the space between the first lens unit and the second lens unit in the wide-angle end, and is a condition for balancing miniaturization, the increase of the zoom ratio and the securing of the optical performance more satisfactorily. When the value of the condition is not below the lower limit of 1.40, the constitution is advantageous in maintaining the variable space and securing the zoom ratio without increasing the refractive powers of the first and second lens units excessively. Therefore, the constitution is advantageous to the aberration correction and the maintaining of the zoom ratio. When the value of the condition is not above the upper limit of 2.80, the constitution is advantageous in suppressing the increase of the ray height in the first lens unit and suppressing the increase of the diameter of the front lens. Alternatively, the constitution is advantageous in suppressing the increase of the total length of the zoom lens system and the thinning of the lens barrel in the collapsed state.

It is preferable that the zoom lens system satisfies the following condition (8B):

$$0.5 < D_2(t)/D_2(w) < 2.0 \tag{8B},$$

wherein $D_2(w)$ is an air space between the second lens unit and the third lens unit along the optical axis in the wide-angle end, and $D_2(t)$ is an air space between the second lens unit and the third lens unit along the optical axis in the telephoto end.

This condition defines a preferable change of the space between the second lens unit and the third lens unit in a case where the third lens unit is used as the focusing lens unit.

When the value of the condition is not above the lower limit of 0.5, it is possible to maintain the space between a front unit and a rear unit of a telephoto type lens system constituted of a positive lens unit (the front unit) composed of the first and second lens units and the third lens unit (the rear unit) having a negative refractive power. This constitution is advantageous to the decrease of the total length in the telephoto end. When the value of the condition is not above the upper limit of 2.0, it is possible to reduce the movement amount of the third lens unit for focusing when photographing an object in a short distance. This constitution is advantageous to the thinning of the lens barrel.

In the above zoom lens system, the second lens unit preferably includes a positive lens element and a negative lens element. This constitution is advantageous to adjustments of chromatic aberration, the position of the principal point and the like in the second lens unit.

Moreover, the second lens unit preferably includes one cemented lens component constituted by cementing three lens elements including a positive lens element, a negative lens element and a positive lens element in order from the object side. This constitution is advantageous to the decrease of the aberration of the second lens unit itself.

Furthermore, the incidence-side surface of the cemented lens component is preferably formed into a shape such that the surface has a positive refractive power on the optical axis and the refractive power of the portion on the surface decreases with distance from the optical axis. This is advantageous in securing the positive refractive power of the second lens unit, disposing the principal point closer to the object side to secure the zoom ratio and correcting spherical aberration easily generated in this surface.

In addition, the exit-side surface of the cemented lens component is preferably formed into such a shape that the refractive power of a portion on the surface decreases (the positive refractive power weakens or the negative refractive power strengthens) with distance from the optical axis, that is, the refractive power of the portion decreases as the portion comes closer to the periphery of the lens surface. This is advantageous to correction of field curvature.

Moreover, the Abbe number of the negative lens element of the cemented lens component is set to be smaller than that of at least one positive lens element of the cemented lens component, the positive lens element having the Abbe number larger than that of the negative lens element is cemented to the concave surface of the negative lens element, and the cemented surface is constituted so as to have a negative refractive power. In this case, chromatic aberration can satisfactorily be corrected.

That is, spherical aberration is primarily controlled on the object-side surface of the cemented lens component, chromatic aberration is controlled primarily by selection of the power and the Abbe number rather than the surface shape of the central negative lens element, and off-axial aberration is primarily controlled on the image-side surface of the cemented lens component, so that chromatic aberration can satisfactorily be corrected. It is to be noted that, since the cemented surface has a secondary effect of controlling aberration, it is preferable to use this effect together with the above primary effect.

Moreover, the second lens unit may be constituted of, in order from the object side, a single lens element having a positive refractive power, and one cemented lens component including a positive lens element and a negative lens element.

Such a constitution is advantageous in that the principal point of the second lens unit can easily be positioned closer to the object side, the total length of the zoom lens system in the telephoto end is reduced, and the zoom ratio can be increased. This constitution is also advantageous to the decrease of the diameter of the second lens unit. It is also possible to obtain the above effect of the cemented positive and negative lens elements.

Furthermore, in a case where the single lens element of the second lens unit is constituted so that the refractive power of the image-side surface of the lens element is larger than that of the object-side surface of the lens element, the constitution is advantageous to the increase of the zoom ratio due to the adjustment of the principal point position and miniaturization of the second lens unit due to a converging function of an axial light flux on the object side surface.

In addition, when the image-side surface of the cemented lens component is formed into a concave surface, the constitution is advantageous in offsetting the aberration of the second lens unit and the aberration of the third lens unit having the positive refractive power to satisfactorily correct the aberration of the whole zoom lens system.

Moreover, in the above zoom lens system, the third lens unit preferably satisfies the following condition (9B):

$$3.8<f_3/f_w<15.0 \tag{9B}$$

wherein $f_3$ is a focal length of the third lens unit, and $f_w$ is a focal length of the zoom lens system in the wide-angle end.

The above zoom lens system has a constitution advantageous to miniaturization of the third lens unit especially owing to the form of movement of the third lens unit. When the third lens unit is used as a focusing lens unit, the focusing sensitivity of the third lens unit in the telephoto end is easily increased. Therefore, the refractive power of the third lens unit can appropriately be reduced so as to satisfy the condition (9B), and the constitution is more advantageous to miniaturization. When the value of the condition (9B) is not below the lower limit of 3.8, the movement amount of the third lens unit during focusing is reduced, and the constitution is advantageous to thinning. When the value of the condition is not above the upper limit of 15.0, the refractive power in the third lens unit is reduced, and the influence of the third lens unit on aberration can easily be reduced.

Moreover, the above zoom lens system preferably satisfies the following condition (10B):

$$0.01<D_{3G}/f_t<0.08 \tag{10B}$$

wherein $D_{3G}$ is a thickness of the third lens unit along the optical axis, and $f_t$ is a focal length of the zoom lens system in the telephoto end.

It is preferable to satisfy the above condition (10B) so that the third lens unit includes a positive lens element having an appropriate thickness. When the value of the condition is not below the lower limit of 0.01, the constitution is advantageous to the securing of necessary strength of the positive lens element of the third lens unit. When the value of the condition is not above the upper limit of 0.08, the thickness of the third lens unit along the optical axis is reduced. The constitution is advantageous to miniaturization of the zoom lens system in the collapsed state.

Moreover, it is preferable that the above zoom lens system satisfies the following condition (AB):

$$2.5 \leq f_t/f_w<5.5 \tag{AB}$$

wherein $f_t$ is a focal length of the zoom lens system in the telephoto end, and $f_w$ is a focal length of the zoom lens system in the wide-angle end.

This condition (AB) defines the zoom ratio of the zoom lens system. When the zoom lens system has an appropriate zoom ratio of 2.5 or more, the size of the zoom lens system and the optical performance are preferably easily balanced. When the value of the condition (AB) is not below the lower limit of 2.5, the zoom ratio sufficient for general use is obtained. When the value of the condition is not above the upper limit of 5.5, the constitution serves for reduction of the number of lens elements required for correcting aberrations and this is advantageous for cost reduction.

Moreover, it is preferable that the zoom lens system includes an aperture stop which is disposed immediately before the second lens unit and which moves integrally with the second lens unit during zooming.

According to such a constitution, enlargement of the diameter of the first lens unit is prevented. Moreover, the off-axial chief ray emitted from the third lens unit is easily brought close to a parallel state with respect to the optical axis. Since the second lens unit is not disposed on the object side of the aperture stop and the lens elements of the second lens unit are arranged on the image side of the aperture stop, it is possible to inhibit deterioration of the aberration due to relative eccentricities among the lens elements of the second lens unit. Since the moving mechanism can be shared by the aperture stop with the second lens unit, the constitution can easily be simplified.

It is to be noted that the above zoom lens system can be used as an image pickup lens of an image pickup apparatus. In this case, it is preferable that the image pickup apparatus comprises any of the above zoom lens system; and an image sensor which is disposed on the image side of the zoom lens system and which converts an image formed by the zoom lens system into an electric signal.

The above zoom lens system according to the present invention is advantageous to miniaturization and the securing of a wide angle of field in the wide-angle end. Since the incidence angle of ray on the image pickup surface easily decreases, the zoom lens system is preferably used in the image pickup apparatus including an image sensor.

It is to be noted that the above described constitution(s) and/or condition(s) may be simultaneously satisfied in any combination.

In addition, the above conditions may be modified as follows.

In the condition (1B), it is more preferable to set the lower limit value to 0.50, further preferably 0.55. It is more preferable to set the upper limit value to 0.63.

In the condition (5B), it is more preferable to set the lower limit value to −0.003. It is more preferable to set the upper limit value to 0.4, further preferably 0.3.

In the condition (6B), it is more preferable to set the lower limit value to −0.04, further preferably −0.38. It is more preferable to set the upper limit value to 0.40, further preferably 0.38.

In the condition (7B), it is more preferable to set the lower limit value to 1.5. It is more preferable to set the upper limit value to 2.5, further preferably 2.2.

In the condition (8B), it is more preferable to set the lower limit value to 0.6. It is more preferable to set the upper limit value to 1.5.

In the condition (9B), it is more preferable to set the lower limit value to 3.9. Moreover, it is more preferable to set the upper limit value to 10.0, further preferably 7.0.

In the condition (10B), it is more preferable to set the lower limit value to 0.03.

In the condition (AB), it is more preferable to set the lower limit value to 2.6, further preferably 2.7. Furthermore, it is more preferable to set the upper limit value to 4.5, further preferably 3.5.

Next, there will be described embodiments of the zoom lens system according to the second aspect.

FIGS. 17A to 23C are sectional views of the ninth to fifteenth embodiments of the present invention when focused on an infinite object. Among these drawings, FIGS. 17A, 18A, 19A . . . show states in the wide-angle ends, FIGS. 17B, 18B, 19B . . . show the intermediate states, and FIGS. 17C, 18C, 19C . . . show states in telephoto ends, respectively. In the drawings, the first lens unit is denoted with G1, the aperture stop is denoted with ST, the second lens unit is denoted with G2 and the third lens unit is denoted with G3. A low pass filter coated with an IR cut coating or the like are represented as a plane parallel plate F. The cover glass of the electronic image sensor (a CCD image sensor, a CMOS image sensor or the like) is represented as a plane parallel plate C. The image surface is denoted with I. When an image formed by the zoom lens system is received by the electronic image sensor, the light receiving surface of the image sensor is disposed on the image surface I. It is to be noted that a multilayered film for restricting a wavelength region may be disposed on the surface of the cover glass C. The cover glass C may be provided with a low pass filter function. In each drawing, the dash-dotted line extended through the lens units and the plane parallel plates is an optical axis.

Figure 17A:
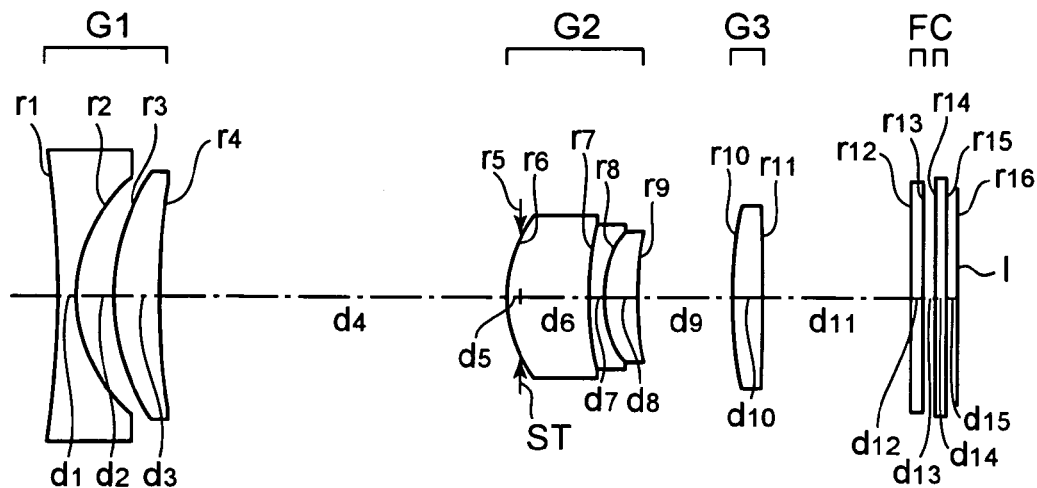
FIGS. 17A to 17C are sectional views of the ninth embodiment of the present invention when focused on an infinite object.
Figure 17B:
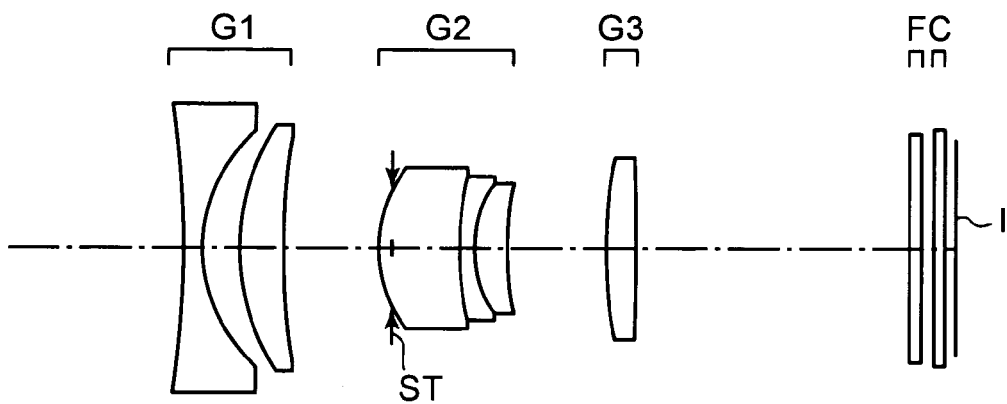
Figure 17C:
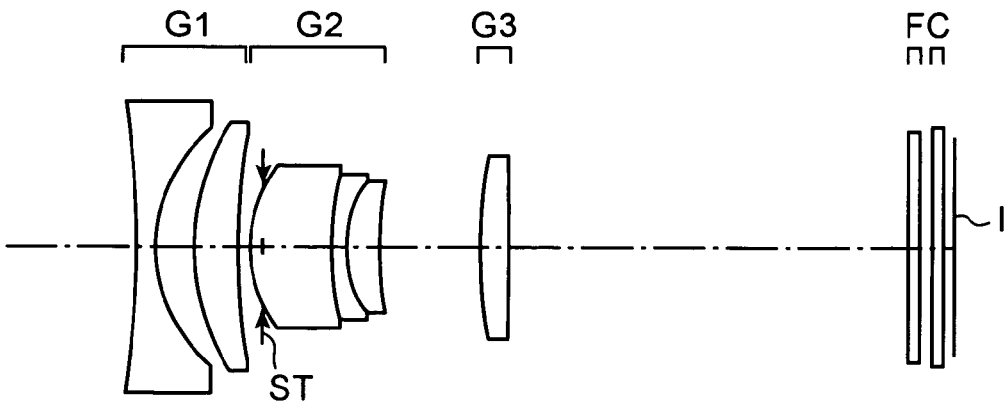

As shown in FIGS. 17A to 17C, the ninth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while slightly enlarging the space between the third lens unit G3 and the second lens unit G2.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side.

Aspherical surfaces are used on four surfaces including the image-side surface of the double-concave negative lens of the first lens unit G1; the surfaces of the cemented triplet of the second lens unit G2 closest to the object side and the image side; and the object-side surface of the positive meniscus lens of the third lens unit G3.

Figure 18A:
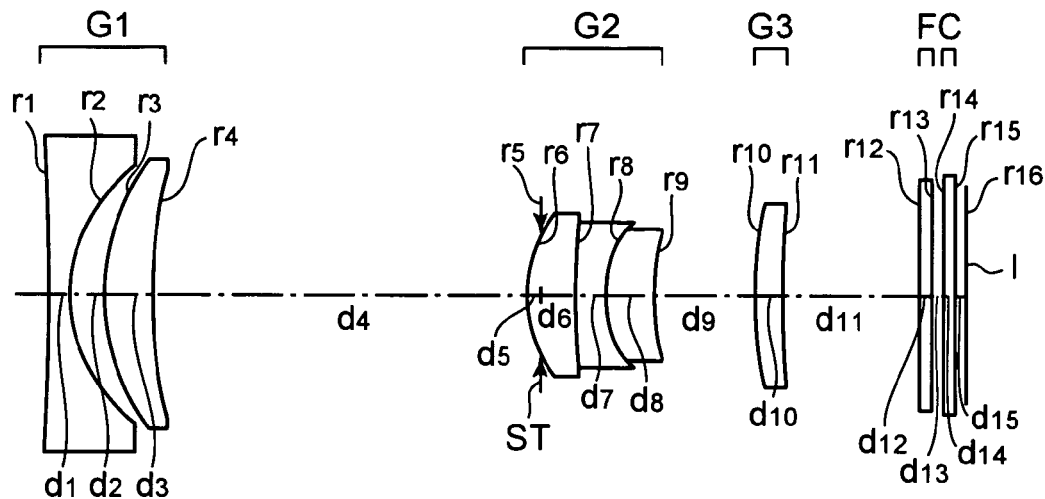
FIGS. 18A to 18C are sectional views of the tenth embodiment of the present invention when focused on an infinite object.
Figure 18B:
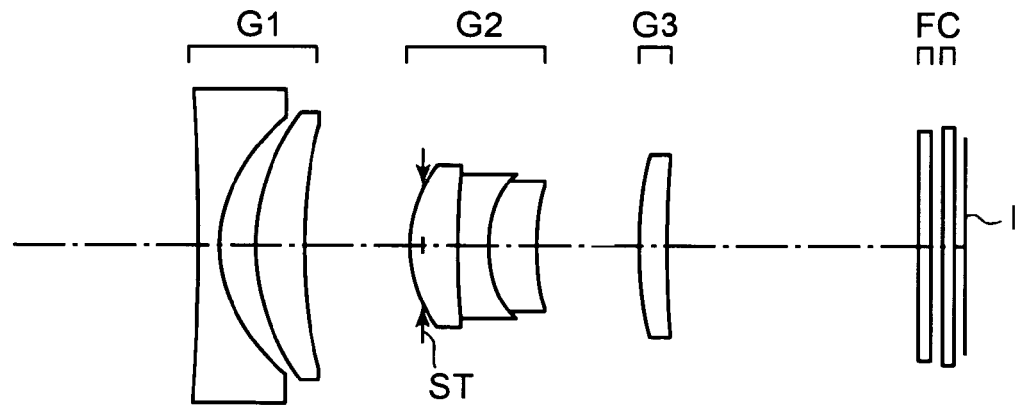
Figure 18C:
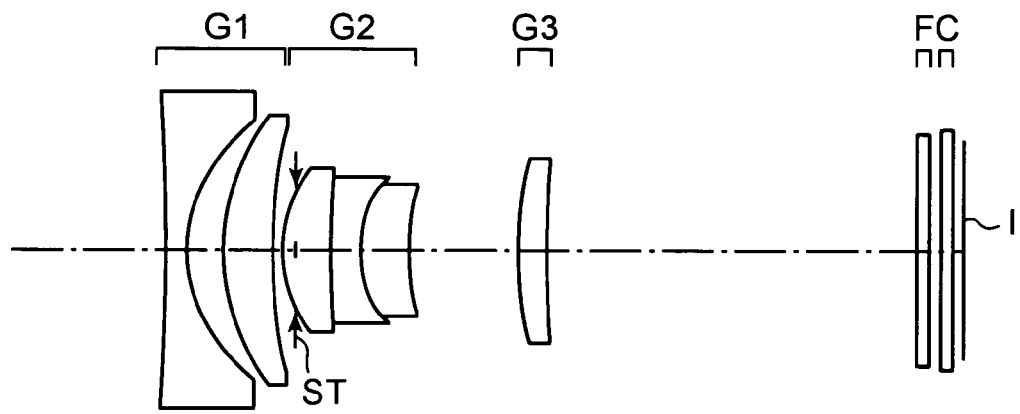

As shown in FIGS. 18A to 18C, the tenth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously moves toward the object side while reducing the space between the second lens unit G2 and the first lens unit G1. The third lens unit G3 moves toward the object side while slightly enlarging the space between the third lens unit G3 and the second lens unit G2.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side.

Aspherical surfaces are used on four surfaces including the image-side surface of the double-concave negative lens of the first lens unit G1; the surfaces of the cemented triplet of the second lens unit G2 closest to the object side and the image side; and the object-side surface of the positive meniscus lens of the third lens unit G3.

Figure 19A:
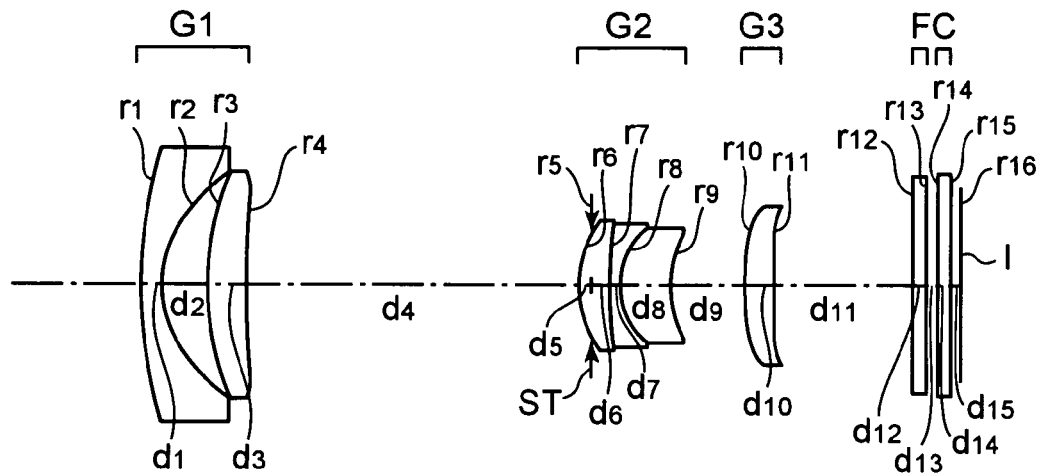
FIGS. 19A to 19C are sectional views of the eleventh embodiment of the present invention when focused on an infinite object.
Figure 19B:
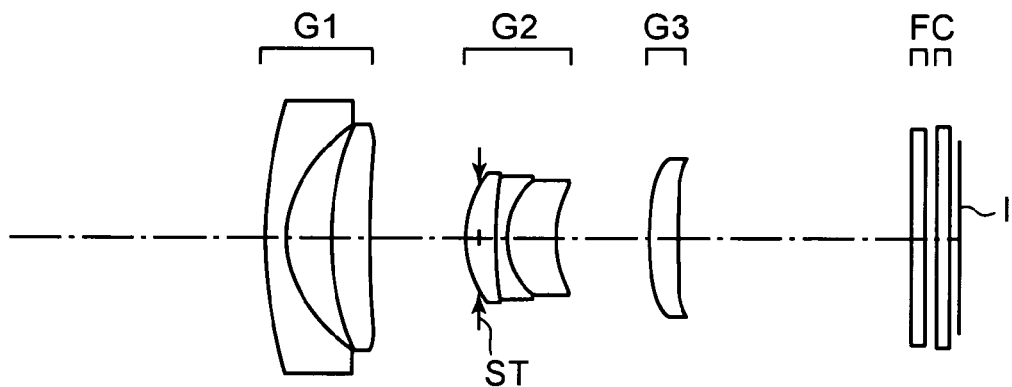
Figure 19C:
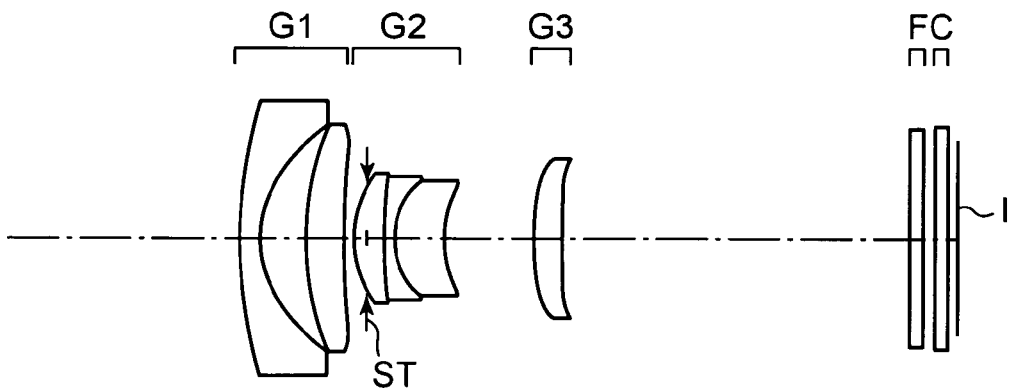

As shown in FIGS. 19A to 19C, the eleventh embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side. The first lens unit is arranged closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while slightly enlarging the space between the third lens unit G3 and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side.

Aspherical surfaces are used on six surfaces including opposite surfaces of the positive meniscus lens of the first lens unit G1; the surfaces of the cemented triplet of the second lens unit G2 closest to the object side and the image side; and opposite surfaces of the positive meniscus lens of the third lens unit G3.

Figure 20A:
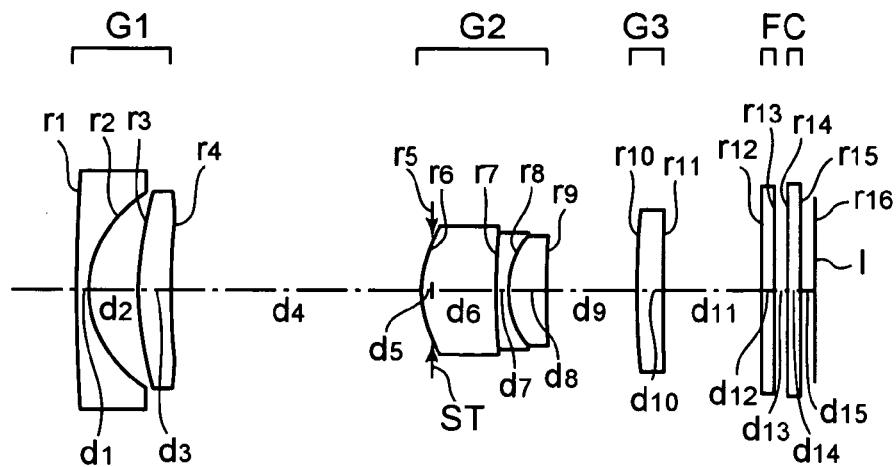
FIGS. 20A to 20C are sectional views of the twelfth embodiment of the present invention when focused on an infinite object.
Figure 20B:
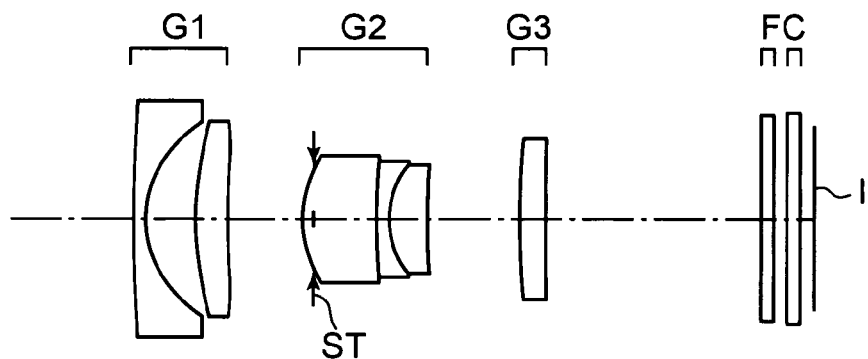
Figure 20C:
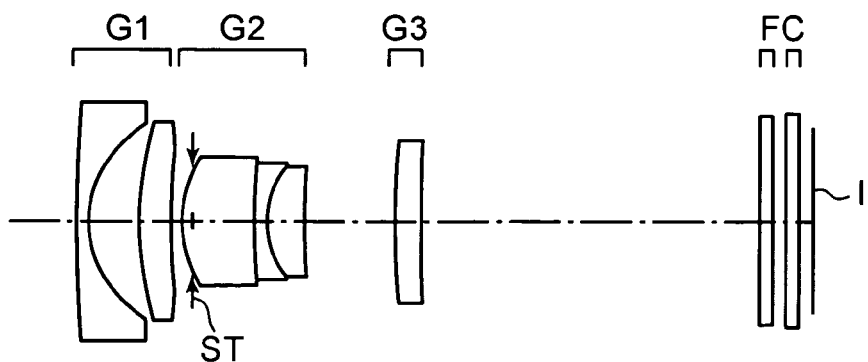

As shown in FIGS. 20A to 20C, the twelfth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side. The first lens unit is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while once slightly enlarging the space between the third lens unit G3 and the second lens unit G2 and then slightly reducing the space.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a double-convex lens. The third lens unit G3 is constituted of one positive meniscus lens whose convex surface faces the object side. The aperture stop ST is positioned on the image side of the vertex of the surface of the cemented triplet of the second lens unit G2 closest to the object side.

Aspherical surfaces are used on four surfaces including opposite surfaces of the positive meniscus lens of the first lens unit G1; and the surfaces of the cemented triplet of the second lens unit G2 closest to the object side and the image side.

Figure 21A:
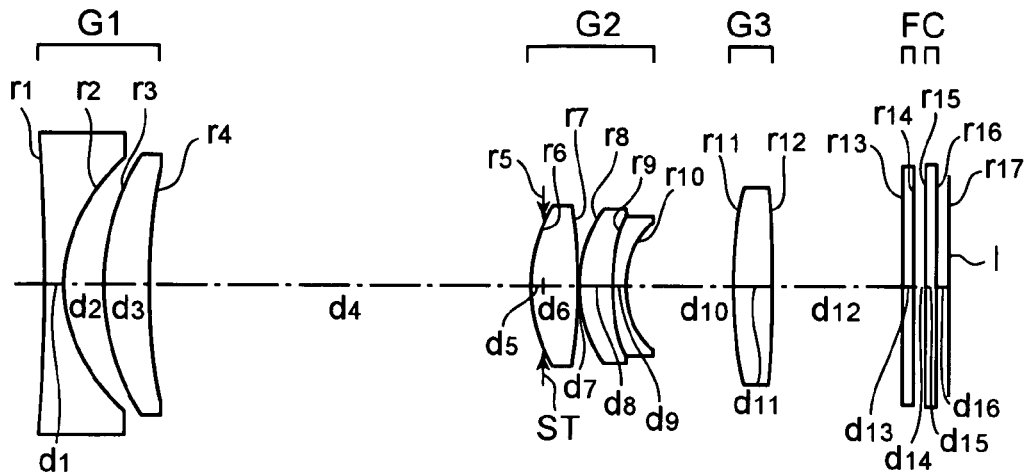
FIGS. 21A to 21C are sectional views of the thirteenth embodiment of the present invention when focused on an infinite object.
Figure 21B:
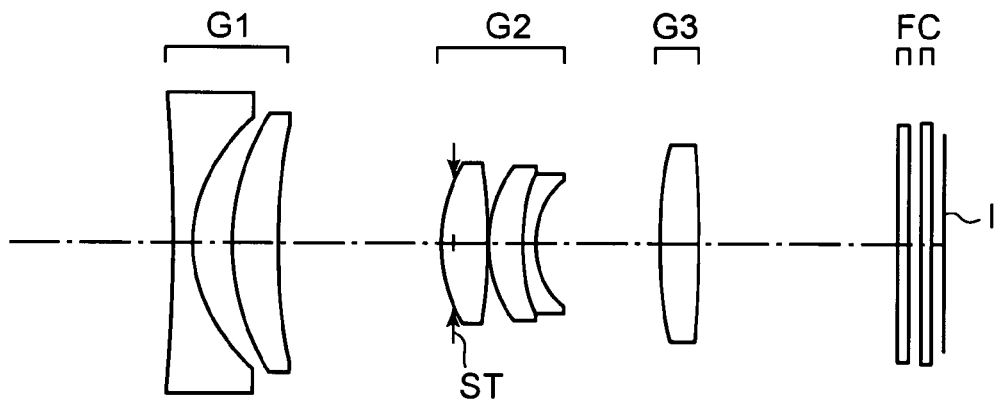
Figure 21C:
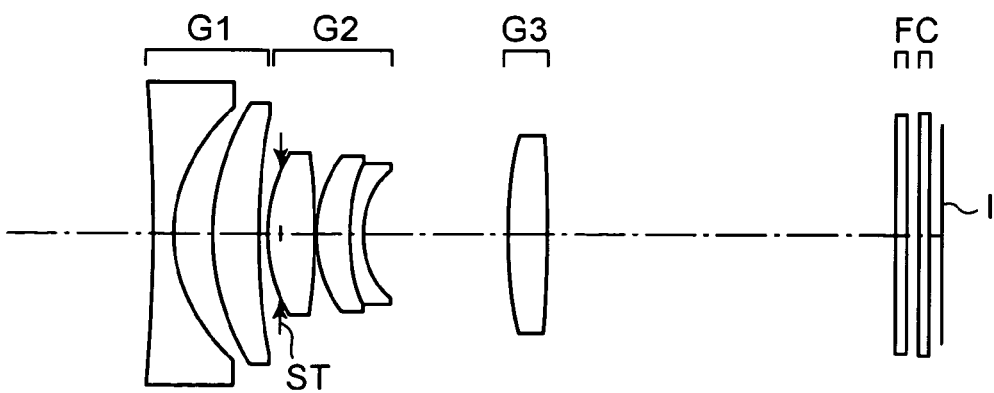

As shown in FIGS. 21A to 21C, the thirteenth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side. The first lens unit is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while enlarging the space between the third lens unit G3 and the second lens unit G2.

The first lens unit G1 is constituted of, in order from the object side, a double-concave negative lens and a positive meniscus lens whose convex surface faces the object side. The second lens unit G2 is constituted of, in order from the object side, a double-convex positive lens and a cemented doublet including a positive meniscus lens whose convex surface faces the object side and a negative meniscus lens whose convex surface faces the object side. The third lens unit G3 is constituted of one double-convex positive lens. The aperture stop ST is positioned on the image side of the vertex of the object-side surface of the double-convex positive lens of the second lens unit G2.

Aspherical surfaces are used on four surfaces including the image-side surface of the double-concave negative lens of the first lens unit G1; opposite surfaces of the double-convex positive lens of the second lens unit G2; and the object-side surface of the double-convex positive lens of the third lens unit G3.

Figure 22A:
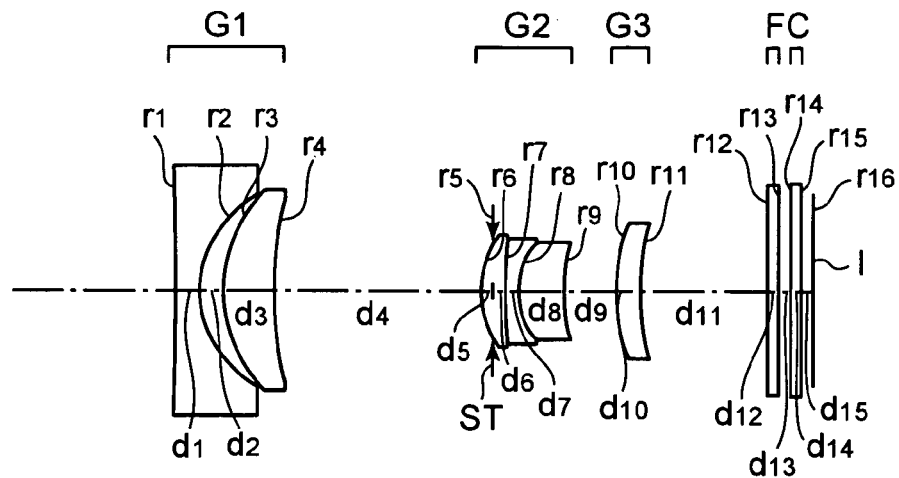
FIGS. 22A to 22C are sectional views of the fourteenth embodiment of the present invention when focused on an infinite object.
Figure 22B:
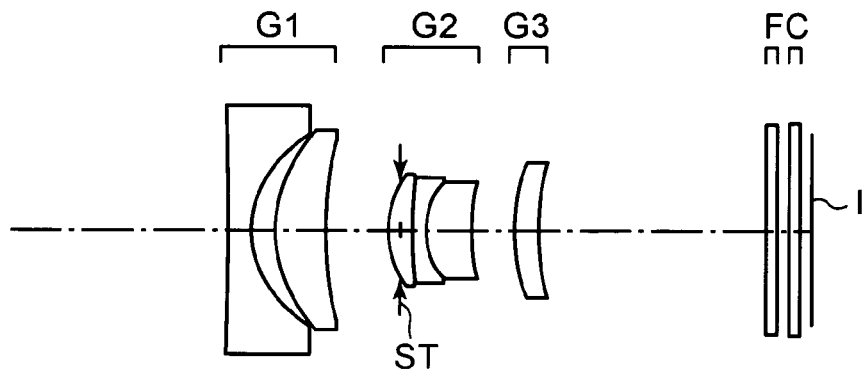
Figure 22C:
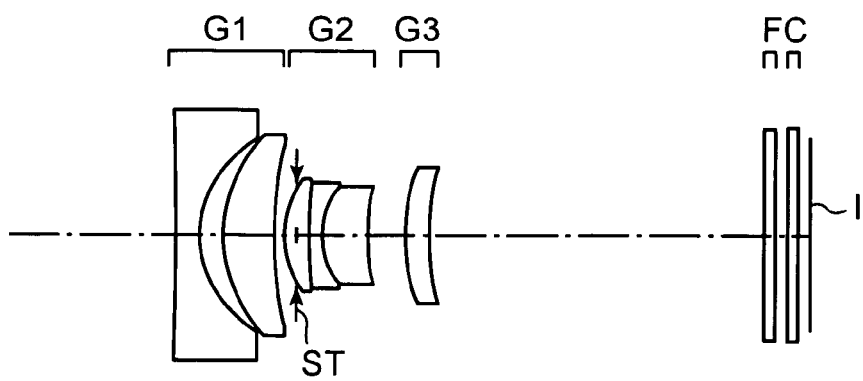

As shown in FIGS. 22A to 22C, the fourteenth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side. The first lens unit is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while slightly reducing the space between the third lens unit and the second lens unit G2.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side.

Aspherical surfaces are used on five surfaces including the image-side surface of the double-concave negative lens of the first lens unit G1; the surfaces of the cemented triplet of the second lens unit G2 closest to the object side and the image side; and opposite surfaces of the positive meniscus lens of the third lens unit G3.

Figure 23A:
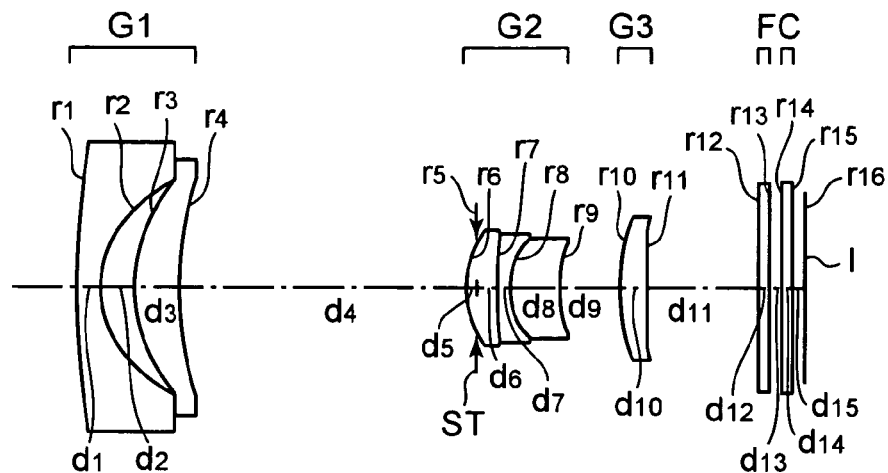
FIGS. 23A to 23C are sectional views of the fifteenth embodiment of the present invention when focused on an infinite object.
Figure 23B:
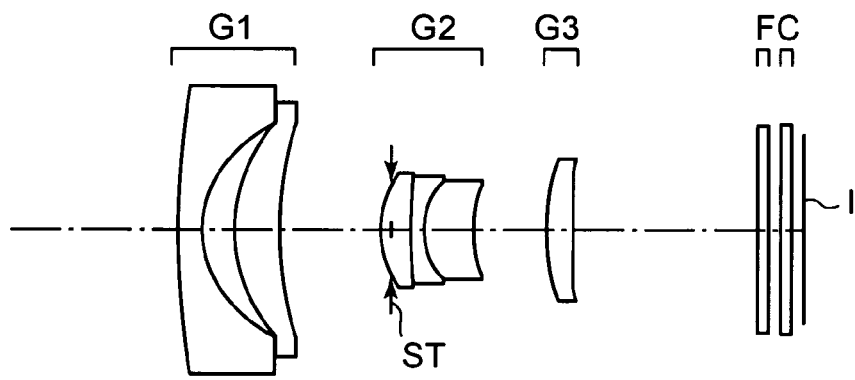
Figure 23C:
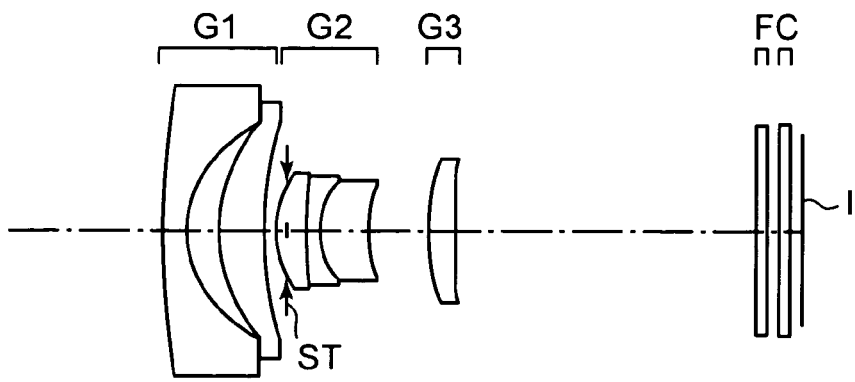
Figure 24A:
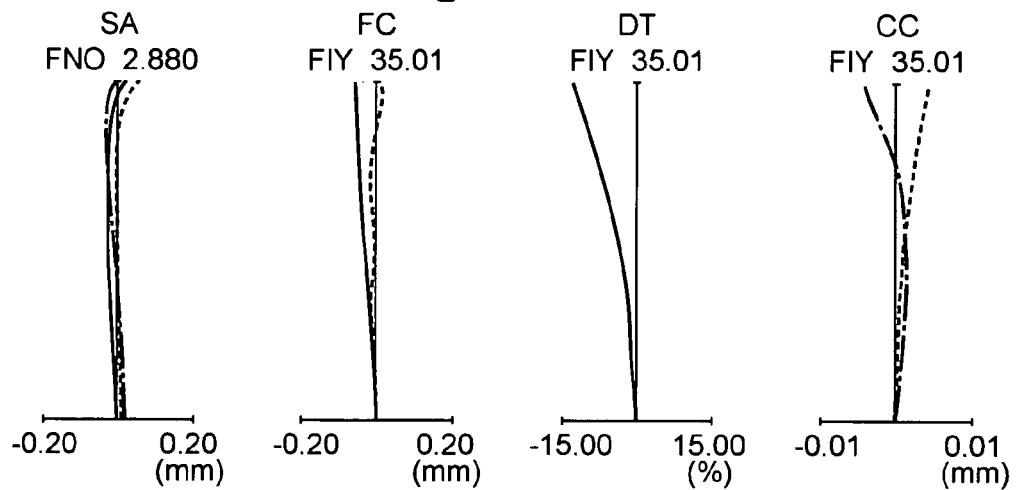
FIG. 24A is an aberration diagram of the ninth embodiment in the wide-angle end when focused on the infinite object.
Figure 24B:
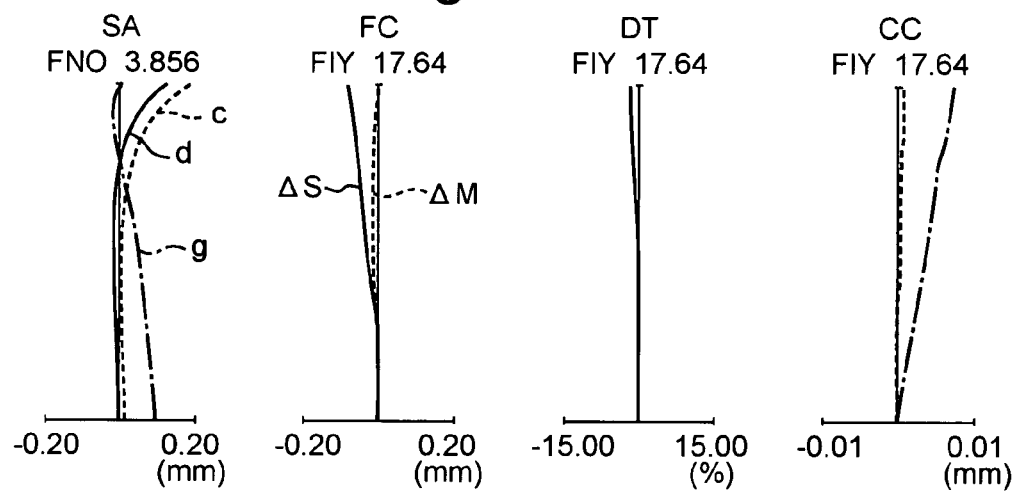
FIG. 24B is an aberration diagram in the intermediate state.
Figure 24C:
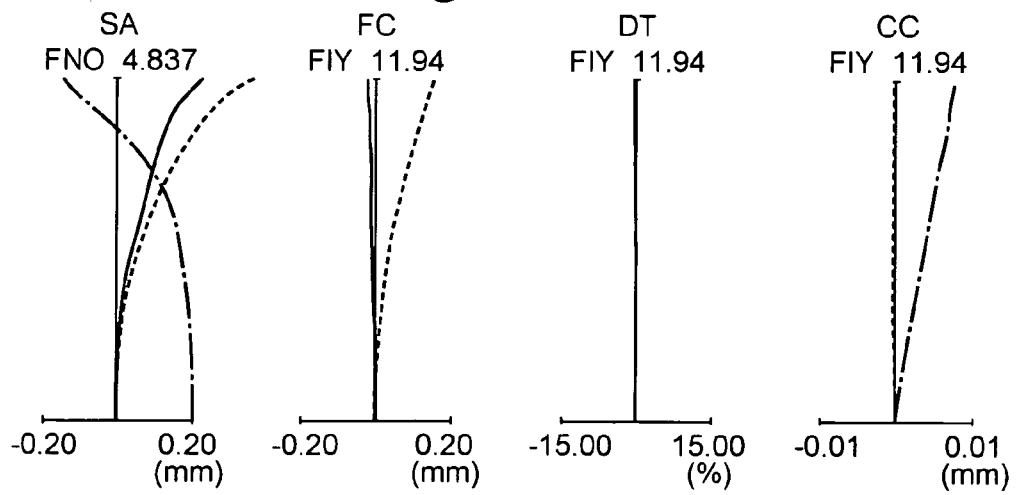
FIG. 24C is an aberration diagram in the telephoto end.
Figure 25A:
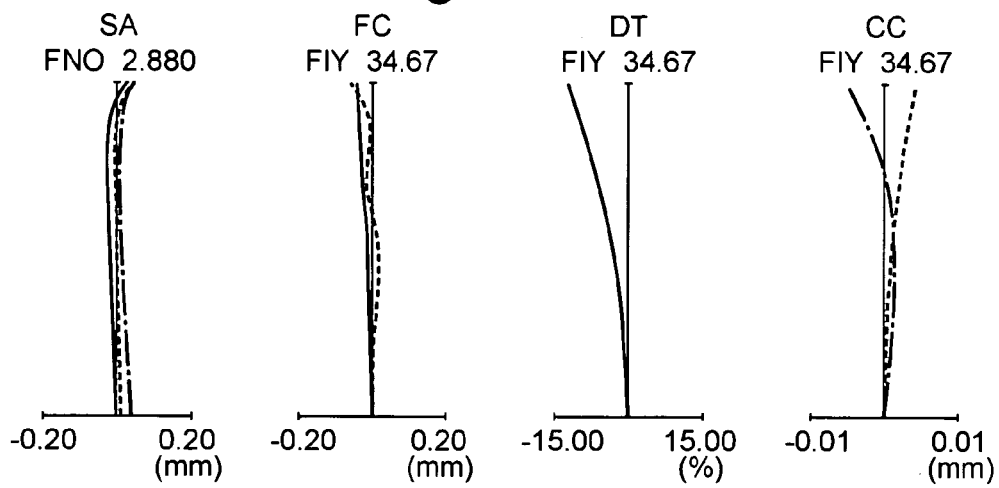
FIG. 25A is an aberration diagram of the tenth embodiment in the wide-angle end when focused on the infinite object.
Figure 25B:
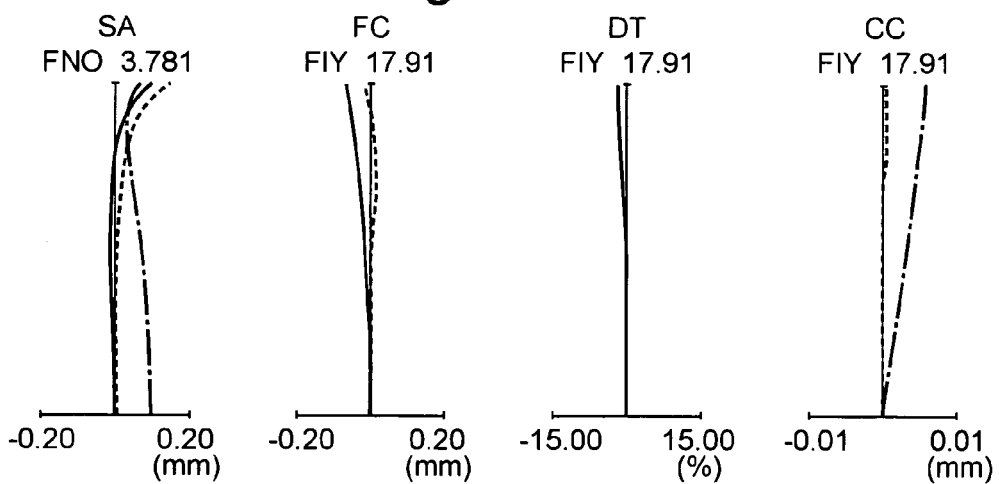
FIG. 25B is an aberration diagram in the intermediate state.
Figure 25C:
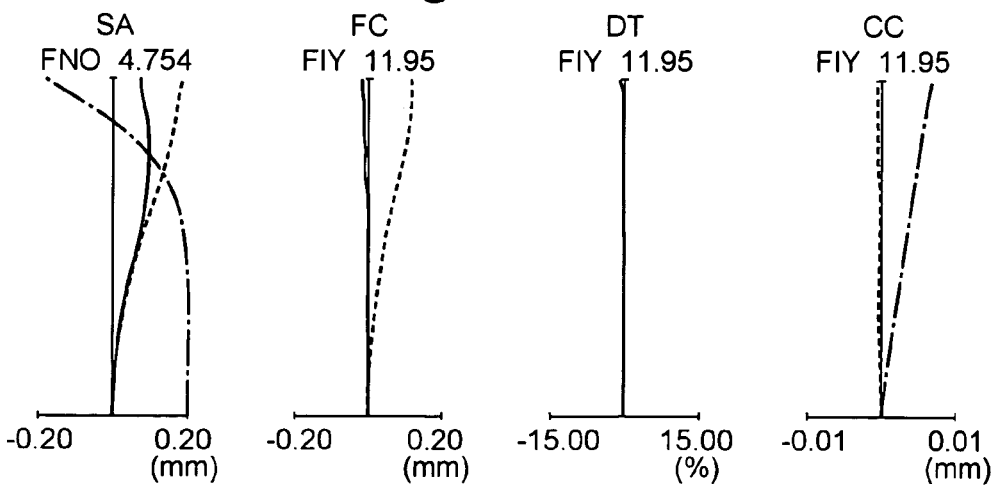
FIG. 25C is an aberration diagram in the telephoto end.
Figure 26A:
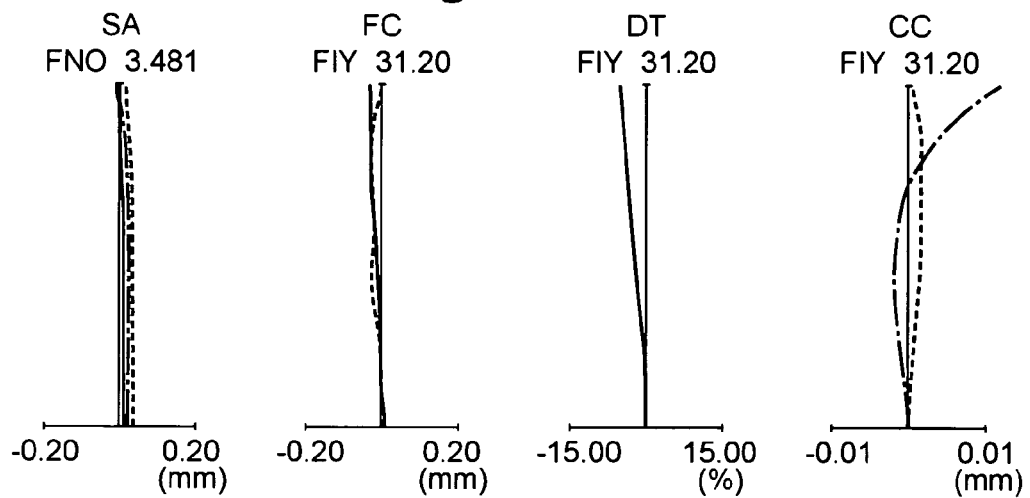
FIG. 26A is an aberration diagram of the eleventh embodiment in the wide-angle end when focused on the infinite object.
Figure 26B:
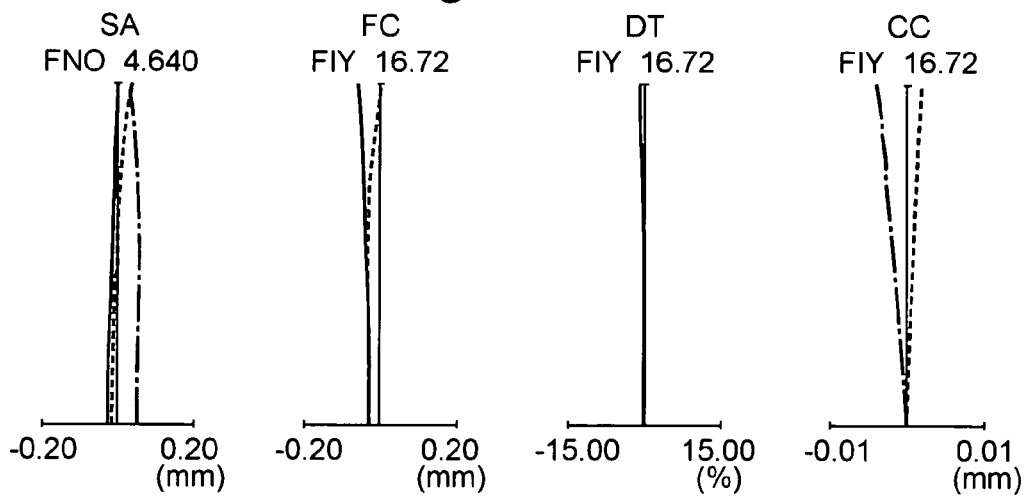
FIG. 26B is an aberration diagram in the intermediate state.
Figure 26C:
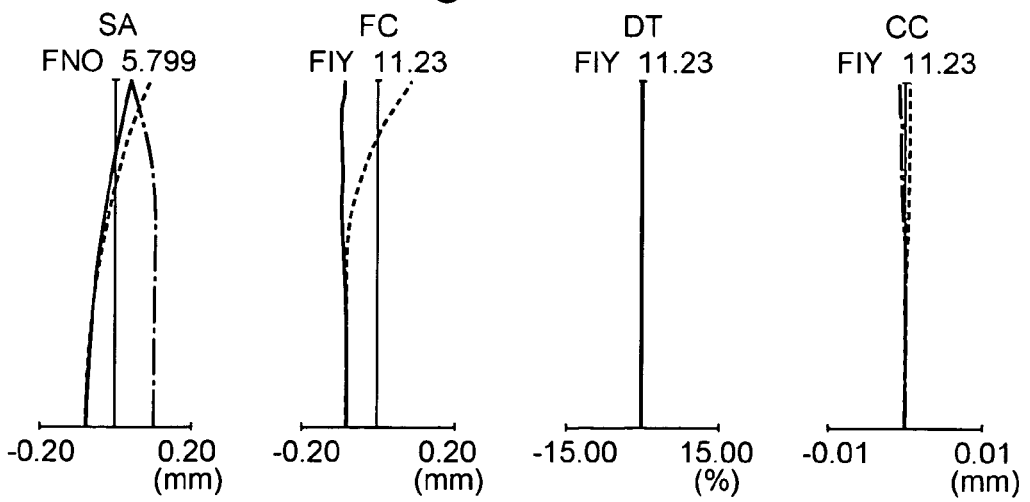
FIG. 26C is an aberration diagram in the telephoto end.
Figure 27A:
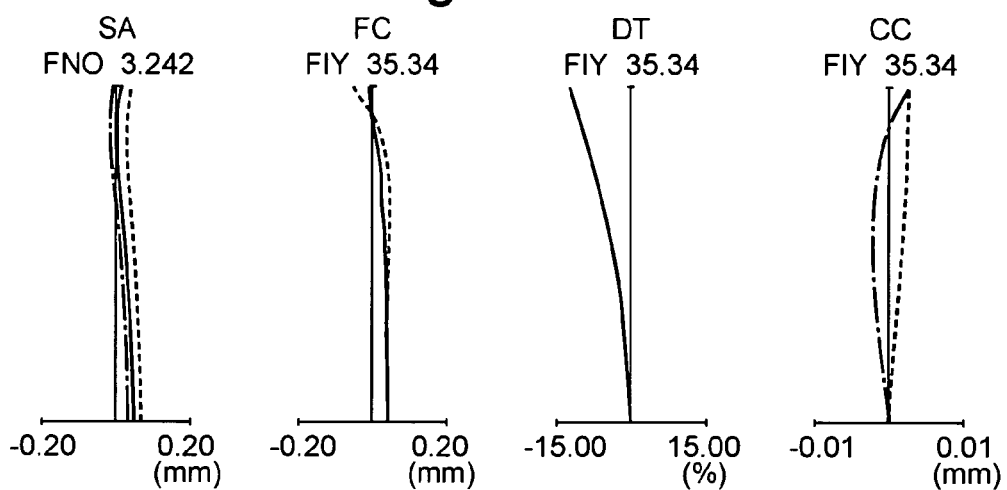
FIG. 27A is an aberration diagram of the twelfth embodiment in the wide-angle end when focused on the infinite object.
Figure 27B:
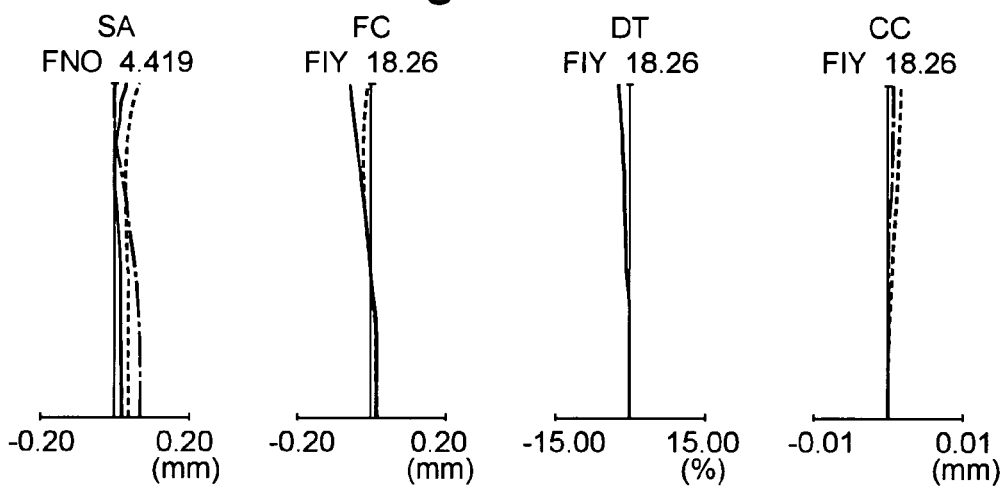
FIG. 27B is an aberration diagram in the intermediate state.
Figure 27C:
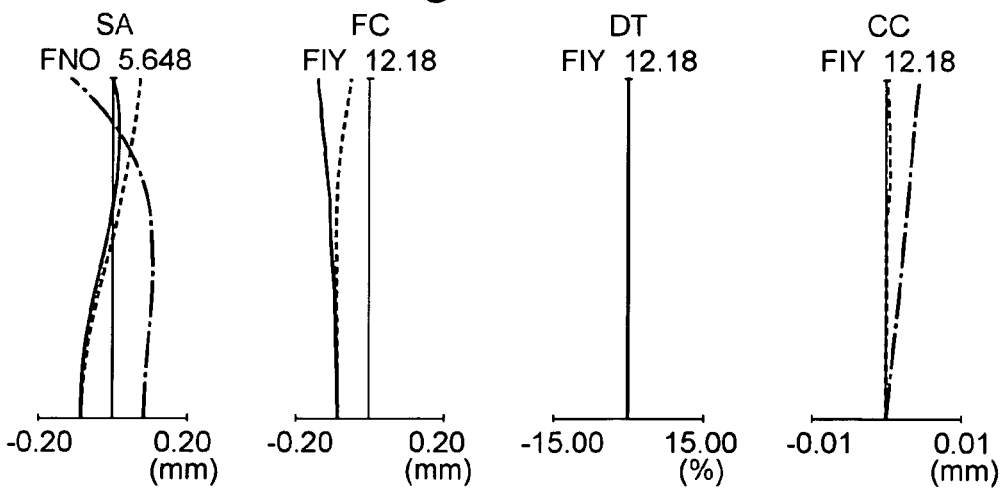
FIG. 27C is an aberration diagram in the telephoto end.
Figure 28A:
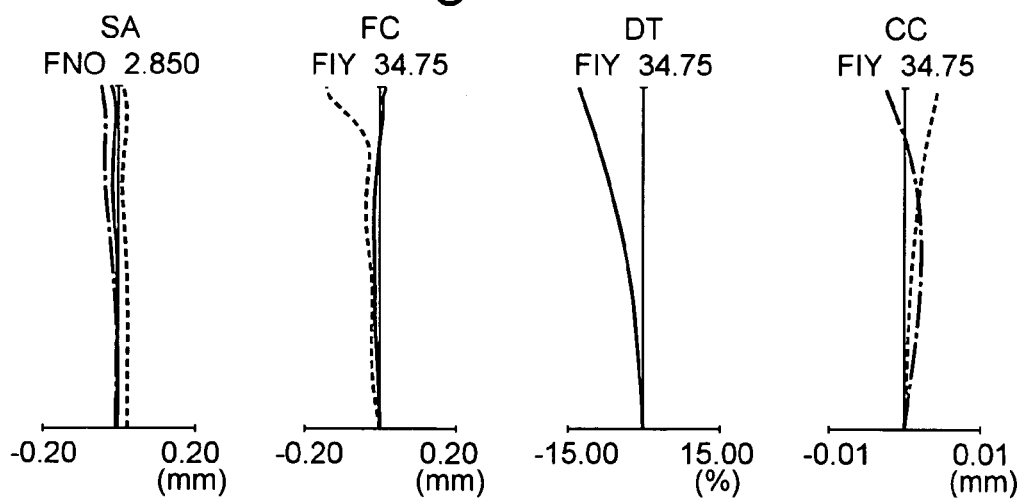
FIG. 28A is an aberration diagram of the thirteenth embodiment in the wide-angle end when focused on the infinite object.
Figure 28B:
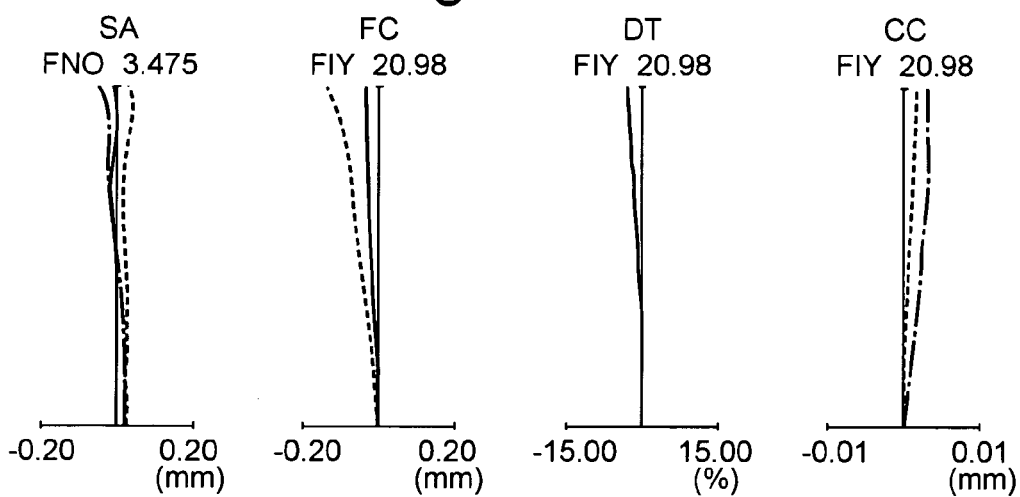
FIG. 28B is an aberration diagram in the intermediate state.
Figure 28C:
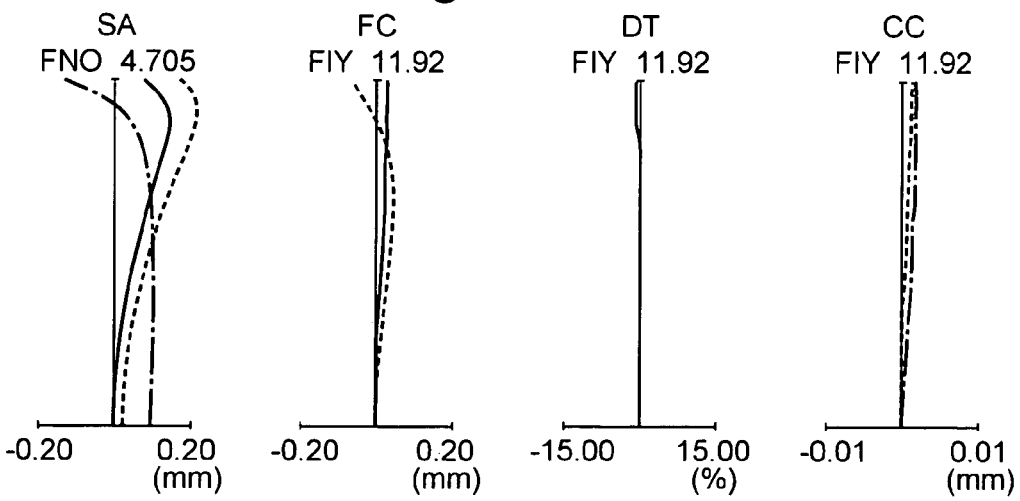
FIG. 28C is an aberration diagram in the telephoto end.
Figure 29A:
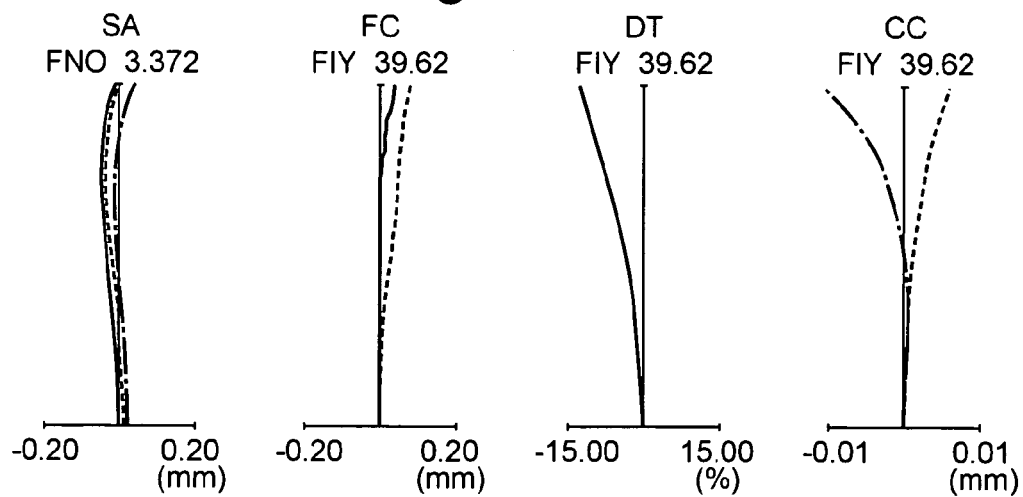
FIG. 29A is an aberration diagram of the fourteenth embodiment in the wide-angle end when focused on the infinite object.
Figure 29B:
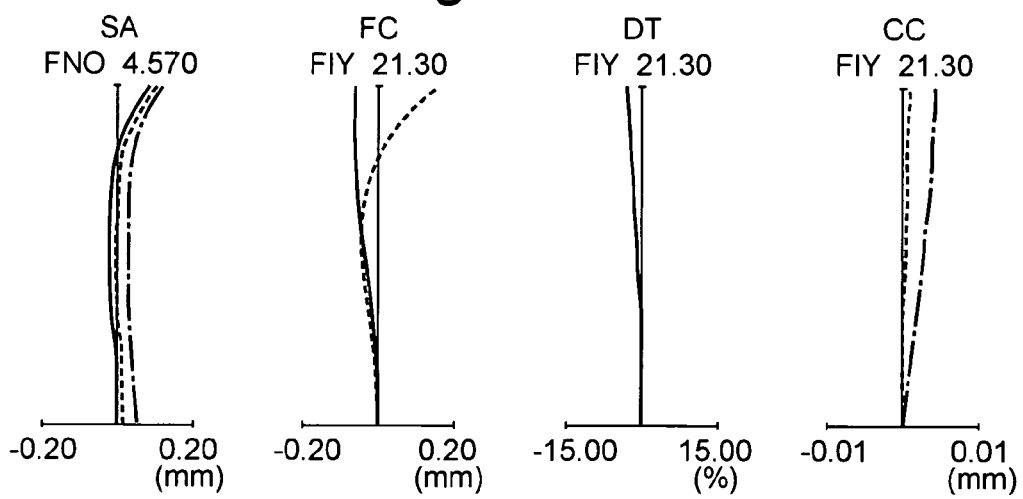
FIG. 29B is an aberration diagram in the intermediate state.
Figure 29C:
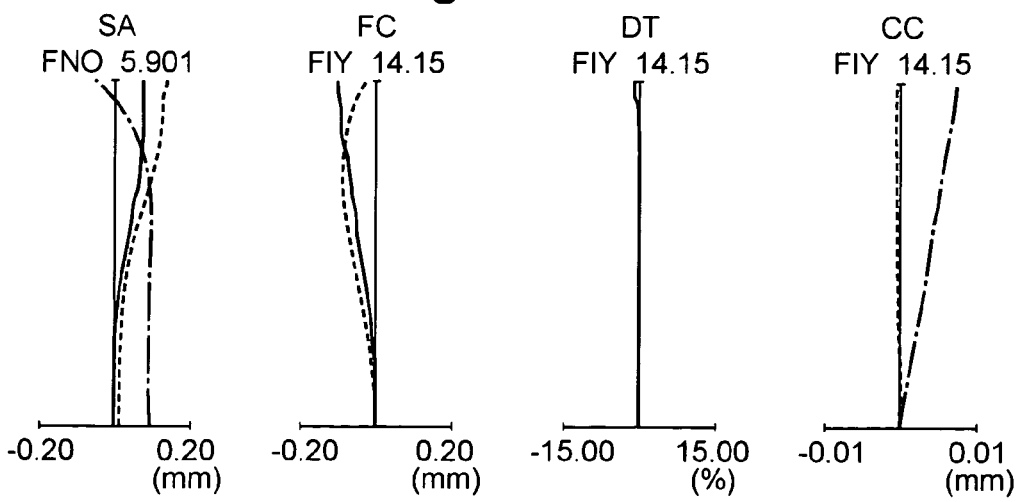
FIG. 29C is an aberration diagram in the telephoto end.
Figure 30A:
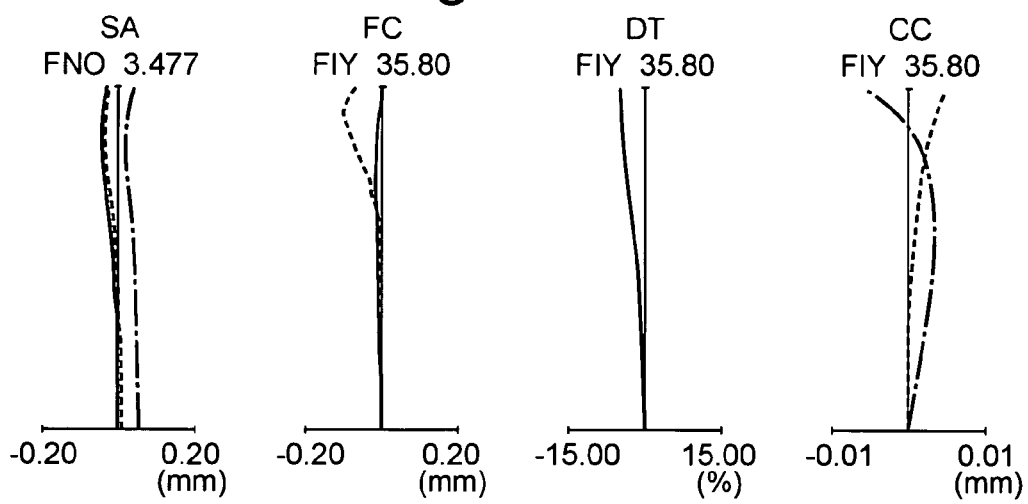
FIG. 30A is an aberration diagram of the fifteenth embodiment in the wide-angle end when focused on the infinite object.
Figure 30B:
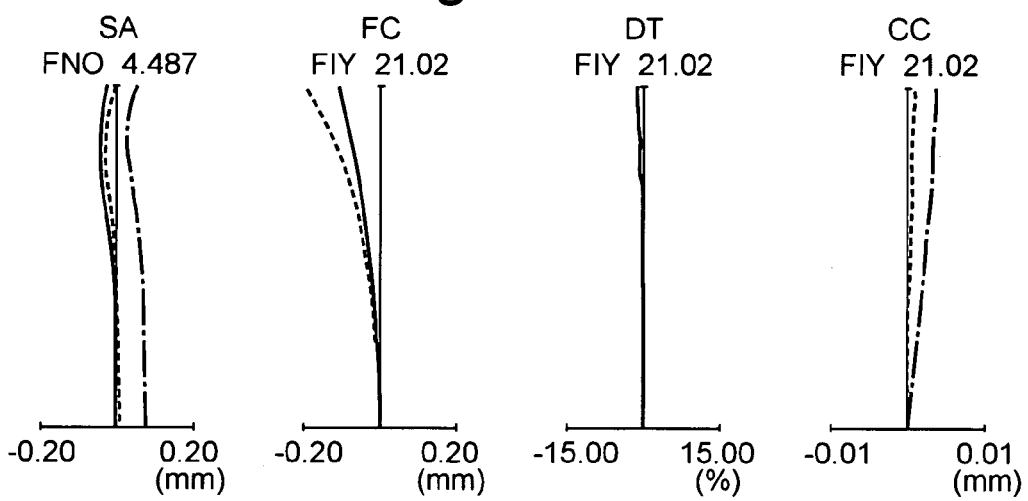
FIG. 30B is an aberration diagram in the intermediate state.
Figure 30C:
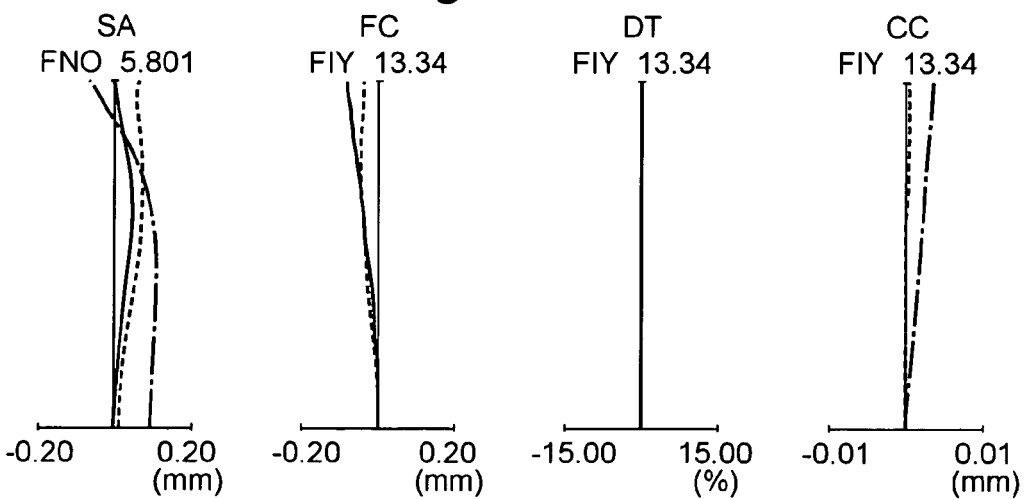
FIG. 30C is an aberration diagram in the telephoto end.
Figure 31:
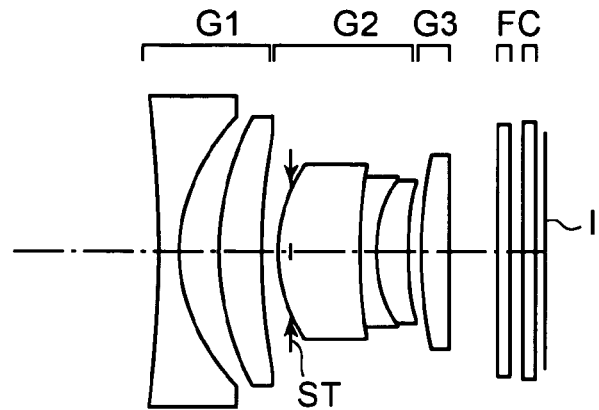
FIG. 31 is a sectional view showing a collapsed state of the ninth embodiment during non-use.
Figure 32:
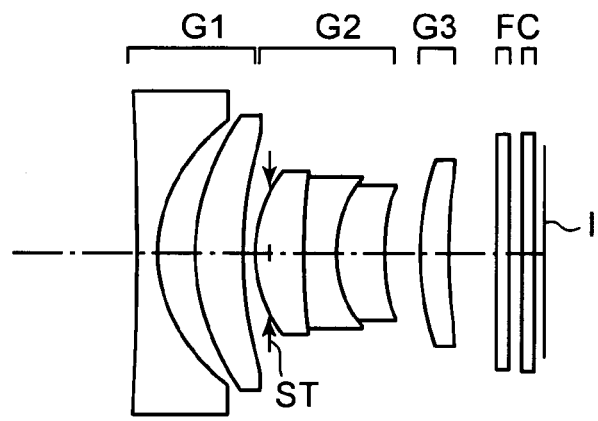
FIG. 32 is a sectional view showing a collapsed state of the tenth embodiment during non-use.
Figure 33:
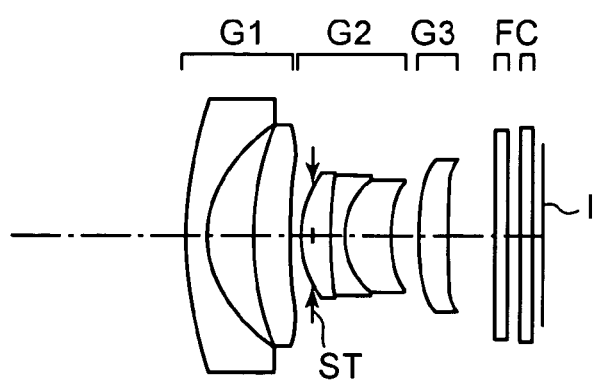
FIG. 33 is a sectional view showing a collapsed state of the eleventh embodiment during non-use.
Figure 34:
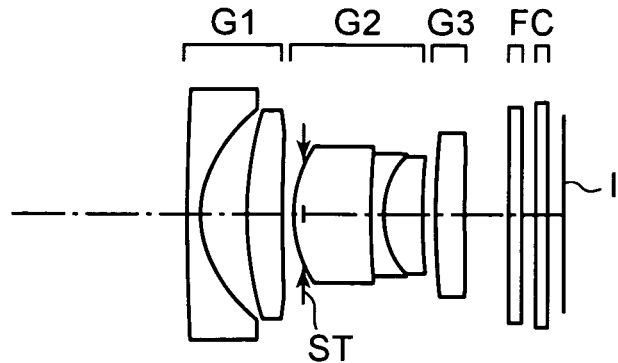
FIG. 34 is a sectional view showing a collapsed state of the twelfth embodiment during non-use.
Figure 35:
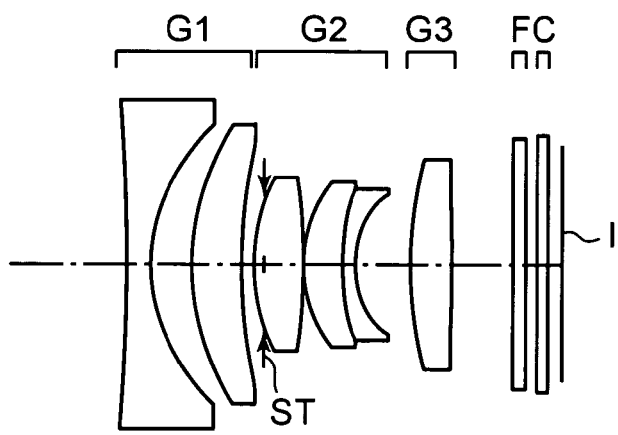
FIG. 35 is a sectional view showing a collapsed state of the thirteenth embodiment during non-use.
Figure 36:
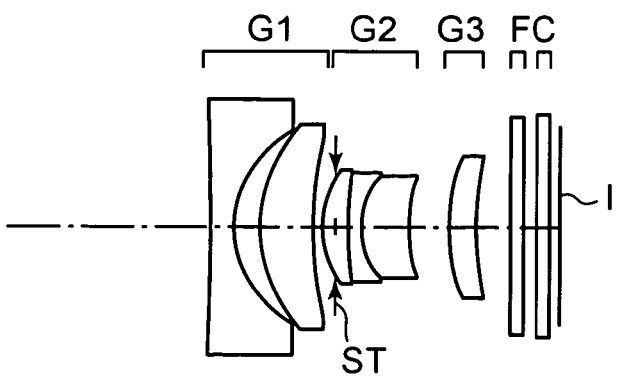
FIG. 36 is a sectional view showing a collapsed state of the fourteenth embodiment during non-use.
Figure 37:
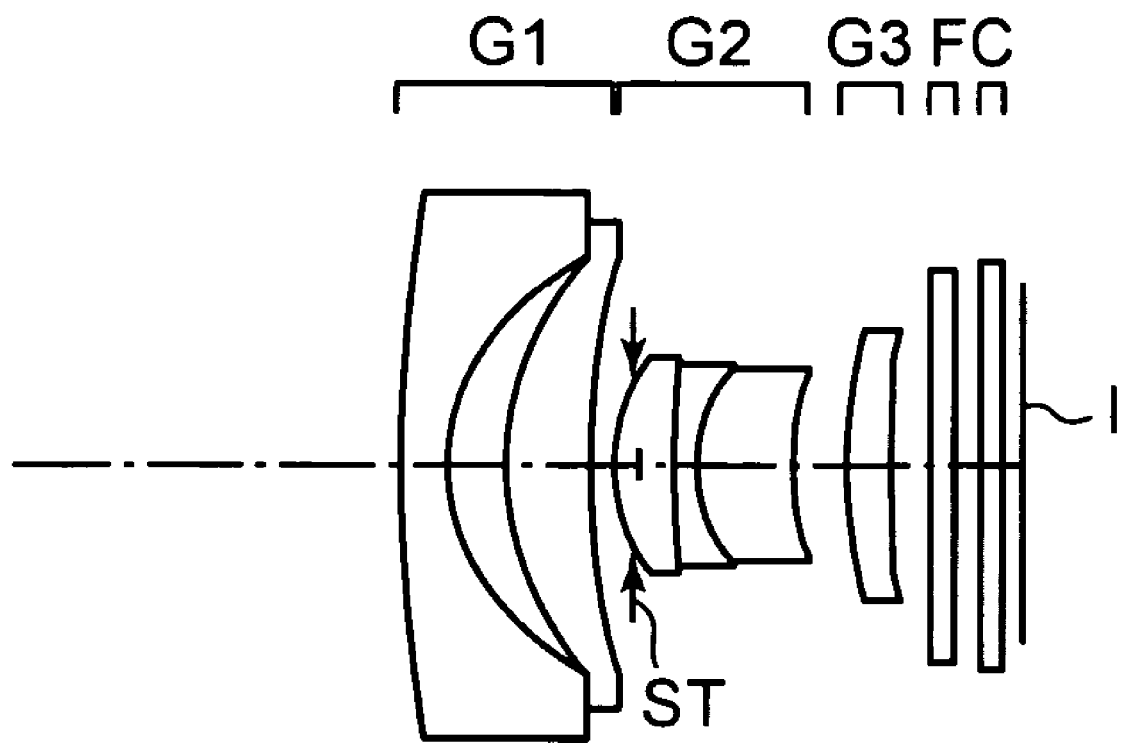
FIG. 37 is a sectional view showing a collapsed state of the fifteenth embodiment during non-use.

As shown in FIGS. 23A to 23C, the fifteenth embodiment comprises, in order from the object side, a first lens unit G1 having a negative refractive power, an aperture stop ST, a second lens unit G2 having a positive refractive power and a third lens unit G3 having a positive refractive power. When zooming is performed from the wide-angle end to the telephoto end, the first lens unit G1 moves along a locus which is convex toward the image side. The first lens unit is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while once slightly enlarging the space between the third lens unit G3 and the second lens unit G2 and then slightly reducing the space.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one double-convex positive lens. The aperture stop ST is positioned on the image side of the vertex of the surface of the cemented triplet of the second lens unit G2 closest to the object side.

Aspherical surfaces are used on six surfaces including the image-side surface of the negative meniscus lens and the object-side surface of the positive meniscus lens in the first lens unit G1; the surfaces of the cemented triplet of the second lens unit G2 closest to the object side and the image side; and opposite surfaces of the double-convex positive lens of the third lens unit G3.

It is to be noted that in any of the above embodiments, focusing is performed by the movement of the third lens unit G3.

There will be described hereinafter numerical data of the above embodiments. In addition to the above-described symbols, f is a focal length of the zoom lens system, $F_{NO}$ is an F-number, $2\omega$ is an angle of field, WE is the wide-angle end, ST is the intermediate state, TE is the telephoto end, $r_1$, $r_2$ ... are paraxial radii of curvature of the lens surfaces, $d_1$, $d_2$ ... are spaces between the lens surfaces, $n_{d1}$, $n_{d2}$ ... are refractive indices of the lenses for the wavelength of d-line, and $V_{d1}$, $V_{d2}$ ... are Abbe numbers of the lenses. After the data of the paraxial radius of curvature, (AS) indicates that the surface is an aspherical surface, (ST) indicates that the surface is an aperture stop and (I) indicates that the surface is an image surface. It is to be noted that the shape of an aspherical surface is represented by the following equation in the coordinate system in which the intersection of the aspherical surface and the optical axis is set as an origin, the optical axis is set as an x-axis whose positive direction is coincide with the light traveling direction, and an arbitrary axis which passes the origin and is perpendicular to the x-axis is set as a y-axis:

$$x=(y^2/r)/[1+\{1-(K+1)(y/r)^2\}^{1/2}]+A_4 \cdot y^4+A_6 \cdot y^6+A_8 \cdot y^8+A_{10} \cdot y^{10}+A_{12} \cdot y^{12},$$

wherein r is a paraxial radius of curvature, K is a conic constant, and $A_4$, $A_6$, $A_8$, $A_{10}$ and $A_{12}$ are 4-th, 6-th, 8-th, 10-th and 12-th order aspherical surface coefficients.

Ninth embodiment

| | | | |
|---|---|---|---|
| $r_1 = -55.947$ | $d_1 = 0.90$ | $n_{d1} = 1.80610$ | $V_{d1} = 40.92$ |
| $r_2 = 6.646$(AS) | $d_2 = 1.62$ | | |
| $r_3 = 11.161$ | $d_3 = 1.82$ | $n_{d2} = 2.00069$ | $V_{d2} = 25.46$ |
| $r_4 = 30.512$ | $d_4$ = variable | | |
| $r_5 = \infty$ (ST) | $d_5 = -0.67$ | | |
| $r_6 = 5.808$(AS) | $d_6 = 3.51$ | $n_{d3} = 1.74320$ | $V_{d3} = 49.34$ |
| $r_7 = 16.319$ | $d_7 = 0.60$ | $n_{d4} = 1.84666$ | $V_{d4} = 23.78$ |
| $r_8 = 5.200$ | $d_8 = 1.36$ | $n_{d5} = 1.58313$ | $V_{d5} = 59.38$ |
| $r_9 = 26.430$(AS) | $d_9$ = variable | | |
| $r_{10} = 24.745$(AS) | $d_{10} = 1.24$ | $n_{d6} = 1.52542$ | $V_{d6} = 55.78$ |
| $r_{11} = 7929.558$ | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.45$ | | |
| $r_{16} = \infty$ (I) | | | |

Aspherical Surface Coefficient

TABLE 18

| | 2nd surface | 6th surface | 9th surface | 10th surface |
|---|---|---|---|---|
| K | −3.702 | −2.011 | 0.000 | 0.000 |
| $A_4$ | $1.29210 \times 10^{-3}$ | $1.29270 \times 10^{-3}$ | $1.94125 \times 10^{-3}$ | $-1.01517 \times 10^{-4}$ |
| $A_6$ | $-2.94031 \times 10^{-5}$ | $-8.81428 \times 10^{-6}$ | $3.03189 \times 10^{-5}$ | $5.70765 \times 10^{-6}$ |
| $A_8$ | $6.63852 \times 10^{-7}$ | $1.57107 \times 10^{-6}$ | $1.16357 \times 10^{-5}$ | 0 |
| $A_{10}$ | $-7.48401 \times 10^{-9}$ | $-3.88466 \times 10^{-8}$ | $1.55401 \times 10^{-7}$ | 0 |

Zoom Data ($\infty$)

TABLE 19

| | WE | ST | TE |
|---|---|---|---|
| f (mm) | 7.51 | 14.60 | 21.63 |
| $F_{NO}$ | 2.88 | 3.86 | 4.84 |
| $2\omega(°)$ | 70.01 | 35.27 | 23.89 |
| $d_4$ | 15.42 | 4.74 | 1.07 |
| $d_9$ | 4.10 | 4.19 | 4.41 |
| $d_{11}$ | 6.29 | 11.60 | 16.79 |

| Tenth embodiment | | | |
|---|---|---|---|
| $r_1 = -200.434$ | $d_1 = 0.90$ | $n_{d1} = 1.80610$ | $V_{d1} = 40.92$ |
| $r_2 = 6.474$(AS) | $d_2 = 1.53$ | | |
| $r_3 = 9.933$ | $d_3 = 2.02$ | $n_{d2} = 2.00069$ | $V_{d2} = 25.46$ |
| $r_4 = 21.902$ | $d_4 = $ variable | | |
| $r_5 = \infty$ (ST) | $d_5 = -0.63$ | | |
| $r_6 = 5.753$(AS) | $d_6 = 2.06$ | $n_{d3} = 1.80610$ | $V_{d3} = 40.92$ |
| $r_7 = 35.230$ | $d_7 = 1.27$ | $n_{d4} = 1.84666$ | $V_{d4} = 23.78$ |
| $r_8 = 5.202$ | $d_8 = 2.06$ | $n_{d5} = 1.58313$ | $V_{d5} = 59.38$ |
| $r_9 = 16.552$(AS) | $d_9 = $ variable | | |
| $r_{10} = 14.000$(AS) | $d_{10} = 1.24$ | $n_{d6} = 1.52542$ | $V_{d6} = 55.78$ |
| $r_{11} = 41.056$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.43$ | | |
| $r_{16} = \infty$ (I) | | | |

Aspherical Surface Coefficient

TABLE 20

| | 2nd surface | 6th surface | 9th surface | 10th surface |
|---|---|---|---|---|
| K | −3.501 | −2.429 | −4.333 | 0.000 |
| $A_4$ | $1.39590 \times 10^{-3}$ | $1.61259 \times 10^{-3}$ | $2.27790 \times 10^{-3}$ | $-1.47199 \times 10^{-4}$ |
| $A_6$ | $-2.94154 \times 10^{-5}$ | $-1.94631 \times 10^{-5}$ | $1.03782 \times 10^{-5}$ | $5.67379 \times 10^{-6}$ |
| $A_8$ | $6.73010 \times 10^{-7}$ | $2.01443 \times 10^{-6}$ | $2.09837 \times 10^{-5}$ | $4.82046 \times 10^{-7}$ |
| $A_{10}$ | $-7.13429 \times 10^{-9}$ | $-5.44542 \times 10^{-8}$ | $-4.69417 \times 10^{-7}$ | $-1.84788 \times 10^{-8}$ |

Zoom Data (∞)

TABLE 21

| | WE | ST | TE |
|---|---|---|---|
| f (mm) | 7.51 | 14.38 | 21.64 |
| $F_{NO}$ | 2.88 | 3.78 | 4.75 |
| $2\omega(°)$ | 69.34 | 35.82 | 23.90 |
| $d_4$ | 16.35 | 5.11 | 1.03 |
| $d_9$ | 4.20 | 4.23 | 4.65 |
| $d_{11}$ | 5.83 | 10.66 | 15.58 |

| Eleventh embodiment | | | |
|---|---|---|---|
| $r_1 = 19.064$ | $d_1 = 0.80$ | $n_{d1} = 1.77250$ | $V_{d1} = 49.60$ |
| $r_2 = 5.104$ | $d_2 = 1.87$ | | |
| $r_3 = 10.613$(AS) | $d_3 = 1.50$ | $n_{d2} = 1.82114$ | $V_{d2} = 24.06$ |
| $r_4 = 17.740$(AS) | $d_4 = $ variable | | |
| $r_5 = \infty$ (ST) | $d_5 = -0.50$ | | |
| $r_6 = 4.218$(AS) | $d_6 = 1.25$ | $n_{d3} = 1.80610$ | $V_{d3} = 40.92$ |
| $r_7 = 16.475$ | $d_7 = 0.50$ | $n_{d4} = 1.72825$ | $V_{d4} = 28.46$ |
| $r_8 = 3.000$ | $d_8 = 1.98$ | $n_{d5} = 1.58313$ | $V_{d5} = 59.38$ |
| $r_9 = 6.705$(AS) | $d_9 = $ variable | | |
| $r_{10} = 15.406$(AS) | $d_{10} = 1.20$ | $n_{d6} = 1.52511$ | $V_{d6} = 56.22$ |
| $r_{11} = 679.942$(AS) | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (I) | | | |

Aspherical Surface Coefficient

TABLE 22-1

| | 3rd surface | 4th surface | 6th surface | 9th surface |
|---|---|---|---|---|
| K | −13.399 | 4.762 | −1.661 | −1.556 |
| $A_4$ | $1.00692 \times 10^{-3}$ | $-9.39622 \times 10^{-4}$ | $2.81854 \times 10^{-3}$ | $5.79158 \times 10^{-3}$ |
| $A_6$ | $-5.17345 \times 10^{-5}$ | $1.08563 \times 10^{-5}$ | $3.99977 \times 10^{-5}$ | $5.27276 \times 10^{-4}$ |
| $A_8$ | $2.70682 \times 10^{-6}$ | $-5.52833 \times 10^{-7}$ | $1.43030 \times 10^{-6}$ | $2.64149 \times 10^{-7}$ |
| $A_{10}$ | $-8.69858 \times 10^{-8}$ | $-3.72262 \times 10^{-8}$ | $1.39779 \times 10^{-7}$ | $1.62265 \times 10^{-5}$ |

TABLE 22-2

| | 10th surface | 11th surface |
|---|---|---|
| K | −14.699 | 0.000 |
| $A_4$ | $1.27364 \times 10^{-3}$ | $6.13478 \times 10^{-4}$ |
| $A_6$ | $1.39733 \times 10^{-4}$ | $1.52095 \times 10^{-4}$ |
| $A_8$ | $2.54309 \times 10^{-5}$ | $7.94767 \times 10^{-6}$ |
| $A_{10}$ | $-7.92228 \times 10^{-7}$ | $1.36613 \times 10^{-6}$ |

Zoom Data (∞)

TABLE 23

| | WE | ST | TE |
|---|---|---|---|
| f (mm) | 6.61 | 12.75 | 19.11 |
| $F_{NO}$ | 3.48 | 4.64 | 5.80 |
| $2\omega(°)$ | 62.40 | 33.44 | 22.45 |
| $d_4$ | 13.97 | 4.45 | 0.90 |
| $d_9$ | 2.98 | 3.71 | 3.63 |
| $d_{11}$ | 5.54 | 9.39 | 13.94 |

| Twelfth embodiment | | | |
|---|---|---|---|
| $r_1 = 69.726$ | $d_1 = 0.50$ | $n_{d1} = 1.69350$ | $V_{d1} = 53.21$ |
| $r_2 = 4.746$ | $d_2 = 1.96$ | | |
| $r_3 = 12.885$(AS) | $d_3 = 1.36$ | $n_{d2} = 1.84666$ | $V_{d2} = 23.78$ |
| $r_4 = 25.844$(AS) | $d_4 = $ variable | | |
| $r_5 = \infty$ (ST) | $d_5 = -0.50$ | | |
| $r_6 = 4.943$(AS) | $d_6 = 3.04$ | $n_{d3} = 1.74320$ | $V_{d3} = 49.34$ |
| $r_7 = 25.950$ | $d_7 = 0.50$ | $n_{d4} = 1.71736$ | $V_{d4} = 29.52$ |
| $r_8 = 3.545$ | $d_8 = 1.57$ | $n_{d5} = 1.51633$ | $V_{d5} = 64.14$ |
| $r_9 = -140.225$(AS) | $d_9 = $ variable | | |
| $r_{10} = 36.103$ | $d_{10} = 1.08$ | $n_{d6} = 1.58393$ | $V_{d6} = 30.21$ |
| $r_{11} = 157.196$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.60$ | | |
| $r_{16} = \infty$ (I) | | | |

Aspherical Surface Coefficient

TABLE 24

| | 3rd surface | 4th surface | 6th surface | 9th surface |
|---|---|---|---|---|
| K | 2.135 | −1.605 | −1.070 | 0.000 |
| $A_4$ | $-3.15464 \times 10^{-4}$ | $-6.13441 \times 10^{-4}$ | $9.28135 \times 10^{-4}$ | $2.77025 \times 10^{-3}$ |
| $A_6$ | $-1.04123 \times 10^{-5}$ | $-1.89803 \times 10^{-5}$ | $1.60749 \times 10^{-5}$ | $8.45677 \times 10^{-5}$ |
| $A_8$ | $-2.90693 \times 10^{-7}$ | $-5.74661 \times 10^{-7}$ | $9.55801 \times 10^{-7}$ | $2.81700 \times 10^{-5}$ |
| $A_{10}$ | 0 | 0 | 0 | 0 |

Zoom Data ($\infty$)

TABLE 25

|  | WE | ST | TE |
|---|---|---|---|
| f (mm) | 6.11 | 11.77 | 17.64 |
| $F_{NO}$ | 3.24 | 4.42 | 5.65 |
| $2\omega(°)$ | 70.69 | 36.52 | 24.36 |
| $d_4$ | 10.68 | 3.49 | 0.90 |
| $d_9$ | 3.68 | 3.69 | 3.68 |
| $d_{11}$ | 4.04 | 8.76 | 13.77 |

Thirteenth embodiment

| $r_1 = -160.146$ | $d_1 = 0.90$ | $n_{d1} = 1.80610$ | $V_{d1} = 40.92$ |
|---|---|---|---|
| $r_2 = 7.098$(AS) | $d_2 = 1.65$ | | |
| $r_3 = 10.592$ | $d_3 = 2.00$ | $n_{d2} = 1.84666$ | $V_{d2} = 23.78$ |
| $r_4 = 26.737$ | $d_4 = $ variable | | |
| $r_5 = \infty$ (ST) | $d_5 = -0.50$ | | |
| $r_6 = 6.763$(AS) | $d_6 = 2.00$ | $n_{d3} = 1.58913$ | $V_{d3} = 61.25$ |
| $r_7 = -36.924$(AS) | $d_7 = 0.10$ | | |
| $r_8 = 5.800$ | $d_8 = 1.50$ | $n_{d4} = 1.74320$ | $V_{d4} = 49.34$ |
| $r_9 = 8.590$ | $d_9 = 0.55$ | $n_{d5} = 1.84666$ | $V_{d5} = 23.78$ |
| $r_{10} = 3.731$ | $d_{10} = $ variable | | |
| $r_{11} = 18.510$(AS) | $d_{11} = 1.70$ | $n_{d6} = 1.52542$ | $V_{d6} = 55.78$ |
| $r_{12} = -100.022$ | $d_{12} = $ variable | | |
| $r_{13} = \infty$ | $d_{13} = 0.50$ | $n_{d7} = 1.54771$ | $V_{d7} = 62.84$ |
| $r_{14} = \infty$ | $d_{14} = 0.50$ | | |
| $r_{15} = \infty$ | $d_{15} = 0.50$ | $n_{d8} = 1.51633$ | $V_{d8} = 64.14$ |
| $r_{16} = \infty$ | $d_{16} = 0.47$ | | |
| $r_{17} = \infty$ (I) | | | |

Aspherical Surface Coefficient

TABLE 26

|  | 2nd surface | 6th surface | 7th surface | 11th surface |
|---|---|---|---|---|
| K | 0.451 | −0.342 | −16.702 | −12.387 |
| $A_4$ | $-3.50597 \times 10^{-4}$ | $-3.00803 \times 10^{-4}$ | $-1.08960 \times 10^{-4}$ | $2.18644 \times 10^{-4}$ |
| $A_6$ | $1.68189 \times 10^{-6}$ | $1.21000 \times 10^{-5}$ | $1.42203 \times 10^{-5}$ | $5.62619 \times 10^{-6}$ |
| $A_8$ | $-9.27265 \times 10^{-7}$ | $-1.61039 \times 10^{-6}$ | $-1.79719 \times 10^{-6}$ | 0 |
| $A_{10}$ | $3.65434 \times 10^{-8}$ | 0 | 0 | 0 |
| $A_{12}$ | $-8.50610 \times 10^{-10}$ | 0 | 0 | 0 |

Zoom Data ($\infty$)

TABLE 27

|  | WE | ST | TE |
|---|---|---|---|
| f (mm) | 7.51 | 12.27 | 21.75 |
| $F_{NO}$ | 2.85 | 3.47 | 4.70 |
| $2\omega(°)$ | 69.50 | 41.96 | 23.85 |
| $d_4$ | 16.82 | 7.45 | 0.90 |
| $d_9$ | 4.71 | 5.24 | 6.22 |
| $d_{11}$ | 5.48 | 8.53 | 14.96 |

Fourteenth embodiment

| $r_1 = -2679.606$ | $d_1 = 1.00$ | $n_{d1} = 1.80610$ | $V_{d1} = 40.92$ |
|---|---|---|---|
| $r_2 = 3.719$(AS) | $d_2 = 1.02$ | | |
| $r_3 = 5.756$ | $d_3 = 2.10$ | $n_{d2} = 1.84666$ | $V_{d2} = 23.78$ |

-continued

Fourteenth embodiment

| $r_4 = 13.814$ | $d_4 = $ variable | | |
|---|---|---|---|
| $r_5 = \infty$ (ST) | $d_5 = -0.50$ | | |
| $r_6 = 3.765$(AS) | $d_6 = 1.00$ | $n_{d3} = 1.80610$ | $V_{d3} = 40.92$ |
| $r_7 = 15.152$ | $d_7 = 0.50$ | $n_{d4} = 1.76182$ | $V_{d4} = 26.52$ |
| $r_8 = 3.002$ | $d_8 = 1.88$ | $n_{d5} = 1.51633$ | $V_{d5} = 64.14$ |
| $r_9 = 12.981$(AS) | $d_9 = $ variable | | |
| $r_{10} = 6.725$(AS) | $d_{10} = 1.00$ | $n_{d6} = 1.52511$ | $V_{d6} = 56.23$ |
| $r_{11} = 13.188$(AS) | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.39$ | | |
| $r_{16} = \infty$ (I) | | | |

Aspherical Surface Coefficient

TABLE 28-1

|  | 2nd surface | 6th surface | 9th surface | 10th surface |
|---|---|---|---|---|
| K | −0.809 | −0.759 | 0.000 | 0.000 |
| $A_4$ | $8.14420 \times 10^{-4}$ | $1.33919 \times 10^{-3}$ | $2.77245 \times 10^{-3}$ | $-2.56927 \times 10^{-3}$ |
| $A_6$ | $2.31684 \times 10^{-6}$ | $7.55420 \times 10^{-5}$ | $6.32079 \times 10^{-4}$ | $-1.07060 \times 10^{-4}$ |
| $A_8$ | $-2.63770 \times 10^{-8}$ | $1.15979 \times 10^{-6}$ | $-5.51581 \times 10^{-5}$ | $2.26819 \times 10^{-5}$ |
| $A_{10}$ | 0 | $3.88227 \times 10^{-7}$ | $2.88512 \times 10^{-5}$ | $9.93781 \times 10^{-7}$ |

TABLE 28-2

|  | 11th surface |
|---|---|
| K | 0.000 |
| $A_4$ | $-3.97145 \times 10^{-4}$ |
| $A_6$ | $-1.29520 \times 10^{-5}$ |
| $A_8$ | $-1.87201 \times 10^{-6}$ |
| $A_{10}$ | $2.25706 \times 10^{-6}$ |

Zoom Data ($\infty$)

TABLE 29

|  | WE | ST | TE |
|---|---|---|---|
| f (mm) | 5.23 | 10.00 | 15.17 |
| $F_{NO}$ | 3.37 | 4.57 | 5.90 |
| $2\omega(°)$ | 79.23 | 42.60 | 28.30 |
| $d_4$ | 8.86 | 3.04 | 0.90 |
| $d_9$ | 2.16 | 1.72 | 1.50 |
| $d_{11}$ | 4.91 | 9.10 | 13.42 |

Fifteenth embodiment

| $r_1 = 31.493$ | $d_1 = 1.00$ | $n_{d1} = 1.80610$ | $V_{d1} = 40.92$ |
|---|---|---|---|
| $r_2 = 4.015$(AS) | $d_2 = 1.36$ | | |
| $r_3 = 6.467$(AS) | $d_3 = 1.80$ | $n_{d2} = 1.84666$ | $V_{d2} = 23.78$ |
| $r_4 = 13.950$ | $d_4 = $ variable | | |
| $r_5 = \infty$ (ST) | $d_5 = -0.45$ | | |
| $r_6 = 3.743$(AS) | $d_6 = 1.30$ | $n_{d3} = 1.74320$ | $V_{d3} = 49.34$ |
| $r_7 = 20.976$ | $d_7 = 0.50$ | $n_{d4} = 1.71736$ | $V_{d4} = 29.52$ |
| $r_8 = 3.002$ | $d_8 = 2.03$ | $n_{d5} = 1.51633$ | $V_{d5} = 64.14$ |
| $r_9 = 9.297$(AS) | $d_9 = $ variable | | |
| $r_{10} = 19.045$(AS) | $d_{10} = 1.00$ | $n_{d6} = 1.52511$ | $V_{d6} = 56.23$ |
| $r_{11} = -241.584$(AS) | $d_{11} = $ variable | | |

-continued

Fifteenth embodiment

| | | | |
|---|---|---|---|
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $Vd_{d8} = 64.14$ |
| $r_{15} = \infty$ | $d_{15} = 0.40$ | | |
| $r_{16} = \infty$ (I) | | | |

Aspherical Surface Coefficient

TABLE 30-1

| | 2nd surface | 3rd surface | 6th surface | 9th surface |
|---|---|---|---|---|
| K | −0.788 | 0.000 | −1.016 | 0.000 |
| $A_4$ | $5.88309 \times 10^{-4}$ | $2.80805 \times 10^{-10}$ | $2.19556 \times 10^{-3}$ | $6.49949 \times 10^{-3}$ |
| $A_6$ | $1.25094 \times 10^{-5}$ | $7.99547 \times 10^{-7}$ | $9.52058 \times 10^{-5}$ | $6.51196 \times 10^{-4}$ |
| $A_8$ | $-6.84764 \times 10^{-8}$ | $-3.58622 \times 10^{-12}$ | $2.20537 \times 10^{-6}$ | $8.19880 \times 10^{-5}$ |
| $A_{10}$ | $1.92475 \times 10^{-9}$ | 0 | $-7.19757 \times 10^{-8}$ | $1.62716 \times 10^{-5}$ |

TABLE 30-2

| | 10th surface | 11th surface |
|---|---|---|
| K | 0.000 | 0.000 |
| $A_4$ | $-8.16440 \times 10^{-11}$ | $7.72945 \times 10^{-7}$ |
| $A_6$ | $4.00208 \times 10^{-5}$ | $5.03191 \times 10^{-5}$ |
| $A_8$ | $1.51332 \times 10^{-5}$ | $-1.14557 \times 10^{-5}$ |
| $A_{10}$ | $2.94028 \times 10^{-6}$ | $4.64487 \times 10^{-6}$ |

Zoom Data (∞)

TABLE 31

| | WE | ST | TE |
|---|---|---|---|
| f (mm) | 5.53 | 10.00 | 16.04 |
| $F_{NO}$ | 3.48 | 4.49 | 5.80 |
| 2ω(°) | 71.60 | 42.04 | 26.68 |
| $d_4$ | 12.20 | 4.63 | 0.95 |
| $d_9$ | 2.50 | 3.01 | 2.50 |
| $d_{11}$ | 4.49 | 7.40 | 12.12 |

FIGS. 24A to 30C show aberration diagrams of the above ninth to fifteenth embodiments when focused on the infinite object. In these aberration diagrams, FIGS. 24A, 25A, 26A ... show aberrations in the wide-angle end, FIGS. 24B, 25B, 26B ... show aberrations in the intermediate state, and FIGS. 24C, 25C, 26C ... show aberrations in the telephoto end. In the drawings, SA is spherical aberration, FC is astigmatism, DT is distortion and CC is chromatic aberration of magnification. In the drawings, "FIY" is the maximum image height (mm).

Next, there will be described basic parameter values of conditions (1B) to (10B) and (AB) in the above embodiments, and values of the respective conditions. It is to be noted that the condition (4B) is not shown in the following table, but it is seen from lines of conditions (2B) and (3B) and the value of $*D_2$ (intermediate)/$f_3$ between them that each embodiment satisfies the condition (4B).

TABLE 32

| Embodiment | 9 | 10 | 11 | 12 | 13 | 14 | 15 |
|---|---|---|---|---|---|---|---|
| $f_w$ | 7.51 | 7.51 | 6.61 | 6.11 | 7.51 | 5.23 | 5.53 |
| $f_t$ | 21.63 | 21.64 | 19.11 | 17.64 | 21.75 | 15.17 | 16.04 |
| □$d_{1G}$ | 4.34 | 4.45 | 4.17 | 3.81 | 4.55 | 4.12 | 4.16 |
| RDY(R)$_{L2}$ | 30.51 | 21.90 | 17.74 | 25.84 | 26.74 | 13.81 | 13.95 |
| $D_1(w)$ | 14.76 | 15.72 | 13.47 | 10.18 | 16.32 | 8.36 | 11.75 |
| $D_2(w)$ | 4.10 | 4.20 | 2.98 | 3.68 | 4.71 | 2.16 | 2.50 |
| $D_2$ (intermediate) | 4.19 | 4.23 | 3.71 | 3.69 | 5.24 | 1.72 | 3.01 |
| $D_2(t)$ | 4.41 | 4.65 | 3.63 | 3.68 | 6.22 | 1.50 | 2.50 |
| $f_3$ | 47.24 | 39.80 | 30.00 | 80.00 | 29.88 | 24.81 | 33.66 |
| $D_{3G}$ | 1.24 | 1.24 | 1.20 | 1.08 | 1.70 | 1.00 | 1.00 |
| (1B) □$d_1G/f_w$ | 0.58 | 0.59 | 0.63 | 0.62 | 0.61 | 0.79 | 0.75 |
| (2B) $D_2(w)/f_3$ | 0.087 | 0.106 | 0.099 | 0.046 | 0.158 | 0.087 | 0.074 |
| $*D_2$(intermediate)/$f_3$ | 0.089 | 0.106 | 0.124 | 0.046 | 0.175 | 0.069 | 0.089 |
| (3B) $D_2(t)/f_3$ | 0.093 | 0.117 | 0.121 | 0.046 | 0.208 | 0.060 | 0.074 |
| (5B) $(D_2(t) - D_2(w))/f_w$ | 0.0411 | 0.0601 | 0.0985 | −0.0013 | 0.2009 | −0.1253 | 0.0000 |
| (6B) $f_w$/RDY(R)$_{L2}$ | 0.25 | 0.34 | 0.37 | 0.24 | 0.28 | 0.38 | 0.40 |
| (7B) $D_1(w)/f_w$ | 1.96 | 2.09 | 2.04 | 1.67 | 2.17 | 1.60 | 2.13 |
| (8B) $D_2(t)/D_2(w)$ | 1.08 | 1.11 | 1.22 | 1.00 | 1.32 | 0.70 | 1.00 |
| (9B) $f_3/f_w$ | 6.29 | 5.30 | 4.54 | 13.10 | 3.98 | 4.74 | 6.09 |
| (10B) $D_{3G}/f_t$ | 0.0571 | 0.0573 | 0.0628 | 0.0610 | 0.0782 | 0.0659 | 0.0624 |
| (AB) $f_t/f_w$ | 2.88 | 2.88 | 2.89 | 2.89 | 2.90 | 2.90 | 2.90 |

FIGS. 31 to 36 show sectional views showing collapsed states of the ninth to fifteenth embodiments during non-use, respectively. In any of the embodiments, the space between the first lens unit G1 and the second lens unit G2, the space between the second lens unit G2 and the third lens unit G3 and the space between the third lens unit G3 and the plane parallel plate F before the image surface I are shortened as much as possible. Each space is set to be smaller than that in the wide-angle end. In consequence, the total length of the zoom lens system in the collapsed state is shortened.

The zoom lens system described in each embodiment is capable of securing an appropriate zoom ratio without bending the optical axis or moving a part of the lens units externally from the optical axis and is advantageous to miniaturization and the securing of the optical performance.

Next, the third aspect of the present invention will be described.

As described above, the zoom lens system according to the present invention comprises, in order from the object side, a first lens unit having a negative refractive power, a second lens unit having a positive refractive power and a third lens unit having a positive refractive power.

During the zooming from a wide-angle end to a telephoto end, a space between the first lens unit and the second lens unit narrows In the third aspect, during the zooming from the wide-angle end to the telephoto end, at least the second and third lens units move only toward the object side.

The first lens unit comprises, in order from the object side, a negative lens element and a positive lens element, and the total number of the lens elements in the first lens unit is two.

The third lens unit comprises a positive lens element, and the total number of the lens elements of the third lens unit is one.

By using a negative-positive-positive type refractive power layout, the zoom lens system may be formed into the simplest constitution required for balancing the performance and the thinning of the lens barrel in the collapsed state. Moreover, when the third lens unit moves toward the object side during zooming from the wide-angle end to the telephoto end, the ray height in the third lens unit is reduced as compared with the case where the third lens unit is fixed or moves to the image side during zooming. Therefore, the diameter of the third lens unit can be reduced. Furthermore, since the focusing sensitivity of the third lens unit in the telephoto end increases, the power of the focusing unit can be weakened, and the thickness of the third lens unit can be reduced. This constitution is advantageous to the thinning of the zoom lens system in the collapsed state.

The first lens unit is constituted of two lens elements and is formed into the simplest constitution in which the thinning of the zoom lens system in the collapsed state, and the optical performance are balanced.

The third lens unit is constituted of one lens element, and is formed into the simplest constitution for the thinning of the system in the collapsed state.

In the case where this third lens unit is used as a focusing lens unit, the driving system for focusing can be simplified since the third lens unit is light in weight. This constitution is advantageous to miniaturization of the lens barrel.

In one preferable example according to the third aspect, the lens surfaces brought into contact with air on the optical axis of the zoom lens system, excluding the lens surface closest to the object side, are all lens surfaces each having the center of paraxial curvature on the image side of the vertex of the lens surface.

According to such a shape, the thickness of each lens unit is reduced, interference between the lens units is inhibited, and the space between the lens unit is easily secured. The principal point of the second lens unit is easily positioned closer to the object side. The constitution is advantageous in securing the zoom ratio with respect to the amount of change in the space for zooming. The air space between the lens units can be reduced when the zoom lens system is collapsed, and the constitution is further advantageous to the thinning of the zoom lens system in the collapsed state.

Moreover, in the above zoom lens system, the third lens unit is positioned closer to the object side when the zoom lens system is brought closer to the telephoto end. When such a form of movement of the third lens unit is used, the influence of the third lens unit on off-axial aberration in the telephoto end is reduced. The refractive power of the third lens unit is easily reduced. Therefore, in a case where the third lens unit is constituted of a positive meniscus lens whose concave surface faces the image side, the angle of refraction of the axial light flux can be reduced and the generation of spherical aberration in the telephoto end can be easily reduced. The constitution is also advantageous to the thinning in the collapsed state.

Furthermore, when the lens surface of the zoom lens system closest to the object side has the center of paraxial curvature on the image side of the vertex thereof, the off-axial chief ray is gently refracted by the lens surface in the wide-angle end. The constitution is advantageous to the correction of distortion.

On the other hand, when the lens surface of the zoom lens system closest to the object side has the center of paraxial curvature on the object side of the vertex thereof, the principal point of the lens system can be positioned closer to the object side. This constitution is further advantageous to the decrease of the total length. In addition, since the curvature of the image-side surface of the negative lens element may be reduced, the constitution is advantageous to the correction of spherical aberration and coma in the telephoto end.

In another preferable example according to the third aspect, the lens surface of the first lens unit closest to the image side is a concave surface which faces the image side, the lens surface of the second lens unit closest to the object side is a convex surface which faces the object side, the lens surface of the second lens unit closest to the image side is a concave surface which faces the image side, and the lens surface of the third lens unit closest to the object side is a convex surface which faces the object side.

The zoom lens system satisfies the following conditions (1C) and (2C):

$$1.0 < RG1I/RG2O < 6.0 \qquad (1C); \text{ and}$$

$$0.5 < RG2I/RG3O < 3.0 \qquad (2C),$$

wherein RG1I is a paraxial radius of curvature of the lens surface of the first lens unit closest to the image side, RG2O is a paraxial radius of curvature of the lens surface of the second lens unit closest to the object side, RG2I is a paraxial radius of curvature of the second lens unit closest to the image side, and RG3O is a paraxial radius of curvature of the lens surface of the third lens unit closest to the object side.

These conditions define shapes of the surfaces of the lens units which face each other.

In a case where the object-side surface and image-side surface which define the space between the lens units are formed into convex shapes toward the object side, the air space for zooming and for collapsing the zoom lens system can be reduced. The constitution is advantageous to the securing of the zoom ratio and miniaturization in the collapsed state.

Moreover, the principal point of the second lens unit is easily positioned closer to the object side. The shape is advantageous to the securing of the zoom ratio with respect to the amount of change in the space for zooming in the telephoto end. In addition, since the axial light flux diverged from the first lens unit is received by the convex surface of the second lens unit, the diameter of the second lens unit may be reduced.

Furthermore, when the image-side surface of the second lens unit is a concave surface, the off-axial ray is refracted in a direction away from the optical axis. The off-axial ray is further refracted by the positive refractive power of the third lens unit to come close to a parallel state with respect to the optical axis. In consequence, the diameter of the second lens unit is reduced, and the exit pupil of the zoom lens system is easily shifted away from the image surface.

The condition (1C) specifies the shape of the lens surface which defines the space between the first lens unit and the second lens unit. In a case where the positive refractive power of the object-side surface of the second lens unit is secured so that the value of this condition is not below the lower limit of 1.0, the constitution is advantageous to adjustment of the principal point and the decrease of the diameter of the second lens unit. Alternatively, when the curvature of the image-side surface of the first lens unit is suppressed, the curvature of each lens surface of the first lens unit is suppressed. The constitution is advantageous to the aberration correction.

In a case where the curvature of the object-side surface of the second lens unit is appropriately suppressed so that the value of the condition (1C) is not above the upper limit of 6.0, the constitution is advantageous in suppressing the aberration in the second lens unit. Alternatively, when the concave shape of the image-side surface of the first lens unit is secured, the constitution is advantageous in inhibiting generation of the off-axial aberration.

The condition (2C) specifies the shape of the lens surface which defines the space between the second lens unit and the third lens unit. In a case where the positive refractive power of the object-side surface of the third lens unit is secured so that the value of this condition is not below the lower limit of 0.5, the constitution is advantageous to the securing of the function of shifting the exit pupil as mentioned above. Alternatively, when the curvature of the image-side surface of the second lens unit is suppressed, the curvature of each lens surface of the second lens unit is suppressed, and the constitution is advantageous to the aberration correction.

In a case where the curvature of the object-side surface of the third lens unit is appropriately suppressed so that the value of the condition (2C) is not above the upper limit of 3.0, the constitution is advantageous in suppressing aberration and the thickness of the third lens unit. Alternatively, when the concave shape of the image-side surface of the second lens unit is secured, the constitution is advantageous to the adjustment of the principal point and miniaturization of the second lens unit as mentioned above.

In the zoom lens system according to the present invention, it is preferable that focusing operation is performed by moving the third lens unit in the optical-axis direction.

The focusing sensitivity of the third lens unit can be increased. Therefore, the constitution in which the third lens unit is used as a focusing lens unit is advantageous in decreasing the movement amount of the focusing lens unit.

Moreover, it is preferable that the second lens unit has a cemented lens component constituted of a plurality of lens elements cemented on the optical axis.

To achieve the thinning in the collapsed state, it is preferable to decrease thicknesses of not only each lens unit but also the lens frame for holding the lens unit as much as possible.

When the second lens unit is constituted of only the cemented lens component, the second lens unit may be held by holding only one portion of the cemented lens component. This serves to reduce the thickness of the lens frame and also to reduce the thickness in the collapsed state.

Furthermore, it is preferable that the vertex of the lens surface of the second lens unit closest to the object side is positioned on the object side of the intersection between the surface of the aperture of the aperture stop and the optical axis and a part of the surface of the second lens unit closest to the object side is disposed in the aperture of the aperture stop. In addition, it is preferable that the aperture stop is moved integrally with the second lens unit during zooming.

According to such a constitution, the first and second lens units can be brought close to each other in the telephoto end. This constitution is advantageous to the decreases of the diameters of the first and second lens units, adjustment of the exit pupil position and simplification of the moving mechanism for the aperture stop.

Moreover, it is preferable to satisfy the following condition:

$$n_{1p} > 1.9 \tag{3C}$$

wherein $n_{1p}$ is a refractive index of the positive lens element of the first lens unit.

When the refractive index is large, the radius of curvature of the lens surface can be increased, and the thickness of the lens can be decreased. Therefore, the thinning in the collapsed state can be achieved. The Petzval curvature can be corrected into a positive value, and a satisfactory image forming performance can be obtained.

Furthermore, it is preferable to satisfy the following condition:

$$-0.15 < (D_2(t) - D_2(w))/f_w < 0.5 \tag{4C}$$

wherein $D_2(w)$ is a space between the second lens unit and the third lens unit along the optical axis in the wide-angle end, $D_2(t)$ is a space between the second lens unit and the third lens unit along the optical axis in the telephoto end, and $f_w$ is a focal length of the zoom lens system in the wide-angle end.

This condition specifies a preferable change amount of the space between the second lens unit and the third lens unit. When the value of the condition (4C) is not below the lower limit of −0.15, it is easy to secure a space necessary for focusing in the telephoto end and a tolerance for adjustment of the fluctuation of the image surface position during manufacturing.

When the value of the condition (4C) is not above the upper limit of 0.5, the increase of the space between the first lens unit and the second lens unit in the wide-angle end is suppressed, the ray height in the first lens unit is suppressed and the increase of the diameter of the front lens is easily suppressed. In the telephoto end, the third lens unit is easily positioned apart from the image surface, and the constitution is advantageous to the decrease of the diameter of the third lens unit.

Moreover, when a shaft is disposed on the lens frame for holding the second lens unit to hold the lens frame for holding the third lens unit, the length of the shaft increases as much as the relative movement amount of the third lens unit with respect to the second lens unit. However, when the condition (4C) is satisfied, this movement amount is suppressed, and the constitution is advantageous to the thinning of the lens barrel in the collapsed state.

Furthermore, it is preferable that the second lens unit includes a cemented triplet in which a positive lens element, a negative lens element and a positive lens element are arranged in order from the object side.

In such a constitution, it is possible to effectively correct spherical aberration, field curvature and chromatic aberration while the lenses are easily held. That is, spherical aberration is primarily controlled on the object-side surface of the cemented lens component, chromatic aberration is controlled primarily by selection of the power and the Abbe number, and off-axial aberration is primarily controlled on the image-side surface of the cemented lens component.

Especially, it is preferable for the aberration correction that the object-side and image-side surfaces of the cemented lens component are formed into aspherical surfaces. Since the positive refractive power of the object-side surface easily increases, it is preferable to form the object-side surface into such a shape that the positive refractive power of a portion on the surface decreases with distance from the optical axis, that is, the refractive power of the portion decreases as the portion comes closer to the periphery of the lens surface. This is advantageous to the correction of spherical aberration. On the other hand, it is preferable to form the image-side surface into such a shape that the negative refractive power on a portion on the surface strengthens with distance from the optical axis, that is, the refractive power of the portion strengthens as the portion comes closer to the periphery of the surface. This is advantageous to the correction of off-axial aberration.

Moreover, it is preferable that the refractive index of the negative lens element of the second lens unit is set to be higher than that of the positive lens element on the image side, the Abbe number of the negative lens element is set to be smaller than the Abbe numbers of the positive lens elements arranged on both side of the negative lens element. The constitution is advantageous to the correction of chromatic aberration.

Furthermore, it is preferable to satisfy the following condition:

$$1.5 < Cj(t)/f_t < 1.8 \quad (5C),$$

wherein $Cj(t)$ is an axial distance from the surface of the zoom lens system closest to the object side to the image surface in the telephoto end, and $f_t$ is a focal length of the zoom lens system in the telephoto end.

When the value of the condition (5C) is not below the lower limit of 1.5, the total length in the wide-angle end is easily suppressed. Alternatively, the zoom ratio can easily be secured.

It is preferable that the value of the condition (5C) is not above the upper limit of 1.8 so as to suppress the total length in the telephoto end. This constitution is advantageous to simplification of the lens barrel mechanism such as the decrease of the number of steps of the collapsible lens barrel.

Moreover, it is preferable to satisfy the following condition:

$$3.0 < f_3/f_w < 10 \quad (6C),$$

wherein $f_3$ is a focal length of the third lens unit, and $f_w$ is a focal length of the zoom lens system in the wide-angle end.

When the value of the condition (6C) is not below the lower limit of 3.0, the ray height in the first lens unit in the wide-angle end is suppressed, and the increase of the diameter of the front lens is easily suppressed. Alternatively, the thickness of the third lens unit is easily suppressed, and the constitution is advantageous to the thinning of the lens barrel.

The value of the condition (6C) is not above the upper limit of 10 so as to suppress the focusing movement amount at a time when the third lens unit is used as a focusing lens unit and to easily secure the space for moving the third lens unit. The constitution is advantageous to the thinning in the collapsed state.

Moreover, it is preferable to set the zoom ratio to 2.5 or more and secure the zoom ratio.

Furthermore, it is preferable to satisfy the following condition:

$$-2.2 < (D_1(t)-D_1(w))/f_w < -1.3 \quad (7C),$$

wherein $D_1(w)$ is a space between the first lens unit and the second lens unit along the optical axis in the wide-angle end, $D_1(t)$ is a space between the first lens unit and the second lens unit along the optical axis in the telephoto end, and $f_w$ is a focal length of the zoom lens system in the wide-angle end.

This condition specifies a preferable change amount of the space between the first lens unit and the second lens unit. When the value of the condition is not below the lower limit of −2.2, the constitution is advantageous in suppressing the increase of the total length in the wide-angle end and the increase of the diameter of the first lens unit. When the value of the condition is not above the upper limit of −1.3, the constitution is advantageous to the securing of the zoom ratio.

In addition, it is preferable to satisfy the following condition:

$$1.1 < (D_3(t)-D_3(w))/f_w < 1.9 \quad (8C),$$

wherein $D_3(w)$ is a space between the third lens unit and the image surface along the optical axis in the wide-angle end, $D_3(t)$ is a space between the third lens unit and the image surface along the optical axis in the telephoto end, and $f_w$ is a focal length of the zoom lens system in the wide-angle end.

This condition specifies a preferable movement amount of the third lens unit. When the value of the condition is not below the lower limit of 1.1, the constitution is advantageous to the securing of an appropriate movement amount of the third lens unit, the securing of the focusing sensitivity of the third lens unit in the telephoto end and miniaturization of the diameter of the third lens unit. When the value of the condition is not above the upper limit of 1.9, the constitution is advantageous in suppressing the movement amount of the third lens unit and the complicating of the movement mechanism.

Moreover, it is preferable to satisfy the following condition:

$$2.5 < f_t/f_w < 4.0 \quad (9C),$$

wherein $f_t$ is a focal length of the zoom lens system in the telephoto end, and $f_w$ is a focal length of the zoom lens system in the wide-angle end.

It is preferable that the value of this condition is not below the lower limit of 2.5 so as to secure the zoom ratio. It is preferable that the value of the condition is not above the upper limit of 4.0 so as to suppress the increase of the total length, the increase of the aberration fluctuation and the increase of the number of the lens elements. It is advantageous for obtaining the above-described effect when the conditions described above are deformed as follows.

It is preferable to set the lower limit value of the condition (1C) to 2.0. It is preferable to set the upper limit value of the condition (1C) to 5.0

It is preferable to set the lower limit value of the condition (2C) to 0.55. It is preferable to set the upper limit value of the condition (2C) to 2.0.

It is more preferable to set the lower limit value of the condition (3C) to 2.0. It is preferable to set an upper limit to the condition (3C) which is not larger than 2.7 to facilitate the availability of the material and to reduce costs.

It is preferable to set the lower limit value of the condition (4C) to −0.13. It is preferable to set the upper limit value of the condition (4C) to 0.43.

It is preferable to set the lower limit value of the condition (5C) to 1.55. It is preferable to set the upper limit value of the condition (5C) to 1.7.

It is preferable to set the lower limit value of the condition (6C) to 3.2. It is preferable to set the upper limit value of the condition (6C) to 7.5.

It is preferable to set the lower limit value of the condition (7C) to −1.93. It is preferable to set the upper limit value of the condition (7C) to −1.5.

It is preferable to set the lower limit value of the condition (8C) to 1.2. It is preferable to set the upper limit value of the condition (8C) to 1.7.

It is preferable to set the lower limit value of the condition (9C) to 2.8. It is preferable to set the upper limit value of the condition (9C) to 3.5.

Moreover, it is preferable that a plastic lens is used in the third lens unit for reducing the weight and the burden to the driving mechanism.

In the above zoom lens system, the exit pupil can easily be positioned away from the image surface. In an electronic image sensor such as a CCD image sensor or a CMOS image sensor, if a ray obliquely strikes on the light receiving surface, shortage of quantity of light and color shading easily occur. However, this problem can be solved by shifting the exit pupil away from the light receiving surface. Therefore, the above zoom lens system is suitable for an image pickup lens for the electronic image pickup apparatus which is provided with an electronic image sensor. In this case, the image pickup apparatus preferably includes any of the zoom lens systems described above; and an image sensor which is disposed on the image side of the zoom lens system and which converts an image formed by the zoom lens system into an electric signal.

It is more preferable that a plurality of constitutions and/or conditions described above are simultaneously satisfied.

Next, there will be described embodiments of the zoom lens system according to the third aspect.

FIGS. 38A to 45C are sectional views of the sixteenth to twenty-third embodiments when focused on an infinite object. Among these drawings, FIGS. 38A, 39A, 40A . . . show states in the wide-angle ends, FIGS. 38B, 39B, 40B . . . show the intermediate states, and FIGS. 38C, 39C, 40C . . . show states in the telephoto ends, respectively. In the drawings, the first lens unit is denoted with G1, the aperture stop is denoted with ST, the second lens unit is denoted with G2, and the third lens unit is denoted with G3. A low pass filter coated with an IR cut coating or the like are represented as a plane parallel plate F. The cover glass of the electronic image sensor (a CCD image sensor, a CMOS image sensor or the like) is represented as a plane parallel plate C. The image surface is denoted with I. When an image formed by the zoom lens system is received by the electronic image sensor, the light receiving surface of the sensor is disposed in the position of the image surface I. It is to be noted that, for example, the optical low pass filter F may directly be coated with a near-infrared sharp cut coating, an infrared cut absorbing filter may separately be disposed, or the surface of the cover glass C may be provided with a multilayer thin film for restricting a wavelength region.

Figure 38A:
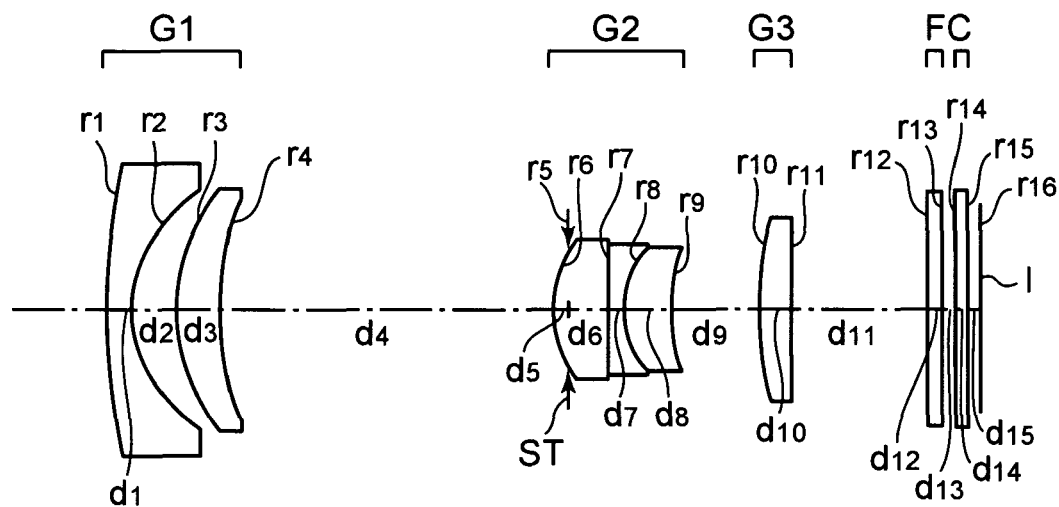
FIGS. 38A to 38C are sectional views of the sixteenth embodiment of the present invention when focused on an infinite object.
Figure 38B:
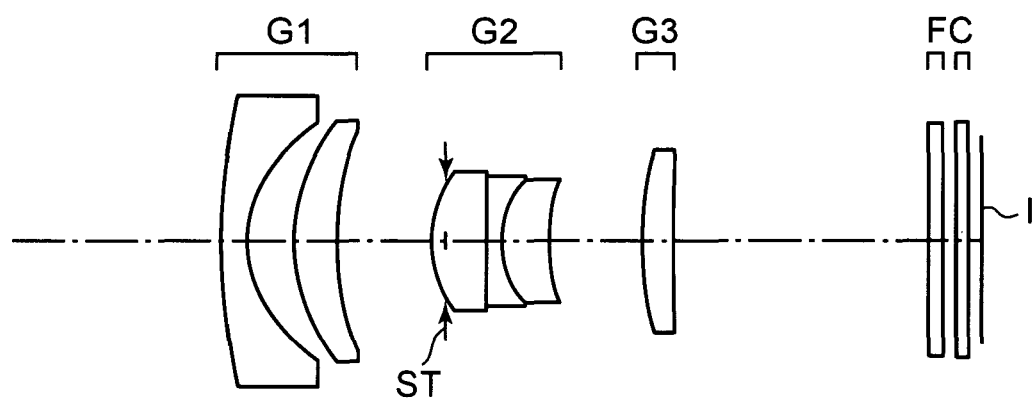
Figure 38C:
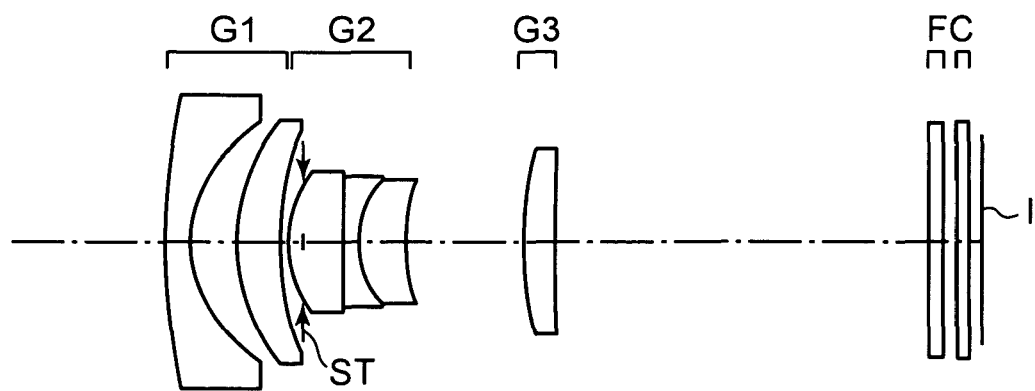

As shown in FIGS. 38A to 38C, the sixteenth embodiment comprises, in order from an object side, a first lens unit G1 having a negative refractive power, a second lens unit G2 having a positive refractive power and a third lens unit G3 having a positive refractive power. An aperture stop ST is disposed so that a part of the surface of the second lens unit G2 closest to the object side is disposed in the aperture of the aperture stop. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while enlarging the space between the third lens unit G3 and the second lens unit G2. Focusing is performed by moving the third lens unit G3 in the optical-axis direction.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side. It is to be noted that the lens element of the third lens unit G3 is made of plastic.

Aspherical surfaces are used on four surfaces including the image-side surface of the negative meniscus lens of the first lens unit G1; the surfaces of the cemented triplet of the second lens unit G2 closest to the object side and the image side; and the object-side surface of the positive meniscus lens of the third lens unit G3.

Figure 39A:
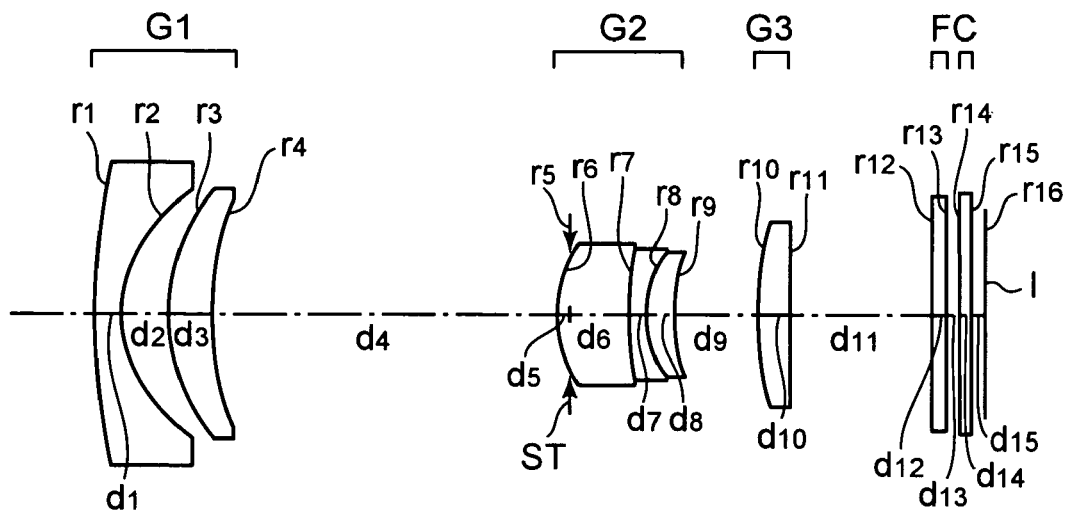
FIGS. 39A to 39C are sectional views of the seventeenth embodiment of the present invention when focused on an infinite object.
Figure 39B:
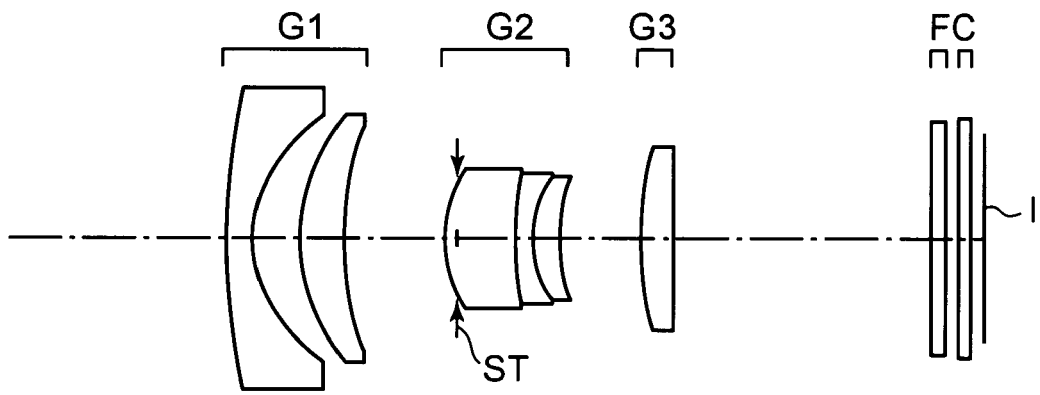
Figure 39C:
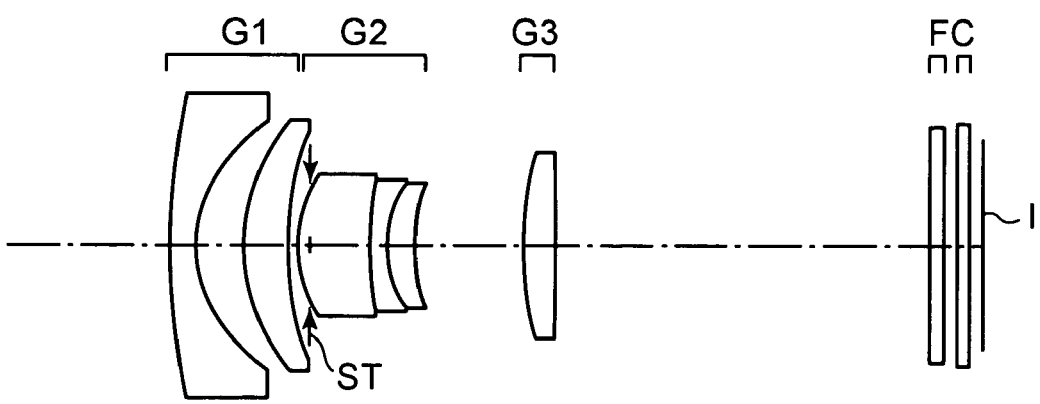

As shown in FIGS. 39A to 39C, the seventeenth embodiment comprises, in order from an object side, a first lens unit G1 having a negative refractive power, a second lens unit G2 having a positive refractive power and a third lens unit G3 having a positive refractive power. An aperture stop ST is disposed so that a part of the surface of the second lens unit G2 closest to the object side is disposed in the aperture of the aperture stop. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit G2 and the first lens unit G1. The third lens unit G3 moves toward the object side while slightly reducing the space between the third lens unit G3 and the second lens unit G2 from the wide-angle end to an intermediate state and enlarging the space from the intermediate state to the telephoto end. Focusing is performed by moving the third lens unit G3 in the optical-axis direction.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side. It is to be noted that the lens element of the third lens unit G3 is made of plastic.

Aspherical surfaces are used on four surfaces including the image-side surface of the negative meniscus lens of the first lens unit G1; the surfaces of the cemented triplet of the second lens unit G2 closest to the object side and the image side; and the object-side surface of the positive meniscus lens of the third lens unit G3.

Figure 40A:
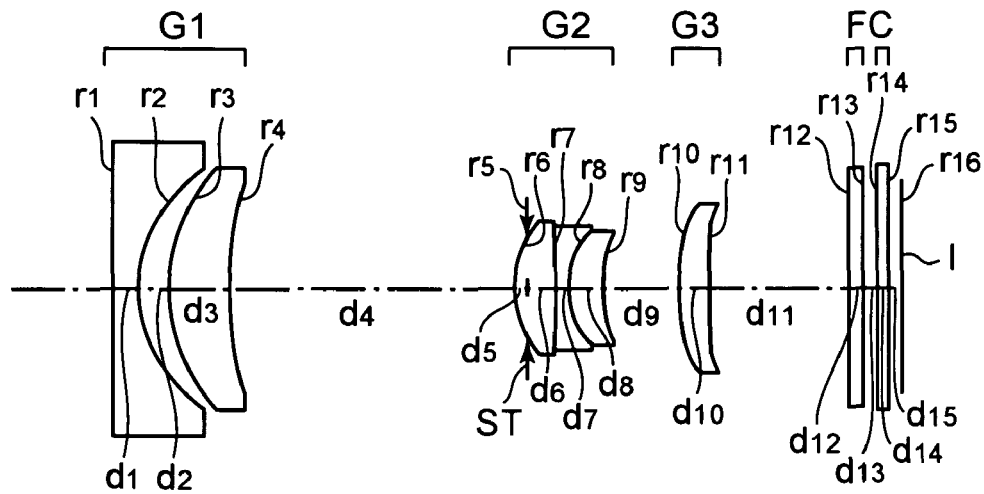
FIGS. 40A to 40C are sectional views of the eighteenth embodiment of the present invention when focused on an infinite object.
Figure 40B:
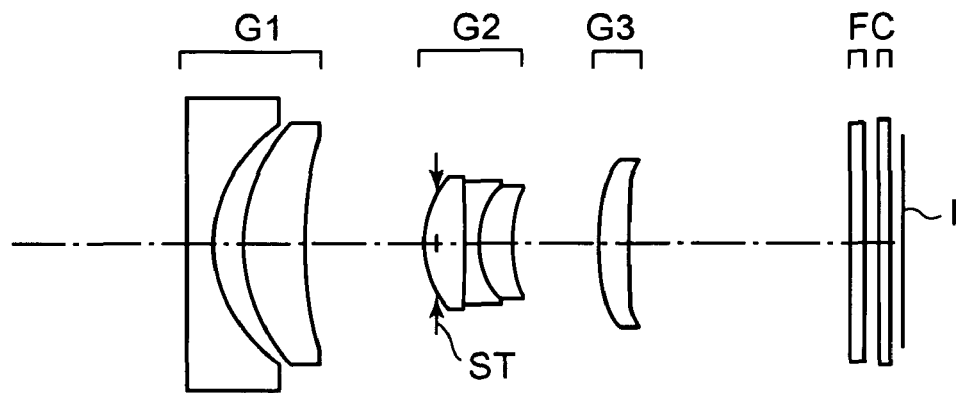
Figure 40C:
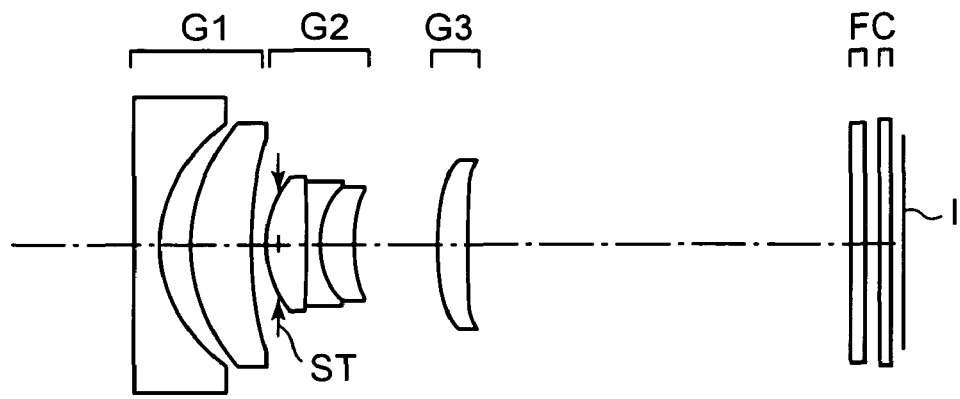

As shown in FIGS. 40A to 40C, the eighteenth embodiment comprises, in order from an object side, a first lens unit G1 having a negative refractive power, a second lens unit G2 having a positive refractive power and a third lens unit G3 having a positive refractive power. An aperture stop ST is disposed so that a part of the surface of the second lens unit closest to the object side is disposed in the aperture of the aperture stop. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit and the first lens unit G1. The third lens unit G3 moves toward the object side while enlarging the space between the third lens unit and the second lens unit G2 from the wide-angle end to an intermediate state and slightly reducing the space from the intermediate state to the telephoto end. Focusing is performed by moving the third lens unit G3 in the optical-axis direction.

The first lens unit G1 is constituted of, in order from the object side, a negative meniscus lens whose convex surface faces the object side and a positive meniscus lens whose convex surface faces the object side. The second lens unit G2 is constituted of a cemented triplet including a double-convex positive lens, a double-concave negative lens and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side. It is to be noted that the lens element of the third lens unit G3 is made of plastic.

Aspherical surfaces are used on five surfaces including the image-side surface of the negative meniscus lens of the first lens unit G1; the surfaces of the cemented triplet of the second lens unit G2 closest to the object side and the image side; and opposite surfaces of the positive meniscus lens of the third lens unit G3.

Figure 41A:
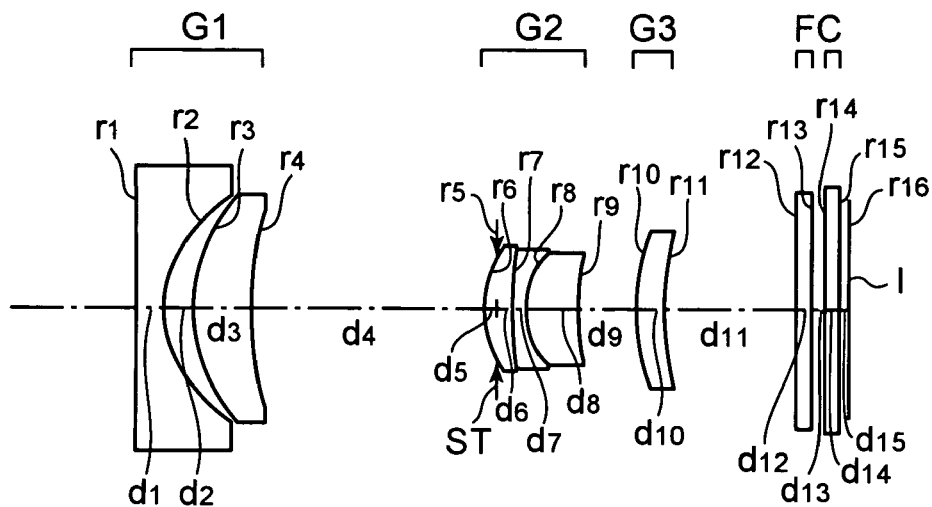
FIGS. 41A to 41C are sectional views of the nineteenth embodiment of the present invention when focused on an infinite object.
Figure 41B:
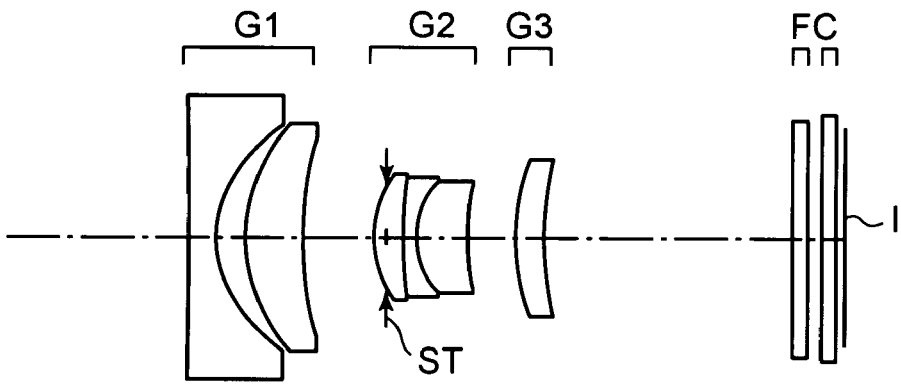
Figure 41C:
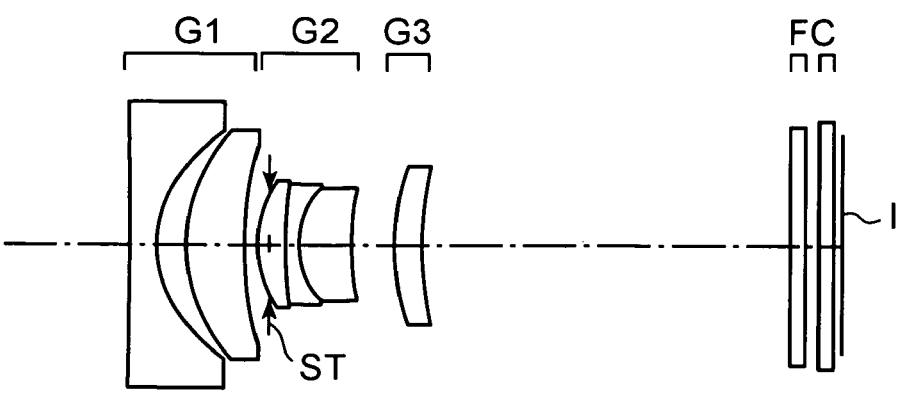

As shown in FIGS. 41A to 41C, the nineteenth embodiment comprises, in order from an object side, a first lens unit G1 having a negative refractive power, a second lens unit G2 having a positive refractive power and a third lens unit G3 having a positive refractive power. An aperture stop ST is disposed so that a part of the surface of the second lens unit closest to the object side is disposed in the aperture of the aperture stop. When zooming is performed from the wide-angle end to the telephoto end, the first lens unit G1 moves along a locus which is convex toward the image side, and is positioned slightly closer to the image side in the telephoto end than in the wide-angle end. The aperture stop ST and the second lens unit G2 integrally monotonously move toward the object side while reducing the space between the second lens unit and the first lens unit G1. The third lens unit G3 moves toward the object side while reducing the space between the third lens unit and the second lens unit G2. Focusing is performed by moving the third lens unit G3 in the optical-axis direction.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side. It is to be noted that the lens element of the third lens unit G3 is made of plastic.

Aspherical surfaces are used on five surfaces including the image-side surface of the double-concave negative lens of the first lens unit G1; the surfaces of the cemented triplet of the second lens unit G2 closest to the object side and the image side; and opposite surfaces of the positive meniscus lens of the third lens unit G3.

Figure 42A:
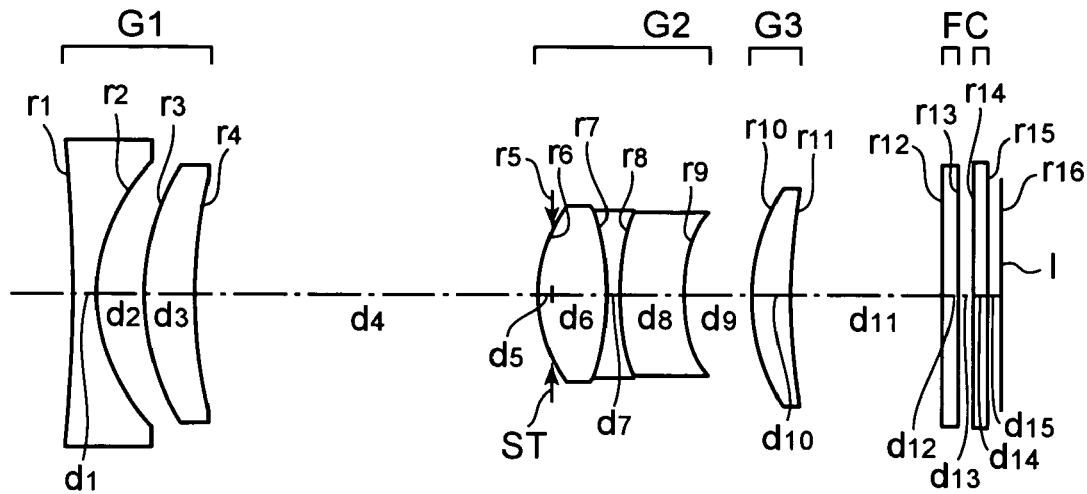
FIGS. 42A to 42C are sectional views of the twentieth embodiment of the present invention when focused on an infinite object.
Figure 42B:
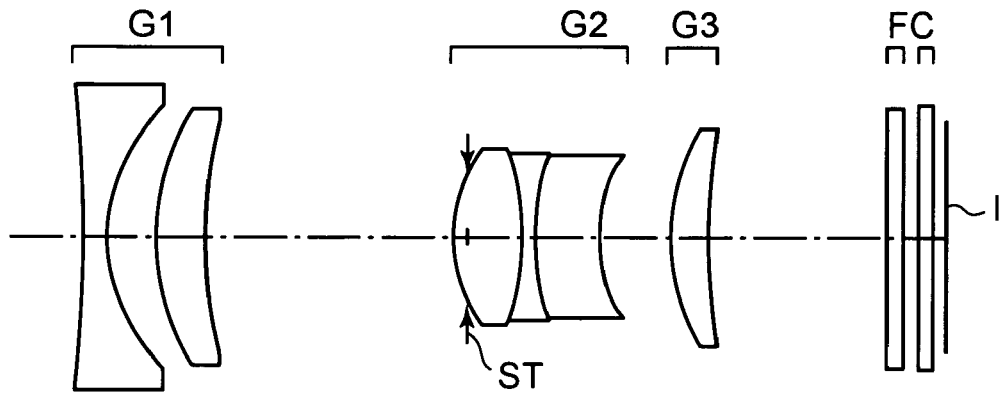
Figure 42C:
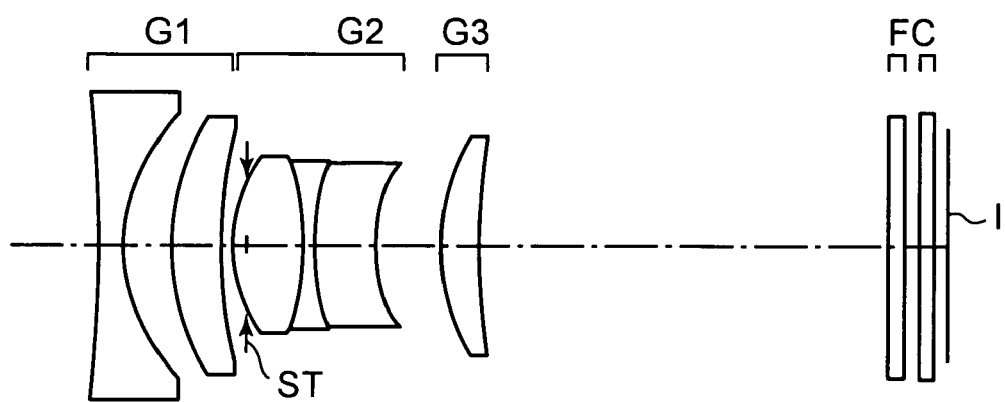

As shown in FIGS. 42A to 42C, the twentieth embodiment comprises, in order from an object side, a first lens unit G1 having a negative refractive power, a second lens unit G2 having a positive refractive power and a third lens unit G3 having a positive refractive power. An aperture stop ST is disposed so that a part of the surface of the second lens unit closest to the object side is disposed in the aperture of the aperture stop. When zooming is performed from the wide-angle end to the telephoto end, the first lens unit G1 moves toward the image side. The aperture stop ST and the second lens unit G2 integrally monotonously move toward the object side while reducing the space between the second lens unit and the first lens unit G1. The third lens unit G3 moves toward the object side while slightly enlarging the space between the third lens unit and the second lens unit G2 from the wide-angle end to an intermediate state and slightly reducing the space from the intermediate state to the telephoto end. Focusing is performed by moving the third lens unit G3 in the optical-axis direction.

The first lens unit G1 is constituted of, in order from the object side, a double-concave negative lens and a positive meniscus lens whose convex surface faces the object side. The second lens unit G2 is constituted of a cemented triplet including, in order from the object side, a double-convex positive lens, a double-concave negative lens and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side. It is to be noted that the lens element of the third lens unit G3 is made of plastic.

Aspherical surfaces are used on four surfaces including the image-side surface of the double-concave negative lens of the first lens unit G1; the surfaces of the cemented triplet of the second lens unit G2 closest to the object side and the image side; and the object-side surface of the positive meniscus lens of the third lens unit G3.

Figure 43A:
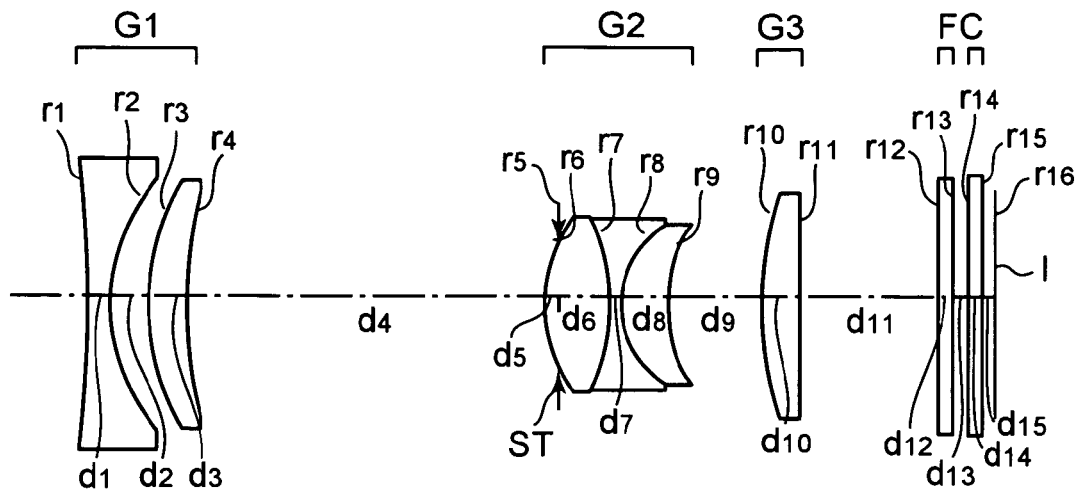
FIGS. 43A to 43C are sectional views of the twenty-first embodiment of the present invention when focused on an infinite object.
Figure 43B:
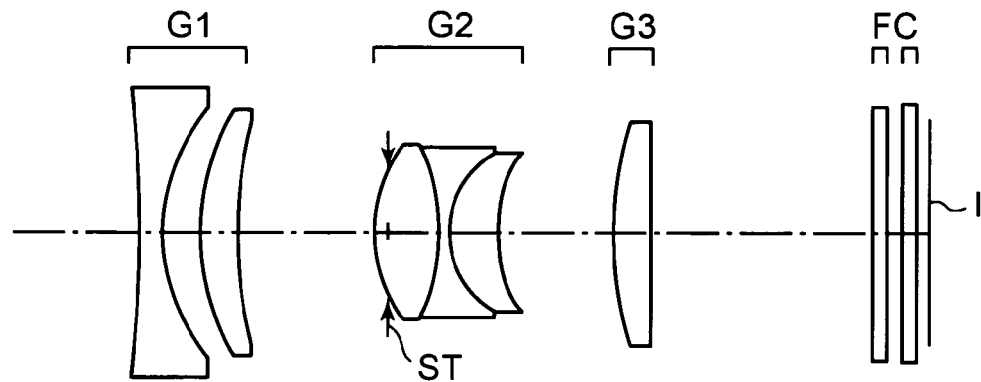
Figure 43C:
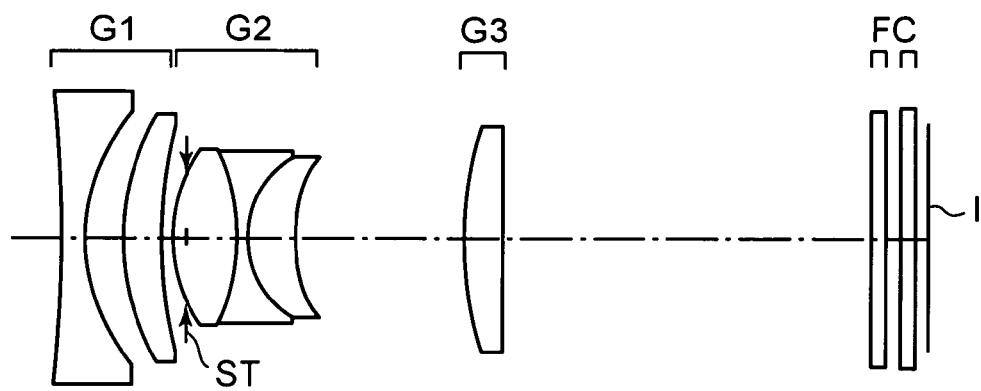

As shown in FIGS. 43A to 43C, the twenty-first embodiment comprises, in order from an object side, a first lens unit G1 having a negative refractive power, a second lens unit G2 having a positive refractive power and a third lens unit G3 having a positive refractive power. An aperture stop ST is disposed so that a part of the surface of the second lens unit closest to the object side is disposed in the aperture of the aperture stop. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit and the first lens unit G1. The third lens unit G3 moves toward the object side while enlarging the space between the third lens unit and the second lens unit G2. Focusing is performed by moving the third lens unit G3 in the optical-axis direction.

The first lens unit G1 is constituted of, in order from the object side, a double-concave negative lens and a positive meniscus lens whose convex surface faces the object side. The second lens unit G2 is constituted of a cemented triplet including, in order from the object side, a double-convex positive lens, a double-concave negative lens and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side. It is to be noted that the lens element of the third lens unit G3 is made of plastic.

Aspherical surfaces are used on three surfaces including the image-side surface of the double-concave negative lens of the first lens unit G1; and the surfaces of the cemented triplet of the second lens unit G2 closest to the object side and the image side.

Figure 44A:
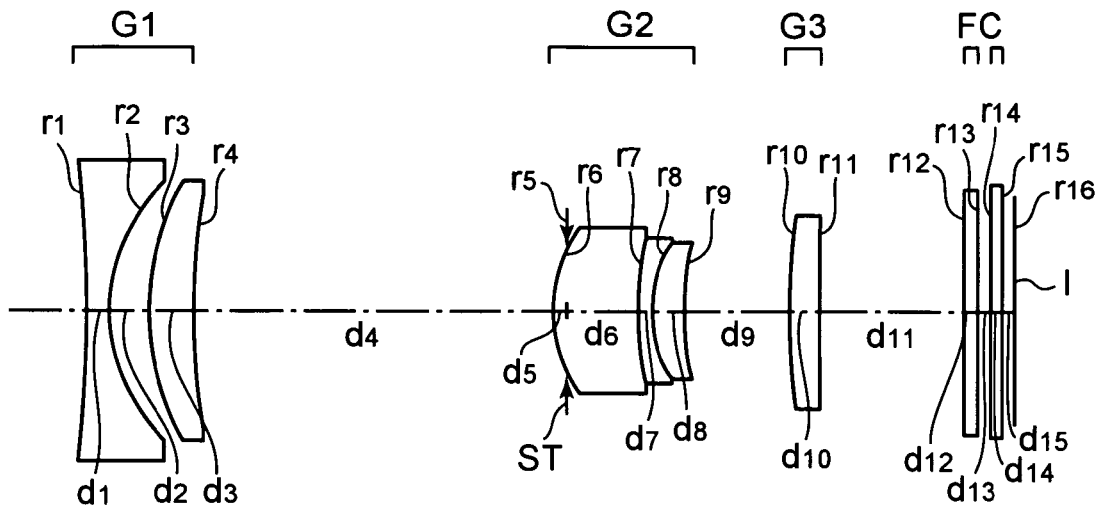
FIGS. 44A to 44C are sectional views of the twenty-second embodiment of the present invention when focused on an infinite object.
Figure 44B:
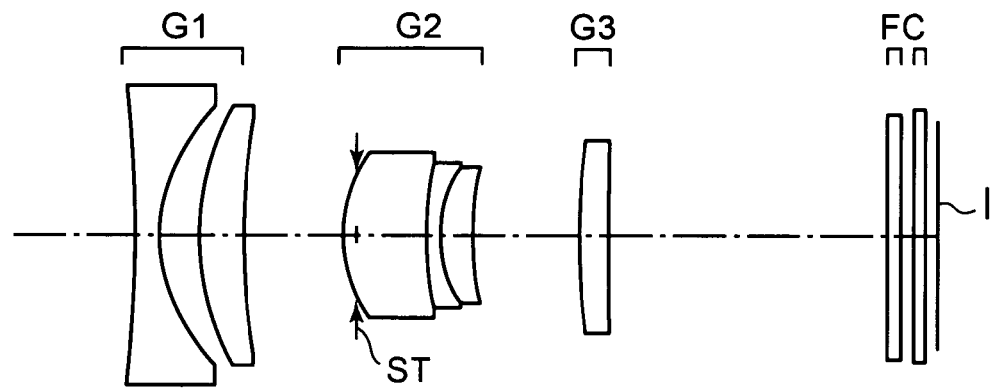
Figure 44C:
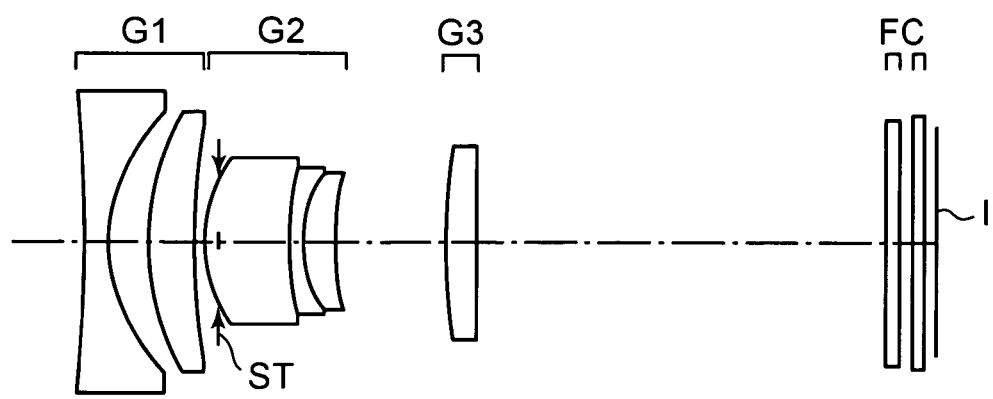

As shown in FIGS. 44A to 44C, the twenty-second embodiment comprises, in order from an object side, a first lens unit G1 having a negative refractive power, a second lens unit G2 having a positive refractive power and a third lens unit G3 having a positive refractive power. An aperture stop ST is disposed so that a part of the surface of the second lens unit closest to the object side is disposed in the aperture of the aperture stop. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit and the first lens unit G1. The third lens unit G3 moves toward the object side while enlarging the space between the third lens unit and the second lens unit G2. Focusing is performed by moving the third lens unit G3 in the optical-axis direction.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one positive meniscus lens whose convex surface faces the object side. The aperture stop ST is positioned on the image side of the vertex of the surface of the cemented triplet of the second lens unit G2 closest to the object side. It is to be noted that the lens element of the third lens unit G3 is made of plastic.

Aspherical surfaces are used on four surfaces including the image-side surface of the double-concave negative lens of the first lens unit G1; the surfaces of the cemented triplet of the second lens unit G2 closest to the object side and the image side; and the object-side surface of the positive meniscus lens of the third lens unit G3.

Figure 45A:
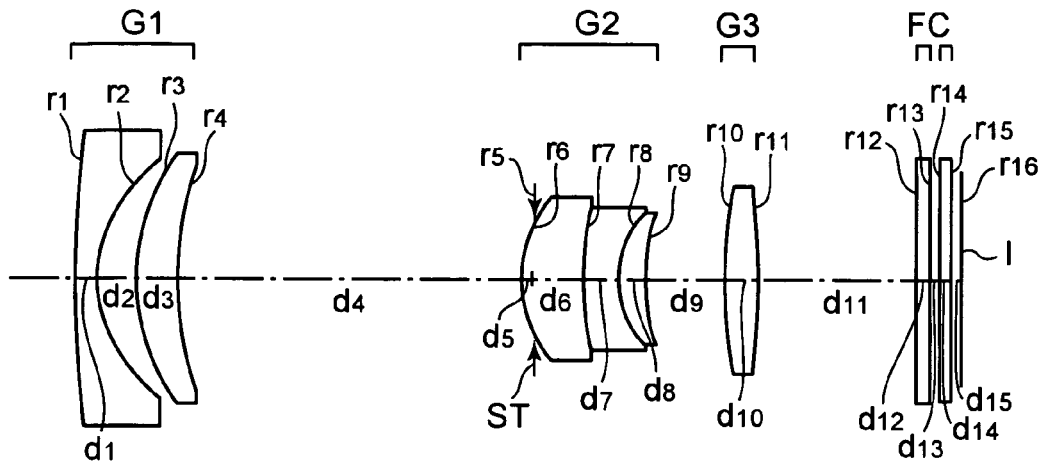
FIGS. 45A to 45C are sectional views of the twenty-third embodiment of the present invention when focused on an infinite object.
Figure 45B:
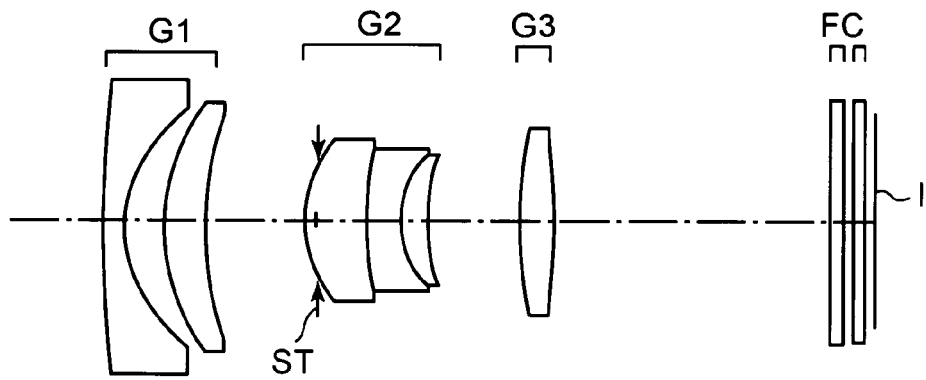
Figure 45C:
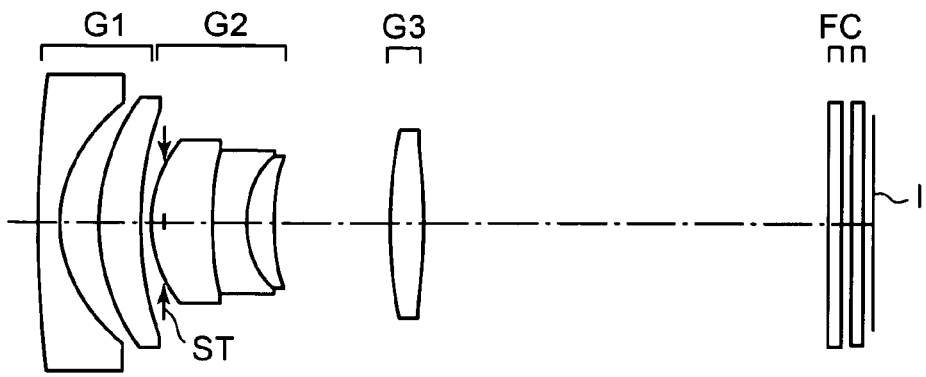
Figure 46A:
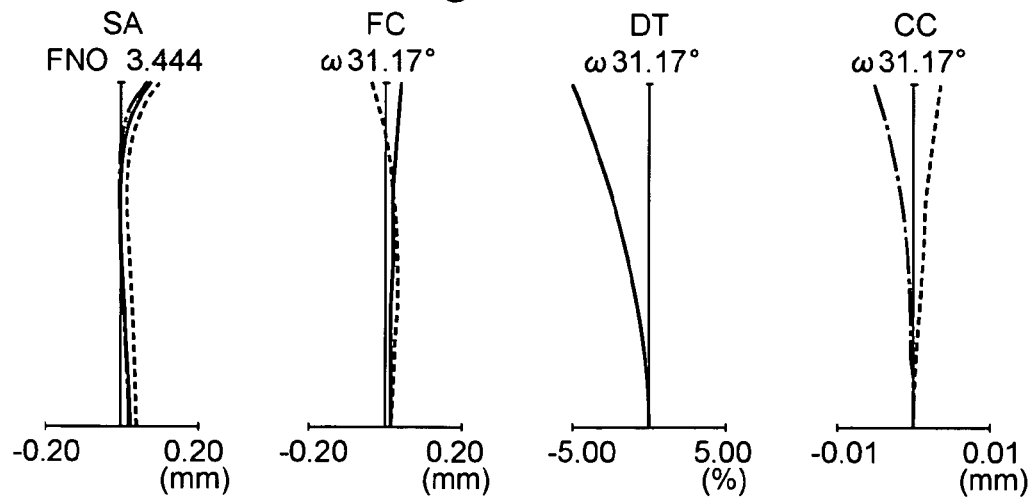
FIG. 46A is an aberration diagram of the sixteenth embodiment in the wide-angle end when focused on the infinite object.
Figure 46B:
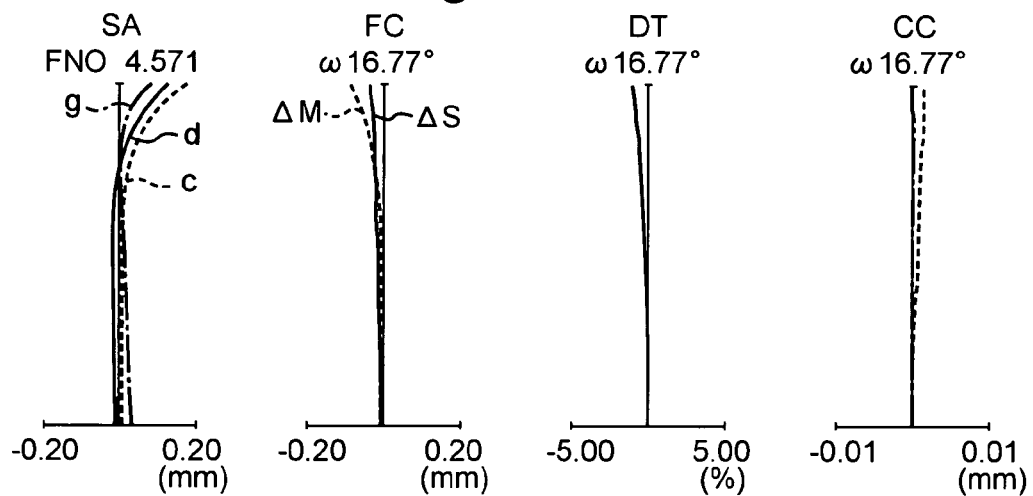
FIG. 46B is an aberration diagram in the intermediate state.
Figure 46C:
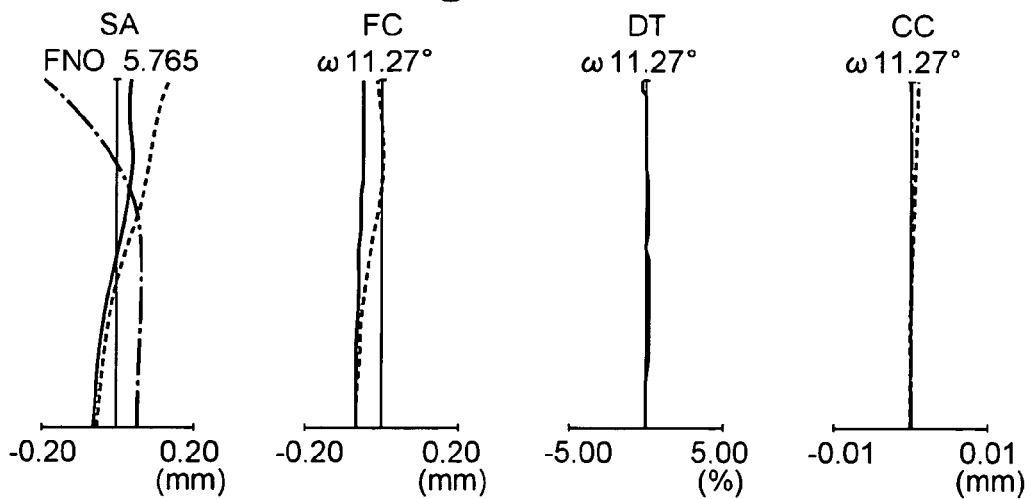
FIG. 46C is an aberration diagram in the telephoto end.
Figure 47A:
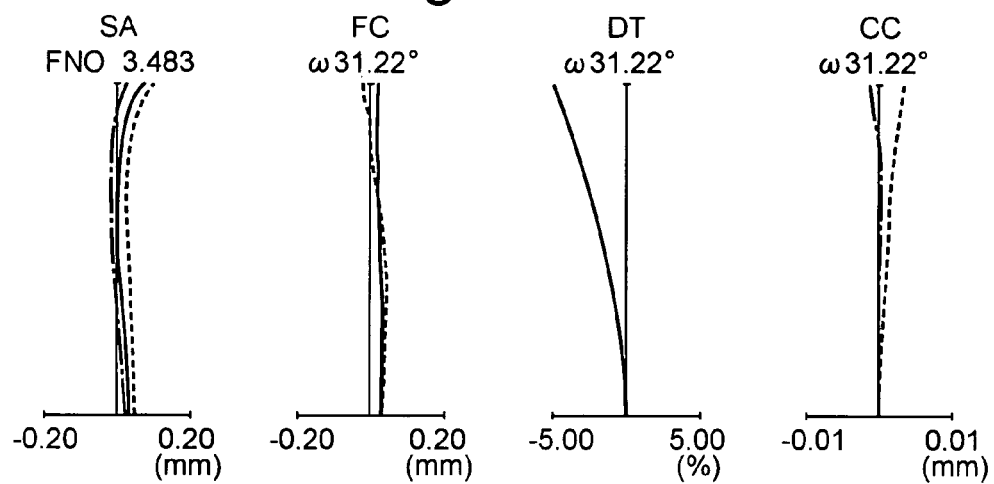
FIG. 47A is an aberration diagram of the seventeenth embodiment in the wide-angle end when focused on the infinite object.
Figure 47B:
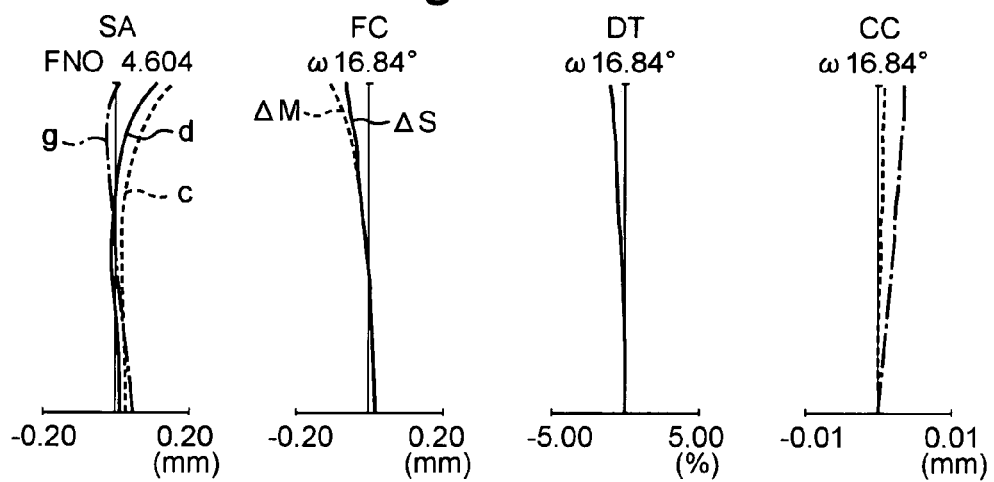
FIG. 47B is an aberration diagram in the intermediate state.
Figure 47C:
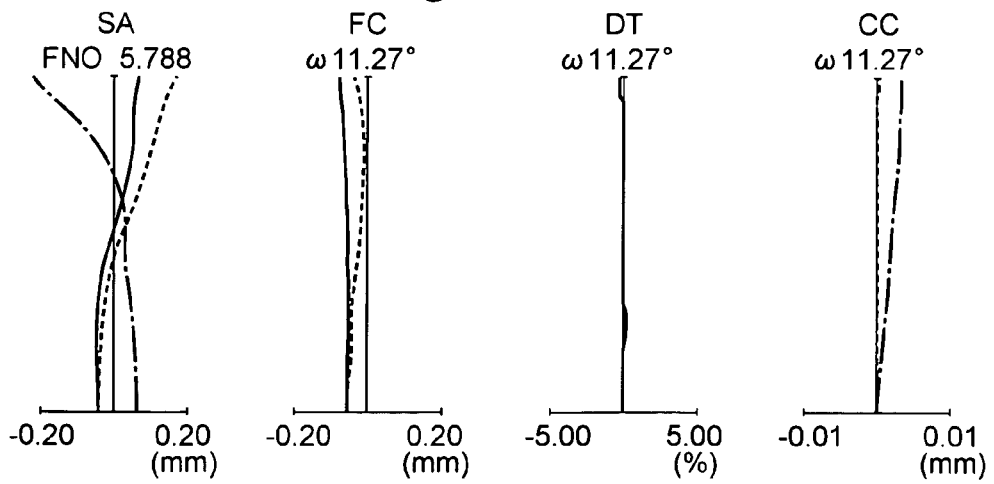
FIG. 47C is an aberration diagram in the telephoto end.
Figure 48A:
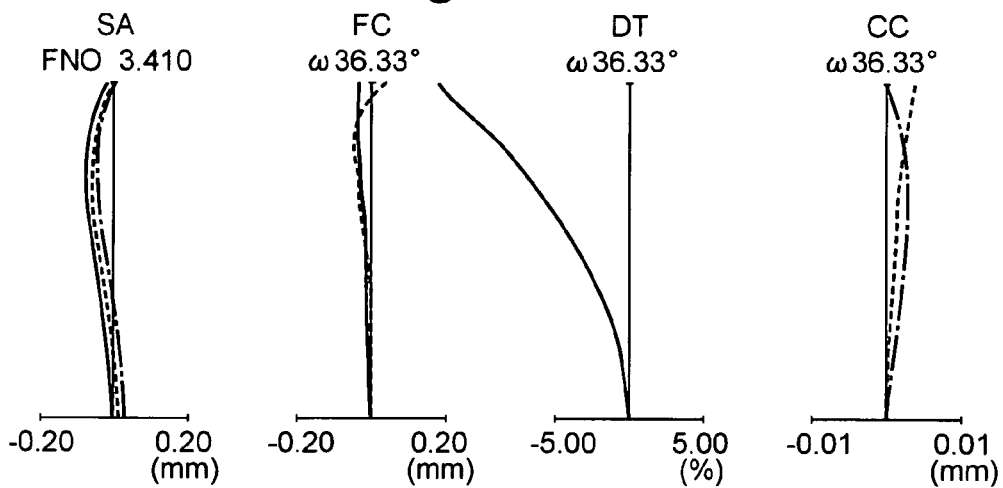
FIG. 48A is an aberration diagram of the eighteenth embodiment in the wide-angle end when focused on the infinite object.
Figure 48B:
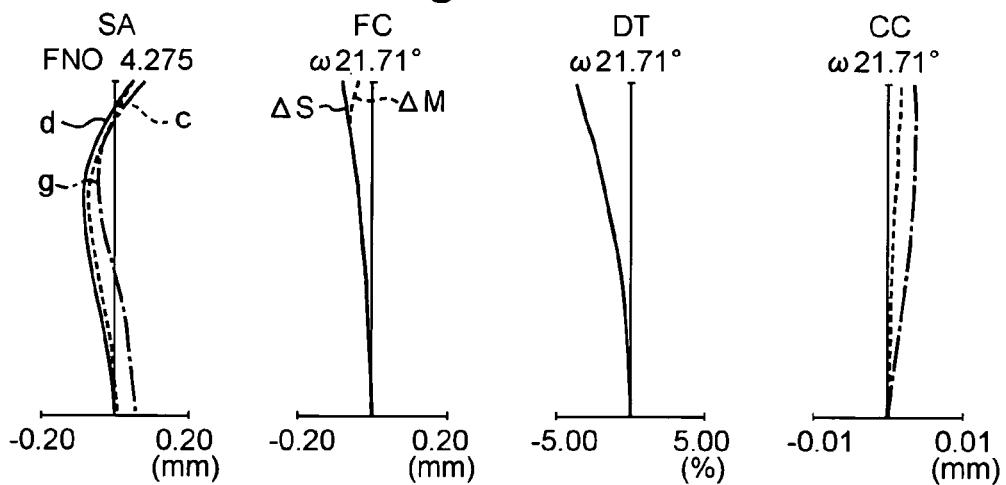
FIG. 48B is an aberration diagram in the intermediate state.
Figure 48C:
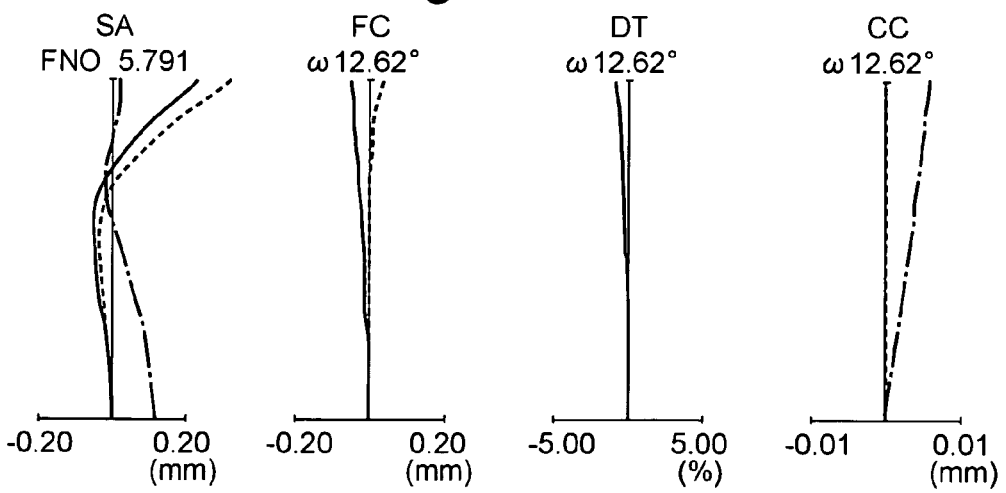
FIG. 48C is an aberration diagram in the telephoto end.
Figure 49A:
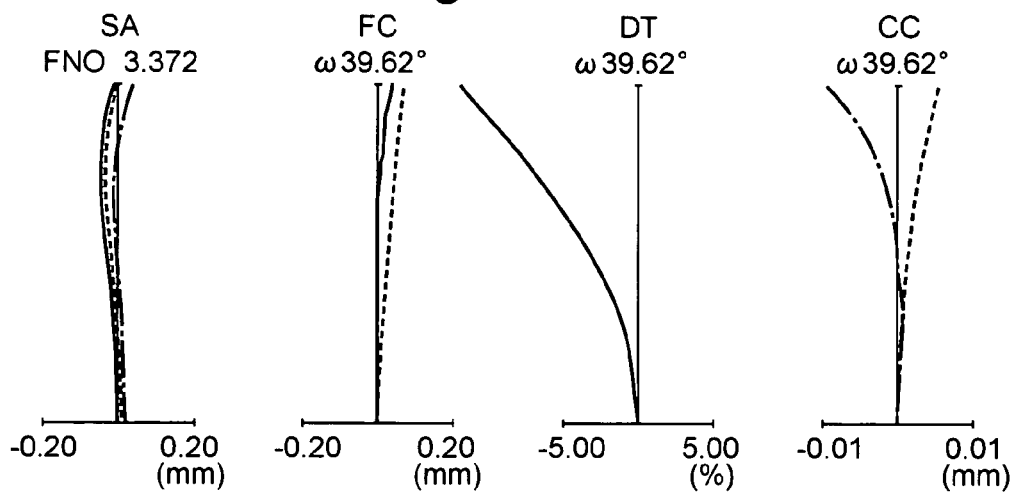
FIG. 49A is an aberration diagram of the nineteenth embodiment in the wide-angle end when focused on the infinite object.
Figure 49B:
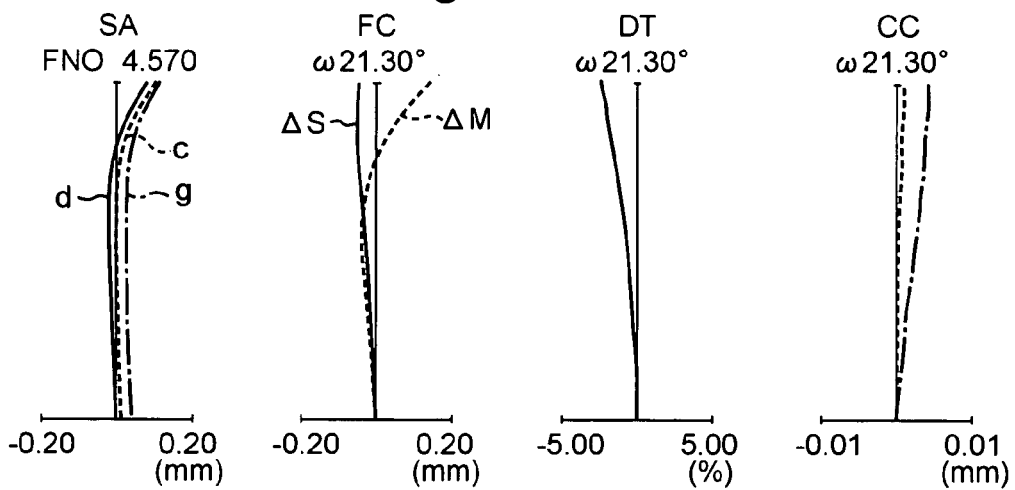
FIG. 49B is an aberration diagram in the intermediate state.
Figure 49C:
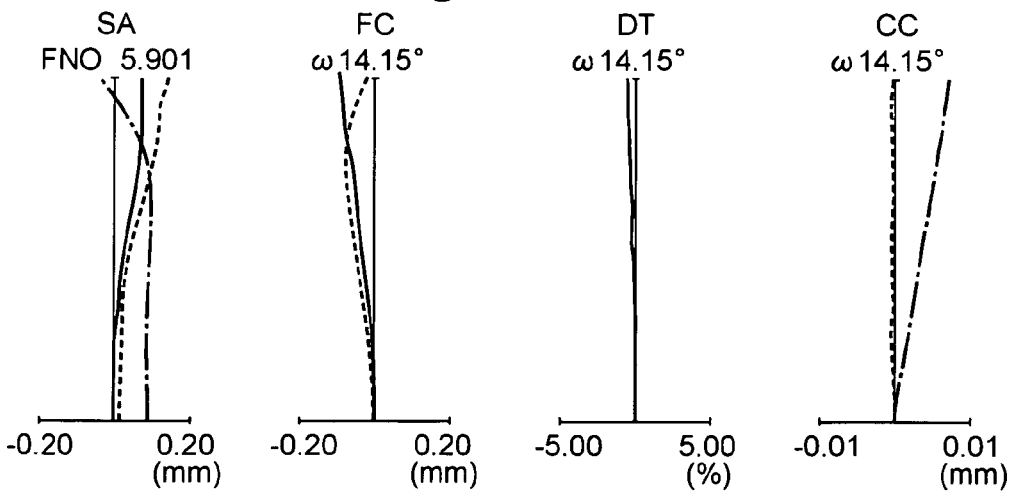
FIG. 49C is an aberration diagram in the telephoto end.
Figure 51A:
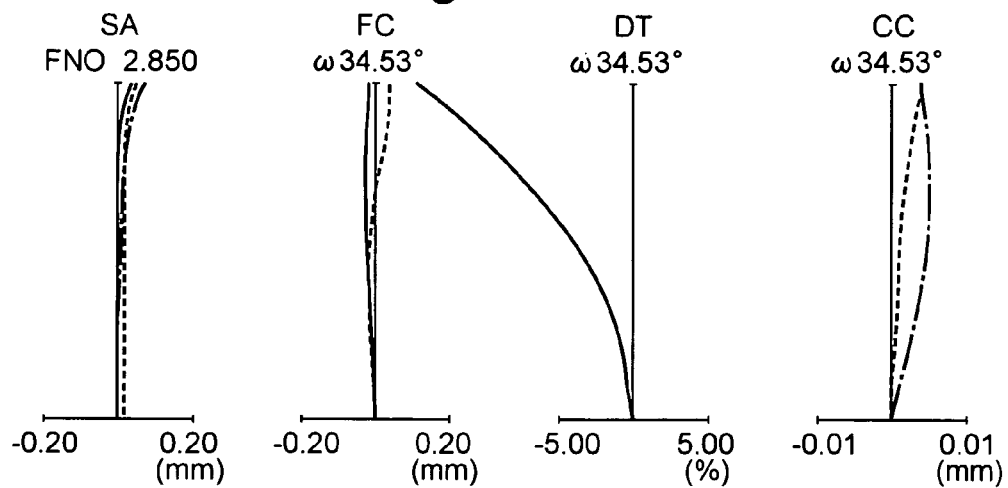
FIG. 51A is an aberration diagram of the twenty-first embodiment in the wide-angle end when focused on the infinite object.
Figure 51B:
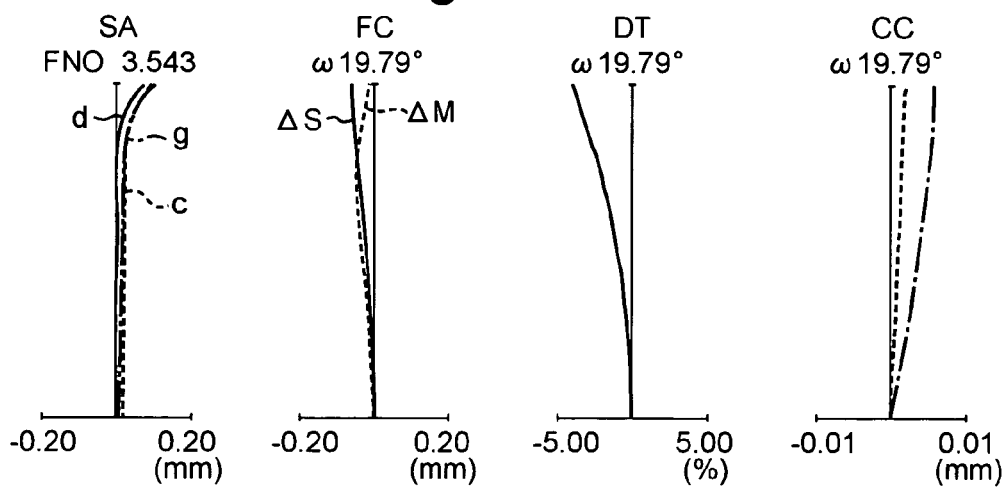
FIG. 51B is an aberration diagram in the intermediate state.
Figure 51C:
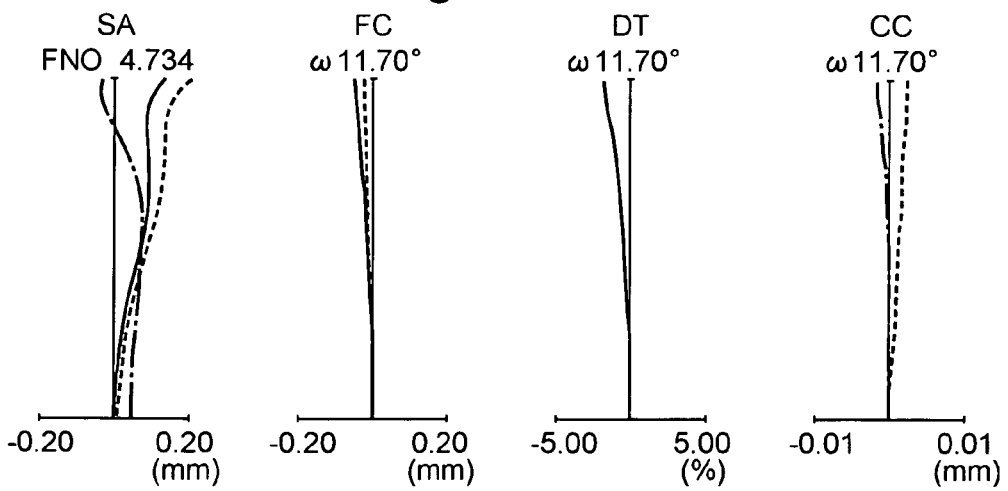
FIG. 51C is an aberration diagram in the telephoto end.
Figure 52A:
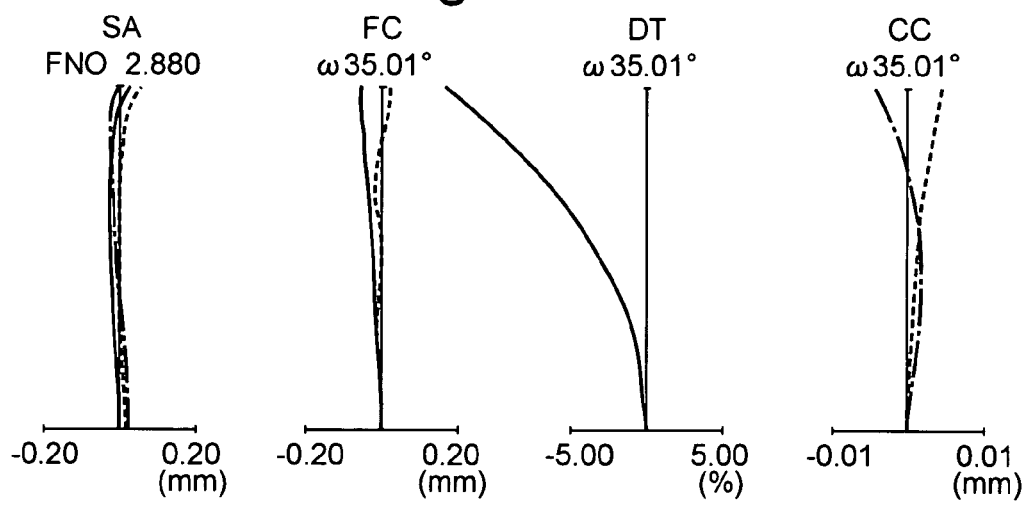
FIG. 52A is an aberration diagram of the twenty-second embodiment in the wide-angle end when focused on the infinite object.
Figure 52B:
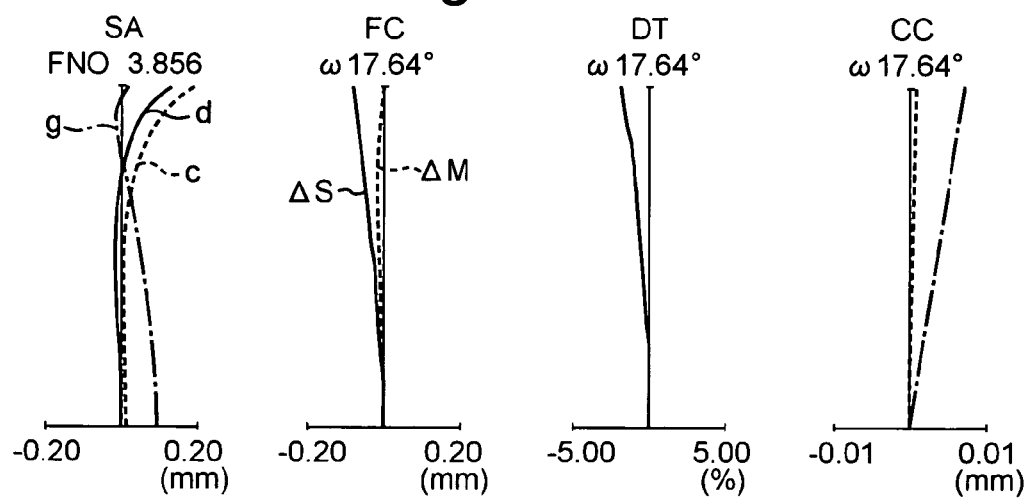
FIG. 52B is an aberration diagram in the intermediate state.
Figure 52C:
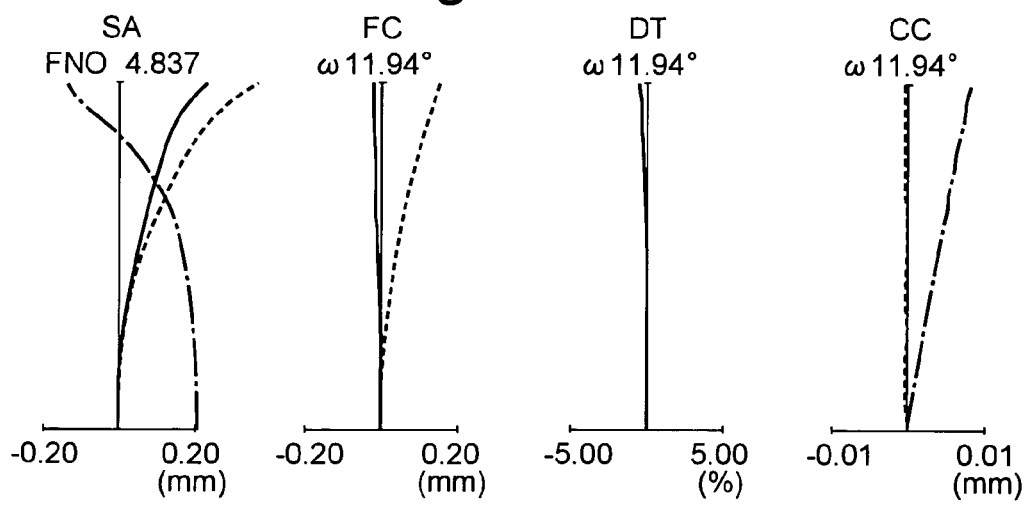
FIG. 52C is an aberration diagram in the telephoto end.
Figure 53A:
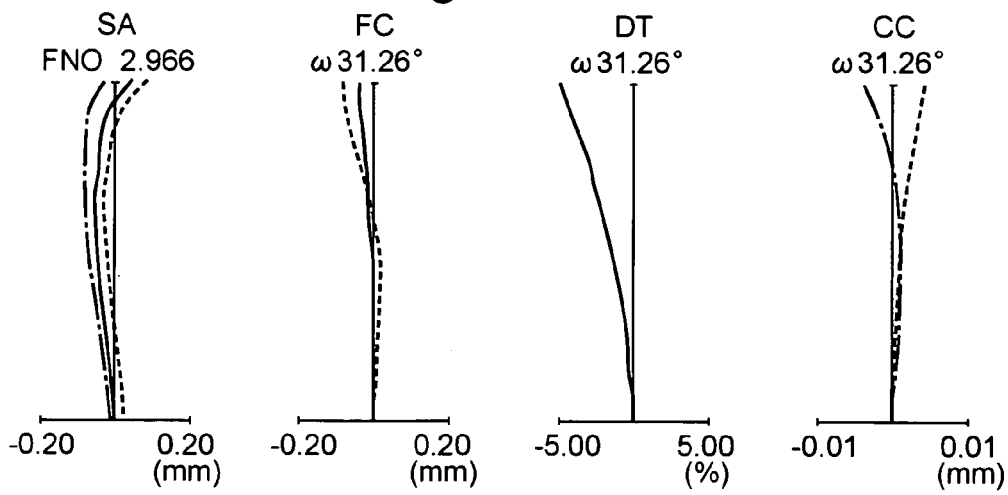
FIG. 53A is an aberration diagram of the twenty-third embodiment in the wide-angle end when focused on the infinite object.
Figure 53B:
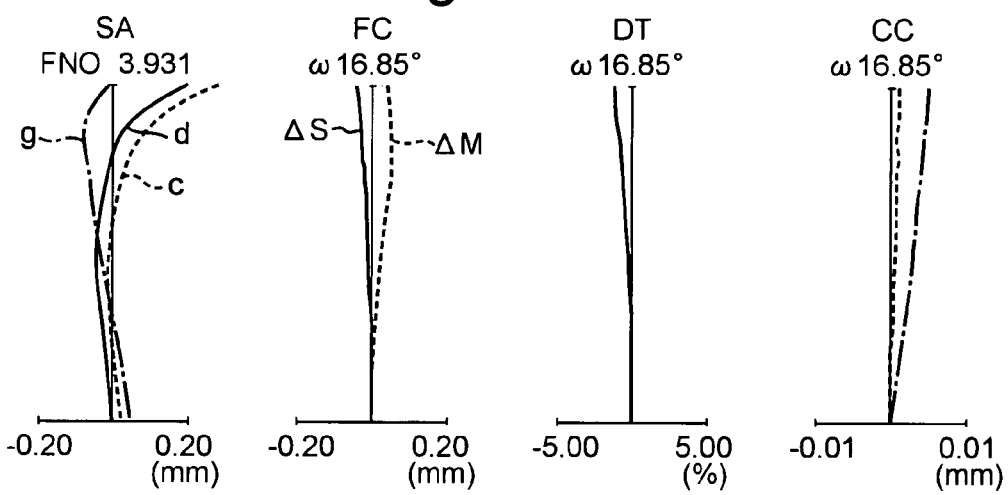
FIG. 53B is an aberration diagram in the intermediate state.
Figure 53C:
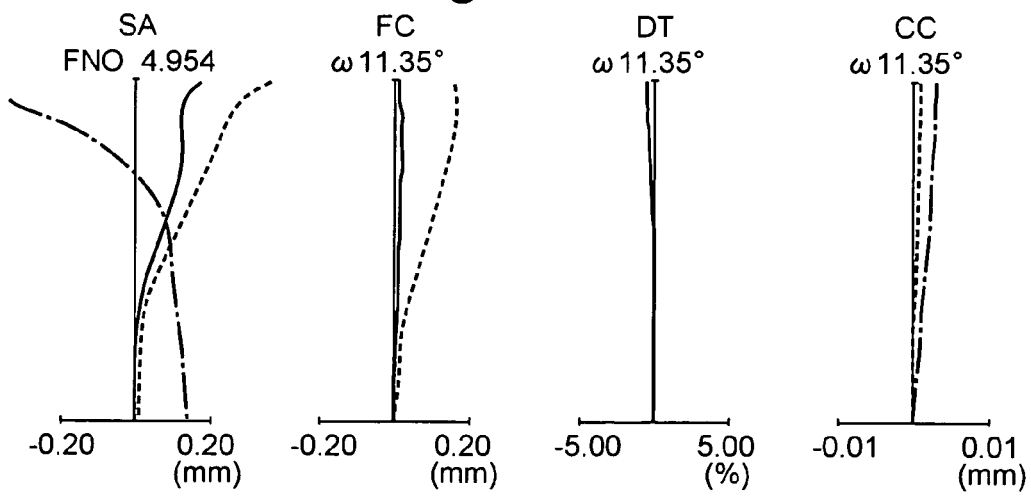
FIG. 53C is an aberration diagram in the telephoto end.

As shown in FIGS. 45A to 45C, the twenty-third embodiment is constituted of, in order from an object side, a first lens unit G1 having a negative refractive power, a second lens unit G2 having a positive refractive power and a third lens unit G3 having a positive refractive power. An aperture stop ST is disposed so that a part of the surface of the second lens unit closest to the object side is disposed in the aperture of the aperture stop. When zooming is performed from the wide-angle end to the telephoto end, the first lens unit G1 moves along a locus which is convex toward the image side, and is positioned closer to the image side in the telephoto end than in the wide-angle end. The aperture stop ST and the second lens unit G2 integrally monotonously move toward the object side while reducing the space between the second lens unit and the first lens unit G1. The third lens unit G3 moves toward the object side while enlarging the space between the third lens unit and the second lens unit G2. Focusing is performed by moving the third lens unit G3 in the optical-axis direction.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a positive meniscus lens whose convex surface faces the object side. The third lens unit G3 is constituted of one double-convex positive lens. The aperture stop ST is positioned on the image side of the vertex of the surface of the cemented triplet of the second lens unit G2 closest to the object side. It is to be noted that the lens element of the third lens unit G3 is made of plastic.

Aspherical surfaces are used on four surfaces including the image-side surface of the negative meniscus lens of the first lens unit G1; the surfaces of the cemented triplet of the second lens unit G2 closest to the object side and the image side; and the object-side surface of the double-convex positive lens of the third lens unit G3.

There will be described hereinafter numerical data of the above embodiments. In addition to the above-described symbols, f is a focal length of the zoom lens system, $F_{NO}$ is the F-number, $2\omega$ is an angle of field, WE is the wide-angle end, ST is the intermediate state, TE is the telephoto end, $r_1$, $r_2$ ... are paraxial radii of curvature of the lens surfaces, $d_1$, $d_2$ ... are spaces between the lens surfaces, $n_{d1}$, $n_{d2}$ ... are refractive indices of the lenses for the wavelength of d-line, and $V_{d1}$, $V_{d2}$ ... are Abbe numbers of the lenses. After the data of the paraxial radius of curvature, (AS) indicates that the surface is an aspherical surface, (ST) indicates that the surface is an aperture stop and (I) indicates that the surface is an image surface. It is to be noted that the shape of an aspherical surface is represented by the following equation in the coordinate system in which the intersection of the aspherical surface and the optical axis is set as an origin, the optical axis is set as an x-axis whose positive direction is coincide with the light traveling direction, and an arbitrary axis which passes the origin and is perpendicular to the x-axis is set as a y-axis:

$$x=(y^2/r)/[1+\{1-(K+1)(y/r)^2\}^{1/2}]+A_4 \cdot y^4+A_6 \cdot y^6+A_8 \cdot y^8+A_{10} \cdot y^{10},$$

wherein r is a paraxial radius of curvature, K is a conic constant, and $A_4$, $A_6$, $A_8$ and $A_{10}$ are 4-th, 6-th, 8-th, and 10-th order aspherical surface coefficients.

Sixteenth embodiment

| | | | |
|---|---|---|---|
| $r_1 = 23.249$ | $d_1 = 1.00$ | $n_{d1} = 1.80610$ | $V_{d1} = 40.92$ |
| $r_2 = 4.545(AS)$ | $d_2 = 1.68$ | | |
| $r_3 = 6.745$ | $d_3 = 1.62$ | $n_{d2} = 2.00069$ | $V_{d2} = 25.46$ |
| $r_4 = 10.000$ | $d_4 = $ variable | | |
| $r_5 = \infty$ (ST) | $d_5 = -0.50$ | | |
| $r_6 = 4.591(AS)$ | $d_6 = 1.98$ | $n_{d3} = 1.80610$ | $V_{d3} = 40.92$ |
| $r_7 = 50.000$ | $d_7 = 0.55$ | $n_{d4} = 1.74000$ | $V_{d4} = 28.30$ |
| $r_8 = 3.147$ | $d_8 = 1.75$ | $n_{d5} = 1.58313$ | $V_{d5} = 59.38$ |
| $r_9 = 8.300(AS)$ | $d_9 = $ variable | | |
| $r_{10} = 11.436(AS)$ | $d_{10} = 1.20$ | $n_{d6} = 1.52511$ | $V_{d6} = 56.22$ |
| $r_{11} = 85.514$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (I) | | | |

Aspherical Surface Coefficient

TABLE 33

| | 2nd surface | 6th surface | 9th surface | 10th surface |
|---|---|---|---|---|
| K | −1.069 | −1.111 | 0.000 | 0.000 |
| $A_4$ | $9.82367 \times 10^{-4}$ | $1.36092 \times 10^{-3}$ | $3.53310 \times 10^{-3}$ | $-2.73474 \times 10^{-4}$ |
| $A_6$ | $6.13229 \times 10^{-6}$ | $2.46840 \times 10^{-5}$ | $2.64589 \times 10^{-4}$ | $2.44609 \times 10^{-5}$ |
| $A_8$ | $4.16082 \times 10^{-7}$ | $1.69262 \times 10^{-6}$ | $2.99098 \times 10^{-5}$ | 0 |
| $A_{10}$ | $-1.47859 \times 10^{-9}$ | $-1.16420 \times 10^{-7}$ | $2.87001 \times 10^{-6}$ | 0 |

Zoom Data (∞)

TABLE 34

| | WE | ST | TE |
|---|---|---|---|
| f (mm) | 6.62 | 12.74 | 19.12 |
| $F_{NO}$ | 3.44 | 4.57 | 5.76 |
| 2ω(°) | 62.35 | 33.53 | 22.54 |
| $d_4$ | 12.85 | 4.04 | 0.90 |
| $d_9$ | 3.39 | 3.50 | 4.15 |
| $d_{11}$ | 5.08 | 9.49 | 13.99 |

Seventeenth embodiment

| | | | |
|---|---|---|---|
| $r_1 = 23.044$ | $d_1 = 1.00$ | $n_{d1} = 1.80610$ | $V_{d1} = 40.92$ |
| $r_2 = 4.637(AS)$ | $d_2 = 1.67$ | | |
| $r_3 = 6.786$ | $d_3 = 1.58$ | $n_{d2} = 2.00069$ | $V_{d2} = 25.46$ |
| $r_4 = 10.000$ | $d_4 = $ variable | | |
| $r_5 = \infty$ (ST) | $d_5 = -0.50$ | | |
| $r_6 = 4.414(AS)$ | $d_6 = 2.63$ | $n_{d3} = 1.74320$ | $V_{d3} = 49.34$ |
| $r_7 = 10.000$ | $d_7 = 0.50$ | $n_{d4} = 1.80518$ | $V_{d4} = 25.42$ |
| $r_8 = 3.572$ | $d_8 = 1.06$ | $n_{d5} = 1.58313$ | $V_{d5} = 59.38$ |
| $r_9 = 9.779(AS)$ | $d_9 = $ variable | | |
| $r_{10} = 12.767(AS)$ | $d_{10} = 1.20$ | $n_{d6} = 1.52511$ | $V_{d6} = 56.22$ |
| $r_{11} = 450.005$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (I) | | | |

Aspherical Surface Coefficient

TABLE 35

| | 2nd surface | 6th surface | 9th surface | 10th surface |
|---|---|---|---|---|
| K | −1.086 | −0.954 | 0.000 | 0.000 |
| $A_4$ | $9.62928 \times 10^{-4}$ | $1.31409 \times 10^{-3}$ | $3.73309 \times 10^{-3}$ | $-2.15582 \times 10^{-4}$ |
| $A_6$ | $5.95705 \times 10^{-6}$ | $2.98474 \times 10^{-5}$ | $5.31664 \times 10^{-4}$ | $2.64093 \times 10^{-5}$ |
| $A_8$ | $3.29554 \times 10^{-7}$ | $4.67221 \times 10^{-6}$ | $-3.88576 \times 10^{-5}$ | 0 |
| $A_{10}$ | $1.16736 \times 10^{-9}$ | $-3.77040 \times 10^{-7}$ | $1.32383 \times 10^{-5}$ | 0 |

Zoom Data (∞)

TABLE 36

| | WE | ST | TE |
|---|---|---|---|
| f (mm) | 6.61 | 12.69 | 19.12 |
| $F_{No}$ | 3.48 | 4.60 | 5.79 |
| 2ω(°) | 62.44 | 33.68 | 22.55 |
| $d_4$ | 13.28 | 4.15 | 0.90 |
| $d_9$ | 3.16 | 3.09 | 3.96 |
| $d_{11}$ | 5.29 | 9.64 | 13.97 |

Eighteenth embodiment

| | | | |
|---|---|---|---|
| $r_1 = 157.020$ | $d_1 = 1.00$ | $n_{d1} = 1.80610$ | $V_{d1} = 40.92$ |
| $r_2 = 4.547(AS)$ | $d_2 = 1.05$ | | |
| $r_3 = 6.272$ | $d_3 = 2.20$ | $n_{d2} = 1.80810$ | $V_{d2} = 22.76$ |
| $r_4 = 13.255$ | $d_4 = $ variable | | |
| $r_5 = \infty$ (ST) | $d_5 = -0.45$ | | |
| $r_6 = 3.721(AS)$ | $d_6 = 1.40$ | $n_{d3} = 1.74320$ | $V_{d3} = 49.34$ |
| $r_7 = -7358.609$ | $d_7 = 0.50$ | $n_{d4} = 1.68893$ | $V_{d4} = 31.07$ |
| $r_8 = 3.002$ | $d_8 = 1.19$ | $n_{d5} = 1.51633$ | $V_{d5} = 64.14$ |
| $r_9 = 6.657(AS)$ | $d_9 = $ variable | | |
| $r_{10} = 11.922(AS)$ | $d_{10} = 1.10$ | $n_{d6} = 1.52511$ | $V_{d6} = 56.23$ |
| $r_{11} = 30423.657(AS)$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.49$ | | |
| $r_{16} = \infty$ (I) | | | |

Aspherical Surface Coefficient

TABLE 37-1

| | 2nd surface | 6th surface | 9th surface | 10th surface |
|---|---|---|---|---|
| K | −0.273 | −0.978 | 0.000 | 0.000 |
| $A_4$ | $-4.57253 \times 10^{-5}$ | $2.62235 \times 10^{-3}$ | $7.42985 \times 10^{-3}$ | $5.04258 \times 10^{-4}$ |
| $A_6$ | $-8.76429 \times 10^{-6}$ | $5.71552 \times 10^{-5}$ | $6.75400 \times 10^{-4}$ | $2.09830 \times 10^{-4}$ |
| $A_8$ | $2.14403 \times 10^{-8}$ | $1.38662 \times 10^{-5}$ | $1.92625 \times 10^{-4}$ | $1.45376 \times 10^{-5}$ |
| $A_{10}$ | $-2.20356 \times 10^{-8}$ | $-7.25720 \times 10^{-8}$ | $1.93182 \times 10^{-5}$ | $2.75747 \times 10^{-6}$ |

TABLE 37-2

| | 11th surface |
|---|---|
| K | 0.000 |
| $A_4$ | $4.21538 \times 10^{-4}$ |
| $A_6$ | $1.53746 \times 10^{-4}$ |
| $A_8$ | $4.60241 \times 10^{-6}$ |
| $A_{10}$ | $4.35430 \times 10^{-6}$ |

Zoom Data (∞)

TABLE 38

|  | WE | ST | TE |
|---|---|---|---|
| f (mm) | 5.96 | 9.94 | 17.14 |
| $F_{NO}$ | 3.41 | 4.28 | 5.79 |
| 2ω(°) | 72.71 | 43.42 | 25.23 |
| $d_4$ | 10.66 | 4.78 | 0.95 |
| $d_9$ | 2.66 | 3.12 | 3.06 |
| $d_{11}$ | 5.40 | 8.27 | 13.96 |

Nineteenth embodiment

| $r_1 = -2679.606$ | $d_1 = 1.00$ | $n_{d1} = 1.80610$ | $V_{d1} = 40.92$ |
|---|---|---|---|
| $r_2 = 3.719$(AS) | $d_2 = 1.02$ | | |
| $r_3 = 5.756$ | $d_3 = 2.10$ | $n_{d2} = 1.84666$ | $V_{d2} = 23.78$ |
| $r_4 = 13.814$ | $d_4$ = variable | | |
| $r_5 = \infty$ (ST) | $d_5 = -0.50$ | | |
| $r_6 = 3.765$(AS) | $d_6 = 1.00$ | $n_{d3} = 1.80610$ | $V_{d3} = 40.92$ |
| $r_7 = 15.152$ | $d_7 = 0.50$ | $n_{d4} = 1.76182$ | $V_{d4} = 26.52$ |
| $r_8 = 3.002$ | $d_8 = 1.88$ | $n_{d5} = 1.51633$ | $V_{d5} = 64.14$ |
| $r_9 = 12.981$(AS) | $d_9$ = variable | | |
| $r_{10} = 6.725$(AS) | $d_{10} = 1.00$ | $n_{d6} = 1.52511$ | $V_{d6} = 56.23$ |
| $r_{11} = 13.188$(AS) | $d_{11}$ = variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.37$ | | |
| $r_{16} = \infty$ (I) | | | |

Aspherical Surface Coefficient

TABLE 39-1

|  | 2nd surface | 6th surface | 9th surface | 10th surface |
|---|---|---|---|---|
| K | −0.809 | −0.759 | 0.000 | 0.000 |
| $A_4$ | $8.14420 \times 10^{-4}$ | $1.33919 \times 10^{-3}$ | $2.77245 \times 10^{-3}$ | $-2.56927 \times 10^{-3}$ |
| $A_6$ | $2.31684 \times 10^{-6}$ | $7.55420 \times 10^{-5}$ | $6.32079 \times 10^{-4}$ | $-1.07060 \times 10^{-4}$ |
| $A_8$ | $-2.63770 \times 10^{-8}$ | $1.15979 \times 10^{-6}$ | $-5.51581 \times 10^{-5}$ | $2.26819 \times 10^{-5}$ |
| $A_{10}$ | 0 | $3.88227 \times 10^{-7}$ | $2.88512 \times 10^{-5}$ | $9.93781 \times 10^{-7}$ |

TABLE 39-2

|  | 11th surface |
|---|---|
| K | 0.000 |
| $A_4$ | $-3.97145 \times 10^{-4}$ |
| $A_6$ | $-1.29520 \times 10^{-5}$ |
| $A_8$ | $-1.87201 \times 10^{-6}$ |
| $A_{10}$ | $2.25706 \times 10^{-6}$ |

Zoom Data (∞)

TABLE 40

|  | WE | ST | TE |
|---|---|---|---|
| f (mm) | 5.23 | 10.00 | 15.17 |
| $F_{NO}$ | 3.37 | 4.57 | 5.90 |
| 2ω(°) | 79.23 | 42.60 | 28.30 |
| $d_4$ | 8.86 | 3.04 | 0.90 |
| $d_9$ | 2.16 | 1.72 | 1.50 |
| $d_{11}$ | 4.93 | 9.12 | 13.44 |

Twentieth embodiment

| $r_1 = -90.942$ | $d_1 = 1.00$ | $n_{d1} = 1.80610$ | $V_{d1} = 40.92$ |
|---|---|---|---|
| $r_2 = 7.169$(AS) | $d_2 = 1.83$ | | |
| $r_3 = 10.422$ | $d_3 = 2.00$ | $n_{d2} = 1.92286$ | $V_{d2} = 20.88$ |
| $r_4 = 19.732$ | $d_4$ = variable | | |
| $r_5 = \infty$ (ST) | $d_5 = -0.60$ | | |
| $r_6 = 5.900$(AS) | $d_6 = 2.79$ | $n_{d3} = 1.80610$ | $V_{d3} = 40.92$ |
| $r_7 = -12.401$ | $d_7 = 0.50$ | $n_{d4} = 1.84666$ | $V_{d4} = 23.78$ |
| $r_8 = 10.000$ | $d_8 = 2.53$ | $n_{d5} = 1.56384$ | $V_{d5} = 60.67$ |
| $r_9 = 9.115$(AS) | $d_9$ = variable | | |
| $r_{10} = 8.153$(AS) | $d_{10} = 1.60$ | $n_{d6} = 1.52542$ | $V_{d6} = 55.78$ |
| $r_{11} = 21.385$ | $d_{11}$ = variable | | |
| $r_{12} = \infty$ | $d_{12} = 0.60$ | $n_{d7} = 1.51633$ | $V_{d7} = 64.14$ |
| $r_{13} = \infty$ | $d_{13} = 0.60$ | | |
| $r_{14} = \infty$ | $d_{14} = 0.60$ | $n_{d8} = 1.51633$ | $V_{d8} = 64.14$ |
| $r_{15} = \infty$ | $d_{15} = 0.54$ | | |
| $r_{16} = \infty$ (I) | | | |

Aspherical Surface Coefficient

TABLE 41

|  | 2nd surface | 6th surface | 9th surface | 10th surface |
|---|---|---|---|---|
| K | 0.030 | −0.049 | 2.486 | −0.687 |
| $A_4$ | $-1.16119 \times 10^{-4}$ | $-2.15050 \times 10^{-5}$ | $1.57249 \times 10^{-3}$ | $-2.13415 \times 10^{-4}$ |
| $A_6$ | $-5.00701 \times 10^{-6}$ | $-1.31222 \times 10^{-6}$ | $5.61721 \times 10^{-5}$ | $-1.43124 \times 10^{-7}$ |
| $A_8$ | $7.43004 \times 10^{-8}$ | $3.25383 \times 10^{-7}$ | $9.99343 \times 10^{-6}$ | $1.44820 \times 10^{-6}$ |
| $A_{10}$ | $-3.22200 \times 10^{-9}$ | $-1.30109 \times 10^{-8}$ | $3.83442 \times 10^{-7}$ | 0 |

Zoom Data (∞)

TABLE 42

|  | WE | ST | TE |
|---|---|---|---|
| f (mm) | 7.29 | 8.94 | 21.00 |
| $F_{NO}$ | 2.85 | 3.09 | 4.80 |
| 2ω(°) | 73.61 | 58.94 | 24.72 |
| $d_4$ | 14.35 | 10.58 | 1.00 |
| $d_9$ | 2.73 | 2.77 | 2.56 |
| $d_{11}$ | 6.26 | 7.49 | 16.62 |

Twenty-first embodiment

| $r_1 = -120.395$ | $d_1 = 1.00$ | $n_{d1} = 1.80610$ | $V_{d1} = 40.92$ |
|---|---|---|---|
| $r_2 = 7.653$(AS) | $d_2 = 1.60$ | | |
| $r_3 = 10.272$ | $d_3 = 1.60$ | $n_{d2} = 1.92286$ | $V_{d2} = 20.88$ |
| $r_4 = 19.021$ | $d_4$ = variable | | |
| $r_5 = \infty$ (ST) | $d_5 = -0.60$ | | |
| $r_6 = 0.092$(AS) | $d_6 = 2.70$ | $n_{d3} = 1.80610$ | $V_{d3} = 40.92$ |
| $r_7 = -8.957$ | $d_7 = 0.50$ | $n_{d4} = 1.67270$ | $V_{d4} = 32.10$ |
| $r_8 = 3.826$ | $d_8 = 2.00$ | $n_{d5} = 1.49700$ | $V_{d5} = 81.54$ |
| $r_9 = 9.512$(AS) | $d_9$ = variable | | |
| $r_{10} = 14.529$ | $d_{10} = 1.60$ | $n_{d6} = 1.51633$ | $V_{d6} = 64.14$ |
| $r_{11} = 507.947$ | $d_{11}$ = variable | | |
| $r_{12} = \infty$ | $d_{12} = 0.60$ | $n_{d7} = 1.51633$ | $V_{d7} = 64.14$ |
| $r_{13} = \infty$ | $d_{13} = 0.60$ | | |
| $r_{14} = \infty$ | $d_{14} = 0.60$ | $n_{d8} = 1.51633$ | $V_{d8} = 64.14$ |
| $r_{15} = \infty$ | $d_{15} = 0.53$ | | |
| $r_{16} = \infty$ (I) | | | |

Aspherical Surface Coefficient

TABLE 43

|   | 2nd surface | 6th surface | 9th surface |
|---|---|---|---|
| K | −0.481 | −0.117 | −0.377 |
| $A_4$ | $5.33432 \times 10^{-5}$ | $-9.87240 \times 10^{-5}$ | $1.63400 \times 10^{-3}$ |
| $A_6$ | $1.31789 \times 10^{-6}$ | $-5.15054 \times 10^{-6}$ | $3.97670 \times 10^{-5}$ |
| $A_8$ | $-1.87256 \times 10^{-8}$ | $1.80533 \times 10^{-7}$ | $2.09267 \times 10^{-6}$ |
| $A_{10}$ | $-4.79094 \times 10^{-11}$ | $-2.13356 \times 10^{-8}$ | $1.70358 \times 10^{-7}$ |

Zoom Data (∞)

TABLE 44

|   | WE | ST | TE |
|---|---|---|---|
| f (mm) | 7.79 | 13.20 | 22.41 |
| $F_{NO}$ | 2.85 | 3.54 | 4.73 |
| 2ω(°) | 69.06 | 39.58 | 23.41 |
| $d_4$ | 15.60 | 6.42 | 1.00 |
| $d_9$ | 3.96 | 4.68 | 7.13 |
| $d_{11}$ | 6.15 | 9.71 | 15.76 |

Twenty-second embodiment

| $r_1 = -55.947$ | $d_1 = 0.90$ | $n_{d1} = 1.80610$ | $V_{d1} = 40.92$ |
| $r_2 = 6.646$(AS) | $d_2 = 1.62$ | | |
| $r_3 = 11.161$ | $d_3 = 1.82$ | $n_{d2} = 2.00069$ | $V_{d2} = 25.46$ |
| $r_4 = 30.512$ | $d_4 =$ variable | | |
| $r_5 = \infty$ (ST) | $d_5 = -0.67$ | | |
| $r_6 = 5.808$(AS) | $d_6 = 3.51$ | $n_{d3} = 1.74320$ | $V_{d3} = 49.34$ |
| $r_7 = 16.319$ | $d_7 = 0.60$ | $n_{d4} = 1.84666$ | $V_{d4} = 23.78$ |
| $r_8 = 5.200$ | $d_8 = 1.36$ | $n_{d5} = 1.58313$ | $V_{d5} = 59.38$ |
| $r_9 = 26.430$(AS) | $d_9 =$ variable | | |
| $r_{10} = 24.745$(AS) | $d_{10} = 1.24$ | $n_{d6} = 1.52542$ | $V_{d6} = 55.78$ |
| $r_{11} = 7929.558$ | $d_{11} =$ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.45$ | | |
| $r_{16} = \infty$ (I) | | | |

Aspherical Surface Coefficient

TABLE 45

|   | 2nd surface | 6th surface | 9th surface | 10th surface |
|---|---|---|---|---|
| K | −3.702 | −2.011 | 0.000 | 0.000 |
| $A_4$ | $1.29210 \times 10^{-3}$ | $1.29270 \times 10^{-3}$ | $1.94125 \times 10^{-3}$ | $-1.01517 \times 10^{-4}$ |
| $A_6$ | $-2.94031 \times 10^{-5}$ | $-8.81428 \times 10^{-6}$ | $3.03189 \times 10^{-5}$ | $5.70765 \times 10^{-6}$ |
| $A_8$ | $6.63852 \times 10^{-7}$ | $1.57107 \times 10^{-6}$ | $1.16357 \times 10^{-5}$ | 0 |
| $A_{10}$ | $-7.48401 \times 10^{-9}$ | $-3.88466 \times 10^{-8}$ | $1.55401 \times 10^{-7}$ | 0 |

Zoom Data (∞)

TABLE 46

|   | WE | ST | TE |
|---|---|---|---|
| f (mm) | 7.51 | 14.60 | 21.63 |
| $F_{NO}$ | 2.88 | 3.86 | 4.84 |
| 2ω(°) | 70.01 | 35.27 | 23.89 |
| $d_4$ | 15.42 | 4.74 | 1.07 |
| $d_9$ | 4.10 | 4.19 | 4.41 |
| $d_{11}$ | 6.29 | 11.60 | 16.79 |

Twenty-third embodiment

| $r_1 = 50.852$ | $d_1 = 0.90$ | $n_{d1} = 1.80610$ | $V_{d1} = 40.92$ |
| $r_2 = 5.799$(AS) | $d_2 = 1.89$ | | |
| $r_3 = 9.201$ | $d_3 = 1.76$ | $n_{d2} = 2.00069$ | $V_{d2} = 25.46$ |
| $r_4 = 16.258$ | $d_4 =$ variable | | |
| $r_5 = \infty$ (ST) | $d_5 = -0.60$ | | |
| $r_6 = 5.636$(AS) | $d_6 = 2.63$ | $n_{d3} = 1.74320$ | $V_{d3} = 49.34$ |
| $r_7 = 11.974$ | $d_7 = 1.71$ | $n_{d4} = 1.80518$ | $V_{d4} = 25.42$ |
| $r_8 = 4.090$ | $d_8 = 1.25$ | $n_{d5} = 1.58313$ | $V_{d5} = 59.38$ |
| $r_9 = 13.539$(AS) | $d_9 =$ variable | | |
| $r_{10} = 18.182$(AS) | $d_{10} = 1.50$ | $n_{d6} = 1.52542$ | $V_{d6} = 55.78$ |
| $r_{11} = -61.937$ | $d_{11} =$ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.47$ | | |
| $r_{16} = \infty$ (I) | | | |

Aspherical Surface Coefficient

TABLE 47

|   | 2nd surface | 6th surface | 9th surface | 10th surface |
|---|---|---|---|---|
| K | −1.118 | −0.831 | 0.000 | 0.000 |
| $A_4$ | $4.40772 \times 10^{-4}$ | $5.53954 \times 10^{-4}$ | $1.86701 \times 10^{-3}$ | $-7.43754 \times 10^{-5}$ |
| $A_6$ | $-1.79165 \times 10^{-7}$ | $-6.08508 \times 10^{-7}$ | $9.48986 \times 10^{-5}$ | $7.82756 \times 10^{-6}$ |
| $A_8$ | $6.84992 \times 10^{-8}$ | $1.25836 \times 10^{-6}$ | $-1.36654 \times 10^{-7}$ | 0 |
| $A_{10}$ | $-4.27115 \times 10^{-10}$ | $-3.07335 \times 10^{-8}$ | $1.56679 \times 10^{-6}$ | 0 |

Zoom Data (∞)

TABLE 48

|   | WE | ST | TE |
|---|---|---|---|
| f (mm) | 7.90 | 15.23 | 22.84 |
| $F_{NO}$ | 2.97 | 3.93 | 4.95 |
| 2ω(°) | 62.52 | 33.69 | 22.70 |
| $d_4$ | 16.00 | 4.96 | 1.00 |
| $d_9$ | 3.47 | 3.89 | 5.15 |
| $d_{11}$ | 7.21 | 12.48 | 17.95 |

FIGS. 46A to 53C show aberration diagrams of the above sixteenth to twenty-third embodiments when focused on the infinite object. In these aberration diagrams, FIGS. 46A, 47A, 48A . . . show aberrations in the wide-angle end, FIGS. 46B, 47B, 48B . . . show aberrations in the intermediate state, and FIGS. 46C, 47C, 48C . . . show aberrations in the telephoto end. In the drawings, SA is a spherical aberration, FC is an astigmatism, DT is a distortion and CC is a chromatic aberration of magnification. In the drawings, "ω" is a half angle of field (°).

Next, there will be described hereinafter values of the conditions (1C) to (9C) of the embodiments.

TABLE 49

| Embodiment | 16 | 17 | 18 | 19 | 20 | 21 | 22 | 23 |
|---|---|---|---|---|---|---|---|---|
| (1C) | 2.18 | 2.27 | 3.56 | 3.67 | 3.34 | 3.12 | 5.25 | 2.88 |
| (2C) | 0.73 | 0.77 | 0.56 | 1.93 | 1.12 | 0.65 | 1.07 | 0.74 |
| (3C) | 2.001 | 2.001 | 1.816 | 1.847 | 1.923 | 1.923 | 2.001 | 2.001 |
| (4C) | 0.12 | 0.12 | 0.07 | −0.13 | −0.02 | 0.41 | 0.04 | 0.21 |
| (5C) | 1.58 | 1.56 | 1.63 | 1.69 | 1.63 | 1.63 | 1.60 | 1.62 |
| (6C) | 3.78 | 3.78 | 3.80 | 4.74 | 3.30 | 3.71 | 6.29 | 3.41 |
| (7C) | −1.80 | −1.87 | −1.63 | −1.52 | −1.83 | −1.87 | −1.91 | −1.90 |
| (8C) | 1.35 | 1.31 | 1.44 | 1.64 | 1.42 | 1.23 | 1.41 | 1.37 |
| (9C) | 2.89 | 2.89 | 2.88 | 2.90 | 2.88 | 2.88 | 2.88 | 2.89 |

When each of the zoom lens systems of the first to twenty-third embodiments is used as an image pickup lens system of an image pickup apparatus including an electronic image sensor, the distortion remaining in an optical image of an object formed by the zoom lens system can electrically be corrected by digital signal processing (digital correction). Here, there will be described the basic concept in the case where the distortion of the optical image is digitally corrected.

Figure 54:
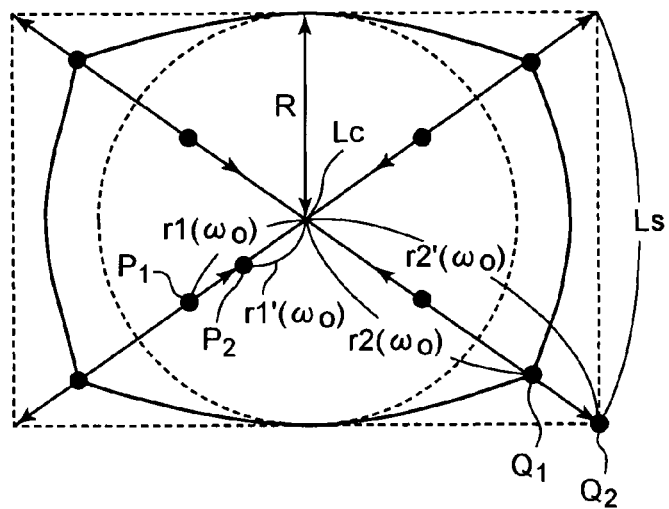
FIG. 54 is an explanatory view of the basic concept for digitally correcting the distortion of an image.
Figure 55:
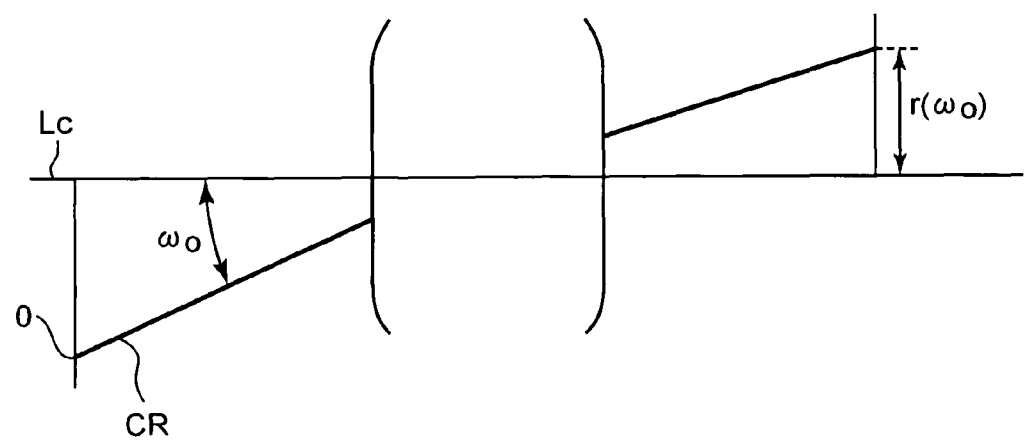
FIG. 55 is a diagram showing the relation between an image height and a half angle of field of an object.

For example, as shown in FIG. 54, assuming that a circle having a radius R (image height R) is on the image pickup surface whose center is at the intersection of the optical axis Lc and the image pickup surface and which is tangent to the long sides of the effective image pickup region (a region on the image pickup surface where the image pickup is possible). The magnification in each point on the circumference of the circle is fixed and the each point is regarded as a reference of the correction. Each point on the circumference of another circle having an arbitrary radius $r(\omega o)$ (image height $r(\omega o)$) is moved in a substantially radial direction, and moved concentrically so as to obtain a radius $r'((\omega o)$, thereby correcting the distortion of the optical image. For example, in FIG. 54, a point P1 on the circumference of an arbitrary circle having a radius r1 ($\omega o$), positioned inside the circle having the radius R, is directed toward the center of the circle, and moved to a point P2 on the circumference of a circle having a radius r1'($\omega o$). A point Q1 on the circumference of a circle having an arbitrary radius r2 ($\omega o$), positioned outside the circle having the radius R, is directed in the direction distant from the center of the circle, and moved to a point Q2 on the circumference of a circle having a radius r2'($\omega o$)). Here, $r'(\omega o)$ can be represented as follows:

$$r'(\omega o) = \alpha \cdot f \tan \omega o (0 \leq \alpha \leq 1),$$

wherein f is a focal length of the image forming optical system (zoom lens system), and $\omega o$ is a half angle of view of the object. Here, as shown in FIG. 55, the half angle of view of the object is an angle of a chief ray CR from an object point O with respect to the optical axis Lc, the object point corresponding to an image point formed in a position of a height r from the center of the image pickup surface.

Here, assuming that an ideal image height of the point on the circumference of the circle having the radius R (image height R) is Y, the following results:

$$\alpha = R/Y = R/(f \tan \omega)).$$

The optical system is ideally rotationally symmetric with respect to the optical axis. Therefore, the distortion is also generated rotationally symmetrically with respect to the optical axis. Therefore, to electrically correct the optically generated distortion, the magnification is fixed on the circumference of the circle having the radius R which is tangent to the long sides of the effective image pickup region and whose center is at a point corresponding to the intersection of the optical axis Lc and the image pickup surface in the image to be reproduced, and the points on the circumference of the other circle having the radius $r(\omega o)$ are concentrically moved to the position of the radius $r'(\omega o)$ in the radial direction, as described above. If the distortion can thus be corrected, the method of correcting distortion is considered to be advantageous in view of the data amount and the calculation amount.

However, when the optical image is picked up by the electronic image sensor, the image is no longer indicated with a continuous amount due to the sampling by the pixels of the image sensor. Therefore, the circle having the radius R virtually drawn on the optical image is not strictly a correct circle as long as pixels are not radially arranged on the image pickup surface of the electronic image sensor. That is, in the shape correction of an image given as a set of data obtained from discrete coordinate points (pixels of the electronic image sensor), any circle on which the magnification can be fixed as described above does not exist. Therefore, it is preferable to use a method of determining the coordinate (Xi', Yj') of the position for each pixel (which is at a point of coordinate (Xi, Yj)) to which the pixel is to be moved for shape correction. It is to be noted that when a plurality of pixels move to one coordinate (Xi', Yj') position, an average value of data of the plurality of pixels is taken. With respect to a position where there is not any moved pixel, interpolation is performed using data values of several peripheral pixels having data because the pixels have been moved. In consequence, the data of the position is prepared.

Such a method is effective for the correction in a case where the points on the optical image whose magnification has to be fixed are not arranged on the circumference centering on the optical axis, and become asymmetric with respect to the optical axis owing to manufacturing errors of the optical system or the electronic image sensor in the electronic image pickup apparatus including the zoom lens system.

In the electronic image pickup apparatus which performs such correction, in order to calculate a correction amount $r'(\omega o) - r(\omega o)$, data indicating $r(\omega o)$ which includes the relation between the half angle of view of the object and the image height, or data indicating the relation between the actual image height r, the ideal image height r' and the coefficient $\alpha$ may be recorded in the recording medium incorporated in the electronic image pickup apparatus.

It is to be noted that the image having the distortion corrected preferably satisfy the following condition so that the quantity of light is not excessively insufficient in opposite ends in a short-side direction.

$$0 \leq R \leq 0.6LS,$$

wherein LS is a length of a short side of the effective image pickup surface.

It is more preferable that the radius R satisfies the following condition:

$$0.3LS \leq R \leq 0.6LS.$$

Furthermore, it is most advantageous that the radius R substantially agrees with the radius of the inscribed circle in the short-side direction of the effective image pickup surface. It is to be noted that in the correction in a case where the magnification is fixed in the vicinity of the radius R=0, that is, in the vicinity of the optical axis, the region to be extended in the radial direction increases. This is slightly disadvantageous in the viewpoint of the number of the pixels, but it is possible to secure the effect that even the zoom lens system having a wide angle can be minimized.

It is to be noted that the correction of the distortion of one image has been described above, but in the zoom lens system, when the focal length changes, the state of the distortion included in the image changes. Therefore, the focal length range between the maximum value (telephoto end) and the minimum value (wide-angle end) of the focal length where the distortion needs to be corrected is divided into several focal length zones to correct the distortion. For example, a correction amount is set so as to obtain a correction result which substantially satisfies r'(ωo)=α·f·tan ωo in the vicinity of the telephoto end (position where the focal length is maximum in each zone) of each divided focal length zone, and the distortion of the image in the zone can be corrected using this correction amount. However, in this case, in the wide-angle end (position where the focal length is minimum in each zone) in each divided focal length zone, a certain degree of barrel type distortion remains in the obtained image. To avoid this, when the number of the divided zones is increased, the amount of the data to be recorded in the recording medium for the correction increases. To solve the problem, one or several coefficients are calculated beforehand which correspond to one or several focal lengths excluding the telephoto end and the wide-angle end of each divided focal length zone. This coefficient may be determined based on simulation or measurement using an actual image pickup apparatus. Moreover, the correction amount is calculated so as to obtain the correction result which substantially satisfies r'(ωo)=α·f·tan ωo in the vicinity of the telephoto end of each divided zone, and this correction amount may be multiplied by the coefficient for each focal length to determine the correction amount of the image obtained in that focal length state.

If there is not any distortion in the optical image of the infinite object, the following results:

$f = y/\tan \omega o,$ wherein y is a height (image height) from the optical axis of the image point, f is a focal length of the image forming optical system (here the zoom lens system), and ωo is a half angle of view of the object.

If there is a barrel type distortion in the image forming optical system, the following results:

$f > y/\tan \omega o.$

That is, when the focal length f of the image forming optical system, and the image height y are constant, the value of ωo increases.

Next, there will be described an example of the image pickup apparatus to which the zoom optical system of the present invention has been applied.

Figure 56:
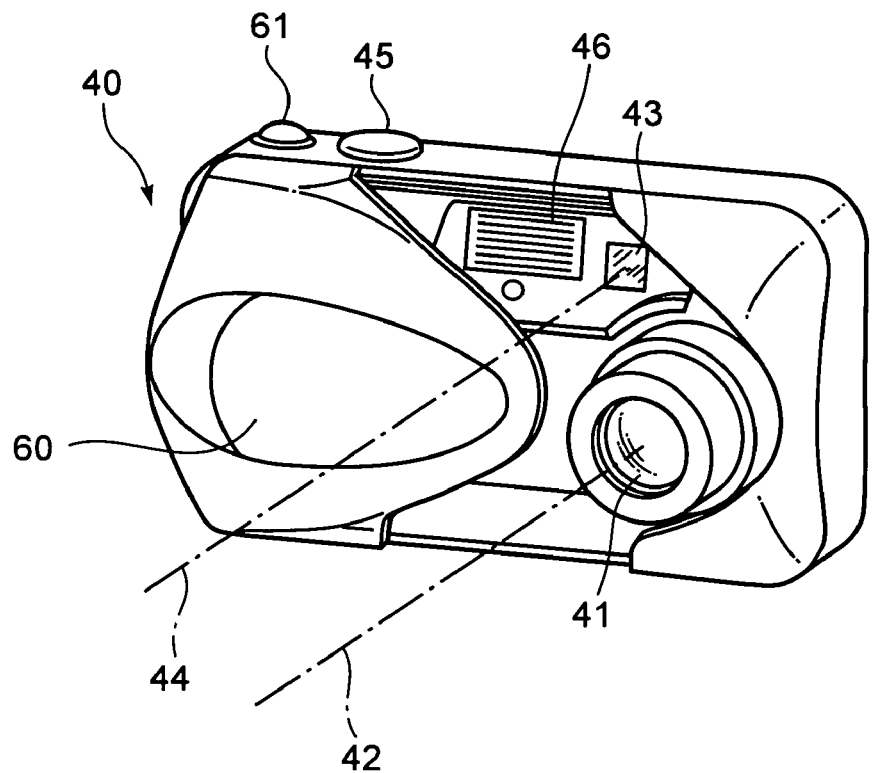
FIG. 56 is a front perspective view showing an appearance of an example of a digital camera according to the present invention.
Figure 57:
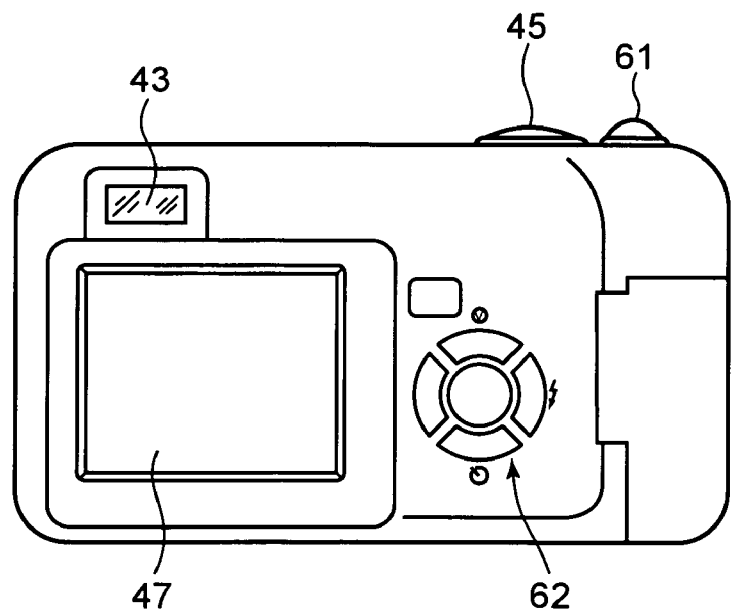
FIG. 57 is a rear view of the digital camera of FIG. 56.

FIGS. 56 to 59 are conceptual diagrams showing a constitution of a digital camera in which the above-described zoom optical system is incorporated in a photographing optical system 41. FIG. 56 is a front perspective view showing an appearance of a digital camera 40, FIG. 57 is a rear view of the digital camera, and FIG. 58 is a schematic sectional view showing an inner constitution of the digital camera 40. FIGS. 56 and 58 show a state in which a lens barrel is not collapsed in the photographing optical system 41.

The digital camera 40 includes the photographing optical system 41 positioned along a photographing optical path 42; a finder optical system 43 positioned along an optical path 44 for a finder; a shutter button 45; a flash lamp 46; a liquid crystal display monitor 47; a focal length change button 61; a camera setting change switch 62 and the like. In a case where the lens barrel of the photographing optical system 41 is collapsed, when a cover 60 is slid, the photographing optical system 41, the finder optical system 43 and the flash lamp 46 are covered with the cover 60. Moreover, when the cover 60 is opened to set the camera 40 to a photographing state, the photographing optical system 41 is brought into the non-collapsed state as shown in FIG. 57. When the shutter button 45 disposed in an upper portion of the camera 40 is pressed, the photographing is performed through the photographing optical system 41 in response to the pressed button. An object image formed by the photographing optical system 41 is formed on an image pickup surface (photoelectric conversion surface) of a CCD image sensor 49 via a cover glass C having the surface provided with a wavelength region restrictive coating. The object image received by the CCD image sensor 49 is displayed as an electronic image in the liquid crystal display monitor 47 disposed in a rear surface of the camera via processing means 51. This processing means 51 is connected to recording means 52, and the photographed electronic image can be recorded. It is to be noted that this recording means 52 may be disposed separately from or integrally with the processing means 51. As the recording means, there may be used a memory or an HDD (Hard Disc Drive) incorporated in the digital camera, or an HDD, a memory card or a DVD detachably attached to the digital camera.

Furthermore, an objective optical system 53 for the finder is disposed along the optical path 44 for the finder. The objective optical system 53 for the finder is a zoom lens system constituted of a plurality of lens units (three units in the drawing) and an image erecting prism system 55 including prisms 55a, 55b and 55c. The system is constituted so that the focal length changes in conjunction with the zoom lens system of the photographing optical system 41. The object image formed by this objective optical system 53 for the finder is formed on the view field frame 57 in the image erecting prism system 55. On the exit side of this image erecting prism system 55, an eyepiece optical system 59 is disposed which guides an erected image into the observer's eyeball E. A cover member 50 is disposed on the exit side of the eyepiece optical system 59.

As the photographing optical system 41, the zoom optical system according to the present invention is used. In FIG. 58, the zoom optical system of Example 16 shown in FIG. 38A is used, but needless to say, another example is applicable.

FIG. 59 is a block diagram of an inner circuit of the digital camera 40. It is to be noted that in the following description, the above processing means 51 includes, for example, a correlated double sampling (CDS)/analog digital conversion (ADC) section 24, a temporary storage memory 17, an image processing section 18 and the like, and the recording means 52 includes, for example, a storage medium section 19 and the like.

As shown in FIG. 59, the digital camera 40 includes an operating section 12; a control section 13 connected to the operating section 12; and an image pickup section driving circuit 16, the temporary storage memory 17, the image processing section 18, the storage medium section 19, a display section 20 and a setting information storage memory section 21 connected to control signal output ports of the control section 13 via buses 14 and 15.

The above temporary storage memory 17, the image processing section 18, the storage medium section 19, the display section 20 and the setting information storage memory section 21 are constituted so that data can be input or output mutually via a bus 22. The image pickup section driving circuit 16 is connected to the CCD image sensor 49 and the CDS/ADC section 24.

The operating section 12 includes various input buttons and switches such as a shutter release button, a camera setting change switch and a focal length change button, and is a circuit which notifies a control section of event information input from the outside (camera user) via these input buttons and switches. The control section 13 is a central processing unit, and is a circuit in which a program memory (not shown) is incorporated. In accordance with a program stored in the program memory, the circuit receives an instruction or a command input from the camera user via the operating section 12 and controls the whole digital camera 40.

The CCD image sensor 49 receives the object image formed via the photographing optical system 41. The CCD image sensor 49 is an image sensor driven and controlled by the image pickup section driving circuit 16 to convert a quantity of light of the object image for each pixel into an electric signal and output the signal to the CDS/ADC section 24.

The CDS/ADC section 24 is a circuit which amplifies the electric signal output from the CCD image sensor 49 to perform analog/digital conversion. The circuit outputs, to the temporary storage memory 17, video bare data (hereinafter referred to as the raw data) subjected to this amplification and digital conversion only.

The temporary storage memory 17 is a buffer constituted of, for example, an SDRAM or the like, and is a memory unit in which the raw data output from the CDS/ADC section 24 is temporarily stored. The image processing section 18 is a circuit which reads out the raw data stored in the temporary storage memory 17 or the storage medium section 19 to electrically perform various types of image processing including distortion correction based on an image quality parameter designated from the control section 13.

The recording medium section 19 is a control circuit of, for example, a device to which a card or stick type recording medium including a flash memory and the like is detachably attached and which records and retains, in the card or stick type flash memory, the raw data transferred from the temporary storage memory 17 and the image data obtained by processing the image by the image processing section 18.

The display section 20 includes the liquid crystal display monitor 47 and a circuit which displays an image, an operation menu and the like in the liquid crystal display monitor 47.

The setting information storage memory section 21 includes an ROM portion in which various image quality parameters are stored beforehand; an RAM portion in which there are stored the image quality parameter selected from the image quality parameters read from the ROM portion, by an input operation of the operating section 12; and a circuit which controls input/output with respect to the memories.

In the digital camera 40 constituted in this manner, the photographing optical system 41 has a sufficiently wide angle of field, is small-sized, has a high zoom ratio and has an image forming performance stabilized in the whole zooming region. In the wide-angle end and the telephoto end, a fast focusing operation is possible.

The present invention may be applied to not only a so-called compact digital camera which photographs a general subject as described above but also a monitoring camera requiring a wide angle of field and a lens interchangeable type camera.

The above-described example implementations of the present invention are not to be regarded as limiting and may be varied in many ways without departing from the spirit and scope of the invention, and such modifications are intended to be included within the scope of the present invention.

What is claimed is:

1. A three-unit zoom lens system comprising, in order from an object side:
   a first lens unit having a negative refractive power;
   a second lens unit having a positive refractive power; and
   a third lens unit having a positive refractive power,
   wherein during zooming from a wide-angle end to a telephoto end, a space between the first lens unit and the second lens unit narrows, at least the second lens unit and the third lens unit move only toward the object side;
   the second lens unit comprises a cemented lens component which comprises, in order from the object side, a positive lens element, a negative lens element and a positive lens element;
   the lens elements are cemented on an optical axis;
   the third lens unit comprises a positive lens element, and the total number of the lens elements in the third lens unit is one.

2. The three-unit zoom lens system according to claim 1, wherein only the third lens unit moves for focusing.

3. The three-unit zoom lens system according to claim 2, wherein the following condition (BA) is satisfied:

$$0.5 < 1 - \beta_{3T}^2 < 1.0 \tag{BA}$$

wherein $\beta_{3T}$ is a lateral magnification of the third lens unit in the telephoto end.

4. The three-unit zoom lens system according to claim 1, wherein the first lens unit comprises, in order from the object side, a negative lens element and a positive lens element; and
   the total number of the lens elements in the first lens unit is two.

5. A three-unit zoom lens system comprising, in order from an object side:
   a first lens unit having a negative refractive power;
   a second lens unit having a positive refractive power; and
   a third lens unit having a positive refractive power,
   wherein during zooming from a wide-angle end to a telephoto end, a space between the first lens unit and the second lens unit narrows, at least the second lens unit and the third lens unit move only toward the object side;
   the first lens unit comprises, in order from the object side, a negative lens element and a positive lens element;
   the total number of the lens elements in the first lens unit is two;
   the second lens unit comprises a positive lens element and a negative lens element;
   the total number of the lens elements in the second lens unit is three;
   the third lens unit comprises a positive lens element;
   the total number of the lens elements in the third lens unit is one; and
   the following condition (1A) is satisfied:

$$1.0 < Cj\max/f_t < 2.0 \tag{1A}$$

wherein Cjmax is a maximum value of a distance from an incidence surface of the first lens unit to an image surface in a zooming region from the wide-angle end to the telephoto end, and
   $f_t$ is a focal length of the zoom lens system in the telephoto end.

6. The three-unit zoom lens system according to claim 1, wherein the following condition (2A) is satisfied:

$$4.0 < Cj(w)/f_w < 6.0 \tag{2A}$$

wherein Cj(w) is a distance from an incidence surface of the first lens unit to an image surface in the wide-angle end, and $f_w$ is a focal length of the zoom lens system in the wide-angle end.

7. The three-unit zoom lens system according to claim 1, wherein the following condition (3A) is satisfied:

$$-0.005<(D_2(t)-D_2(w))/f_w<0.5 \qquad (3A),$$

wherein $D_2(w)$ is an air space between the second lens unit and the third lens unit along the optical axis in the wide-angle end, $D_2(t)$ is an air space between the second lens unit and the third lens unit along the optical axis in the telephoto end, and fw is a focal length of the zoom lens system in the wide-angle end.

8. The three-unit zoom lens system according to claim 1, wherein the second lens unit comprises a cemented lens component which comprises, in order from the object side, a positive lens element, a negative lens element and a positive lens element; and the total number of the lens elements in the second lens unit is three.

9. The three-unit zoom lens system according to claim 5, wherein the second lens unit comprises, in order from the object side, a positive lens element as a single lens element, and a cemented lens component constituted by cementing a positive lens element and a negative lens element.

10. A three-unit zoom lens system comprising, in order from an object side:

a first lens unit having a negative refractive power;
a second lens unit having a positive refractive power; and
a third lens unit having a positive refractive power,
wherein during zooming from a wide-angle end to a telephoto end, a space between the first lens unit and the second lens unit narrows, at least the second lens unit and the third lens unit move only toward the object side;
the first lens unit comprises, in order from the object side, a negative lens element and a positive lens element;
the total number of the lens elements in the first lens unit is two;
the second lens unit comprises a positive lens element and a negative lens element, the total number of the lens elements in the second lens unit is three;
the third lens unit comprises a positive lens element, the total number of the lens elements in the third lens unit is one; and
the following conditions (4A) and (5A) are satisfied:

$$1.2<|\Delta 2g/f_w|<2.0 \qquad (4A); \text{ and}$$

$$0.4<\Sigma d2g/f_w<0.74 \qquad (5A),$$

wherein $\Delta 2g$ is a movement amount of the second lens unit during zooming from the wide-angle end to the telephoto end, $\Sigma d2g$ is a thickness of the second lens unit along an optical axis, and $f_w$ is a focal length of the zoom lens system in the wide-angle end.

11. The three-unit zoom lens system according to claim 10, wherein the following condition (3A) is satisfied:

$$-0.005<(D_2(t)-D_2(w))/f_w<0.5 \qquad (3A),$$

wherein D2(w) is an air space between the second lens unit and the third lens unit along the optical axis in the wide-angle end, and D2(t) is an air space between the second lens unit and the third lens unit along the optical axis in the telephoto end.

12. The three-unit zoom lens system according to claim 10, wherein the second lens unit comprises a cemented lens component which comprises, in order from the object side, a positive lens element, a negative lens element and a positive lens element.

13. The three-unit zoom lens system according to claim 10, wherein the second lens unit comprises, in order from the object side, a positive lens element as a single lens element, and a cemented lens component constituted by cementing a positive lens element and a negative lens element.

14. The three-unit zoom lens system according to claim 1, wherein the following condition (6A) is satisfied, $$1.3<Cj(t)/f_t<1.8 \qquad (6A),$$

wherein Cj(t) is a distance from an incidence surface of the first lens unit to an image surface in the telephoto end, and $f_t$ is a focal length of the zoom lens system in the telephoto end.

15. The three-unit zoom lens system according to claim 1, wherein the third lens unit moves to perform focusing, and the following condition (7A) is satisfied:

$$3.0<f_3/f_w<10 \qquad (7A),$$

in which f3 is a focal length of the third lens unit, and $f_w$ is a focal length of the zoom lens system in the wide-angle end.

16. The three-unit zoom lens system according to claim 1, wherein the following condition (AA) is satisfied:

$$2.5 \leq f_t/f_w<5.5 \qquad (AA),$$

wherein $f_t$ is a focal length of the zoom lens system in the telephoto end, and $f_w$ is a focal length of the zoom lens system in the wide-angle end.

17. The three-unit zoom lens system according to claim 1, further comprising:

an aperture stop which is disposed immediately before the second lens unit and which moves integrally with the second lens unit during zooming.

18. An image pickup apparatus comprising:

the three-unit zoom lens system according to claim 1; and
an image sensor which is disposed on the image side of the three-unit zoom lens system and which converts an optical image formed by the three-unit zoom lens system into an electric signal.

19. A zoom lens system comprising, in order from an object side, a first lens unit having a negative refractive power;
a second lens unit having a positive refractive power; and
a third lens unit having a positive refractive power,
wherein a space between the second lens unit and the third lens unit changes during zooming or during focusing operation;
during zooming from a wide-angle end to a telephoto end, a space between the first lens unit and the second lens unit narrows, at least the second lens unit and the third lens unit move only toward the object side;
the first lens unit comprises, in order from the object side, a negative lens element and a positive lens element;
the total number of the lens elements in the first lens unit is two;
the second lens unit comprises three lens elements in total;
the third lens unit comprises a positive lens element;
the total number of the lens elements in the third lens unit is one;

the total number of the lens elements in the zoom lens system is six; and the following condition (1B) is satisfied:

$$0.45 < \Sigma d1G/f_w < 0.65 \qquad (1B),$$

wherein $\Sigma d1G$ is a thickness of the first lens unit along an optical axis, and $f_w$ is a focal length of the zoom lens system in the wide-angle end.

20. The zoom lens system according to claim 19, wherein the space between the second lens unit and the third lens unit changes during zooming, and the following conditions (2B) and (3B) are satisfied:

$$0.04 < D_2(w)/f_3 < 0.23 \qquad (2B); \text{ and}$$

$$0.04 < D_2(t)/f_3 < 0.23 \qquad (3B),$$

wherein D2(w) is an air space between the second lens unit and the third lens unit along the optical axis in the wide-angle end, $D_2(t)$ is an air space between the second lens unit and the third lens unit along the optical axis in the telephoto end, and $f_3$ is a focal length of the third lens unit.

21. A zoom lens system comprising, in order from an object side, a first lens unit having a negative refractive power;
a second lens unit having a positive refractive power; and
a third lens unit having a positive refractive power,
wherein a space between the second lens unit and the third lens unit changes during zooming;
during zooming from a wide-angle end to a telephoto end, a space between the first lens unit and the second lens unit narrows, and
during zooming from the wide-angle end to the telephoto end, at least the second lens unit moves only toward the object side, and the third lens unit moves so as to be positioned closer to the object side in the telephoto end than in the wide-angle end;
the first lens unit comprises, in order from the object side, a negative lens element and a positive lens element;
the total number of the lens elements in the first lens unit is two;
the second lens unit comprises three lens elements in total;
the third lens unit comprises a positive lens element;
the total number of the lens elements in the third lens unit is one;
the total number of the lens elements in the zoom lens system is six; and
the following conditions (2B) and (3B) are satisfied:

$$0.04 < D_2(w)/f_3 < 0.23 \qquad (2B); \text{ and}$$

$$0.04 < D_2(t)/f_3 < 0.23 \qquad (3B),$$

wherein D2(w) is an air space between the second lens unit and the third lens unit along the optical axis in the wide-angle end, $D_2(t)$ is an air space between the second lens unit and the third lens unit along the optical axis in the telephoto end, and $f_3$ is a focal length of the third lens unit.

22. The zoom lens system according to claim 19, wherein the following condition (4B) is satisfied:

$$0.04 < D_2/f_3 < 0.18 \qquad (4B),$$

wherein $D_2$ is an air space between the second lens unit and the third lens unit along the optical axis in a state between the wide-angle end and the telephoto end, and $f_3$ is a focal length of the third lens unit.

23. A zoom lens system comprising, in order from an object side:

a first lens unit having a negative refractive power;
a second lens unit having a positive refractive power; and
a third lens unit having a positive refractive power,.
wherein a space between the second lens unit and the third lens unit changes during zooming or during focusing operation;
during zooming from a wide-angle end to a telephoto end, a space between the first lens unit and the second lens unit narrows, and
during zooming from the wide-angle end to the telephoto end, at least the second lens unit moves only toward the object side, and the third lens unit moves so as to be positioned closer to the object side in the telephoto end than in the wide-angle end;
the first lens unit comprises, in order from the object side, a negative lens element and a positive lens element;
the total number of the lens elements in the first lens unit is two;
the second lens unit comprises three lens elements in total;
the third lens unit comprises a positive lens element;
the total number of the lens elements in the third lens unit is one;
the total number of the lens elements in the zoom lens system is six; and
the following condition (4B) is satisfied:

$$0.04 < D_2/f_3 < 0.18 \qquad (4B),$$

wherein $D_2$ is an air space between the second lens unit and the third lens unit along the optical axis in a state between the wide-angle end and the telephoto end, and $f_3$ is a focal length of the third lens unit.

24. The zoom lens system according to claim 19, wherein the space between the second lens unit and the third lens unit satisfies the following condition (5B):

$$-0.005 < (D_2(t) - D_2(w))/f_w < 0.5 \qquad (5B),$$

wherein $D_2(w)$ is an air space between the second lens unit and the third lens unit along the optical axis in the wide-angle end, and $D_2(t)$ is an air space between the second lens unit and the third lens unit along the optical axis in the telephoto end, $f_w$ is a focal length of the zoom lens system in the wide-angle end.

25. The zoom lens system according to claim 19, wherein the second lens unit comprises a cemented lens component which comprises the three lens elements.

26. The zoom lens system according to claim 19, wherein the first lens unit satisfies the following condition (6B):

$$-0.41 < f_w/RDY(R)_{L2} < 0.41 \qquad (6B),$$

in which $RDY(R)L_2$ is a paraxial radius of curvature of a lens surface of the first lens unit closest to an image side.

27. The zoom lens system according to claim 19, wherein a space between the lens unit of the zoom lens system in a collapsed is set to be smaller than the space in the wide-angle end.

28. The zoom lens system according to claim 19, wherein only the third lens unit moves during focusing.

29. The zoom lens system according to claim 24, wherein the space between the second lens unit and the third lens unit changes during zooming.

30. The zoom lens system according to claim 19, wherein during zooming from the wide-angle end to the telephoto end, the first lens unit moves toward an image side and then moves toward the object side.

31. The zoom lens system according to claim 19, wherein the following condition (7B) is satisfied:

$$1.40 < D_1(w)/f_w < 2.80 \quad (7B),$$

wherein $D_1(w)$ is an air space between the first lens unit and the second lens unit along the optical axis in the wide-angle end, and $f_w$ is a focal length of the zoom lens system in the wide-angle end.

32. The zoom lens system according to claim 28, wherein the following condition (8B) is satisfied:

$$0.5 < D_2(t)/D_2(w) < 2.0 \quad (8B),$$

wherein $D_2(w)$ is an air space between the second lens unit and the third lens unit along the optical axis in the wide-angle end, and $D_2(t)$ is an air space between the second lens unit and the third lens unit along the optical axis in the telephoto end.

33. The zoom lens system according to claim 19, wherein the second lens unit comprises a positive lens element and a negative lens element.

34. The zoom lens system according to claim 25, wherein the second lens unit comprises a cemented lens component which comprises, in order from the object. side, a positive lens element, a negative lens element and a positive lens element.

35. The zoom lens system according to claim 33, wherein the second lens unit comprises, in order from the object side, a single lens element having a positive refractive power, and a cemented lens component including a positive lens element and a negative lens element.

36. The zoom lens system according to claim 28, wherein the third lens unit satisfies the following condition (9B):

$$3.8 < f_3/f_w < 15.0 \quad (9B),$$

wherein $f_3$ is a focal length of the third lens unit, and $f_w$ is a focal length of the zoom lens system in the wide-angle end.

37. The zoom lens system according to claim 28, wherein the third lens unit satisfies the following condition (10B):

$$0.01 < D_{3G}/f_t < 0.08 \quad (10B),$$

wherein $D_3G$ is a thickness of the third lens unit along the optical axis, and $f_t$ is a focal length of the zoom lens system in the telephoto end.

38. The zoom lens system according to claim 19, wherein the following condition (AB) is satisfied:

$$2.5 \leq f_1/f_w < 5.5 \quad (AB),$$

wherein $f_1$ is a focal length of the zoom lens system in the telephoto end, and $f_w$ is a focal length of the zoom lens system in the wide-angle end.

39. The zoom lens system according to claim 19, further comprising:

an aperture stop which is disposed immediately before the second lens unit and which moves integrally with the second lens unit during zooming.

40. An image pickup apparatus comprising:

the zoom lens system according to claim 19 and an image sensor which is disposed on the image side of the zoom lens system and which converts an optical image formed by the zoom lens system into an electric signal.

41. A zoom lens system comprising, in order from an object side, a first lens unit having a negative refractive power;

a second lens unit having a positive refractive power; and a third lens unit having a positive refractive power, wherein during zooming from a wide-angle end to a telephoto end, a space between the first lens unit and the second lens unit narrows, at least the second lens unit and the third lens unit move only toward the object side;

the first lens unit comprises, in order from the object side, a negative lens element and a positive lens element, the total number of the lens elements in the first lens unit is two;

the third lens unit comprises a positive lens element, the total number of the lens elements in the third lens unit is one;

a lens surface of the first lens unit closest to an image side is a concave surface which faces the image side;

a lens surface of the second lens unit closest to the object side is a convex surface which faces the object side;

a lens surface of the second lens unit closest to the image side is a concave surface which faces the image side;

a lens surface of the third lens unit closest to the object side is a convex surface which faces the object side; and the following conditions (1C) and (2C) are satisfied:

$$1.0 < RG1I/RG2O < 6.0 \quad (1C); \text{and}$$

$$0.5 < RG2I/RG3O < 3.0 \quad (2C),$$

wherein RG1I is a paraxial radius of curvature of the lens surface of the first lens unit closest to the image side, RG2O is a paraxial radius of curvature of the lens surface of the second lens unit closest to the object side, RG2I is a paraxial radius of curvature of the lens surface of the second lens unit closest to the image side, and RG3O is a paraxial radius of curvature of the lens surface of the third lens unit closest to the object side.

42. A zoom lens system comprising, in order from an object side, a first lens unit having a negative refractive power;

a second lens unit having a positive refractive power; and a third lens unit having a positive refractive power, wherein during zooming from a wide-angle end to a telephoto end, a space between the first lens unit and the second lens unit narrows, at least the second lens unit and the third lens unit move only toward the object side;

the first lens unit comprises, in order from the object side, a negative lens element and a positive lens element;

the total number of the lens elements in the first lens unit is two;

the third lens unit comprises a positive lens element, the total number of the lens elements in the third lens unit is one; and each lens surface of the zoom lens system brought into contact with air on an optical axis, excluding a lens surface closest to the object side, has a center of paraxial curvature thereof on an image side of a vertex of the lens surface, wherein the second lens unit comprises a cemented lens component which comprises a plurality of lens elements cemented on the optical axis.

43. A zoom lens system comprising, in order from an object side, a first lens unit having a negative refractive power;

a second lens unit having a positive refractive power; and a third lens unit having a positive refractive power, wherein during zooming from a wide-angle end to a telephoto end, a space between the first lens unit and the second lens unit narrows, at least the second lens unit and the third lens unit move only toward the object side;

the first lens unit comprises, in order from the object side, a negative lens element and a positive lens element;

the total number of the lens elements in the first lens unit is two;

the third lens unit comprises a positive lens element, the total number of the lens elements in the third lens unit is one; and each lens surface of the zoom lens system brought into contact with air on an optical axis, excluding a lens surface closest to the object side, has a center of paraxial curvature thereof on an image side of a vertex of the lens surface, wherein the following condition (3C) is satisfied:

$$n_{1p} > 1.9 \tag{3C}$$

wherein $n_{1p}$ is a refractive index of the positive lens element of the first lens unit.

44. A zoom lens system comprising, in order from an object side, a first lens unit having a negative refractive power;

a second lens unit having a positive refractive power; and a third lens unit having a positive refractive power, wherein during zooming from a wide-angle end to a telephoto end, a space between the first lens unit and the second lens unit narrows, at least the second lens unit and the third lens unit move only toward the object side;

the first lens unit comprises, in order from the object side, a negative lens element and a positive lens element;

the total number of the lens elements in the first lens unit is two;

the third lens unit comprises a positive lens element, the total number of the lens elements in the third lens unit is one; and each lens surface of the zoom lens system brought into contact with air on an optical axis, excluding a lens surface closest to the object side, has a center of paraxial curvature thereof on an image side of a vertex of the lens surface, wherein the following condition (4C) is satisfied:

$$-0.15 < (D_2(t) - D_2(w))/f_w < 0.5 \tag{4C}$$

wherein $D_2(w)$ is a space between the second lens unit and the third lens unit along the optical axis in the wide-angle end, $D_2(t)$ is a space between the second lens unit and the third lens unit along the optical axis in the telephoto end, and $f_w$ is a focal length of the whole zoom lens system in the wide-angle end.

45. A zoom lens system comprising, in order from an object side, a first lens unit having a negative refractive power;

a second lens unit having a positive refractive power; and a third lens unit having a positive refractive power, wherein during zooming from a wide-angle end to a telephoto end, a space between the first lens unit and the second lens unit narrows, at least the second lens unit and the third lens unit move only toward the object side;

the first lens unit comprises, in order from the object side, a negative lens element and a positive lens element;

the total number of the lens elements in the first lens unit is two;

the third lens unit comprises a positive lens element, the total number of the lens elements in the third lens unit is one; and each lens surface of the zoom lens system brought into contact with air on an optical axis, excluding a lens surface closest to the object side, has a center of paraxial curvature thereof on an image side of a vertex of the lens surface, wherein the second lens unit comprises a cemented triplet component which comprises, in order from an object side, a positive lens element, a negative lens element and a positive lens element; and the total number of the lens elements of the second lens unit is three.

46. A zoom lens system comprising, in order from an object side, a first lens unit having a negative refractive power;

a second lens unit having a positive refractive power; and a third lens unit having a positive refractive power, wherein during zooming from a wide-angle end to a telephoto end, a space between the first lens unit and the second lens unit narrows, at least the second lens unit and the third lens unit move only toward the object side;

the first lens unit comprises, in order from the object side, a negative lens element and a positive lens element;

the total number of the lens elements in the first lens unit is two;

the third lens unit comprises a positive lens element, the total number of the lens elements in the third lens unit is one; and each lens surface of the zoom lens system brought into contact with air on an optical axis, excluding a lens surface closest to the object side, has a center of paraxial curvature thereof on an image side of a vertex of the lens surface, wherein the following condition (5C) is satisfied:

$$1.5 < Cj(t)/f_t < 1.8 \tag{5C}$$

wherein $Cj(t)$ is an axial distance from the surface of the zoom lens system closest to the object side to an image surface in the telephoto end, and $f_t$ is a focal length of the zoom lens system in the telephoto end.

47. A zoom lens system comprising, in order from an object side, a first lens unit having a negative refractive power;

a second lens unit having a positive refractive power; and a third lens unit having a positive refractive power, wherein during zooming from a wide-angle end to a telephoto end, a space between the first lens unit and the second lens unit narrows, at least the second lens unit and the third lens unit move only toward the object side;

the first lens unit comprises, in order from the object side, a negative lens element and a positive lens element;

the total number of the lens elements in the first lens unit is two;

the third lens unit comprises a positive lens element, the total number of the lens elements in the third lens unit is one; and each lens surface of the zoom lens system brought into contact with air on an optical axis, excluding a lens surface closest to the object side, has a center of paraxial curvature thereof on an image side of a vertex of the lens surface, wherein a zoom ratio of the zoom lens system is 2.5 or more.

48. The zoom lens system according to claim 47, wherein the following conditions (7C), (8C) and (9C) are satisfied:

$$-2.2 < (D_1(t) - D_1(w))/f_w < -1.3 \quad (7C);$$

$$1.1 < (D_3(t) - D_3(w))/f_w < 1.9 \quad (8C); \text{ and}$$

$$2.5 < f_t/f_w < 4.0 \quad (9C),$$

wherein $D_1(w)$ is a space between the first lens unit and the second lens unit along the optical axis in the wide-angle end, $D_1(t)$ is a space between the first lens unit and the second lens unit along the optical axis in the telephoto end, $D_3(w)$ is a space between the third lens unit and an image surface along the optical axis in the wide-angle end, $D_3(t)$ is a space between the third lens unit and the image surface along the optical axis in the telephoto end, $f_t$ is a focal length of the zoom lens system in the telephoto end, and $f_w$ is a focal length of the zoom lens system in the wide-angle end.

* * * * *